(12) United States Patent  
Matsuo

(10) Patent No.: US 9,680,639 B2  
(45) Date of Patent: Jun. 13, 2017

(54) SECRET SHARING APPARATUS AND SECRET SHARING METHOD THAT RESTORES SECRET DATA FROM AT LEAST TWO OF GENERATED SHARED DATA

(75) Inventor: Masakatsu Matsuo, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 554 days.

(21) Appl. No.: 13/434,369

(22) Filed: Mar. 29, 2012

(65) Prior Publication Data

US 2012/0255030 A1 Oct. 4, 2012

(30) Foreign Application Priority Data

Mar. 31, 2011 (JP) .................................. 2011-077630

(51) Int. Cl.
*G06F 21/00* (2013.01)
*H04L 9/08* (2006.01)

(52) U.S. Cl.
CPC .................................. *H04L 9/085* (2013.01)

(58) Field of Classification Search
CPC ... H04L 9/085; H04L 9/00; H04L 9/08; H04L 9/0816
USPC .......................................................... 726/26
See application file for complete search history.

(56) References Cited

U.S. PATENT DOCUMENTS

| | | | | |
|---|---|---|---|---|
| 7,515,901 B1* | 4/2009 | Kaundinya | ............ | G06Q 10/08 380/247 |
| 2002/0071557 A1* | 6/2002 | Nguyen | .................. | G07F 17/32 380/251 |
| 2003/0018608 A1* | 1/2003 | Rice | ........................ | G06F 21/14 |
| 2003/0149869 A1* | 8/2003 | Gleichauf | ............... | H04L 45/50 713/153 |
| 2004/0025102 A1* | 2/2004 | Yokokawa | .......... | H03M 13/258 714/755 |
| 2005/0123206 A1* | 6/2005 | Sakai et al. | .................. | 382/238 |
| 2007/0180294 A1* | 8/2007 | Kameyama | ......... | G06F 11/1076 714/6.12 |
| 2007/0253548 A1* | 11/2007 | Kameyama et al. | ........... | 380/28 |
| 2008/0205637 A1 | 8/2008 | Kurihara | | |

(Continued)

FOREIGN PATENT DOCUMENTS

| | | |
|---|---|---|
| JP | 2007-124032 | 5/2007 |
| JP | 2008-145917 | 6/2008 |
| JP | 2008-203720 | 9/2008 |

OTHER PUBLICATIONS

Notification of Transmittal of the International Search Report and the Written Opinion of the International Searching Authority, or the Declaration dated Jul. 17, 2012.

(Continued)

*Primary Examiner* — William Goodchild

(74) *Attorney, Agent, or Firm* — Dickinson Wright PLLC

(57) ABSTRACT

A secret sharing apparatus generates, from secret data, a plurality of pieces of shared data from which the secret data is able to be restored. The secret data includes a plurality of pieces of divided data which does not include a random number. The secret sharing apparatus includes a shared data generating section which performs an XOR operation between the pieces of divided data and generates the plurality of pieces of shared data which includes the result of the XOR operation between the pieces of divided data.

9 Claims, 80 Drawing Sheets

(56) References Cited

U.S. PATENT DOCUMENTS

2009/0198888 A1* 8/2009 Mannen .............. G06F 11/1076
711/114
2010/0070839 A1* 3/2010 Shigihara et al. ............ 714/807

OTHER PUBLICATIONS

International Search Report dated Jul. 17, 2012.
Written Opinion of the International Searching Authority dated Jul. 17, 2012.
A. Shamir, "How to Share a Secret," Communications of the ACM, vol. 22, No. 11, Nov. 1979, pp. 612-613, p. 1, Line 14.
L. Chunli, "Efficient Ideal Threshold Secret Sharing Schemes Based on Exclusive-OR Operations," Fourth International Conference on Network and System Security, XP31801826A, 2010, pp. 136-143.
J. Kurihara, "A Fast (3, n)—Threshold Secret Sharing Scheme Using Exclusive-OR Operations," IEICE Trans. Fundamentals, vol. E91-A, No. 1, XP-001509987, Jan. 2008, pp. 127-138.
Z. Chen, "A Rapid Secret Sharing Scheme for Resource Constrained Environments," Fifth IEEE International Symposium on Embedded Computing, XP31366788A, 2008, pp. 55-60.
R. Cramer, "Detection of Algebraic Manipulation with Applications to Robust Secret Sharing and Fuzzy Extractors," LNCS 4965, XP19088218A, 2008, pp. 471-488.
H. Kameyama, et al., "Secure Distribution of Information using LDPC code," Fujitsu Laboratories LTD, Jul. 2006, pp. 913-916, with partial English translation.

* cited by examiner

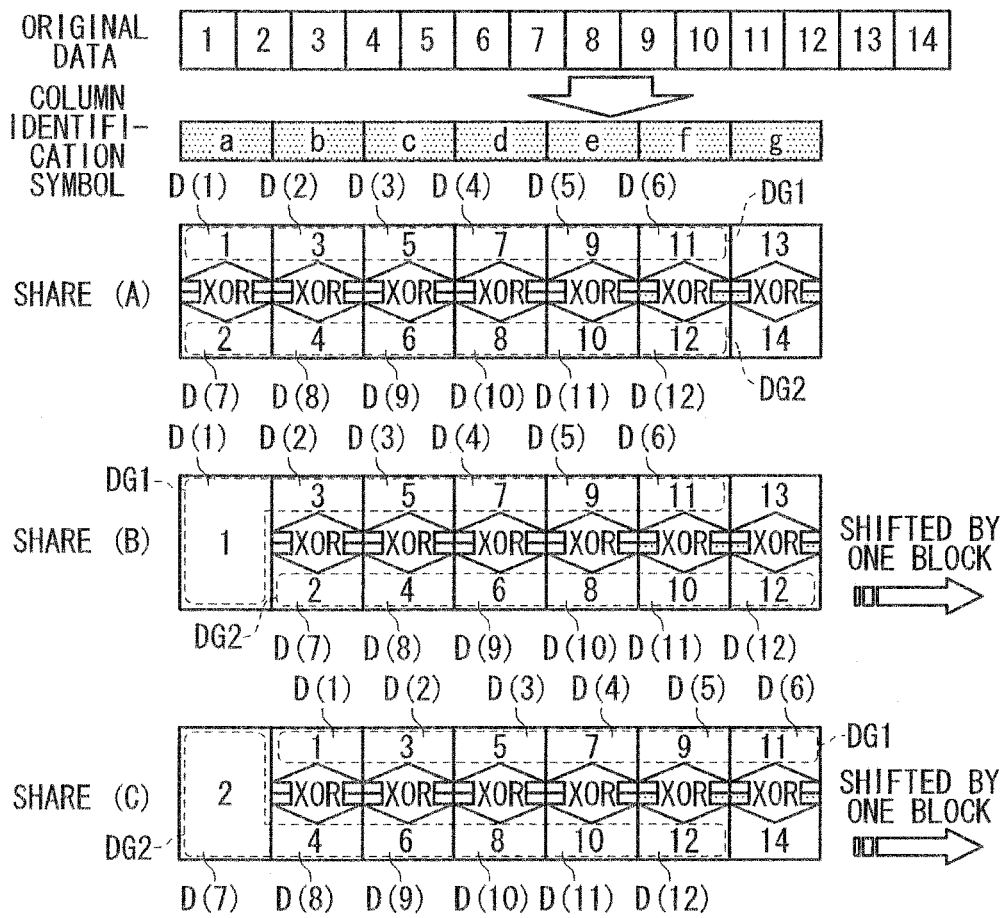

FIG. 56
ORIGINAL DATA
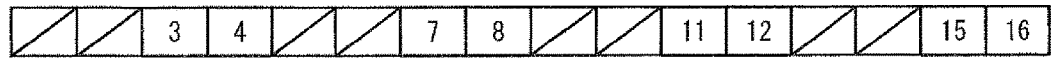
RANDOM NUMBER
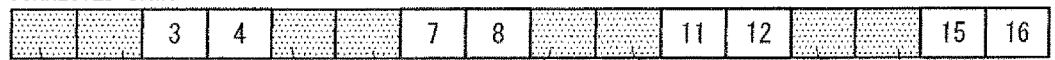
CORRECTED DATA
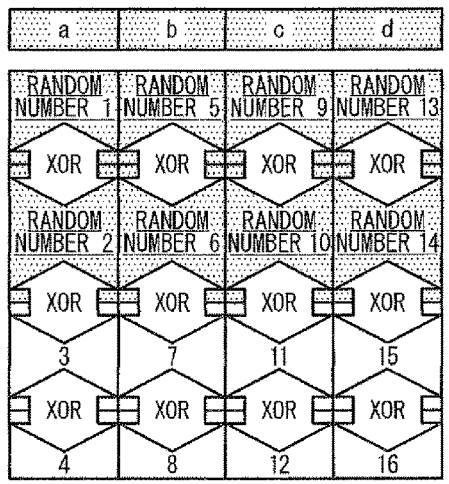
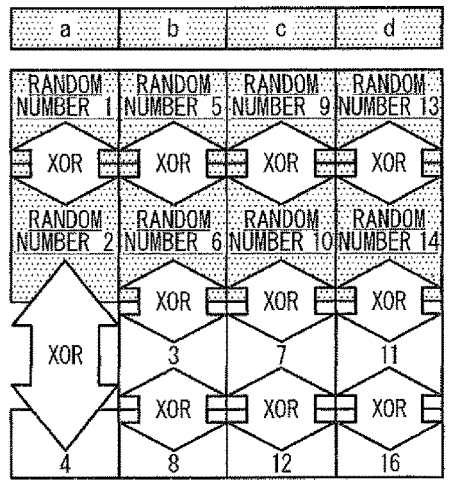
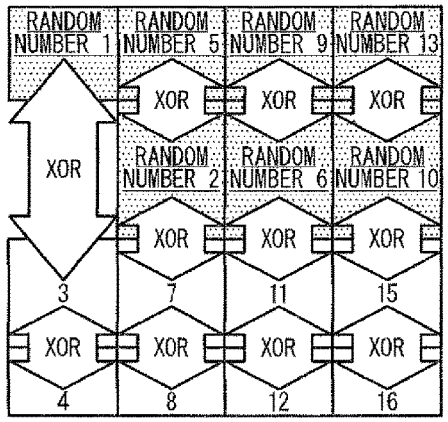
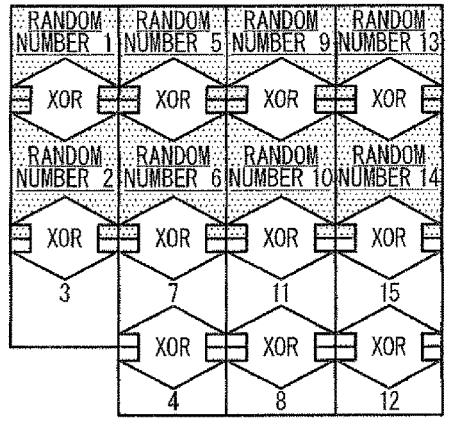

FIG. 57

| | COLUMN IDENTIFICATION SYMBOL | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | ... | 39 | 40 | | | | | | | | | | | | | | | | | | | | | | | | |
| ORIGINAL DATA | | | | | | | | | | | | | | | | | | | | | | | | | | | | | | | | | | | | | | | | |
| | a | b | c | d | e | f | g | h | i | j | k | l | m | n | o | p | q | r | s | t |
| SHARE (1) | | | | | | | 1 | 3 | 5 | 7 | 9 | 11 | 13 | 15 | 17 | 19 | 21 | 23 | 25 | 27 | 29 | 31 | 33 | 35 | 37 | 39 |
| | | | | | | | 2 | 4 | 6 | 8 | 10 | 12 | 14 | 16 | 18 | 20 | 22 | 24 | 26 | 28 | 30 | 32 | 34 | 36 | 38 | 40 |
| SHARE (2) | | | | | | | | 1 | 3 | 5 | 7 | 9 | 11 | 13 | 15 | 17 | 19 | 21 | 23 | 25 | 27 | 29 | 31 | 33 | 35 | 37 | 39 |
| | | | | | | | | 2 | 4 | 6 | 8 | 10 | 12 | 14 | 16 | 18 | 20 | 22 | 24 | 26 | 28 | 30 | 32 | 34 | 36 | 38 | 40 |
| SHARE (3) | | | | | | | | | 1 | 3 | 5 | 7 | 9 | 11 | 13 | 15 | 17 | 19 | 21 | 23 | 25 | 27 | 29 | 31 | 33 | 35 | 37 | 39 |
| | | | | | | | | | 2 | 4 | 6 | 8 | 10 | 12 | 14 | 16 | 18 | 20 | 22 | 24 | 26 | 28 | 30 | 32 | 34 | 36 | 38 | 40 |
| SHARE (4) | | | | | | | | | | 1 | 3 | 5 | 7 | 9 | 11 | 13 | 15 | 17 | 19 | 21 | 23 | 25 | 27 | 29 | 31 | 33 | 35 | 37 | 39 |
| | | | | | | | | | | 2 | 4 | 6 | 8 | 10 | 12 | 14 | 16 | 18 | 20 | 22 | 24 | 26 | 28 | 30 | 32 | 34 | 36 | 38 | 40 |
| SHARE (5) | | | | | | | | | | | 1 | 3 | 5 | 7 | 9 | 11 | 13 | 15 | 17 | 19 | 21 | 23 | 25 | 27 | 29 | 31 | 33 | 35 | 37 | 39 |
| | | | | | | | | | | | 2 | 4 | 6 | 8 | 10 | 12 | 14 | 16 | 18 | 20 | 22 | 24 | 26 | 28 | 30 | 32 | 34 | 36 | 38 | 40 |
| SHARE (6) | | | | | | | | | | | | 1 | 3 | 5 | 7 | 9 | 11 | 13 | 15 | 17 | 19 | 21 | 23 | 25 | 27 | 29 | 31 | 33 | 35 | 37 | 39 |
| | | | | | | | | | | | | 2 | 4 | 6 | 8 | 10 | 12 | 14 | 16 | 18 | 20 | 22 | 24 | 26 | 28 | 30 | 32 | 34 | 36 | 38 | 40 |
| SHARE (7) | | | | | | | | | | | | | 1 | 3 | 5 | 7 | 9 | 11 | 13 | 15 | 17 | 19 | 21 | 23 | 25 | 27 | 29 | 31 | 33 | 35 | 37 | 39 |
| | | | | | | | | | | | | | 2 | 4 | 6 | 8 | 10 | 12 | 14 | 16 | 18 | 20 | 22 | 24 | 26 | 28 | 30 | 32 | 34 | 36 | 38 | 40 |

RESTORING METHOD (OUTLINE)

① GIVEN SHARED DATA IS ARRANGED IN THE ASCENDING ORDER OF SERIAL NUMBERS FROM THE TOP.
② FIRST ROW IS RESTORED IN SHARED DATA HAVING SMALLEST SERIAL NUMBER.
SECOND ROW IS RESTORED IN SHARED DATA HAVING SECOND SMALLEST SERIAL NUMBER. THEREAFTER, THE SAME RESTORATION IS PERFORMED.

EXAMPLE: IN A CASE WHERE THRESHOLD VALUE IS 5, THE NUMBER OF SHARES IS 6, AND SHARES (1) TO (5) ARE USED IN RESTORATION

I (k, n) COMPLETE THRESHOLD SECRET SHARING SCHEME (a) IN A CASE WHERE THRESHOLD VALUE IS 2

(1) DATA S TO ACTUALLY BE KEPT SECRET

| 1 | 2 | 3 | 4 | 5 | 6 | 7 | 8 |
|---|---|---|---|---|---|---|---|

(2) INSERT GENUINE (PHYSICAL) RANDOM NUMBERS IN DATA TO ACTUALLY BE KEPT SECRET (SET DATA SIZE AFTER INSERTION TO TWO TIMES OR MORE WHICH ARE THRESHOLD VALUE)

| ① | 1 | ② | 2 | ③ | 3 | ④ | 4 | ⑤ | 5 | ⑥ | 6 | ⑦ | 7 | ⑧ | 8 | ⑨ |
|---|---|---|---|---|---|---|---|---|---|---|---|---|---|---|---|---|

(3) CREATE SHARED DATA (W1, W2)

※ SHARED DATA (W1, W2) BECOMES VERNAM CIPHER, AND IT IS ABSO-
    LUTELY IMPOSSIBLE TO RESTORE OR ESTIMATE ORIGINAL DATA ONLY
    BY INFORMATION OF W1 AND W2 UNDER THRESHOLD VALUE
    (ABSOLUTELY SECURE)

W1

| ① | ② | ③ | ④ | ⑤ | ⑥ | ⑦ | ⑧ | ⑨ |
|---|---|---|---|---|---|---|---|---|
|   | 1 | 2 | 3 | 4 | 5 | 6 | 7 | 8 |

※ XOR OPERATION ON UPPER AND LOWER LAYERS

W2

| ① | ② | ③ | ④ | ⑤ | ⑥ | ⑦ | ⑧ | ⑨ |
|---|---|---|---|---|---|---|---|---|
| 1 | 2 | 3 | 4 | 5 | 6 | 7 | 8 |   |

※ XOR OPERATION ON UPPER AND LOWER LAYERS (4) ENTROPY

ENTROPY $H(S) = \log 256^8 = 64$ bits
   ENTROPY $H(S|W1) = H(S|W2) = \log 256^8 = 64$ bits
   ∴ $H(S) = H(S|W1) = H(S|W2)$

ACCORDINGLY, INFOLOGICAL SECURITY IS ACHIEVED.

FIG. 73

I (k, n) COMPLETE THRESHOLD SECRET SHARING SCHEME (b) IN A CASE WHERE THRESHOLD VALUE IS 3

(1) DATA S TO ACTUALLY BE KEPT SECRET

| 1 | 2 | 3 | 4 | 5 | 6 |

(2) INSERT GENUINE (PHYSICAL) RANDOM NUMBERS IN DATA TO ACTUALLY BE KEPT SECRET (SET DATA SIZE AFTER INSERTION TO THREE TIMES OR MORE WHICH ARE THRESHOLD VALUE)

| ① | 1 | ⑨ | ② | 2 | ⑩ | ③ | 3 | 11 | ④ | 4 | ⑫ | ⑤ | 5 | ⑬ | ⑥ | 6 | ⑭ |

※ ⑦, ⑧, ⑮, ⑯ ARE NOT SHOWN (3) CREATE SHARED DATA (W1, W2, W3)

W1:
| ① | ② | ③ | ④ | ⑤ | ⑥ | ⑦ | ⑧ | | |
| | 1 | 2 | 3 | 4 | 5 | 6 | | | |
| | ⑨ | ⑩ | ⑪ | ⑫ | ⑬ | ⑭ | ⑮ | ⑯ | |

※ XOR OPERATION ON ALL LAYERS

W2:
| | ① | ② | ③ | ④ | ⑤ | ⑥ | ⑦ | ⑧ | |
| | | 1 | 2 | 3 | 4 | 5 | 6 | | |
| | ⑨ | ⑩ | ⑪ | ⑫ | ⑬ | ⑭ | ⑮ | ⑯ | |

※ XOR OPERATION ON ALL LAYERS

W3:
| | | ① | ② | ③ | ④ | ⑤ | ⑥ | ⑦ | ⑧ |
| | | | 1 | 2 | 3 | 4 | 5 | 6 | |
| ⑨ | ⑩ | ⑪ | ⑫ | ⑬ | ⑭ | ⑮ | ⑯ | | |

※ XOR OPERATION ON ALL LAYERS (4) ENTROPY

ENTROPY $H(S) = \log 256^6 = 48$ bits

ENTROPY $H(S|W1) = H(S|W2) = H(S|W3)$
$= \log 256^{(2*6)} = 96$ bits $\therefore 2 \times H(S) = H(S|W1) = H(S|W2) = H(S|W3)$

FURTHER,

ENTROPY $H(S|W1, W2) = H(S|W1, W3) = H(S|W2, W3)$
$= \log 256^6 = 48$ bits $\therefore H(S) = H(S|W1, W2) = H(S|W1, W3) = H(S|W2, W3)$

ACCORDINGLY, INFOLOGICAL SECURITY IS ACHIEVED.

FIG. 74

I (k, n) COMPLETE THRESHOLD SECRET SHARING SCHEME (c) IN A CASE WHERE THRESHOLD VALUE k IS 2, 3, ... (ARBITRARY VALUE)

IF GENUINE (PHYSICAL) RANDOM NUMBERS WHICH ARE EQUAL TO OR LARGER THAN MULTIPLES OF k WHICH IS THRESHOLD VALUE ARE INSERTED DATA SIZE OF DATA S TO ACTUALLY BE KEPT SECRET, <u>IT IS ABSOLUTELY IMPOSSIBLE TO RESTORE AND ESTIMATE DATA TO BE ACTUALLY KEPT SECRET PERFORM RESTORATION ABSOLUTELY ONLY BY INFORMATION ABOUT SHARED DATA UNDER THRESHOLD VALUE (ABSOLUTELY SECURE)</u>

$(k-1) \times H(S) = H(S|\text{ONE PIECE OF SHARED DATA})$    WHERE $k>2$
$(k-2) \times H(S) = H(S|\text{TWO PIECES OF SHARED DATA})$    WHERE $k>3$
$(k-3) \times H(S) = H(S|\text{THREE PIECES OF SHARED DATA})$    WHERE $k>4$
           ⋮

THAT IS, $(k-(k-1)) \times H(S) = H(S|(k-1)\text{ PIECES OF SHARED DATA})$    WHERE $k>2$
$\Rightarrow H(S) = H(S|(k-1) \text{ PIECES OF SHARED DATA})$    WHERE $k>2$

ACCORDINGLY, INFOLOGICAL SECURITY IS PRESENT.

FIG. 75

II (k, L, n) RAMP THRESHOLD SECRET SHARING SCHEME (a) IN A CASE WHERE THRESHOLD VALUE IS 2

(1) DATA S TO BE REALLY KEPT SECRET

| 1 | 2 | 3 | 4 | 5 | 6 | 7 | 8 |
|---|---|---|---|---|---|---|---|

(2) SHARED DATA (W1, W2) ARE GENERATED ONLY BY DATA TO ACTUALLY BE KEPT SECRET
(HERE, SOME RANDOM NUMBERS ARE USED AT THE HEAD AND END)

W1:
| ① | 1 | 3 | 5 | 7 |   |
|---|---|---|---|---|---|
|   | 2 | 4 | 6 | 8 | ② |

※ XOR OPERATION ON UPPER AND LOWER LAYERS

W2:
|   | ① | 1 | 3 | 5 | 7 |
|---|---|---|---|---|---|
|   |   | 2 | 4 | 6 | 8 | ② |

※ XOR OPERATION ON UPPER AND LOWER LAYERS

※ ①, ② ARE RANDOM NUMBERS (3) ENTROPY

ENTROPY $H(S) = \log 256^8 = 64$ bits
ENTROPY $H(S|W1) = H(S|W2) = \log 256^{(8/2)} = 32$ bits
∴ $1/2 \times H(S) = H(S|W1) = H(S|W2)$ ACCORDINGLY, RAMP THRESHOLD SECRET SHARING WHERE L=2, THAT IS, L=k=2 IS OBTAINED.

INFORMATION CORRESPONDING TO 1/2 OF DATA IS EXPOSED BY SHARED DATA OF W1 OR W2.
THAT IS, IF K=2 PIECES OF SHARED DATA IS GIVEN, FOR EXAMPLE, $2 \times 1/2 = 1$, THAT IS, ENTIRE DATA CAN BE RESTORED.

FIG. 76

II (k, L, n) RAMP THRESHOLD SECRET SHARING SCHEME

(b) IN A CASE WHERE THRESHOLD VALUE IS 3

(1) DATA S TO ACTUALLY BE KEPT SECRET

| 1 | 2 | 3 | 4 | 5 | 6 |
|---|---|---|---|---|---|

(2) SHARED DATA (W1, W2, W3) ARE GENERATED ONLY BY DATA TO ACTUALLY BE KEPT SECRET
(HERE, SOME RANDOM NUMBERS ARE USED AT THE HEAD AND END)

W1: ※ XOR OPERATION OA ALL LAYERS
W2: ※ XOR OPERATION OA ALL LAYERS
W3: ※ XOR OPERATION OA ALL LAYERS

※ ①, ②, … , ⑩ ARE RANDOM NUMBERS (3) ENTROPY
ENTROPY $H(S) = \log 256^6 = 48$ bits
ENTROPY $H(S|W1) = H(S|W2) = H(S|W3) = \log 256^{(2 \cdot 6/3)} = 32$ bits
∴ $2/3 \times H(S) = H(S|W1) = H(S|W2) = H(S|W3)$ FURTHER,
ENTROPY $H(S|W1, W2) = H(S|W1, W3) = H(S|W2, W3) = \log 256^{(1 \cdot 6/3)} = 16$ bits
∴ $1/3 \times H(S) = H(S|W1, W2) = H(S|W1, W3) = H(S|W2, W3)$ ACCORDINGLY, RAMP THRESHOLD WHERE L=3, THAT IS, L=k=3 IS OBTAINED.

INFORMATION CORRESPONDING TO 1/3 OF DATA IS EXPOSED FROM ONE PIECE OF SHARED DATA.
THAT IS, IF K=3 PIECES OF SHARED DATA IS GIVEN, FOR EXAMPLE, $3 \times 1/3 = 1$, THAT IS, ENTIRE DATA CAN BE RESTORED.

FIG. 77

II (k, L, n) RAMP THRESHOLD SECRET SHARING SCHEME (c) IN A CASE WHERE THRESHOLD VALUE k IS 2, 3, ... (ARBITRARY VALUE)

IN A CASE WHERE SHARED DATA IS GENERATED ONLY BY DATA S TO ACTUALLY BE KEPT SECRET, THAT IS, IN A CASE WHERE DATA SIZE OF SHARED DATA IS SET TO APPROXIMATELY 1/k OF DATA TO ACTUALLY BE KEPT SECRET
(HERE, SOME RANDOM NUMBERS ARE USED AT THE HEAD AND END), THIS SECRET SHARING SCHEME IS (k, L=k, n) RAMP THRESHOLD SECRET SHARING.

$(k-1)/k \times H(S) = H(S|\text{ONE PIECE OF SHARED DATA})$ WHERE $k>2$
$(k-2)/k \times H(S) = H(S|\text{TWO PIECES OF SHARED DATA})$ WHERE $k>3$
$(k-3)/k \times H(S) = H(S|\text{THREE PIECES OF SHARED DATA})$ WHERE $k>4$
$\vdots$

THAT IS, $(k-(k-1))/k \times H(S) = H(S|(k-1)\text{PIECES OF SHARED DATA})$ WHERE $k>2$ $\Rightarrow 1/k * H(S) = H(S|(k-1) \text{PIECES OF SHARED DATA})$ WHERE $k>2$ ACCORDINGLY, L=k, THAT IS, (k, k, n) RAMP THRESHOLD SECRET SHARING SCHEME IS OBTAINED.

INFORMATION ABOUT 1/k OF DATA IS LEAKED FROM ONE PIECE OF SHARED DATA.
THAT IS, IF k PIECE OF SHARED DATA IS GIVEN, $k \times 1/k = 1$, THAT IS, ENTIRE DATA CAN BE RESTORED.

FIG. 80

SECRET SHARING APPARATUS AND SECRET SHARING METHOD THAT RESTORES SECRET DATA FROM AT LEAST TWO OF GENERATED SHARED DATA

BACKGROUND

1. Field of the Invention

The present invention relates to a secret sharing apparatus and a secret sharing method capable of performing a restoration process with a small amount of data.

2. Description of the Related Art

In the related art, a technique which uses polynomial interpolation has been proposed as a threshold secret sharing scheme (for example, refer to A. Shamir, "How to Share a Secret", Communications of the ACM, November 1979, Volume 22, No. 11). However, this technique takes time for a calculation process, and is thus unsuitable for a case where real-time performance is demanded or a case where the technique is used for a large amount of data.

As ways for solving the above problem, a threshold secret sharing scheme which uses an XOR operation has been proposed (for example, refer to JP-A-2007-124032, JP-A-2008-145917 and JP-A-2008-203720).

However, in these threshold secret sharing schemes using the XOR operation, if a random number sequence is leaked, there is a risk that original data is easily inferred from shared data. Further, since the data amount of shared data has the same size as in the original data, if the number of shares is increased, a large capacity of memory is necessary. In addition, a certain limit such as limit in the number of threshold values may be present as a threshold secret sharing scheme.

An object of some aspects of the invention is to provide a technique which realizes a secure threshold secret sharing scheme using an XOR operation to prevent original data from being inferred from shared data. Further, it provides a secret sharing apparatus, a sharing apparatus and a secret sharing method capable of reducing the data amount of shared data and freely setting the number of shares and a threshold value to provide easy usage.

SUMMARY

According to an aspect of the invention, there is provided a secret sharing apparatus which generates, from secret data, a plurality of pieces of shared data from which the secret data is able to be restored, wherein the secret data includes a plurality of pieces of divided data which does not include a random number, and wherein the secret sharing apparatus includes a shared data generating section which performs an XOR operation between the pieces of divided data and generates the plurality of pieces of shared data which includes the result of the XOR operation between the pieces of divided data.

According to the aspect of the invention, by performing the XOR operation between the pieces of plurality of divided data, it is possible to set the shared data by a data amount smaller than that of the secret data, and to enhance the speed of restoration.

BRIEF DESCRIPTION OF THE DRAWINGS

In the accompanying drawings:

FIGS. 1A, 1B and 1C are diagrams illustrating an example of a generating method of shared data according to an embodiment of the invention;

FIG. 56 is a diagram illustrating an example of a generating method of shared data in a threshold value of 4;

FIG. 57 is a diagram illustrating an example of a generating method of shared data in a threshold value of 2;

FIG. 58 is a diagram illustrating an example of a generating method of shared data in a threshold value of 3;

FIG. 59 is a diagram illustrating an example of a generating method of shared data in a threshold value of 4;

FIG. 60 is a diagram illustrating an example of a generating method of shared data in a threshold value of 5;

FIG. 61 is a diagram illustrating an example of a generating method of shared data in a threshold value of 6;

FIG. 62 is a diagram illustrating an example of another generating method of shared data;

FIG. 63 is a diagram illustrating an example of another generating method of shared data;

FIG. 64 is a diagram illustrating an example of another generating method of shared data;

FIG. 66 is a diagram illustrating an example of another generating method of shared data;

FIG. 69 is a diagram specifically illustrating a shared data generating method in a case where a threshold value is 5 and the number of shares is 6;

FIG. 70 is a diagram illustrating an example of another restoring method of shared data;

FIG. 71 is a detailed explanatory diagram of FIG. 70;

FIG. 72 is a diagram illustrating a security level in a case where a threshold value is 2 and true random numbers are used;

FIG. 73 is a diagram illustrating a security level in a case where a threshold value is 3 and true random numbers are used;

FIG. 74 is a diagram illustrating a security level in a case where threshold value k is an arbitrary value and true random numbers are used;

FIG. 75 is a diagram illustrating a security level in a case where a threshold value is 2 and true random numbers are not used;

FIG. 76 is a diagram illustrating a security level in a case where a threshold value is 3 and true random numbers are not used;

FIG. 77 is a diagram illustrating a security level in a case where threshold value k is an arbitrary value and true random numbers are not used;

FIG. 80 is a diagram illustrating a method of generating shared data from shared data.

DETAILED DESCRIPTION

Figure 2A:
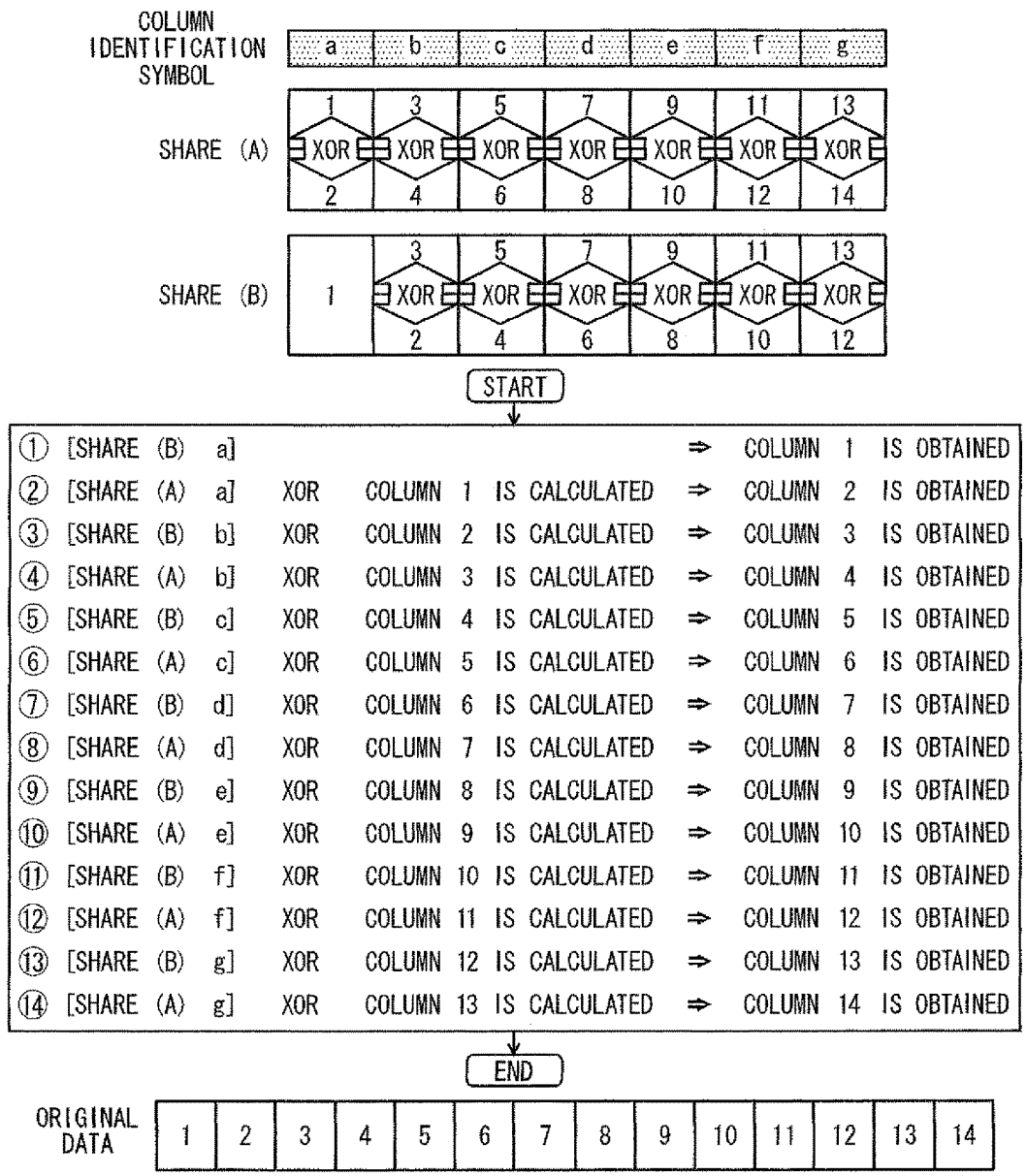
FIG. 2A is a diagram illustrating an example of a restoring method of original data in a threshold value of 2.

According to a first aspect of the invention, there is provided a secret sharing apparatus which generates, from secret data, a plurality of pieces of shared data from which the secret data is able to be restored, wherein the secret data includes a plurality of pieces of divided data which does not include a random number, and the secret sharing apparatus includes a shared data generating section which performs an XOR operation between the pieces of divided data and generates the plurality of pieces of shared data which includes a result of the XOR operation between the pieces of divided data.

According to the first aspect of the invention, by performing the XOR operation between the pieces of divided data, it is possible to set the shared data to a data amount which is smaller than that of the secret data, and to enhance the speed of restoration.

According to a second aspect of the invention, in the secret sharing apparatus according to the first aspect of the invention, the secret data includes a plurality of divided groups of D (No. 1), D (No. 2), . . . , and D (No. n), where n is an integer of 2 or larger, which contains the plurality of divided data (D), the shared data generating section performs the XOR operation for the divided data (D) between the divided groups, and generates the plurality of pieces of shared data which includes the plurality of divided groups between which the XOR operation is performed, and at least two divided groups which are included in arbitrary shared data among the plurality of pieces of shared data have a combination of the divided data between which the XOR operation is performed, which is shifted along Nos. 1, 2, . . . , and n, as compared with at least two divided groups which are included in different arbitrary shared data.

According to the second aspect of the invention, it is possible to give regularity to combinations of XORs of the divided data, in arbitrary two pieces of shared data.

According to a third aspect of the invention, in the secret sharing apparatus according to the first or second aspect of the invention, the shared data generating section further performs an XOR operation between combinations of the divided data and random number data, and generates shared data which includes results of the XOR operation between the pieces of divided data and the XOR operation between the combinations of the divided data and the random number data.

According to the third aspect of the invention, it is possible to encrypt the divided data with random number data, thereby enhancing security.

According to a fourth aspect of the invention, the secret sharing apparatus according to the third aspect of the invention further includes a random number generating section which generates the random number data using at least one piece of divided data among the plurality of divided data.

According to the fourth aspect of the invention, it is not necessary to prepare a seed of random numbers in advance, and thus, to easily generate random numbers.

According to a fifth aspect of the invention, the secret sharing apparatus according to any one of the first to fourth aspects of the invention further includes a dividing section which divides the divided data into a plurality of sub-divided data, and the shared data generating section performs an XOR operation between the pieces of sub-divided data and generates shared data which includes a result of the XOR operation between the pieces of sub-divided data.

According to the fifth aspect of the invention, since the secret data is minutely divided, it is possible to generate a large amount of divided data, thereby enhancing security.

According to a sixth aspect of the invention, in the secret sharing apparatus according to any one of the first to fifth aspects of the invention, the shared data generating section performs the XOR operation between the divided groups of which the number is N or more, where N is an integer of 2 or larger, and generates the plurality of pieces of shared data having a threshold value of N.

According to the sixth aspect of the invention, it is possible to generate shared data having a threshold value of N.

According to a seventh aspect of the invention, in the secret sharing apparatus according to any one of the first to sixth aspects of the invention, the shared data generating section adds attribute information indicating an attribute of the shared data to the shared data.

According to the seventh aspect of the invention, since the shared data shows its attributes, it is possible to easily perform restoration of the shared data.

According to an eighth aspect of the invention, in the secret sharing apparatus according to the seventh aspect of the invention, the shared data generating section performs the XOR operation between the divided groups using the attribute information as the divided data.

According to a ninth aspect of the invention, there is provided a secret sharing apparatus which generates, from secret data, a plurality of pieces of shared data from which the secret data is able to be restored, the secret sharing apparatus including: an operation section which operates two pieces of data or more; and a shared data generating section which generates at least one piece of shared data by performing the operation by the operation section between at least one divided block which includes divided data obtained by dividing the secret data into a plurality of divided data and at least one divided block which includes different divided data, and further generates different shared data by performing an operation process by changing at least one of combinations of the divided blocks between the respective pieces of divided data on which the operation process is performed, while maintaining arrangement of the divided blocks in the divided data.

Here, the secret data refers to data of which at least a part should be hidden in the data, in which the entire data should not be necessarily hidden.

Further, the term "division" simply refers to data division, and has a different meaning from the term "sharing" in the secret sharing. However, since there is a case where the "sharing" may be used as a type of division method, the "division" includes the "sharing".

According to the ninth aspect of the invention, by performing an operation which is equivalent to the XOR operation between the pieces of divided data, it is possible to set the shared data to a data amount which is smaller than that of the secret data, and to achieve reduction in a memory and enhancement of the restoration speed.

According to a tenth aspect of the invention, the secret sharing apparatus according to the ninth aspect of the invention further includes a restoring section which restores one piece of divided data from one piece of shared data by performing the operation process by the operation section between at least one divided block of shared data and at least one divided block of different shared data.

According to the tenth aspect of the invention, by performing an operation which is equivalent to the XOR operation between the pieces of shared data, it is possible to enhance the speed of restoration.

According to an eleventh aspect of the invention, in the secret sharing apparatus according to the ninth or tenth aspect of the invention, the operation process includes an XOR operation.

According to the eleventh aspect of the invention, it is possible to perform the sharing process or the restoration process at high speed.

According to a twelfth aspect of the invention, in the secret sharing apparatus according to any one of the ninth to eleventh aspects of the invention, the divided data the number of which is equal to a threshold value is generated from the secret data, and the shared data is generated from the divided data.

According to the twelfth aspect of the invention, it is possible to easily realize threshold secret sharing.

According to a thirteenth aspect of the invention, in the secret sharing apparatus according to any one of the ninth to twelfth aspects of the invention, the secret data includes original data and a random number.

According to the thirteenth aspect of the invention, it is possible to realize continuous sharing which ranges from ramp threshold sharing to complete threshold sharing by the amount of true random numbers. Further, it is possible to replace plaintext data with a true random number or a pseudo random number, thereby enhancing the level of security.

According to a fourteenth aspect of the invention, in the secret sharing apparatus according to the thirteenth aspect of the invention, the random number is generated from at least a part of the original data.

According to the fourteenth aspect of the invention, it is possible to easily create true random numbers at low cost.

According to a fifteenth aspect of the invention, in the secret sharing apparatus according to the thirteenth aspect of the invention, the random number is a true random number.

According to the fifteenth aspect of the invention, it is possible to easily create true random numbers at low cost.

According to a sixteenth aspect of the invention, in the secret sharing apparatus according to any one of the ninth to fifteenth aspects of the invention, data obtained by changing the arrangement of the data or data obtained by data processing the data with ciphers is used as the secret data.

Here, the data processing is not limited to the ciphers. For example, if data is ABC, this data may be duplicated into AABBCC by the data processing.

According to the sixteenth aspect of the invention, it is possible to prevent a risk of a restoration attempt with respect to the shared data through estimation of any characteristic such as a known data format which is used in the secret data. Further, if the data is duplicated, even in a case where there is a data loss, the possibility of restoration becomes high, and fault tolerance is enhanced.

According to a seventeenth aspect of the invention, in the secret sharing apparatus according to any one of the ninth to sixteenth aspects of the invention, a secret key for decoding the secret data which is encrypted or the shared data is retained in the secret data.

According to the seventeenth aspect of the invention, it is possible to prevent a risk of a restoration attempt with respect to the shared data through inference of any characteristic such as a known data format which is used in the secret data.

According to an eighteenth aspect of the invention, in the secret sharing apparatus according to the ninth to seventeenth aspects of the invention, all data combinations between the respective pieces of divided data on which the operation process are performed are arranged to be different from each other, in the respective pieces of shared data.

According to the eighteenth aspect of the invention, it is possible to arbitrarily determine the number of shares in a threshold secret sharing scheme.

According to a nineteenth aspect of the invention, in the secret sharing apparatus according to the ninth to eighteenth aspects of the invention, a relative position of different divided data with respect to reference divided data is shifted by a predetermined data size in directions which are opposite to and different from each other, or is shifted with a different data size between the divided data which is shifted in the same direction, so that all the data combinations between the respective pieces of divided data on which the operation process are performed are arranged to be different from each other.

According to the nineteenth aspect of the invention, it is possible to decrease a data part of the shared data which is exposed for notice, and to reduce the data size of each shared data. Further, it is possible to perform the process at high speed.

According to a twentieth aspect of the invention, in the secret sharing apparatus according to the nineteenth aspect of the invention, divided data which is shifted at a relative position in a predetermined direction and divided data which is shifted at the relative position in a direction opposite to the predetermined direction are arranged with respect to the reference divided data, so that all the data combinations between the respective pieces of divided data on which the operation process are performed are different from each other.

According to the twentieth aspect of the invention, it is possible to remarkably simplify an algorithm of the restoration process, and to perform the restoration process at high speed.

Hereinafter, embodiments of the invention will be described with reference to the accompanying drawings.

First Embodiment

FIGS. 1A to 1C are diagrams illustrating an example of a generating method of shared data according to an embodiment of the invention. Here, a (secret sharing) method of generating three pieces of shared data including share (A), share (B) and share (C) from original data will be described.

As shown in the figure, data to be treated as secret (hereinafter, simply referred to as "original data") is divided into a plurality of pieces of divided data including 14 blocks (columns) having the same data size. This divided data does not include random numbers. Divided data corresponding to one block corresponds to a divided block, which means a block (column).

Hereinafter, throughout all the figures, the first block (column) of the original data is referred to as column 1, and the second block, the third block and so on are sequentially referred to as column 2, column 3 and so on. The data size of the block (column) may be set to an arbitrary size in the unit of one bit. Here, the original data is divided into 14 blocks (columns), but actually, as long as the number of blocks (columns) is 2 or more, the original data may be divided into several blocks (columns).

On the other hand, hereinafter, throughout all the figures, the first block (column) of each shared data of share (A), share (B) and share (C) which are generated from the original data is referred to as column a, and the second block, the third block and so on are sequentially referred to as column b, column c and so on. Further, "column y in share (X)" is expressed as [share (X) y]. For example, "column a in share (A)" is expressed as [share (A) a].

Firstly, a generating method of share (A) will be described. Here, [share (A) a] is a value obtained by XORing column 1 and column 2. Similarly, [share (A) b] is a value obtained by XORing column 3 and column 4. As shown in the figure, [share (A) c] and so on are calculated by the same process. In this way, share (A) folds the original data into two layers (rows). Accordingly, the number of blocks (columns) in share (A) is ½ of the number of blocks (columns) in the original data.

Here, shared data of share (A) will be described using divided groups. In the above description, the divided data obtained by dividing the original data into blocks (columns) is shown. Here, the divided data is D, and the divided groups includes divided data D(1), divided data D(2), ..., divided data D(n), ... (n is an integer of 2 or more). A divided group which includes odd divided data 1, 3, 5, 7, 9 and 11, that is, D(1)=1, D(2)=3, D(3)=5, D(4)=7, D(5)=9 and D(6)=11 is set to DG1. A divided group which includes even divided data 2, 4, 6, 8, 10 and 12, that is, D(7)=2, D(8)=4, D(9)=6, D(10)=8, D(11)=10 and D(12)=12 is set to DG2. In this case, as shown in FIG. 1, in the shared data of share (A), the divided data D is XORed in the divided groups DG1 and DG2. Thus, the combination of XORs of the divided data D includes D(1) XOR D(7), D(2) XOR D(8), D(3) XOR D(9), D(4) XOR D(10), D(5) XOR D(11), and D(6) XOR D(12).

Next, a generating method of share (B) will be described. Here, [share (B) a] is column 1 itself of the original data. On the other hand, [share (B) b] is a value obtained by XORing column 3 and column 2. As shown in the figure, [share (B)

c] and so on are calculated by the same process as in [share (B) b]. In this way, share (B) folds the original data into two layers (rows). Accordingly, the number of blocks (columns) in share (B) is ½ of the number of blocks (columns) in the original data.

Here, as understood from the figure, share (B) is a value obtained by shifting the blocks shown in the lower layer of share (A), that is, even columns 2, 4, 6 and so on of the original data to the right by one block and by XORing them. Accordingly, column 14 of the original data is not used for calculation in share (B).

Here, in a similar way to share (A), the divided data of share (B) will be described using the divided groups. In the shared data of share (B), as shown in FIG. 1, the divided data D is XORed in the divided groups DG1 and DG2. Thus, the combination of XORs of the divided data D includes D(2) XOR D(7), D(3) XOR D(8), D(4) XOR D(9), D(5) XOR D(10), and D(6) XOR D(11).

In a case where the shared data of share (A) is compared with the shared data of share (B), in the shared data of share (A), compared with the divided groups DG1 and DG2 included in the shared data of share (B), the combination of the divided data D which is XORed shifts by one column according to numbers 1, 2, 3, . . . , n.

Next, a generating method of share (C) will be described. Here, [share (C) a] is column 2 itself of the original data. On the other hand, [share (C) b] is a value obtained, by XORing column 1 and column 4. As shown in the figure, [share (C) c] and so on are calculated by the same process as in [share (C) b]. In this way, share (C) folds the original data into two layers (rows). Accordingly, the number of blocks (columns) in share (C) is ½ of the number of blocks (columns) in the original data.

Here, as understood from the figure, share (C) is a value obtained by shifting the blocks shown in the upper layer of share (A), that is, odd columns 1, 3, 5 and so on of the original data to the right by one block and by XORing them. Accordingly, column 13 of the original data is not used for calculation in share (C).

Here, in a similar way to shares (A) and (B), sharing data of share (C) will be described using the divided groups. In the shared data of share (C), as shown in FIG. 1, the divided data D is XORed in the divided groups DG1 and DG2. Thus, the combination of XORs of the divided data D includes D(1) XOR D(8), D(2) XOR D(9), D(3) XOR D(10), D(4) XOR D(11) and D(5) XOR D(12).

In a case where the shared data of share (C) is compared with the shared data of share (A), in the shared data of share (C), compared with the divided groups DG1 and DG2 included in the shared data of share (A), the combination of the divided data D which is XORed shifts by one column according to numbers 1, 2, 3, . . . , n.

Further, in a case where the shared data of share (C) is compared with the shared data of share (B), in the shared data of share (C), compared with the divided groups DG1 and DG2 included in the shared data of share (B), the combination of the divided data D which is XORed shifts by two columns according to numbers 1, 2, 3, . . . , n.

That is, in at least two divided groups included in arbitrary shared data among three pieces of shared data, compared with at least two divided groups included in different arbitrary shared data, the combination of the divided data which is XORed shifts according to numbers 1, 2, . . . , n.

In this way, if the operation of folding the original data into two layers (rows) is performed, it is possible to delete information in the original data. Thus, it is possible to prevent the original data from being restored from one piece of shared data. That is, it is possible to perform secret sharing.

For example, if "Let them bet his room." is expressed by the ASCII code (American Standard Code for Information Interchange), it becomes as shown in the upper part in FIG. 1B. Here, values are represented as a hexadecimal number. Share (A) becomes as shown in the lower part in FIG. 1B. The XOR operation is performed in divided data (for example, 22 and 4C) which is arranged in the vertical direction.

Next, if "Lap them in this room." is expressed by an ASCII code, it becomes as shown in the upper part in FIG. 1C. Here, share (A) becomes as shown in the lower part in FIG. 1B.

As understood from the figures, the relationship between the original data and the shared data is a many-to-one relationship, and the same share (A) can be generated from different sentences. In other words, it is possible to generate a plurality of sentences from share (A).

Hereinbefore, the original data has been described as the ACII code, but the invention is not limited thereto. Since character data is limited, it is possible to restore the original data from the shared data.

In a case where the size of blocks (columns) is a character code size, that is, 1 byte, the number of combinations of the original data which is able to be inferred from one block (column) of the sharing data is 256×256 (00H XOR 00H, 00H XOR 01H, . . . , FFH XOR FFH). However, in a case where the original data is the ACII code, since data other than 20H to 7EH can be excluded, it is easy to decipher the data. Further, since data which does not make sense as words or sentences can be also excluded, it is further easy to decipher the data.

In order to avoid this problem, if the original data is a code such as ASCII code which is easily deciphered, it is preferable to generate processed data by performing a specific data processing and to generate shared data from the processed data.

Thus, it is preferable to perform a secret sharing process for information (data) about the specific data processing and to store the information together with the shared data.

In description with reference to the subsequent drawings, for ease of description, data processing for the original data will be omitted, but in all the drawings where the original data is shown, the original data represents true original data or processed data which is generated by performing a specific data processing for the true original data.

Since information entropy of each shared data is increased by an operation of negating the original data from such original data, it is not easy to restore the original data from shared data which is smaller than a threshold value. Accordingly, this secret sharing scheme has the same security level as that of a secret sharing scheme of polynomial interpolation.

On the other hand, the secret sharing scheme of generating shared data only by the XOR operation has a very high processing speed, compared with the secret sharing scheme of polynomial interpolation. Further, it is sufficient if the data amount of each shared data is ½.

FIG. 2 is a diagram illustrating an example of a restoring method of original data according to the present embodiment. Here, a method of restoring original data shown on the lower side in the figure from two pieces of shared data of share (A) and share (B) which are shown on the upper side in the figure will be described with reference to a flowchart.

(1) Column 1 of the original data is obtained from [share (B) a]. (2) [Share (A) a] XOR column 1 is calculated, and column 2 is obtained from its result. (3) [Share (B) b] XOR column 2 is calculated, and column 3 is obtained from its result. (4) [Share (A) b] XOR column 3 is calculated, and column 4 is obtained from its result. (5) [Share (B) c] XOR column 4 is calculated, and column 5 is obtained from its result. (6) [Share (A) c] XOR column 5 is calculated, and column 6 is obtained from its result. (7) [Share (B) d] XOR column 6 is calculated, and column 7 is obtained from its result. (8) [Share (A) d] XOR column 7 is calculated, and column 8 is obtained from its result. (9) [Share (B) e] XOR column 8 is calculated, and column 9 is obtained from its result. (10) [Share (A) e] XOR column 9 is calculated, and column 10 is obtained from its result. (11) [Share (B) f] XOR column 10 is calculated, and column 11 is obtained from its result. (12) [Share (A) f] XOR column 11 is calculated, and column 12 is obtained from its result. (13) [Share (B) g] XOR column 12 is calculated, and column 13 is obtained from its result. (14) [Share (A) g] XOR column 13 is calculated, and column 14 is obtained from its result.

Figure 2B:
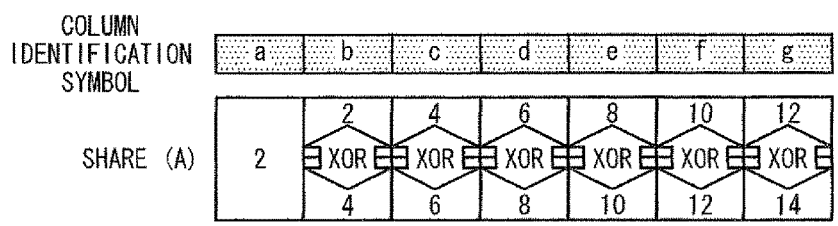
FIG. 2B is a diagram illustrating a different computation method in the restoring method.

Thus, it is possible to restore column 1, column 2, column 3, column 14 of the original data. This computation method is not limitative. For example, if the XOR operation is performed in the respective columns of share (A) and share (B), respectively, the odd columns of the original data are deleted and the values shown in FIG. 2B are calculated.

Next, if the XOR operation is sequentially performed in adjacent columns as described later, it is possible to calculate values of the even columns as follows: Column a (2) XOR column b→column 4, 4 XOR column c→column 6, 6 XOR column c→column 8, 8 XOR column c→column 10, 10 XOR column c→column 12, 12 XOR column c→column 14. If the XOR operation is performed in the above-mentioned values and the respective columns of share (A), the odd columns of the original data are calculated. As described above, as the computation method for restoring the original data, a plurality of computation methods may be used.

Figure 3:
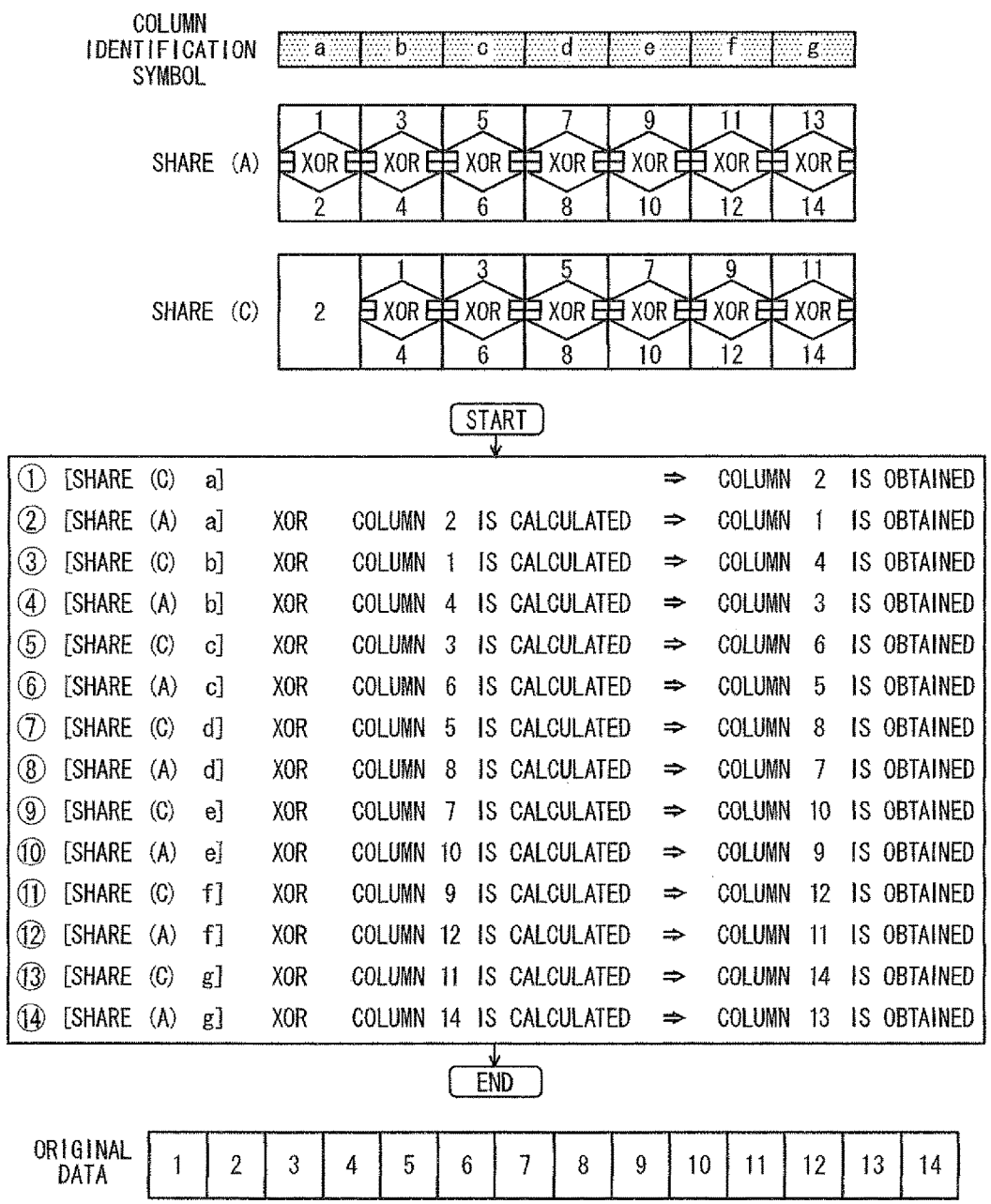
FIG. 3 is a diagram illustrating an example of a restoring method of original data in a threshold value of 2.

FIG. 3 is a diagram illustrating an example of a restoring method of original data according to the present embodiment. Here, a method of restoring the original data shown on the lower side in the figure from two pieces of shared data of share (A) and share (C) which are shown on the upper side in the figure will be described with reference to a flowchart. (1) Column 2 of the original data is obtained from [share (C) a]. (2) [Share (A) a] XOR column 2 is calculated, and column 1 is obtained from its result. (3) [Share (C) b] XOR column 1 is calculated, and column 4 is obtained from its result. (4) [Share (A) b] XOR column 4 is calculated, and column 3 is obtained from its result. (5) [Share (C) c] XOR column 3 is calculated, and column 6 is obtained from its result. (6) [Share (A) c] XOR column 6 is calculated, and column 5 is obtained from its result. (7) [Share (C) d] XOR column 5 is calculated, and column 8 is obtained from its result. (8) [Share (A) d] XOR column 8 is calculated, and column 7 is obtained from its result. (9) [Share (C) e] XOR column 7 is calculated, and column 10 is obtained from its result. (10) [Share (A) e] XOR column 10 is calculated, and column 9 is obtained from its result. (11) [Share (C) f] XOR column 9 is calculated, and column 12 is obtained from its result. (12) [Share (A) f] XOR column 12 is calculated, and column 11 is obtained from its result. (13) [Share (C) g] XOR column 11 is calculated, and column 14 is obtained from its result. (14) [Share (A) g] XOR column 14 is calculated, and column 13 is obtained from its result.

Thus, it is possible to restore column 1, column 2, column 3, . . . , column 14 of the original data. In a similar way to FIG. 2, its computation method is not limitative. For example, as the XOR operation is performed in respective blocks of share (A) and share (B), respectively, it is possible to gradually calculate values of odd blocks from information on column 1, and also to calculate values of even blocks.

Figure 4:
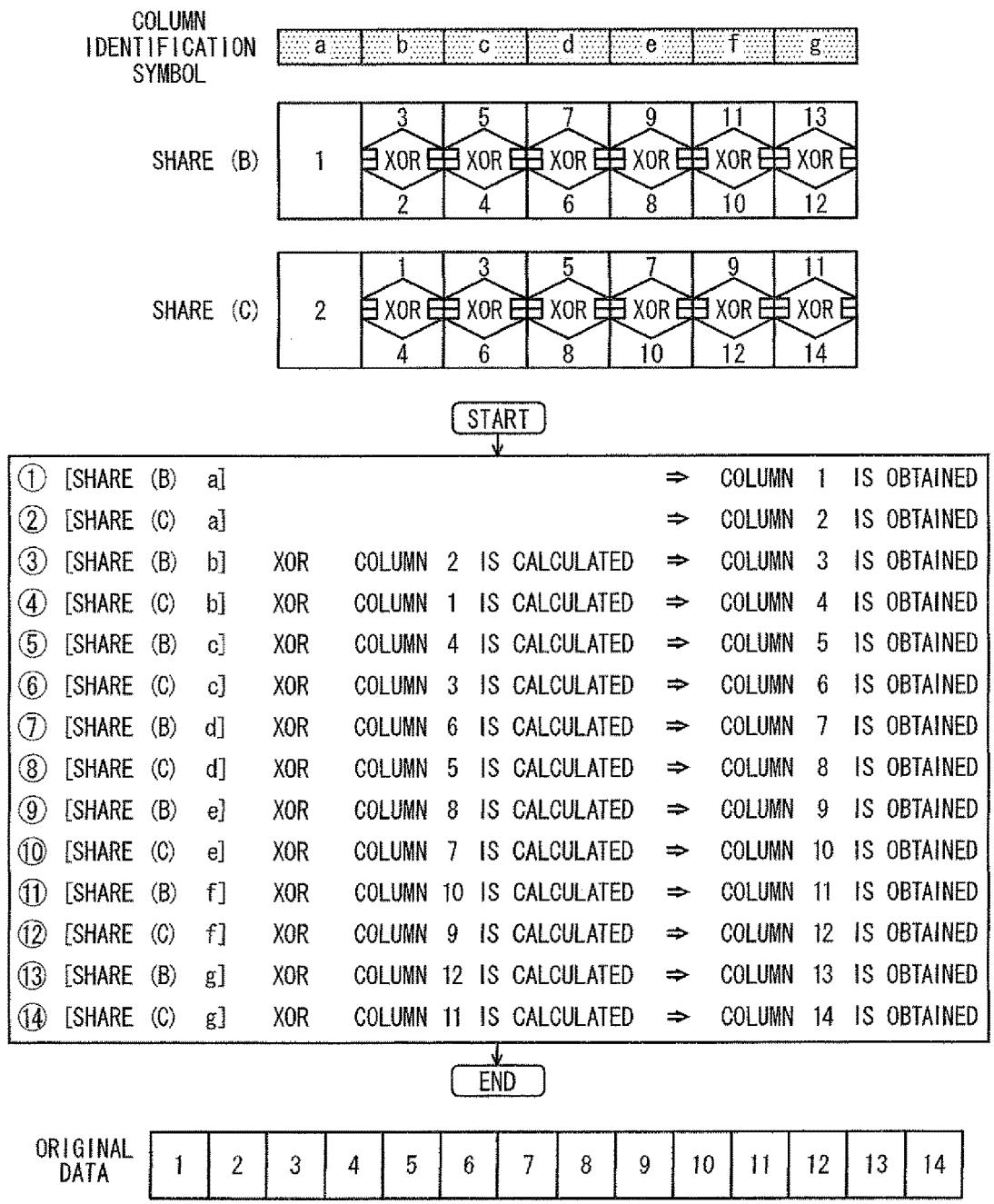
FIG. 4 is a diagram illustrating an example of a restoring method of original data in a threshold value of 2.

FIG. 4 is a diagram illustrating an example of a restoring method of original data according to the present embodiment. Here, a method of restoring the original data shown on the lower side in the figure from two pieces of shared data of share (B) and share (C) which are shown on the upper side in the figure will be described with reference to a flowchart. (1) Column 1 of the original data is obtained from [share (B) a]. (2) Column 2 of the original data is obtained from [share (C) a]. (3) [Share (B) b] XOR column 2 is calculated, and column 3 is obtained from its result. (4) [Share (C) b] XOR column 1 is calculated, and column 4 is obtained from its result. (5) [Share (B) c] XOR column 4 is calculated, and column 5 is obtained from its result. (6) [Share (C) c] XOR column 3 is calculated, and column 6 is obtained from its result. (7) [Share (B) d] XOR column 6 is calculated, and column 7 is obtained from its result. (8) [Share (C) d] XOR column 5 is calculated, and column 8 is obtained from its result. (9) [Share (B) e] XOR column 8 is calculated, and column 9 is obtained from its result. (10) [Share (C) e] XOR column 7 is calculated, and column 10 is obtained from its result. (11) [Share (B) f] XOR column 10 is calculated, and column 11 is obtained from its result. (12) [Share (C) f] XOR column 9 is calculated, and column 12 is obtained from its result. (13) [Share (B) g] XOR column 12 is calculated, and column 13 is obtained from its result. (14) [Share (C) g] XOR column 11 is calculated, and column 14 is obtained from its result.

Thus, it is possible to restore column 1, column 2, column 3, . . . , column 14 of the original data. In a similar way to FIGS. 2 and 3, its computation method is not limitative. A restoring method which will be described with reference to each drawing of FIG. 4 and thereafter is only an example, and its computation method is not limited to one.

Hereinbefore, as understood from FIGS. 2, 3 and 4, this secret sharing is a secret sharing having a threshold value of 2. Although described again later, if the operation of folding the original data into two layers (rows) is performed, this becomes the secret sharing having the threshold value of 2. Accordingly, the secret sharing according to the present embodiment can realize the threshold secret sharing.

Figure 5:
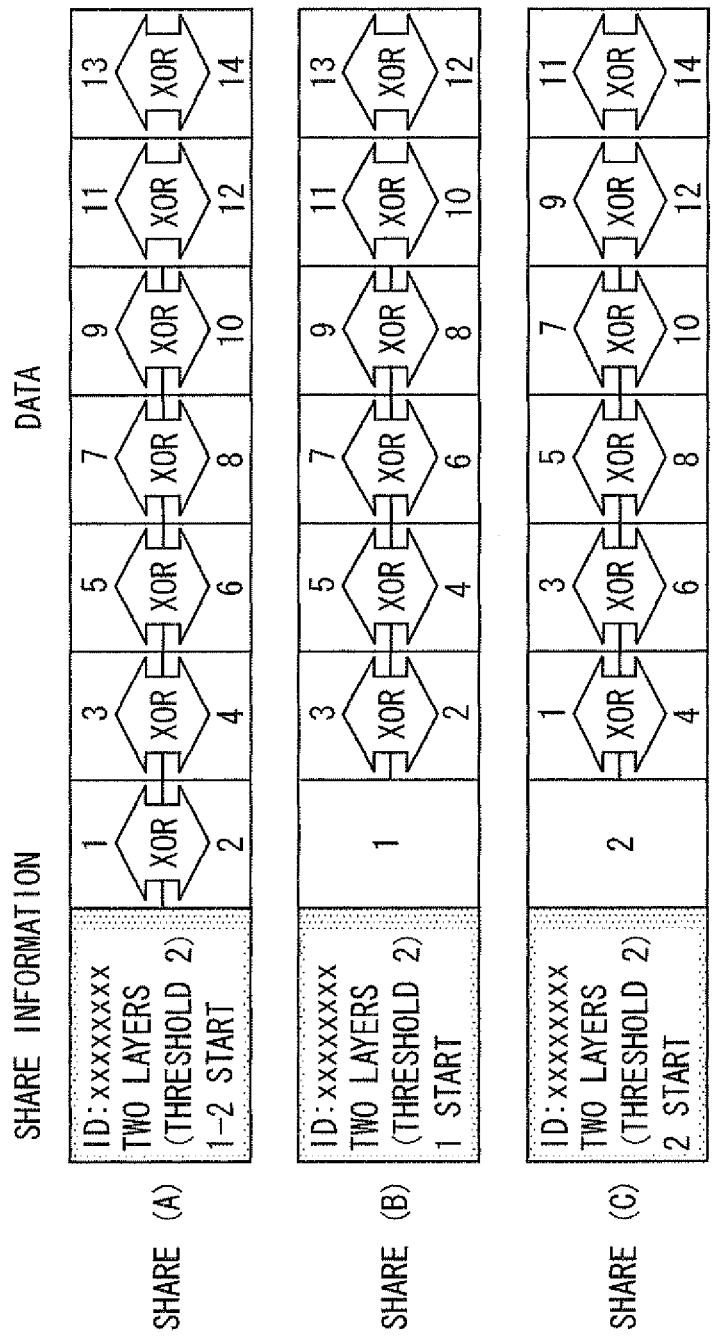
FIG. 5 is a diagram illustrating an example of the format of shared data.

FIG. 5 is a diagram illustrating an example of the format of shared data according to the present embodiment.

As understood from FIGS. 2, 3 and 4, the computation method should be changed by the shared data used for restoration. Here, a mechanism of selecting an appropriate computation method will be described.

When shared data is generated, share information is added to a header portion of each shared data of share (A), share (B) and share (C). Here, the share information refers to information indicating which process the shared data is generated by, or contrarily, which method the restoration is performed by. The share information is an example of attribute information, and the attribute information represents attributes of the shared data. As an example of attributes, there are identification information (which will be described later), the number of layers (the number of combinations of divided groups), the restoring method, and the like.

For example, as described with reference to FIG. 1, since the operation of folding the original data into two layers (rows) using column 1 and column 2 for generation of [share (A) a], "column 1•column 2 start in two layers (rows), that is, in a threshold value of 2" is written in the share information. Similarly, "column 1 start in two layers (rows), that is, in a threshold value of 2" is written in the share information on share (B), and "column 2 start in two layers (rows), that is, in a threshold value of 2" is written in the share information on share (C).

If this share information is added, it is possible to understand which computation method is preferably selected in restoration.

Further, an ID (identification) which is identification information is added to the share information. Although this information should not be necessarily added, it is convenient to prevent false restoration.

If the same IDs are assigned to the shared data created from the same original data, by checking the IDs checked in restoration, it is possible to understand whether the original data can be restored before restoration. If the IDs are different from each other, the restoration is mistakenly performed, and thus, it is necessary to unnecessarily perform the restoration process. Further, by using the IDs, it is also possible to ensure whether the restoration result is correct original data.

In this regard, there is a variety of ID generating methods, but it is simple to use serial numbers or to generate random numbers.

Hereinbefore, the same IDs are assigned to the shared data created from the same original data, but the method of indicating the shared data generated from the same original data is not limited thereto. For example, by using points which are arranged in a certain straight line to IDs, it is possible to indicate the shared data generated from the same original data.

Hereinbefore, it is determined whether the original data can be restored by the ID added to the shared data, but it is possible to determine whether correct restoration is achieved according to whether additional information (mark) added to the original data appears according to the restoration result.

Hereinbefore, the share information is described in the header portion, but the share information may be described in any portion (for example, at the end) of the shared data, or the share information may be stored separately from the shared data. Further, information (data) for generating the original data from the processed data, that is, information (data) on the data processing method which has been performed for the original data, or the like may be stored as a part of the share information (data). It is preferable that this share information (data) be subject to a secret sharing process to then be stored.

Hereinbefore, the share information is described as "ID, two layers (threshold value of 2), X start", but may be described by a variety of describing methods, instead of the above method. For example, the share information may be described using ASCII character strings, or may be described using special commands, identifiers, or the like.

Figure 6:
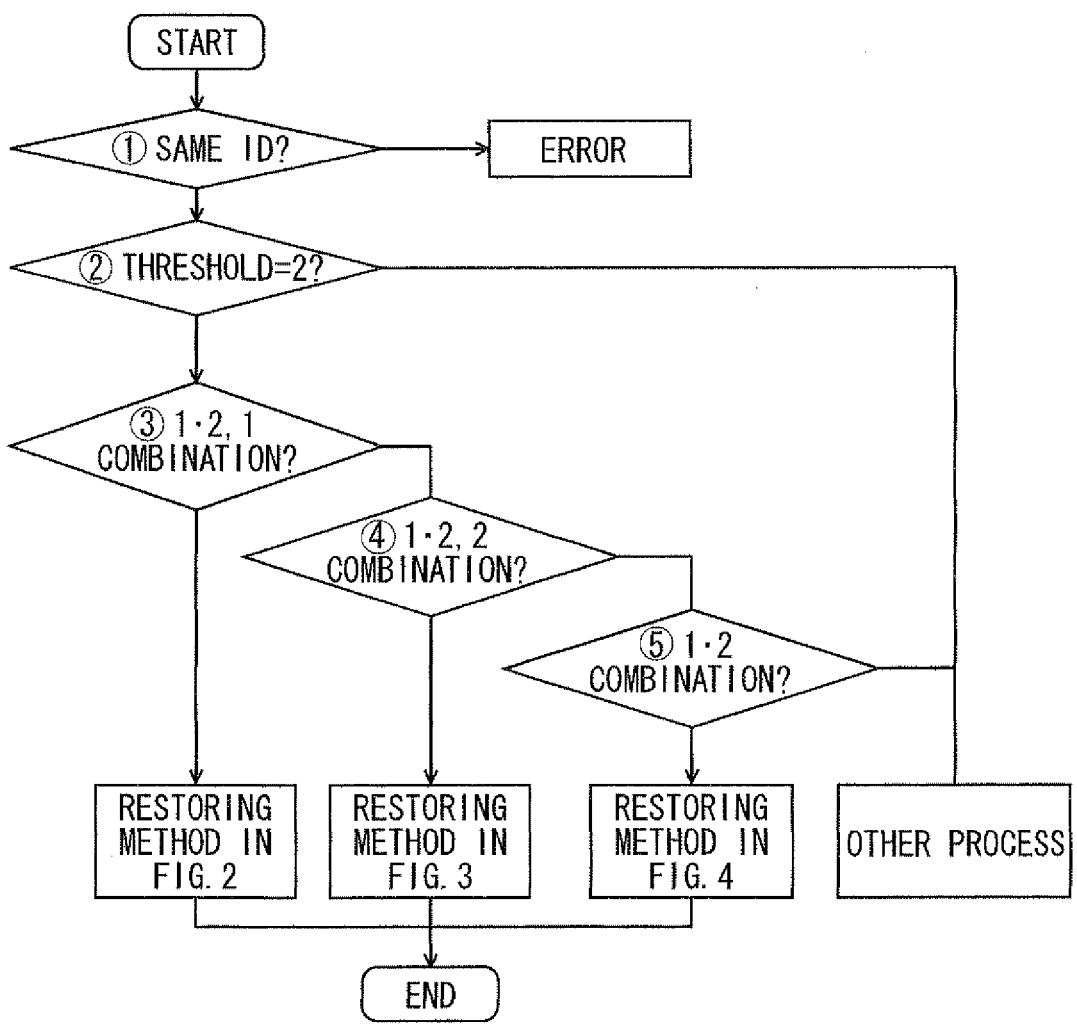
FIG. 6 is a diagram illustrating an example of a restoring method of original data in a threshold value of 2.

FIG. 6 is a diagram illustrating an example of a restoring method of original data according to the present embodiment. Here, a method of selecting two pieces of shared data from the plurality of pieces of shared data such as share (A), share (B) and share (C) and restoring the original data from the selected two pieces of shared data will be described. It is assumed that the share information described with reference to FIG. 5 is assigned to each shared data.

(1) IDs of selected two pieces of shared data are compared with each other. If the IDs are not the same, since they are not the shared data generated from the same original data, the restoration process is considered as an error and is then stopped. In a case where it is determined whether the restoration result is correct according to whether the additional information assigned to the original data appears, the ID determination in this process is not performed, and then, the procedure goes to the next process.

(2) The number of threshold values, that is, the number of layers (rows) is checked. In a case where the threshold value is 2, the procedure goes to the next process. In a case where the threshold value is 3 or more, a different restoration process is performed (which will be described later).

(3) It is checked whether the combination is a combination of "1•2 start" and "1 start". If the combination is the combination of "1•2 start" and "1 start", the original data is restored by the computation method described with reference to FIG. 2.

(4) It is checked whether the combination is a combination of "1•2 start" and "2 start". If the combination is the combination of "1•2 start" and "2 start", the original data is restored by the computation method described with reference to FIG. 3.

(5) It is checked whether the combination is a combination of "1 start" and "2 start". If the combination is the combination of "1 start" and "2 start", the original data is restored by the computation method described with reference to FIG. 4.

Here, any one of (3), (4) and (5) may be preferentially checked. Since there is shared data capable of restoring the original data in addition to the shared data described in (3), (4) and (5), in a case where the shared data does not correspond to (3), (4) and (5), a different restoration process is performed. Its content will be described later.

As understood from the description with reference to FIGS. 5 and 6, if the shared data having the threshold value or more is selected from the plurality of pieces of shared data, it is possible to restore the original data. Accordingly, if n is the number of shares and m is the threshold value, the secret sharing scheme according to the present embodiment becomes an (m, n)-threshold secret sharing scheme.

Figure 7:
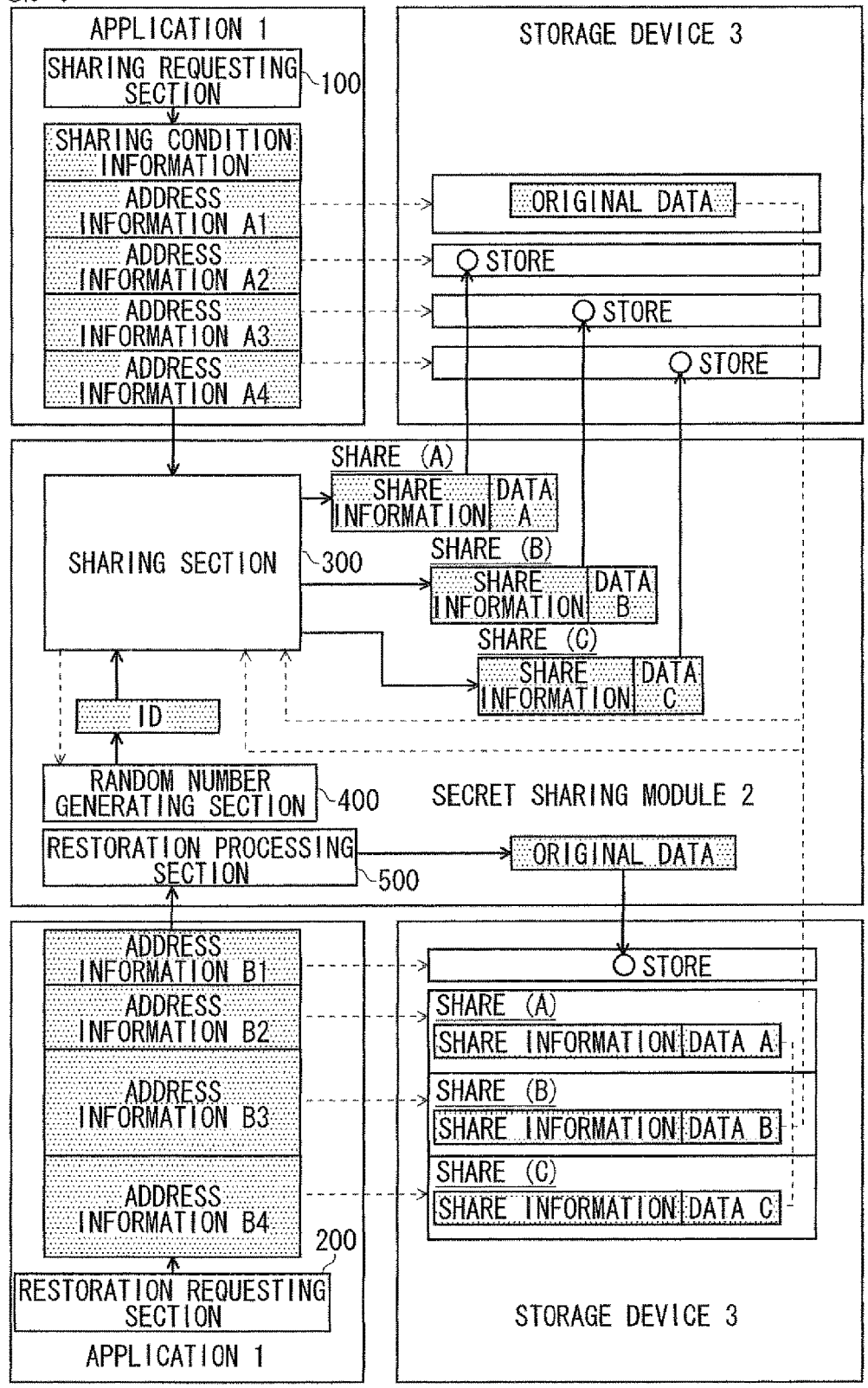
FIG. 7 is a block diagram illustrating an example of a secret sharing scheme according to an embodiment of the invention.

FIG. 7 is an example of a block diagram illustrating an example of a secret sharing scheme according to the present embodiment. FIG. 7 illustrates a case where the methods in FIGS. 1, 2, 3, 4, 5 and 6 are realized as an apparatus.

Here, it is assumed that the generation of the shared data and the restoration of original data are performed by a secret sharing module 2, and an application program 1 requests the secret sharing module 2 to generate the shared data and to restore the original data. The application program 1 and the secret sharing module 2 may be operated in the same computer or different computers.

Further, the original data and the shared data are stored in a storage device 3. The storage device 3 may be operated in the same or different computer which operates the application program 1 and the secret sharing module 2.

Here, even though the first application program 1, the secret sharing module 2 and the storage device 3 are operated in different computers, a communication method between the computers will be omitted for ease of description.

The application program 1 and the storage device 3 shown on the upper side in the figure are used for description of a generating method of the shared data, and the application program 1 and the storage device 3 shown on the lower side in the figure are used for description of a restoring method of the original data. However, the application programs 1 and the storage devices 3 shown on the upper and lower sides in the figure may be the same application programs and storage devices, or may be different application programs and devices.

Firstly, the generating method of the shared data will be described. The application program 1 stores the original data to be secretly shared in the storage device 3. Then, a sharing requesting section 100 transmits sharing condition information indicating sharing conditions, address information A1 indicating an address where the original data is stored, and address information A2, A3 and A4 indicating storage destination addresses of the generated shared data, to a sharing section 300.

Here, the sharing condition information is information which is necessary for performing the secret sharing, and corresponds to information about the number of shares, the threshold value or the like. Here, as shown in FIG. 1, since the example in which the original data is divided into three pieces is described, it is assumed that the number of shares is indicated as 3. In this example, since the number of shares is 3, three pieces of storage destination address information is prepared, but if more pieces of shared data is generated, the sharing requesting section 100 should prepare the storage destination address information corresponding thereto.

The sharing section 300 reads the original data from the address of the storage device 3 shown in the address information A1, and generates share information according to the same means as in FIG. 1, according to the sharing condition information. Here, as shown in FIG. 5, the share information is added to the header of each shared data. Further, the sharing section 300 generates random numbers used as IDs in a random number generating section 400, and adds the random numbers to the share information as IDs as shown in FIG. 5. Further, the sharing section 300 stores the generated shared data (A), (B) and (C) in destination addresses of the address information A2, A3, A4 designated by the sharing requesting section 100.

Next, a restoring method of the original data will be described. The application program 1 stores the shared data used for restoration in the storage device 3. Further, a restoration requesting section 200 transmits address information B1 indicating a storing destination address of the restored original data, and address information B2, B3 and B4 indicating destination addresses where shared data is stored, to the divided processing section 300. Here, since description is made in a case where the threshold value is 2, the application program 1 may prepare at least two pieces of shared data, and may not present the address information B4.

A restoration processing section 500 reads the shared data from the addresses of the storage device 3 shown in the address information B2, B3 and B4, and restores the original data by the same means as in FIG. 6, according to the sharing information. Here, since the threshold value is 2, as described above, the restoration processing section 500 does not read the address information B4 when two pieces of shared data having the same ID are found, and may directly perform restoration of the original data. However, in order to check whether the restored data is correct, the restoration processing section 500 may perform restoration using the shared data in the destination address shown in the address information B4, and may compare the result with the original data which is restored beforehand. Further, the restoration processing section 500 stores the restored original data in the address destination of the address information B1 designated by the restoration requesting section 200.

Figure 8:
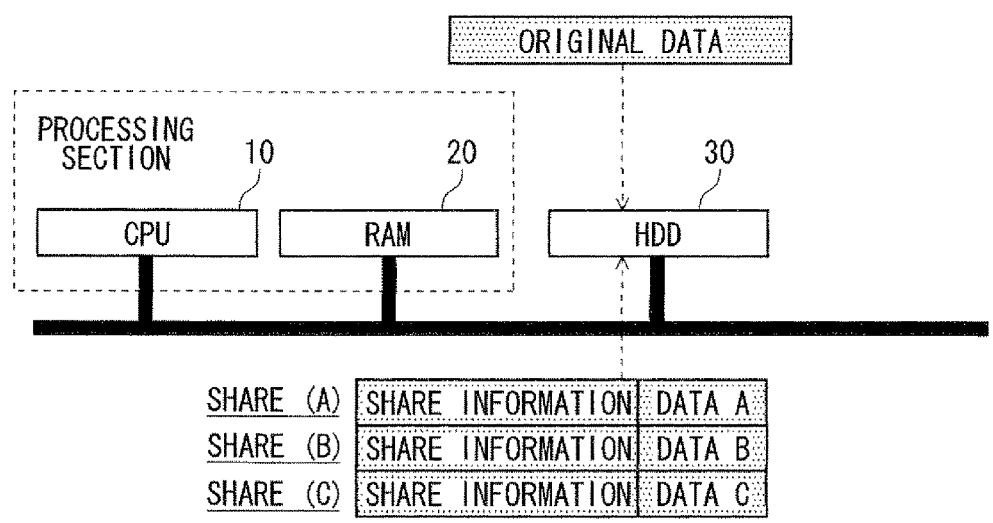
FIG. 8 is a hardware configuration diagram illustrating a secret sharing scheme according to an embodiment of the invention.

FIG. 8 is an example of a hardware configuration diagram of a secret sharing scheme according to the present embodiment. Here, description is made to a case where the application program 1, the secret sharing module 2, and the storage device 3 in FIG. 7 are operated in the same computer. This computer includes a CPU 10 which executes a program process, a RAM 20 which is a temporary storage memory, and an HDD (hard disk drive) 30 which is a rewritable non-volatile memory.

Each processing section shown in FIG. 7 is executed in the CPU 10 and the RAM 20. Further, the storage destination of original data, share (A), share (B), and share (C) is the HDD 30. Accordingly, the address information A1, A2, A3 and A4, and B1, B2, B3 and B4 described with reference to FIG. 7 can be set to a folder and a file name.

Here, the original data and share (A), share (B) and share (C) are stored in the HDD 30 which is the rewritable non-volatile memory, but a different non-volatile memory such as a flash memory, or a volatile memory such as a RAM 20 may be used. Further, the original data which is subject to the sharing process and the shared data which is subject to the restoration process may be stored in a read-only memory.

If the HDD 30 is used as an external storage device such as a flash memory of a USB and the external storage device is connected to the computer, its use becomes simple and convenient.

Although not shown, since the IDs shown in FIG. 7 are temporarily used, the IDs may be stored in the RAM 20.

Figure 9:
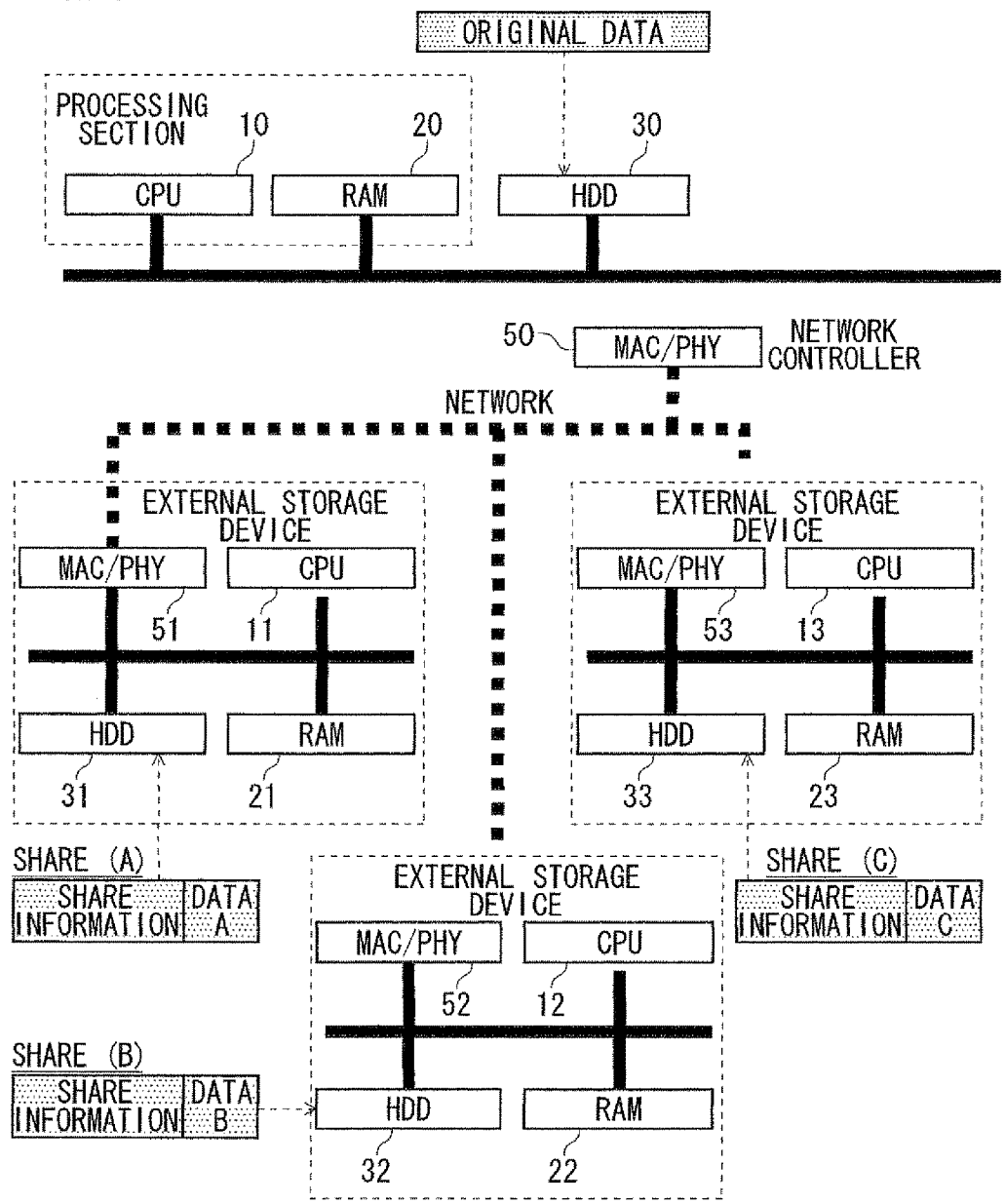
FIG. 9 is a configuration diagram illustrating an example of hardware of a secret sharing scheme.

FIG. 9 is an example of a hardware configuration diagram of a secret sharing scheme according to the present embodiment. Here, description is made to a case where the computer in which the application program 1 and the secret sharing module 2 in FIG. 7 are operated is different from the computer which stores shared data which is a part of the storage device 3. It is assumed that original data is stored in the storage device 3 in the computer where the secret sharing module 2 is operated.

The computer where the secret sharing module 2 is operated and the computer which stores the shared data are connected to each other through a network. Further, it is assumed that respective pieces of shared data are stored in different computers.

In this way, the reason why the respective pieces of shared data are stored in the different computers is to prevent incorrect restoration of the original data. If a manager of each computer is an individual, it is not possible to restore the original data only by the authority of one manager, which is secure. For example, in a case where the computer is a cloud computer, if shared data is collected in the ground computer of one company, there is a risk that a manager of the company restores the original data. However, if the configuration shown in FIG. 9 is used, it is possible to considerably alleviate the risk.

Currently, it is estimated that the ground computer is cheap in its usage fee and is easy to use, but there is a risk that the content of the data is snooped upon, and its usage is not effective in work which demands security. Here, if the configuration shown in FIG. 9 is used, it is possible to securely use the ground computer.

The computer where the secret sharing module 2 is operated includes a CPU 10 which executes a program processing, a RAM 20 which is a temporary storage memory, an HDD (hard disk drive) 30 which is a rewritable non-volatile memory, and a MAC (Media Access Control)/PHY 50 which executes data transmission and reception through a network.

Each processing section shown in FIG. 7 is executed in the CPU 10 and the RAM 20. Further, a storage destination of original data is the HDD 30. Accordingly, the address information A1 and B1 described with reference to FIG. 7 can be set to a folder and a file name.

Here, the original data is stored in the HDD 30 which is the rewritable non-volatile memory, but a different non-volatile memory such as a flash memory, or a volatile memory such as a RAM 20 may be used. Further, the original data which is subject to the sharing process and the shared data which is subject to the restoration process may be stored in a read-only memory.

If the HDD 30 is used as an external storage device such as a flash memory of a USB and the external storage device is connected to the computer, its use becomes simple and convenient.

Although not shown, since the IDs shown in FIG. 7 are temporarily used, the IDs may be stored in the RAM 20.

The MAC/PHY 50 is hardware which controls network communication. Actual communication is controlled by the CPU 10 and the RAM 20.

Next, computers which store shared data will be described. Here, it is assumed that the shared data is shared to three pieces of share (A), share (B) and share (C), which are respectively stored in different computers.

If the shared data is shared data having a threshold value or less, since there is no risk even though the shared data is stored in the same computer, it is actually possible to determine the number of shared data stored in a certain computer according to its usage.

A computer which stores share (A) includes a CPU 11 and a RAM 21 which perform communication control or access to a storage device, a MAC/PHY 51 which is hardware which controls network communication, and an HDD 31 which is a storage device which stores share (A).

Similarly, a computer which stores share (B) includes a CPU 12 and a RAM 22 which perform communication control or access to a storage device, a MAC/PHY 52 which is hardware which controls network communication, and an HDD 32 which is a storage device which stores share (A). Further, a computer which stores share (C) includes a CPU 13 and a RAM 23 which perform communication control or access to a storage device, a MAC/PHY 53 which is hardware which controls network communication, and an HDD 33 which is a storage device which stores share (A).

As described above, since the storage destination of the shared data is the HDD 30 of the computer which is different from the computer where the secret sharing module 2 is operated, the address information A2, A3 and A4, and B2, B3 and B4 described with reference to FIG. 7 are set to a file and a folder name or an URL (Uniform Resource Locator) on the network.

Here, the shared data is stored in the HDD 30 which is the rewritable non-volatile memory, but a different non-volatile memory such as a flash memory, or a volatile memory such as a RAM 20 may be used. Further, the shared data which is subject to the restoration process may be stored in a read-only memory.

As described above, in the first embodiment, since the XOR operation is performed between the divided data, it is possible to set the shared data to have the data amount smaller than that of the secret data, and to enhance the speed of the restoration process. Further, in a case where the shared data is generated, since the divided groups are shifted along numbers (columns), it is possible to achieve regularity in combinations of the XOR operation of the divided data in two arbitrary pieces of shared data. Further, it is possible to easily realize the secret sharing scheme in data which does not include random numbers.

Second Embodiment

A second embodiment of the invention relates to a case where random numbers are added to the original data, differently from the first embodiment.

Figure 10:
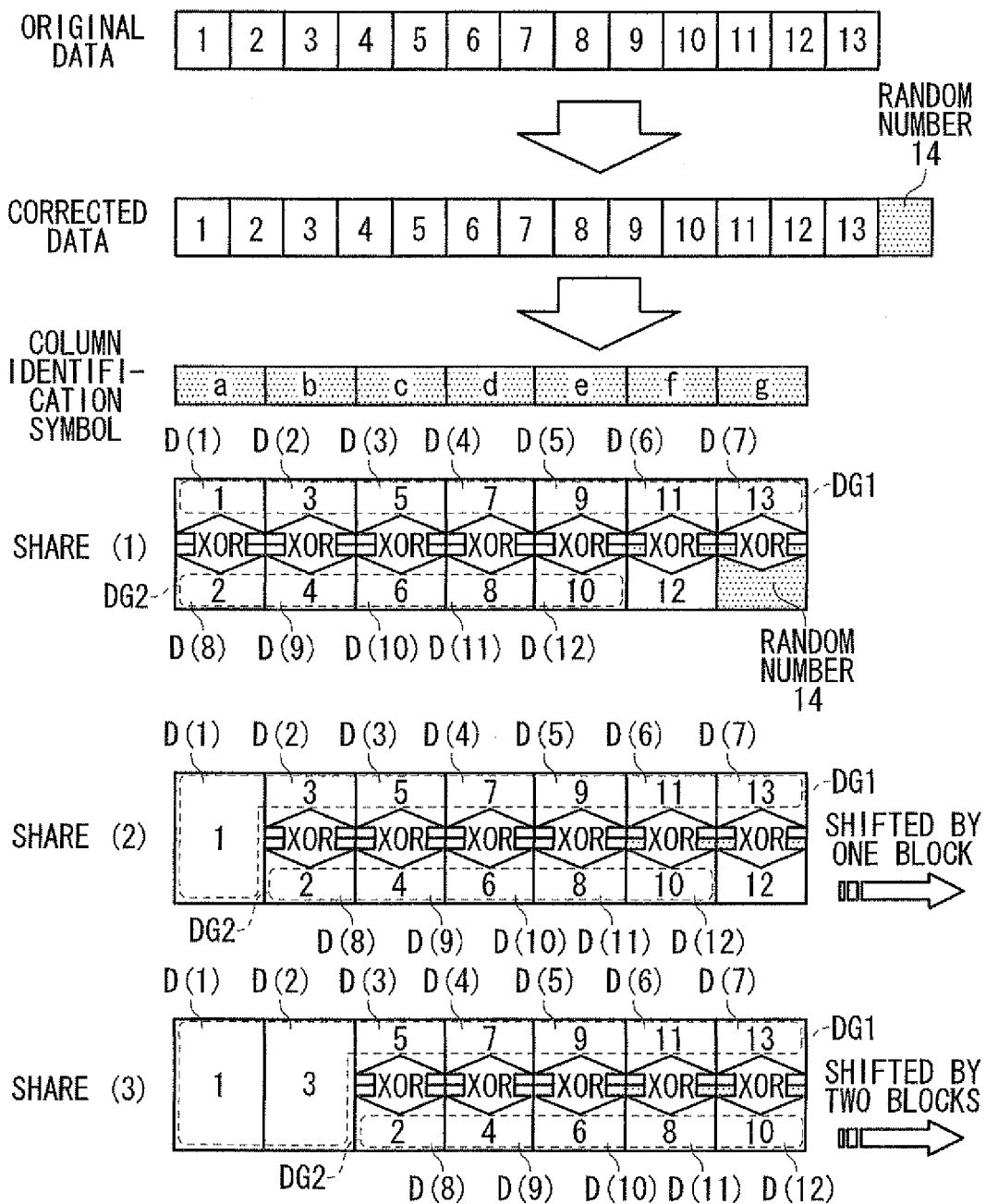
FIG. 10 is a diagram illustrating an example of a generating method of shared data in a threshold value of 2.

FIG. 10 is an example of a generating method of shared data according to the present embodiment. Here, the shared data is generated by a different method in FIG. 1. For comparison with the method in FIG. 1, it is assumed that three pieces of shared data of share (1), share (2), and share (3) are generated.

Share (1) in FIG. 10 is the same as share (A) in FIG. 1. Further, share (2) is the same as share (B). The different thing is the third shared data. Share (C) in FIG. 1 is obtained by shifting the upper layer of share (A) by one block, but share (3) in FIG. 10 is obtained by shifting share (1), that is, the lower layer of share (A) by two blocks.

In this way, it is possible to use share (3) obtained by shifting the lower layer of share (A) by two blocks as the shared data. Further, similarly, it is possible to use a share obtained by shifting the upper layer of share (A) by N blocks (N=1, 2, 3, . . . ) as the shared data.

In the subsequent drawing, a method of shifting the lower layer for generation of the shared data will be described, but it is also possible to generate the shared data by shifting the upper layer in any drawing.

Here, in a case where shared data obtained by shift of a plurality of blocks as in share (3) in FIG. 10 is used, attention is necessary. For example, since information on column 14 of original data is not present in share (2) and share (3), in a case where the original data is restored from share (2) and share (3), column 14 cannot be restored.

In order to deal with this problem, as shown in FIG. 10, corrected data in which column 14 is set to random numbers may be created, and the shared data may be generated from the corrected data. That is, the original data may be divided into 13 blocks (columns), which is one block smaller than that in FIG. 1, one dummy block (column) including random numbers may be added subsequent to column 13, and the shared data may be generated therefrom. Further, when the original data is restored, the final dummy block (column) including random numbers, that is, column 14 may not be deleted or restored.

Then, the dummy block (column) of column 14 has an effect of encrypting column 13 in [share (1) g].

As understood from the description with reference to FIG. 6, the method of generating the shared data in the threshold value of 2 is not limited to the method in FIG. 1, and the method shown in FIG. 10 may be also used.

Figure 11:
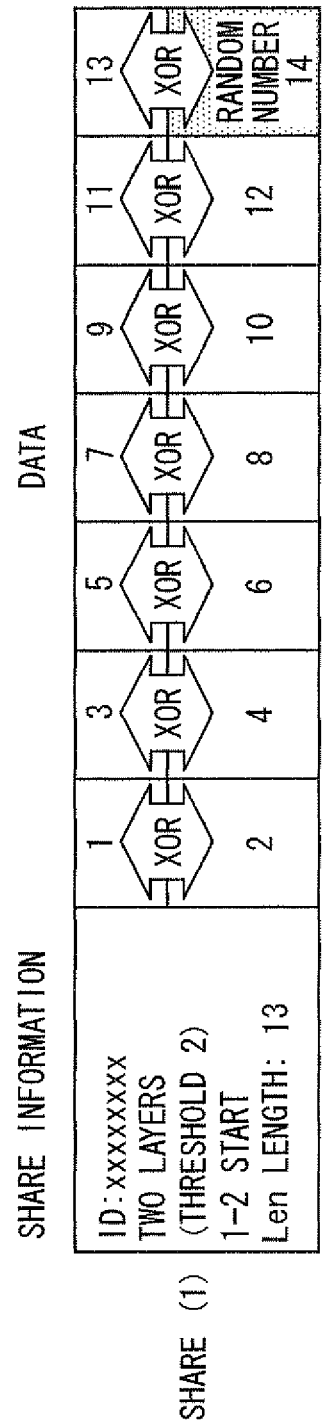
FIG. 11 is a diagram illustrating an example of the format of shared data.

FIG. 11 is a diagram illustrating an example of the format of shared data according to the present embodiment. Here, information having length LEN which is the number of blocks (columns) of the original data is added to the share information in FIG. 5. Thus, in a case where the original data is restored, since the location of the dummy block (column) can be understood, it is possible to correctly restore the original data. Here, the method of identifying the dummy block (column) is not limited thereto, but for example, the number of the dummy block (column) may be described.

Figure 12:
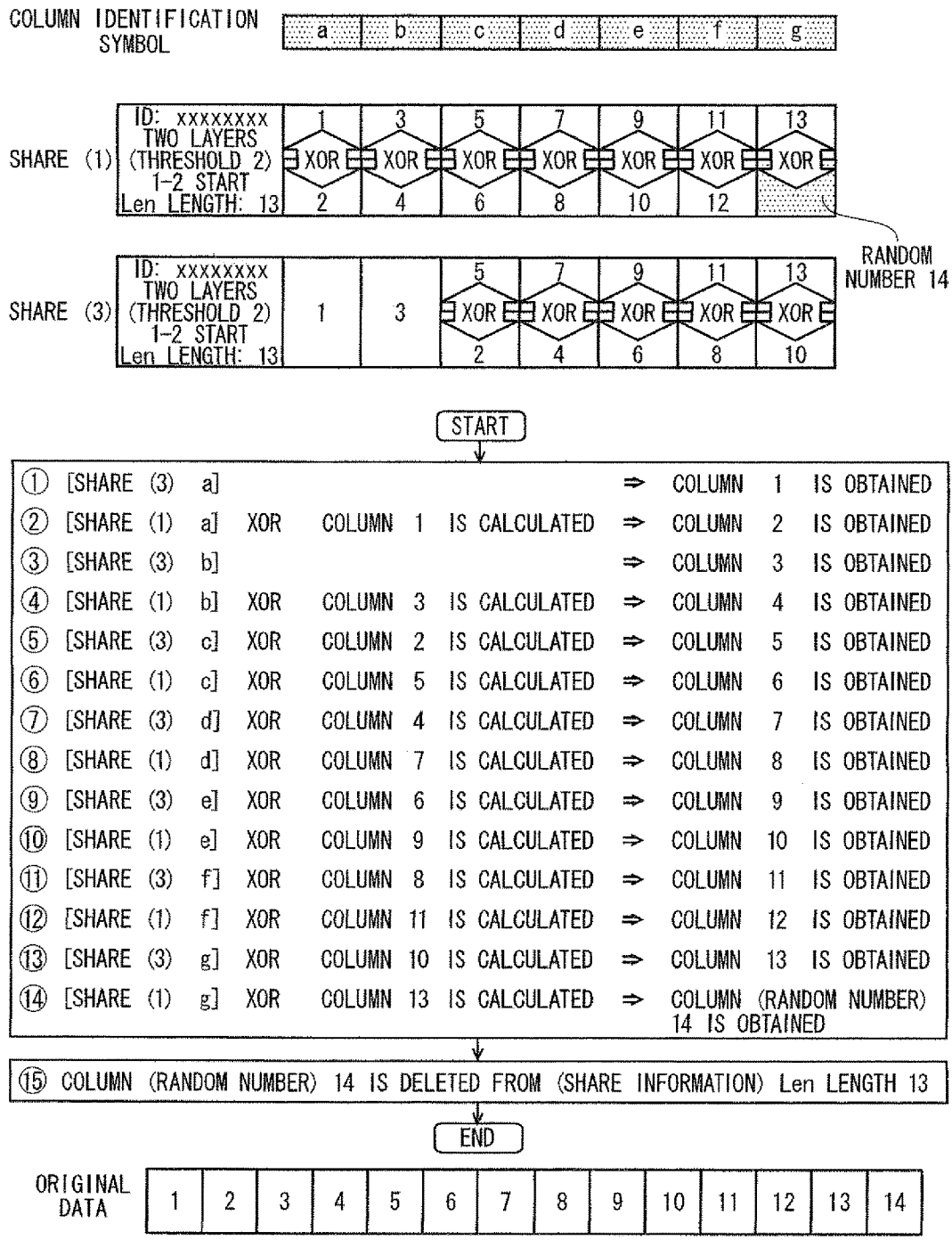
FIG. 12 is a diagram illustrating an example of a restoring method of original data in a threshold value of 2.

FIG. 12 is an example of a restoring method according to the present embodiment. Here, the method of restoring the original data shown on the lower side in the figure from two pieces of shared data of share (1) and share (3) which are shown on the upper side in the figure will be described with reference to a flowchart.

(1) Column 1 of the original data is obtained from [share (3) a]. (2) [Share (1) a] XOR column 1 is calculated, and column 2 is obtained from its result. (3) Column 3 of the original data is obtained from [share (3) b]. (4) [Share (1) b] XOR column 3 is calculated, and column 4 is obtained from its result. (5) [Share (3) c] XOR column 2 is calculated, and column 5 is obtained from its result. (6) [Share (1) c] XOR column 5 is calculated, and column 6 is obtained from its result. (7) [Share (3) *d*] XOR column 4 is calculated, and column 7 is obtained from its result. (8) [Share (1) *d*] XOR column 7 is calculated, and column 8 is obtained from its result. (9) [Share (3) *e*] XOR column 6 is calculated, and column 9 is obtained from its result. (10) [Share (1) *e*] XOR column 9 is calculated, and column 10 is obtained from its result. (11) [Share (3) *f*] XOR column 8 is calculated, and column 11 is then obtained from its result. (12) [Share (1) *f*] XOR column 11 is calculated, and column 12 is obtained from its result. (13) [Share (3) *g*] XOR column 10 is calculated, and column 13 is obtained from its result. (14) [Share (1) *g*] XOR column 13 is calculated, and column 14 is obtained from its result. (15) The number of blocks (columns) is read by the length LEN of the share information. Since it is understood that the number of blocks (columns) is 13, column 14 is deleted.

In this way, even though the shared data obtained by shifting the upper layer or the lower layer in share (A) in FIG. 1 by a plurality of blocks is used, it is understood that the original data can be restored. Here, column 14 is deleted after restoration, but a method may be used in which the block (column) exceeding the shared data is not originally restored in consideration of the length LEN of the share information. The computation method for restoration is not limited thereto.

Figure 13:
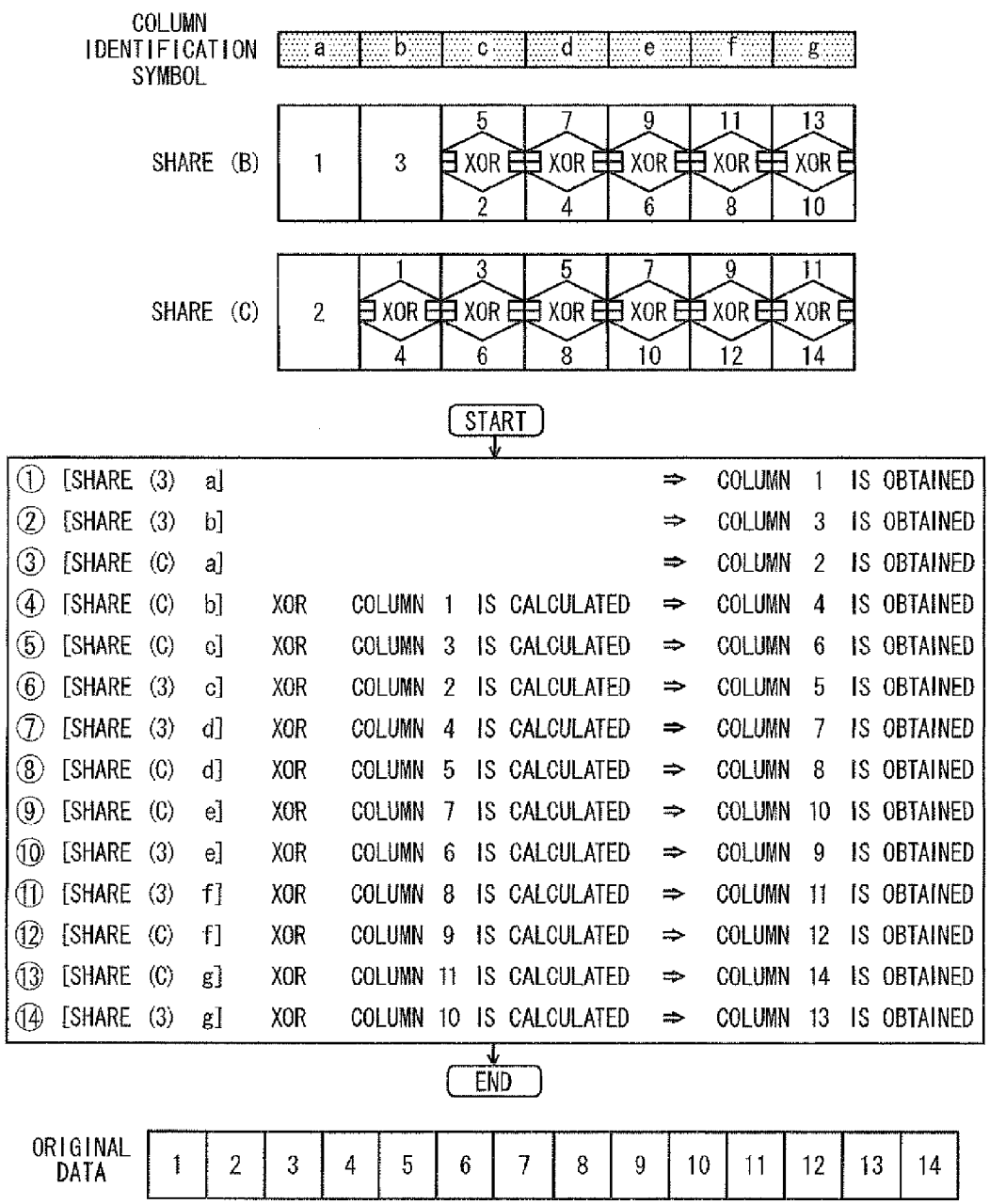
FIG. 13 is a diagram illustrating an example of a restoring method of original data in a threshold value of 2.

FIG. 13 is an example of a restoring method of the original data according to the present embodiment. Here, as shown in the figure, the original data can be also restored in share (C) obtained by shifting the upper layer in share (A) in FIG. 1 by one block, and share (3) obtained by shifting the lower layer in share (A) by two blocks.

(1) Column 1 of the original data is obtained from [share (3) *a*]. (2) Column 3 of the original data is obtained from [share (3) *a*]. (3) Column 2 of the original data is obtained from [share (C) b]. (4) [Share (C) b] XOR column 3 is calculated, and column 4 is obtained from its result. (5) [Share (C) c] XOR column 2 is calculated, and column 6 is obtained from its result. (6) [Share (3) *c*] XOR column 5 is calculated, and column 5 is obtained from its result. (7) [Share (3) *d*] XOR column 4 is calculated, and column 7 is obtained from its result. (8) [Share (C) d] XOR column 7 is calculated, and column 8 is obtained from its result. (9) [Share (C) e] XOR column 6 is calculated, and column 10 is obtained from its result. (10) [Share (3) *e*] XOR column 9 is calculated, and column 9 is obtained from its result. (11) [Share (3) *f*] XOR column 8 is calculated, and column 11 is obtained from its result. (12) [Share (C) f] XOR column 11 is calculated, and column 12 is obtained from its result. (13) [Share (C) g] XOR column 10 is calculated, and column 14 is obtained from its result. (14) [Share (3) *g*] XOR column 13 is calculated, and column 13 is obtained from its result.

In this way, even though the shared data obtained by shifting the upper layer or the lower layer in share (A) in FIG. 1 by a plurality of blocks is combined and used, it is understood that the original data can be restored. Here, block (column) 14 should not necessarily be random numbers. That is, in a case where both of shared data obtained by shifting the lower layer by one block and shared data obtained by shifting the lower layer by two blocks are used, block (column) 14 should be set to random numbers, that is, a dummy block (column). Similarly, in a case where both of shared data obtained by shifting the upper layer by one block and shared data obtained by shifting the upper layer by two blocks are used, block (column) 13 should be set to random numbers, that is, a dummy block (column). Here, the computation method for restoration is not limited thereto.

Figure 14:
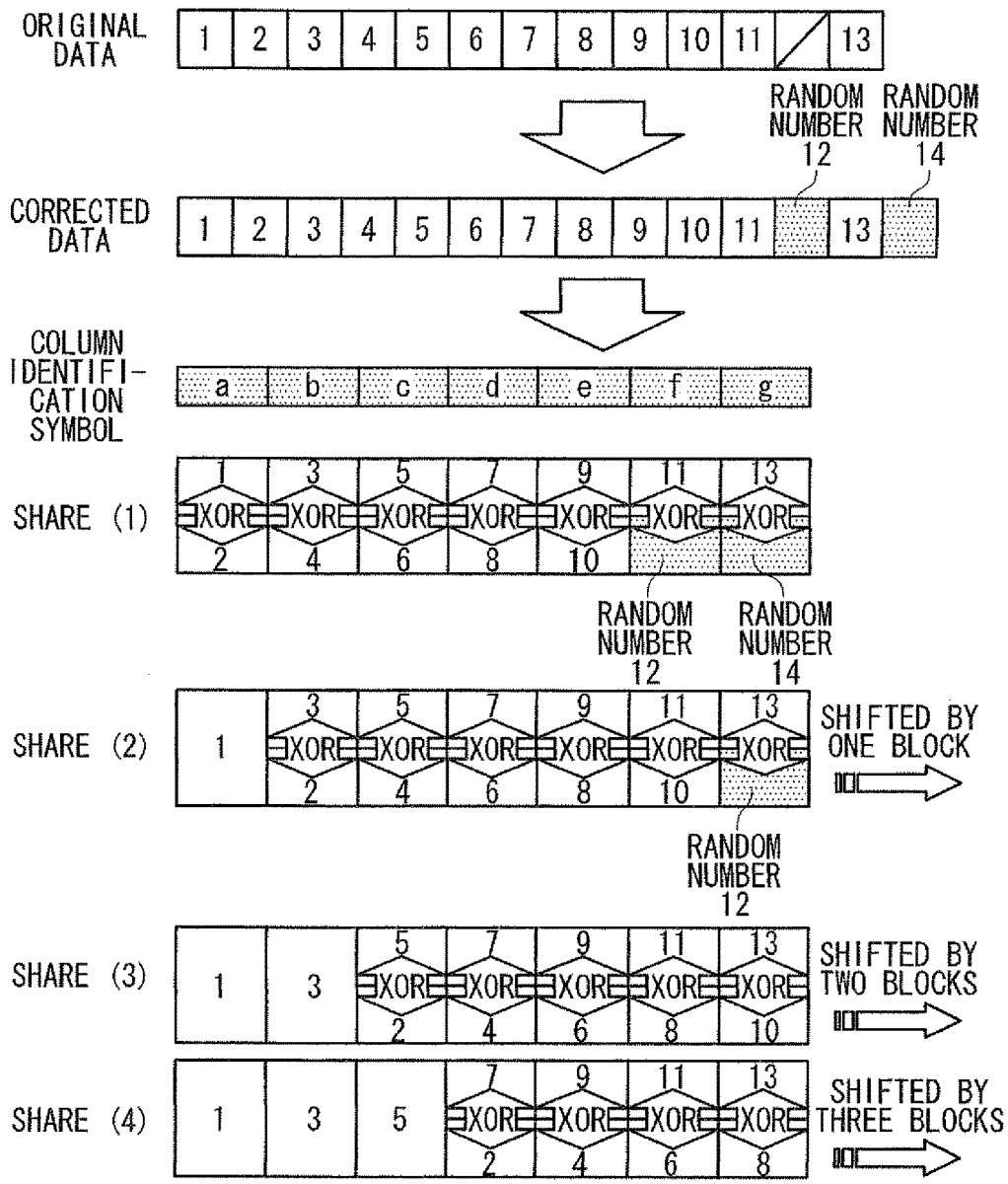
FIG. 14 is a diagram illustrating an example of a generating method of shared data in a threshold value of 2.

FIG. 14 is a diagram illustrating an example of a generating method of shared data according to the present embodiment. Here, share (4) is added to the case in FIG. 10. As understood from the figure, share (4) is obtained by shifting the lower layer by three blocks.

In this way, it is possible to use shared data obtained by shifting the lower layer of share (A) by three blocks, four blocks, or the like as the shared data. Further, similarly, it is possible to use shared data obtained by shifting the upper layer of share (A) by three blocks, four blocks, or the like as the shared data.

Here, in a similar way to share (3) in FIG. 10, in a case where the shared data obtained by shifting a plurality of blocks as in share (4) is used, attention is necessary. For example, since information on column 12 and column 14 of the original data is not present in share (3) and share (4), in a case where the original data is restored from share (3) and share (4), column 12 and column 14 cannot be restored.

In order to solve this problem, in a similar way to FIG. 10, columns to be deleted in restoration may be set to random numbers, that is, dummy blocks (columns). Here, column 12 and column 14 may be set to random numbers. That is, as shown in the figure, the original data may be divided into 12 blocks (columns) which is two blocks smaller than the blocks shown in FIG. 1, corrected data obtained by adding two dummy blocks (columns) to be deleted may be created, the shared data may be generated therefrom.

Positions where these dummy blocks (column) are assigned correspond to column 12 and column 14 which are blocks (columns) to be deleted, as shown in the figure. Further, when the original data is restored, the dummy blocks (columns) including random numbers may not be deleted or restored.

Similarly, in a case where the upper and lower layers of share (1) are shifted by X blocks, (X−1) dummy blocks (column) may be prepared to fill in portions to be deleted.

In this way, if the dummy blocks (columns) are used, it is possible to generate any shared data. As understood from this, according to the present embodiment, it is possible to freely set the number of shares. That is, it is possible to easily create a (N, 2) threshold sharing (share number N=2, 3, 4, . . . , threshold value of 2).

Then, the dummy blocks (column) of column 12 and column 14 have an effect of encrypting column 11 of [share (1) *f*], column 13 of [share (1) *g*], and column 13 of [share (2) *g*].

A slash line between column 11 and column 13 of the original data in the figure means that data is not present. That is, the data immediately after column 11 is column 13. Hereinafter, in all the drawings, it is assumed that a slash line indicates that data is not present.

Figure 15:
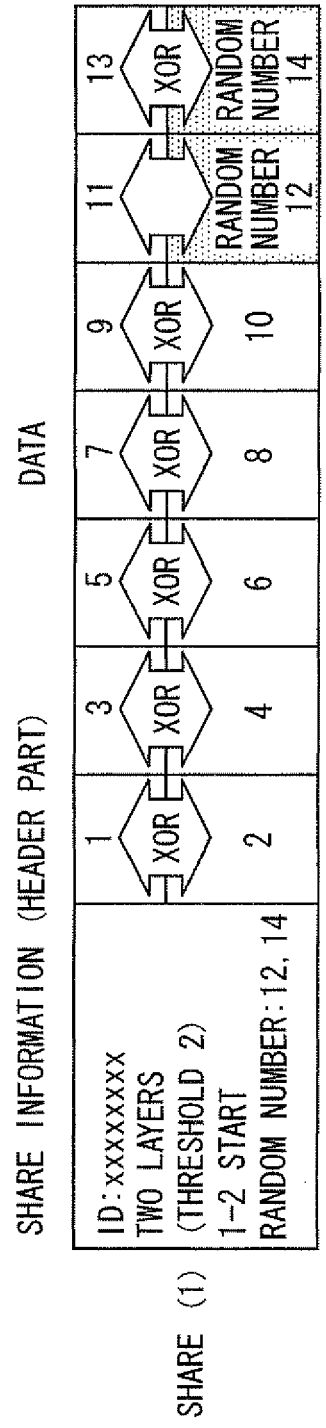
FIG. 15 is a diagram illustrating an example of the format of shared data.

FIG. 15 is a diagram illustrating an example of the format of shared data according to the present embodiment. Here, position information on the dummy blocks (columns) is added to the share information in FIG. 5. Thus, in a case where the original data is restored, since the positions of the dummy blocks (columns) can be understood, it is possible to correctly restore the original data.

The method of identifying the dummy blocks (columns) is not limited thereto, but for example, identification information may be added to the dummy blocks (columns), and then, it may be determined whether they are dummy blocks (columns) according to whether the identification information appears.

Since the restoring method of the original data using share (4) is easily understood with reference to FIGS. 2, 3, 4, 12 and 13, detailed description thereof will be omitted. Similarly, hereinafter, detailed description of the restoring method of the original data in a case where the threshold value is 2 will be omitted.

Figure 16:
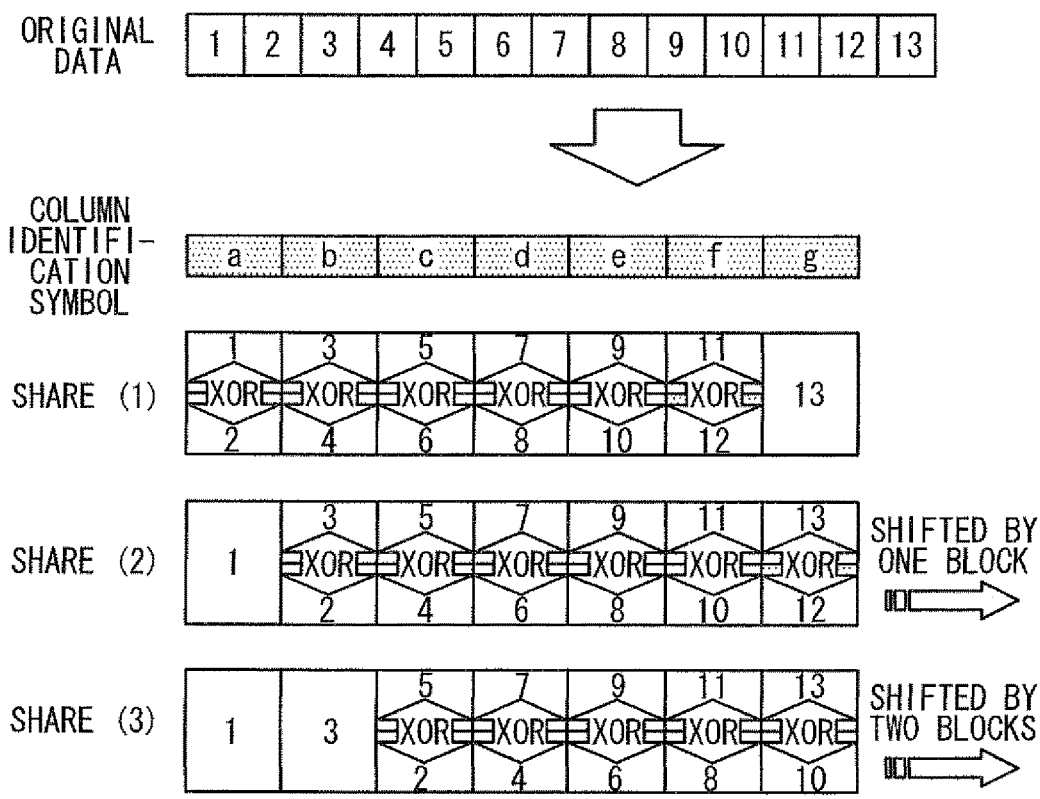
FIG. 16 is a diagram illustrating an example of a generating method of shared data in a threshold value of 2.

FIG. 16 is a diagram illustrating an example of a generating method of shared data according to the present embodiment. Here, differently from the case in FIG. 10, as understood from column g of shared data, this case has a configuration having one more upper layer block (column). In this case, as understood from the figure, according to the same principle as in FIG. 10, there is no block (column) to be deleted even though three pieces of shared data are generated. That is, in a case where the original data is restored in share (2) and share (3) in FIG. 10, column 14 is deleted, but since there is one more block (column) in the upper layer compared with the lower layer in FIG. 16, even in a case where the original data is restored in share (2) and share (3), there is no block (column) to be deleted.

In FIG. 14, in a case where the upper and lower layers of share (1) are shifted by X blocks, (X−1) dummy blocks (column) are used, but this is applied to the case where the numbers of blocks (columns) of the upper layer and the lower layer of share (1) are the same. As shown in FIG. 16, in a case where the number of blocks (columns) one of the upper and lower layers of share (1) is one block more than that of the other thereof (here, the layer having less blocks is shifted), (X−2) dummy blocks (columns) may be prepared. Similarly, in a case where the number of blocks (columns) one of the upper and lower layers of share (1) is M blocks more than that of the other thereof, (X−1−M) dummy blocks (columns) may be prepared. Here, X≥1+M.

As understood from the comparison of the case in FIG. 16 with the case in FIG. 10, the corrected data in FIG. 10 has a form that meaningless random numbers are added at the end of the original data in FIG. 16. Accordingly, the generating methods of shared data in FIGS. 10 and 16 are substantially the same. Here, while [share (1) g] in FIG. 16 is exposed for notice, [share (1) g] in FIG. 10 is XORed (encrypted) by random numbers.

Figure 17:
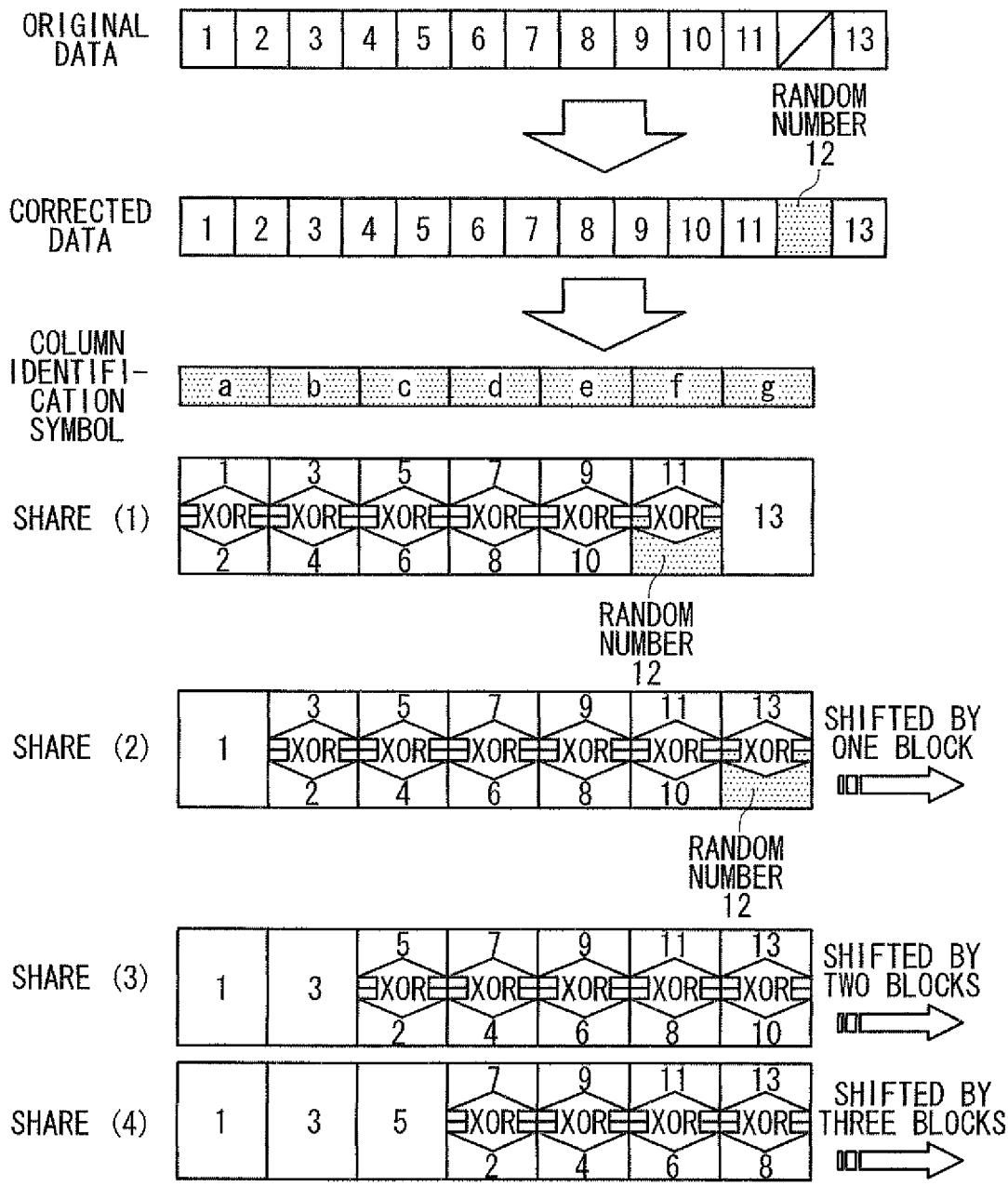
FIG. 17 is a diagram illustrating an example of a generating method of shared data in a threshold value of 2.

FIG. 17 is a diagram illustrating an example of a generating method of shared data according to the present embodiment. In FIG. 17, one more piece of shared data compared with the case in FIG. 16, that is, share (4) is generated, in addition to the existing shared data. As understood from the figure, if restoration is performed in share (3) and share (4), column 12 is deleted.

In order to solve the problem, here, as shown in the figure, the original data is divided into 12 blocks (columns) which are one block smaller than those in FIG. 16, corrected data in which one dummy block (column) to be deleted is added is created, and the shared data is generated therefrom. The position where the dummy block (column) is added is column 12 which is the block (column) to be deleted, as shown in the figure. Further, when the original data is restored, the dummy block (column) of random numbers may not be deleted or restored.

As understood from the comparison of the case in FIG. 17 and the case in FIG. 14, the corrected data in FIG. 14 has a form that meaningless random numbers are added at the end of the corrected data in FIG. 17. Accordingly, the generating methods of shared data in FIGS. 14 and 17 are substantially the same. Here, while [share (1) g] in FIG. 17 is exposed for notice, [share (1) g] in FIG. 14 is XORed (encrypted) by random numbers.

Figure 18:
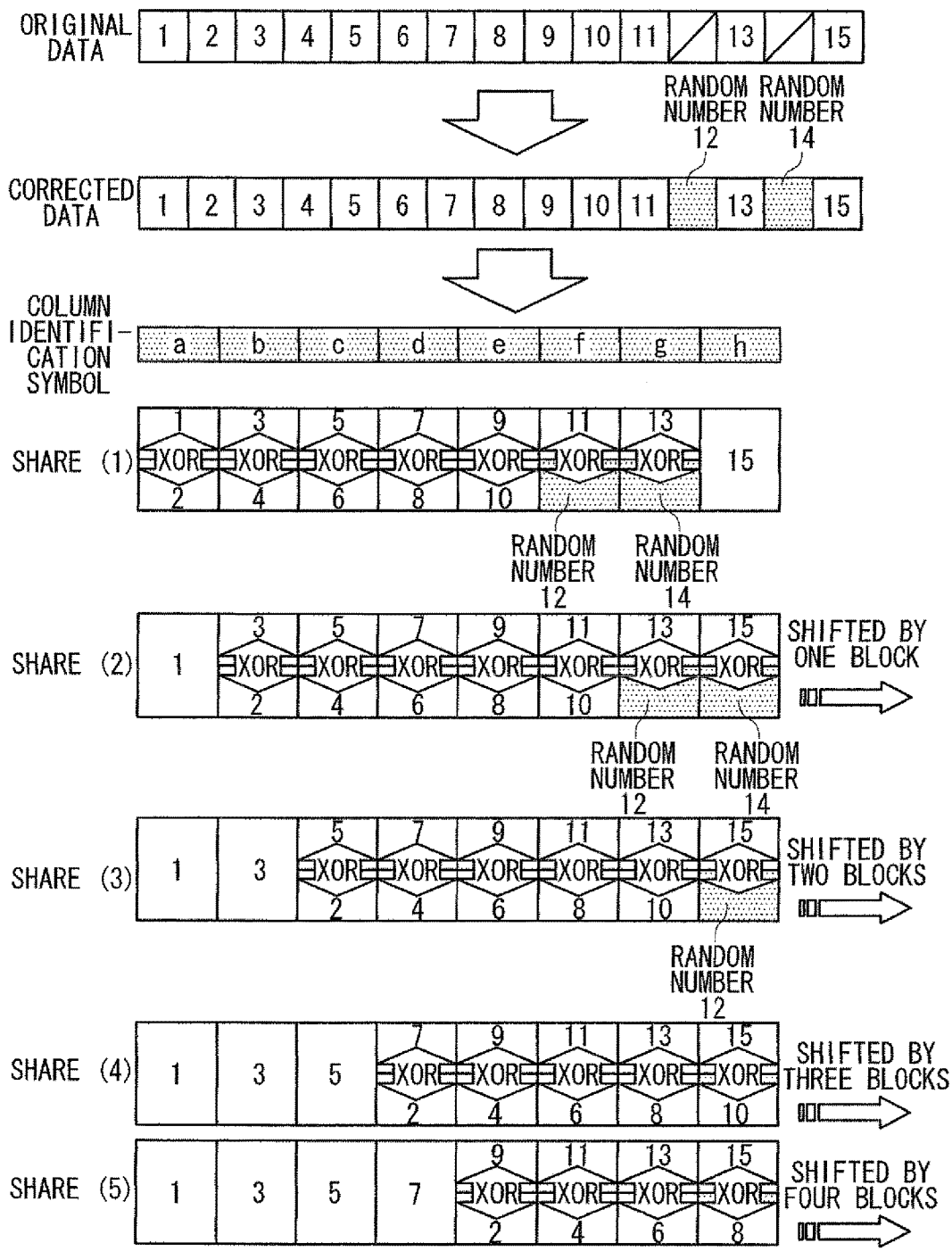
FIG. 18 is a diagram illustrating an example of a generating method of shared data in a threshold value of 2.

FIG. 18 is a diagram illustrating an example of a generating method of shared data according to the present embodiment. In FIG. 18, one more piece of shared data, compared with the case in FIG. 17, that is, share (5) is generated, in addition to the existing shared data. As understood from the above description, two dummy blocks (columns) to be deleted are necessary.

For ease of comparison with the case in FIG. 17, it is preferable that column numbers of the original data in FIG. 18 be set to 1, 2, 3, . . . , 9, 11 and 13, and the number of blocks (columns) of corrected data be set to 13, in a similar way to FIG. 17. However, for ease of comparison with the case in FIG. 14, column numbers of the original data in FIG. 17 are set to 1, 2, 3, . . . , 11, 13 and 15, and the number of the blocks (columns) of corrected data are set to the number which is two blocks larger than that in FIG. 17.

As understood from the comparison of the case in FIG. 18 and the case in FIG. 14, the corrected data in FIG. 18 has a form that meaningful data is added at the end of the corrected data in FIG. 14. Then, while the number of dummy blocks (columns) is the same, the number of shares is increased by 1.

If the upper layer or the lower layer of the shared data is shifted by one block as shown in FIG. 16, it is possible to set the number of shares to 3, and if the corrected data obtained by adding meaningless random numbers at the end of the original data is subject to the secret sharing process as shown in FIG. 10, it is possible to encrypt the final block (column). Further, if meaningful data is added subsequent to the random numbers as shown in FIG. 17, it is possible to set the number of shares to 4 which is one more than 3, and if the corrected data obtained by adding meaningless random numbers at the end of the original data is subject to the secret sharing process as shown in FIG. 14, it is possible to encrypt the final block (column). Further, if meaningful data is added subsequent to the random numbers as shown in FIG. 18, it is possible to set the number of shares to 5 which is one more than 4, and so on. In this way, it is possible to freely set the number of shares.

Figure 19:
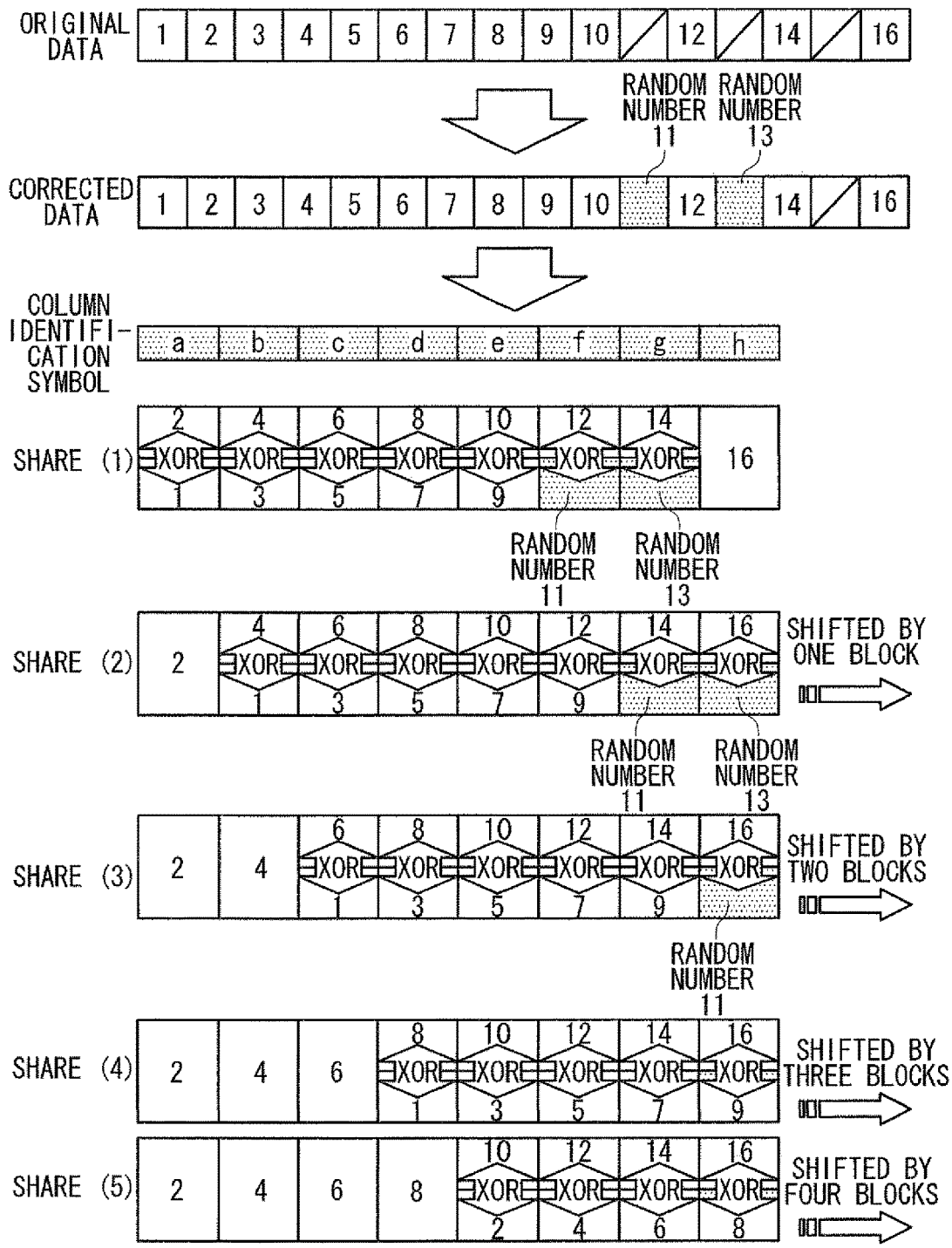
FIG. 19 is a diagram illustrating an example of a generating method of shared data in a threshold value of 2.

FIG. 19 is a diagram illustrating an example of a generating method of shared data according to the present embodiment. The case in FIG. 19 is obtained by changing the upper layer and the lower layer of the shared data in FIG. 18. This is equivalent to the case where the upper layer in FIG. 18 is shifted to generate shared data. As described with reference to FIG. 10, this means that if any one of the upper layer and the lower layer is shifted, the shared data can be generated. The shared data can be also generated by shifting both of the upper layer and the lower layer as shown in FIG. 1, instead of shifting any one of the upper layer and the lower layer.

It is possible to obtain one more viewpoint from FIG. 19. In description with reference to the above drawings, [share (1) a] is generated from columns 1 and 2 of the original data, and thereafter, similarly, [share (1) b] is generated from columns 3 and 4 of the original data, and [share (1) c] is generated from columns 5 and 6 of the original data, and so on. However, the numbers of column 1, column 2, column 3, and so on should not necessarily continue as serial numbers, as shown in FIG. 19.

Figure 20:
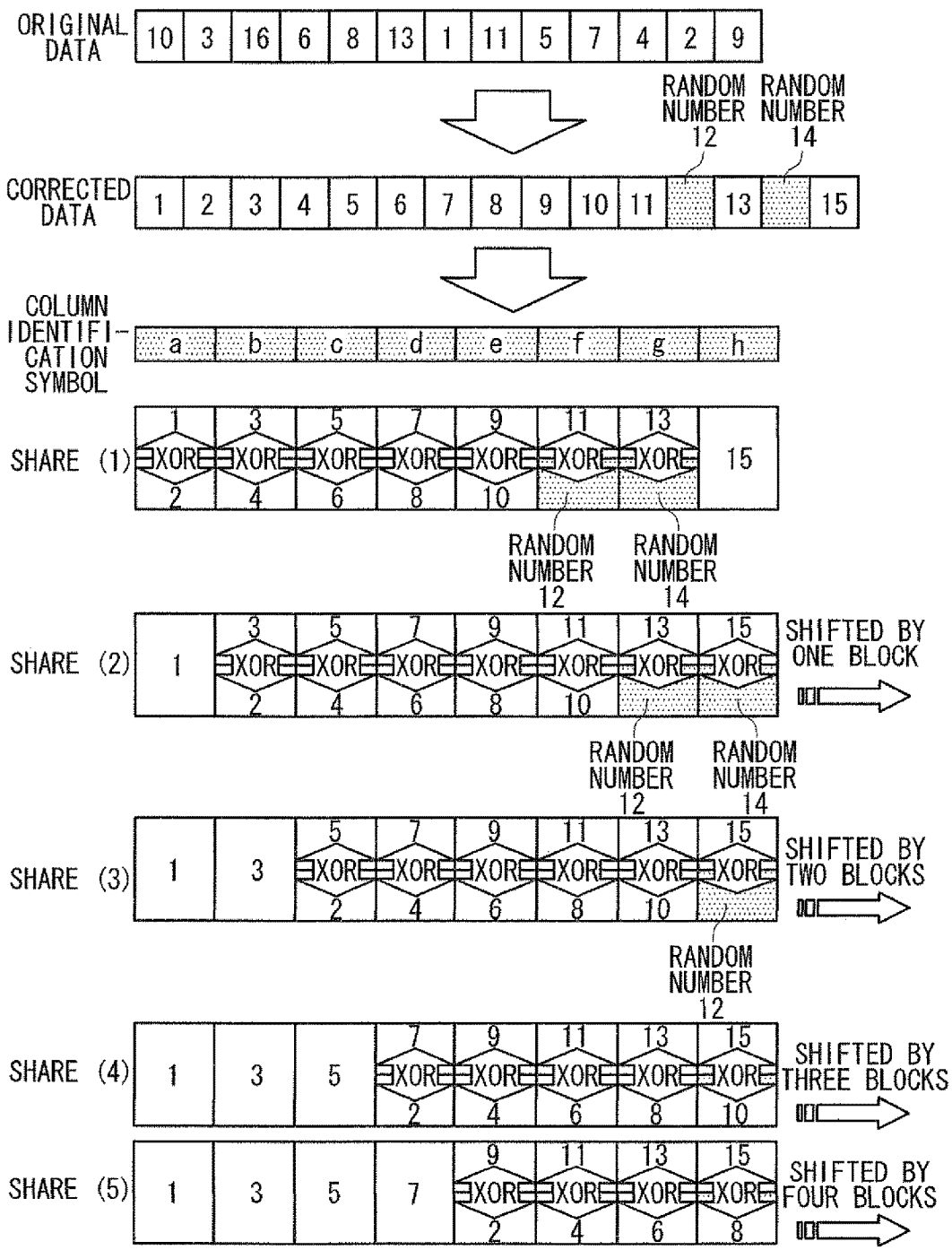
FIG. 20 is a diagram illustrating an example of a generating method of shared data in a threshold value of 2.

FIG. 20 is a diagram illustrating an example of a generating method of shared data according to the present embodiment. In FIG. 20, the meaning of "the numbers of column 1, column 2, column 3, and so on should not necessarily continue as serial numbers" mentioned with reference to FIG. 19 is simply described.

It is assumed that an original layout of the original data is in the order of column 10, column 3, column 16, and so on, as shown in FIG. 20. The data processing as described with reference to FIG. 1 which changes the layout is performed for the original data to generate corrected (processed) data having a changed arrangement of column 1, column 2, column 3, and so on. The process of setting the blocks (columns) to be deleted to a dummy block (column) of random numbers is performed at the same time. If such an operation is performed, the data entirely becomes as shown in FIG. 18.

As described with reference to FIG. 1, according to this data processing, it is difficult to estimate the original data from the shared data, which is preferable.

In this way, it is possible to freely arrange the blocks (columns) of the original data in the respective blocks (columns) of the shared data. This is similarly applied to any drawing except FIG. 19.

Accordingly, according to the present embodiment, odd blocks (columns) and even blocks (columns) of the original data are not divided into two upper and lower layers (columns) of the shared data for arrangement, but it can be understood that the respective blocks (columns) of the original data are arbitrarily divided into two groups, which are arranged in the upper layer and the lower layer of the shared data. Further, the order of arrangement of the upper and lower blocks (columns) of the shared data is arbitrary.

Referring to the following drawings, in a case where the threshold value is 3, the original data is divided into three layers (rows), in a case where the threshold value is 4, the original data is divided into four layers (rows), and in a case where the threshold value is N (N=3, 4, 5, . . . ), the original data is divided into N layers (rows). In a similar way to two layers (rows), a method of arranging a certain block of the original data in a certain layer (row) group of the shared data is arbitrary. Further, the order of arrangement of the blocks (columns) in the layer (row) is arbitrary.

Figure 21:
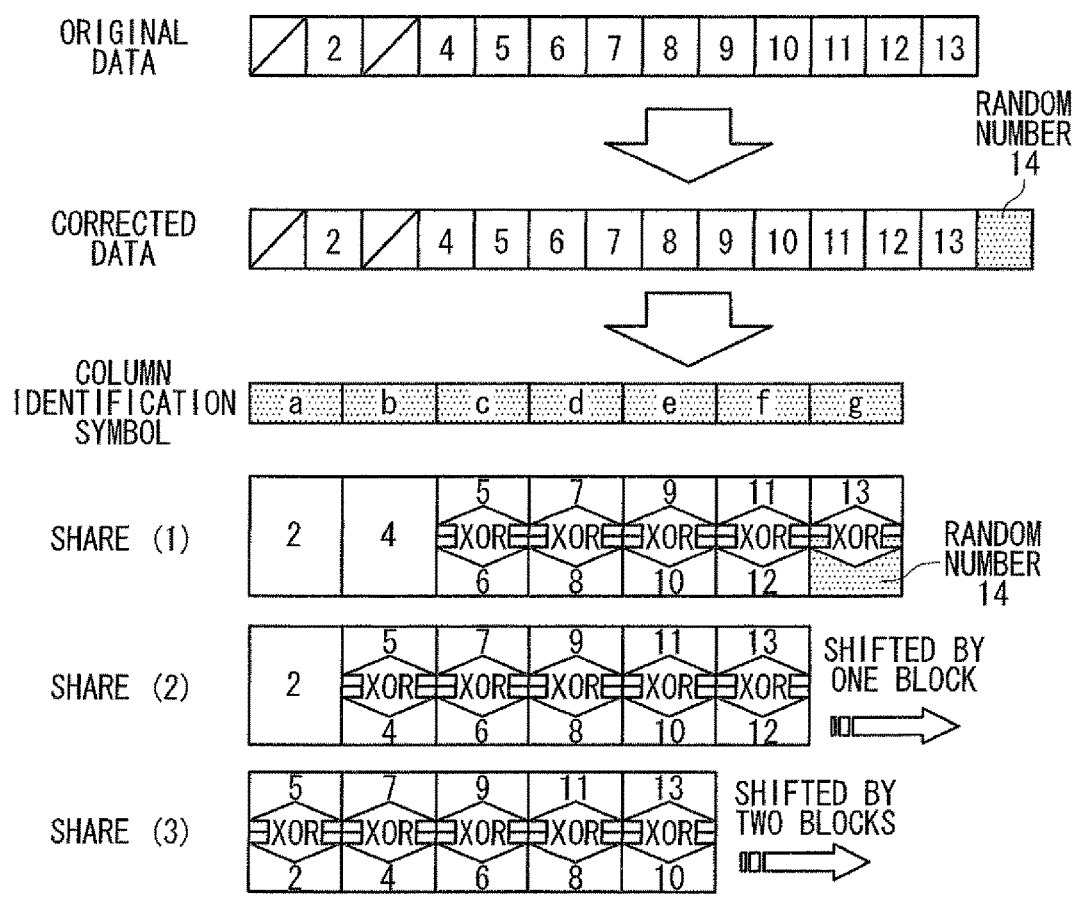
FIG. 21 is a diagram illustrating an example of a generating method of shared data in a threshold value of 2.

FIG. 21 is a diagram illustrating an example of a generating method of shared data according to the present embodiment. The case in FIG. 21 is obtained by deleting column 1 and column 3 of the original data from the case in FIG. 10.

In the above drawings, the number of lower blocks (columns) in share (1) is equal to or less than the number of upper blocks (columns) of the shared data. However, in FIG. 21, the number of lower blocks (columns) in share (1) is larger than the number of upper blocks (columns). An advantage of such an arrangement will be described with reference to FIG. 27.

This is similarly applied to a case where the threshold value is N (N=3, 4, 5, . . . ), and thus, the number of blocks (columns) arranged in each layer is arbitrary.

Figure 22:
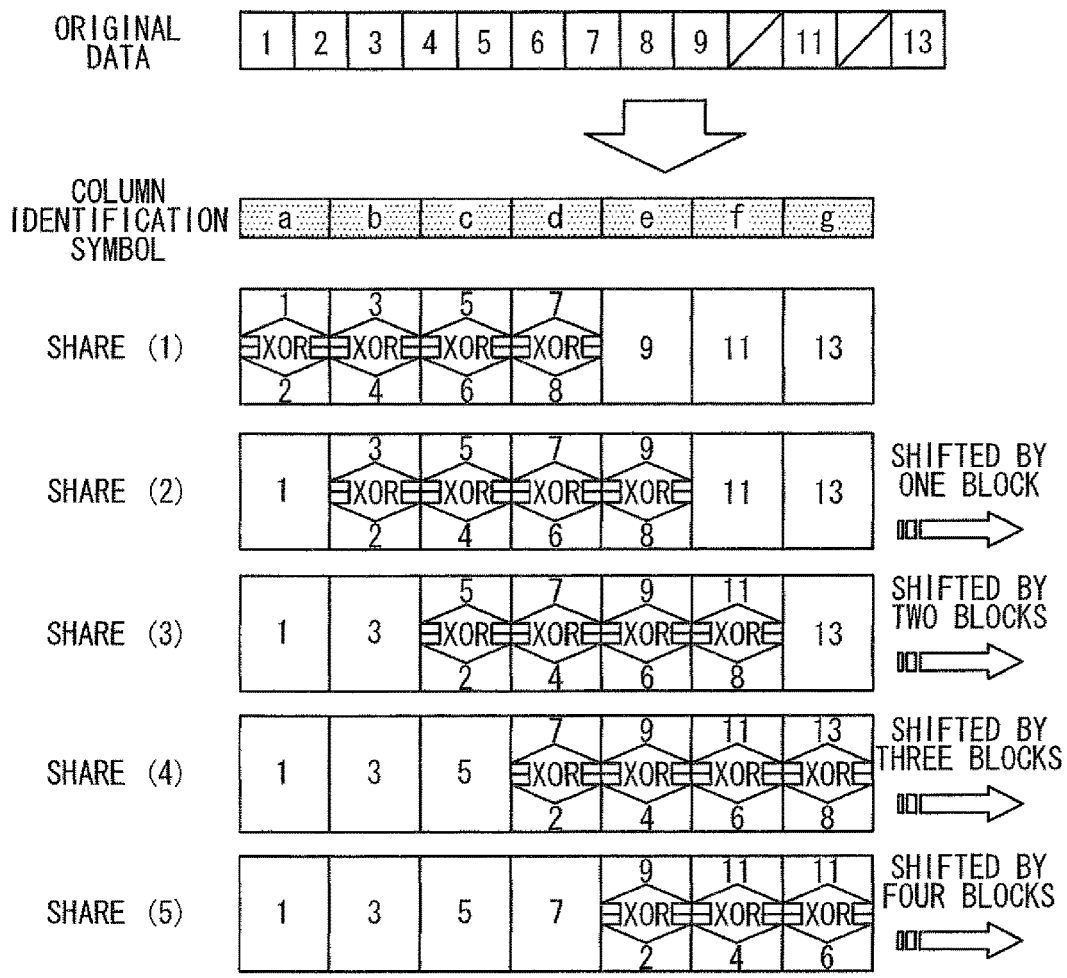
FIG. 22 is a diagram illustrating an example of a generating method of shared data in a threshold value of 2.

FIG. 22 is a diagram illustrating an example of a generating method of shared data according to the present embodiment. The case in FIG. 22 is obtained by deleting column 10 of the original data from the case in FIG. 17 and by inserting dummy blocks (columns) as shown in FIG. 17.

In FIG. 22, the number of upper blocks (columns) in share (1) is three blocks larger than the number of lower blocks (columns). On the other hand, since the dummy blocks (columns) are inserted in FIG. 17, the number of upper blocks (columns) in share (1) seems to be one more than the lower blocks (columns). However, since the dummy blocks (columns) are simple random numbers which are not present in the original data, as understood through removal of these dummy blocks, actually, the number of upper blocks (columns) in share (1) is two blocks larger than the number of lower blocks (columns). That is, the case in FIG. 22 has a form that the difference between the number of upper blocks (columns) and the number of lower blocks (columns) in share (1) is one more than that of the case in FIG. 17.

By setting the difference between the number of upper blocks (columns) and the number of lower blocks (columns) in share (1) to one block more, in FIG. 22, it is possible to set the number of shares to 5 which is one larger than that of the case in FIG. 17.

Actually, this description is made as repetition of the description with reference to FIG. 16 or 18. A difference in description between FIG. 22 and FIG. 16 or 18 is only handling of the dummy block (columns). In FIG. 16 or 18, the blocks (columns) to be deleted are inserted as the dummy blocks (columns), but as understood from the fact that the case in FIG. 22 has a form that the dummy blocks (columns) are removed from the case in FIG. 18, the dummy blocks (columns) should not be necessarily provided.

Figure 23:
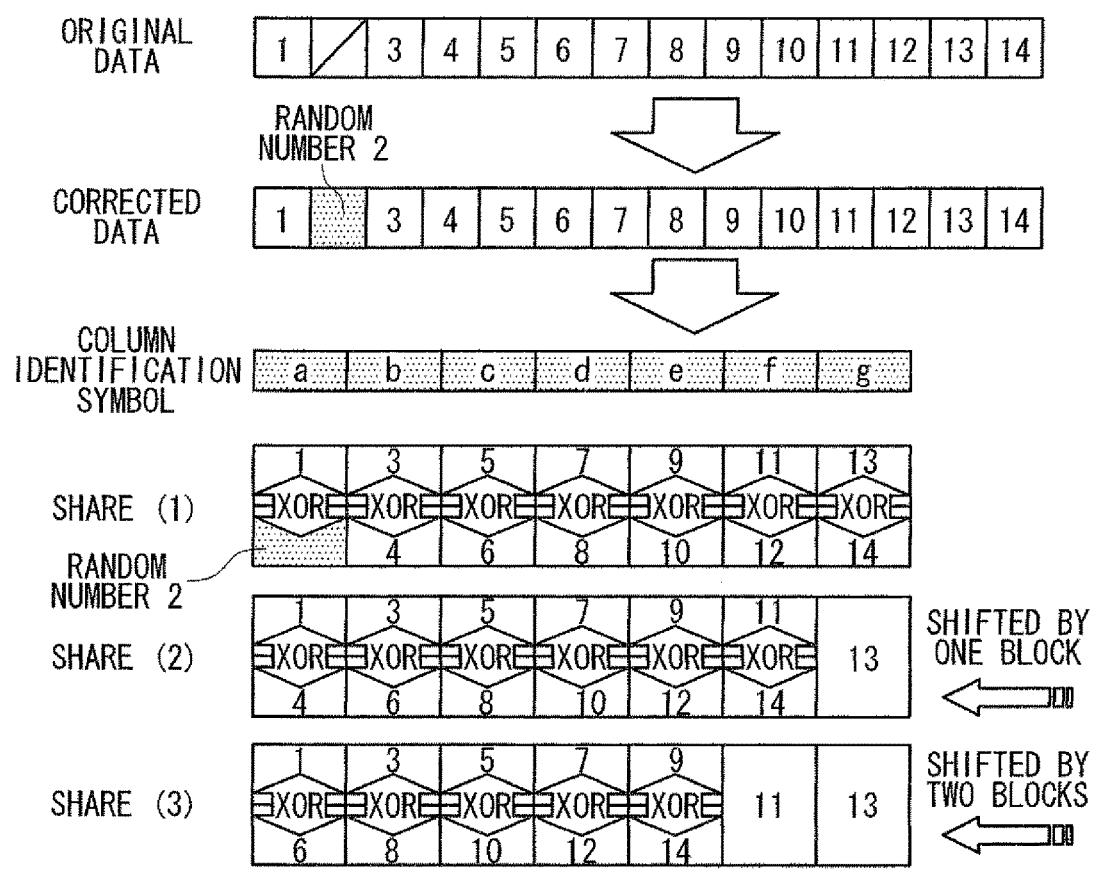
FIG. 23 is a diagram illustrating an example of a generating method of shared data in a threshold value of 2.

FIG. 23 is a diagram illustrating an example of a generating method of shared data according to the present embodiment. Referring to the above drawings, the lower layer in share (1) is shifted to the left to generate different shared data, but here, the lower layer in share (1) is shifted to the right to generate different shared data. Further, even though the upper layer instead of the lower layer is shifted to the right, it is similarly possible to generate the shared data.

In this way, since the shift of the layer to the left and the shift of the layer to the right are entirely the same in their results, and the methods described with reference to the other drawings may be applied to the case where the layer is shifted to the right. When there is a block (column) to be deleted, in a case where the layer is shifted to the right, the position of the block (column) to be deleted is changed, compared with a case where the layer is shifted to the left. In the example in FIG. 23, column 2 is deleted. In FIG. 23, the dummy block (column) using column 2 as random numbers is inserted, as described with reference to FIG. 22, the dummy block (column) may not be provided.

As described above, in the second embodiment, since the divided data and the random number data are combined to perform the XOR operation, it is possible to encrypt the divided data using the random number data, and even in a case where the divided data is easily inferred (for example, in a case where the same values of 0, 0, 0, . . . continue, or in a case where the values have regularity), it is possible to enhance security by obfuscating the divided data.

Third Embodiment

A third embodiment of the invention relates to a case where random numbers added to the original data are shared, differently from the first and second embodiments.

Figure 24:
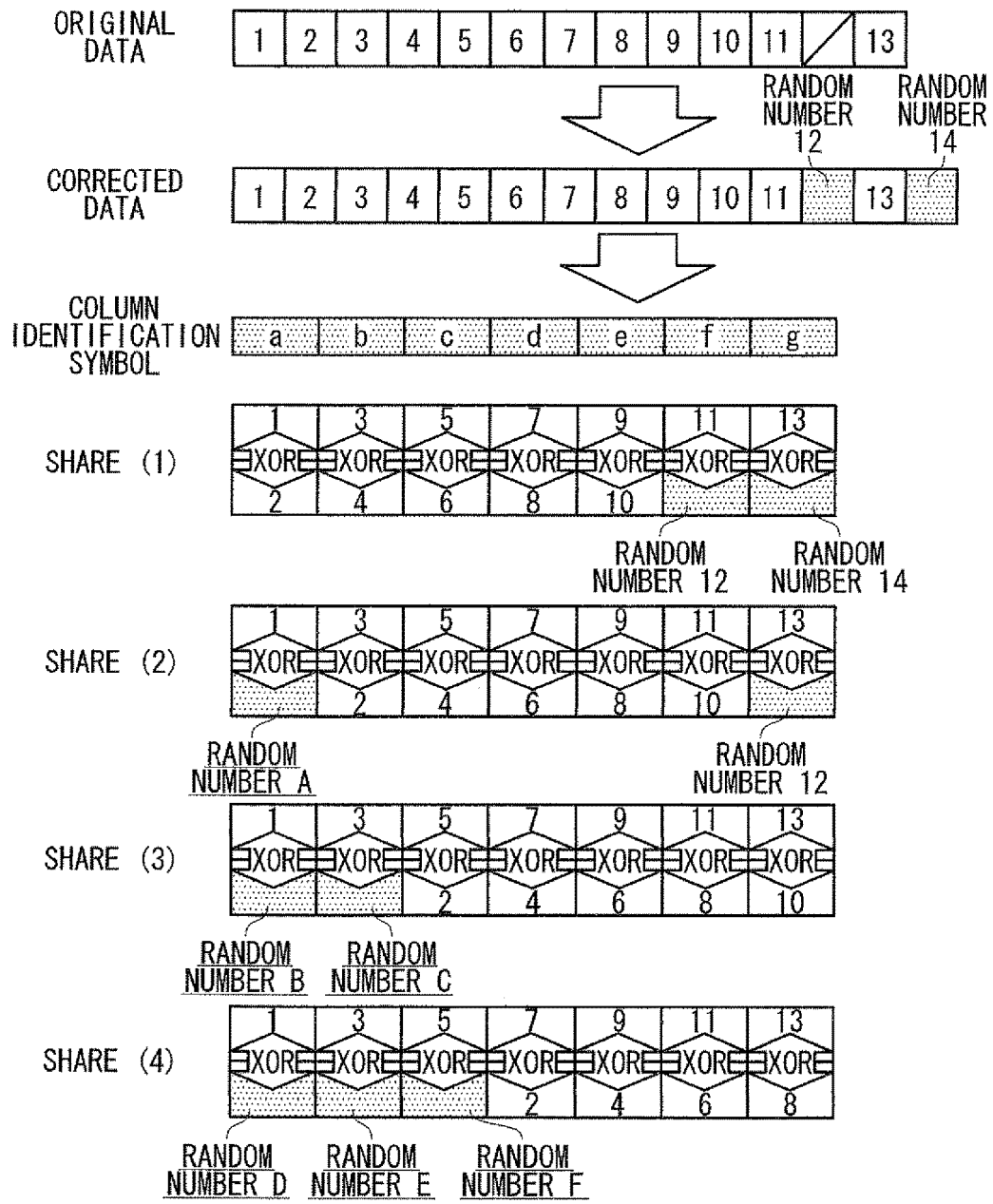
FIG. 24 is a diagram illustrating an example of a generating method of shared data in a threshold value of 2.

FIG. 24 is a diagram illustrating an example of a generating method of shared data according to the present embodiment. The case in FIG. 24 is obtained by XORing (encrypting), by random numbers, [share (2) *a*], [share (3) *a*] and [share (3) *b*], [share (4) *a*], [share (4) *b*] and [share (4) *c*] in FIG. 14 shown as they are. That is, the original data does not appear in the shared data. Thus, deleted blocks are filled with dummy blocks (columns) such as a random number 12 or a random number 14. Thus, it is difficult to restore the original data by the shared data under the threshold value.

As described above, here, [share (2) *a*] is XORed by a random number A. Similarly, [share (3) *a*] is XORed by a random number B, [share (3) *b*] is XORed by a random number C, [share (4) *a*] is XORed by a random number D, [share (4) *b*] is XORed by a random number E, and [share (4) *c*] is XORed by a random number F.

Here, all the random numbers are different, but the shared data may be XORed by all the same random number A, or the same column may be XORed by the same random number. Further, the same random number may be used for each shared data. In this way, the random numbers may be freely used.

There is a variety of sharing methods of the random numbers. Firstly, the random numbers may be processed shared data by the secret sharing scheme according to the present embodiment or the secret sharing scheme of polynomial interpolation (to generate the shared data from the random numbers), or conditions (data) under which the random numbers are able to be generated may be processed by the secret sharing scheme according to the present embodiment or the secret sharing scheme of polynomial interpolation. Further, without performing the secret sharing scheme, it is also possible to wait the random numbers between each other in such manner that the random number A is distributed to share (3), the random numbers B and C are distributed to share (4), and the random numbers D, E and F are distributed to share (2), for example.

Figure 25:
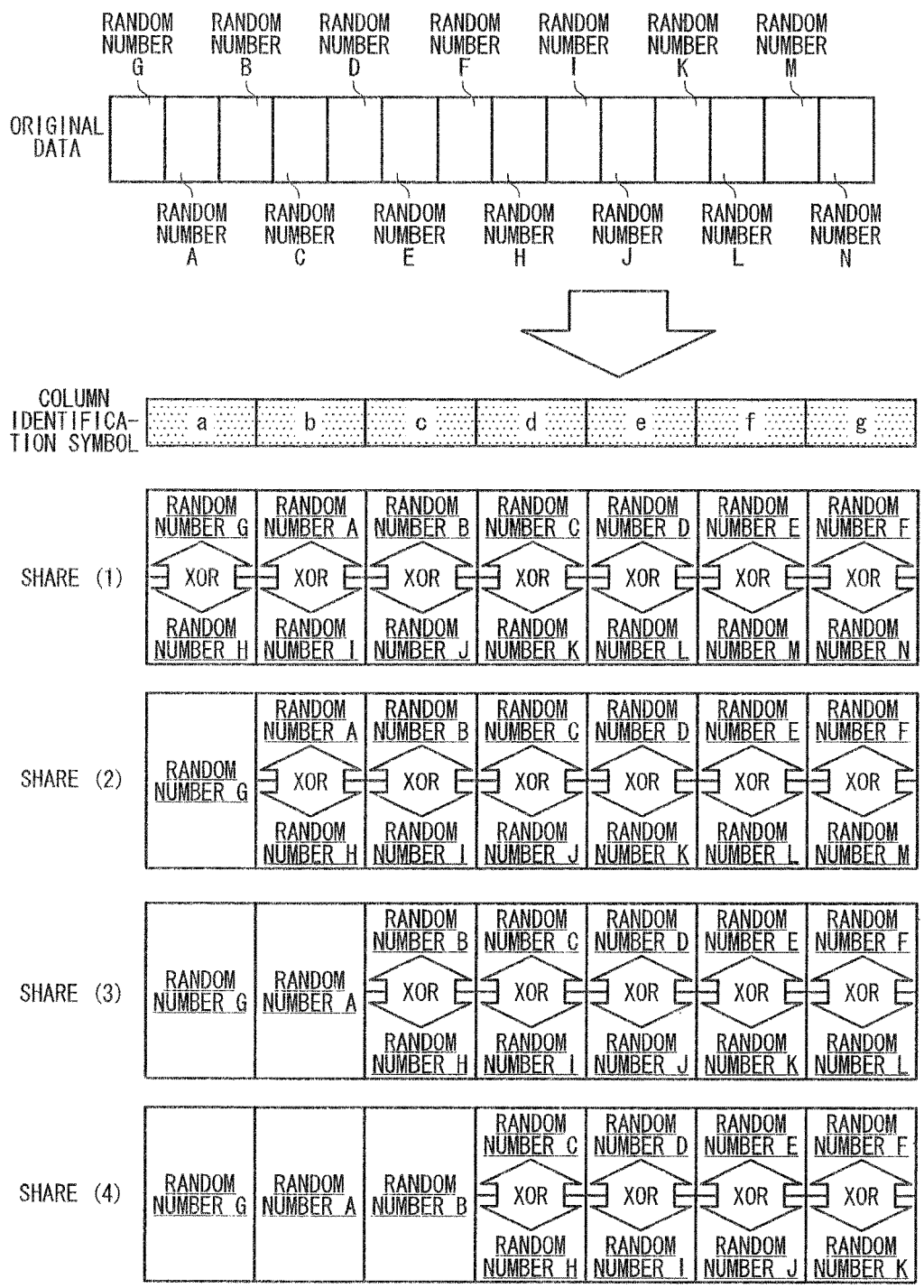
FIG. 25 is a diagram illustrating an example of a random number communalizing method according to an embodiment of the invention.

FIG. 25 is a diagram illustrating an example of a communalizing method of the random numbers. Here, random numbers G, H, . . . , N which are not used in FIG. 23 are subject to the secret sharing process, but only the random numbers which are used may be subject to the secret sharing process. Further, the random numbers used in FIG. 23 are shown in the upper layer of the shared data, but may be arranged in the lower layer thereof. In this way, the random numbers may be freely arranged.

In this regard, information relating to a usage method of the random numbers, such as information about specific columns and specific random numbers of the original data which are subject to the XOR operation, may be stored in the share information.

Figure 26:
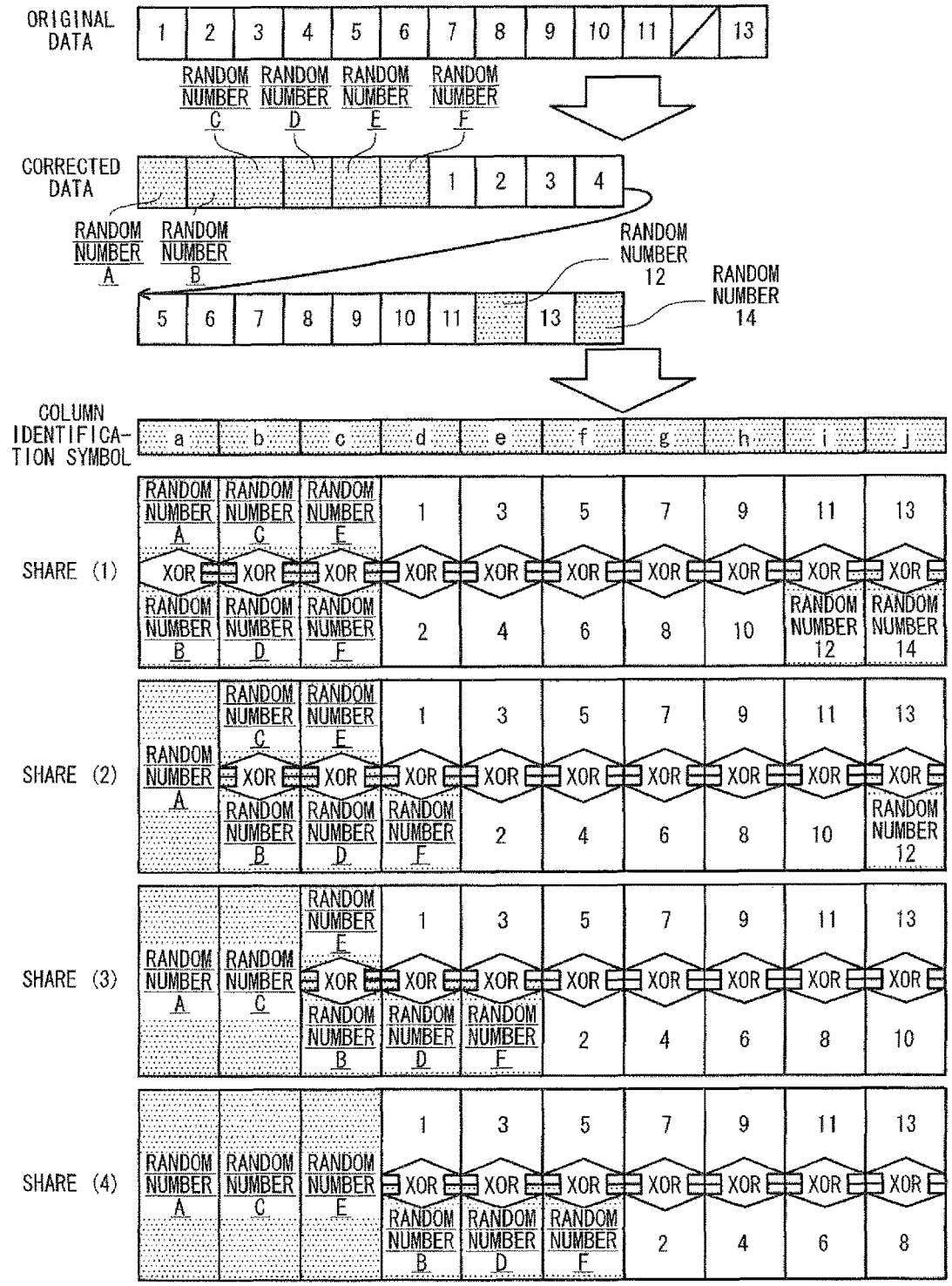
FIG. 26 is a diagram illustrating an example of a generating method of shared data in a threshold value of 2.

FIG. 26 is a diagram illustrating an example of a generating method of the shared data according to the present embodiment. The case in FIG. 26 is obtained by XORing (encrypting), by random numbers, [share (2) *a*], [share (3) *a*] and [share (3) *b*], and [share (4) *a*], [share (4) *b*] and [share (4) *c*] in FIG. 24 shown as they are. That is, the value of the original data does not appear in the shared data. Thus, deleted blocks are also filled with dummy blocks (columns), such as a random number 12 or a random number 14.

As understood from the comparison of the case in FIG. 26 and the case in FIG. 14, corrected data in FIG. 26 has a form random number columns are added at the head of the corrected data in FIG. 14. Accordingly, in a case where share (2), share (3) and share (4) are generated, [share (2) *a*], [share (3) *a*] and [share (3) *b*], and [share (4) *a*], [share (4) *b*] and [share (4) *c*] in FIG. 14 are prevented from appearing as the original data.

In this way, since the random numbers are arranged as a part of data, differently from FIG. 23, it is not necessary to repeatedly share and distribute the random number columns in FIG. 25. Information relating to the random numbers, such as information about the number of random numbers assigned to the head of the original data, may be stored in the share information.

Fourth Embodiment

A fourth embodiment of the invention relates to a case where random numbers are given to blocks where the original data is deleted, differently from the first to third embodiments.

Figure 27:
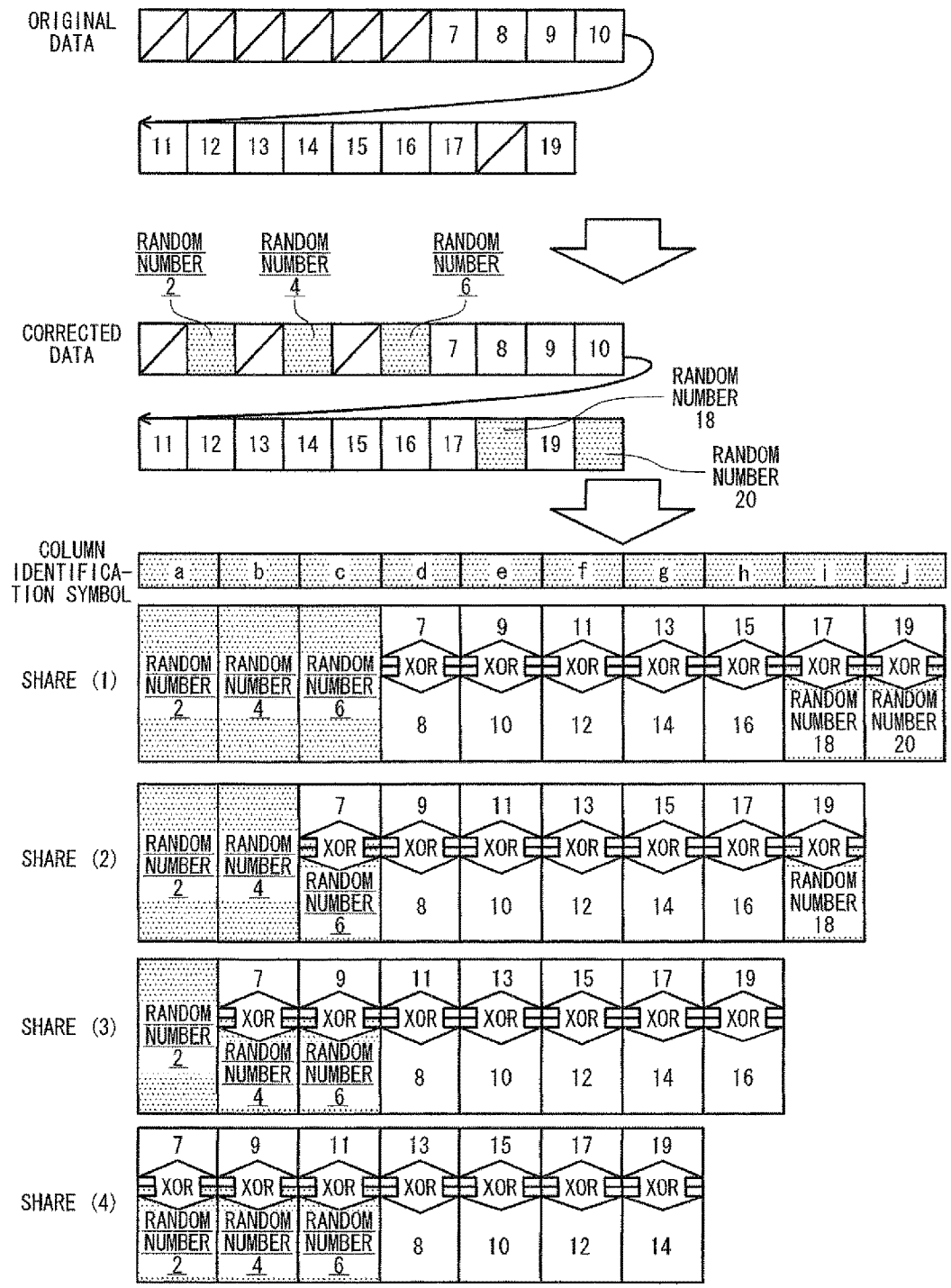
FIG. 27 is a diagram illustrating an example of a generating method of shared data in a threshold value of 2.

FIG. 27 is a diagram illustrating an example of a generating method of shared data according to the present embodiment. In a similar way to FIG. 24 or FIG. 26, the original data does not appear in the shared data in FIG. 27. Thus, deleted blocks are also filled with dummy blocks (columns), such as a random number 18 or a random number 20.

This is an application example of the case in FIG. 21. In FIG. 21, the number of lower blocks (columns) in share (1) is larger than the number of upper blocks (columns). By setting the larger blocks to random numbers, when different shared data is generated, it is possible to prevent the upper block from appearing in an exposed manner. An advantage of FIG. 21 is as follows. That is, in a case where the number of shares is N (N=2, 3, 4, . . . ), extra blocks (columns) of (N-1) may be prepared.

Then, in a similar way to FIG. 26, it is not necessary to repeatedly share and distribute the random number column. Further, it is possible to simply perform the process and reduce the processing time, compared with FIG. 26.

Figure 28:
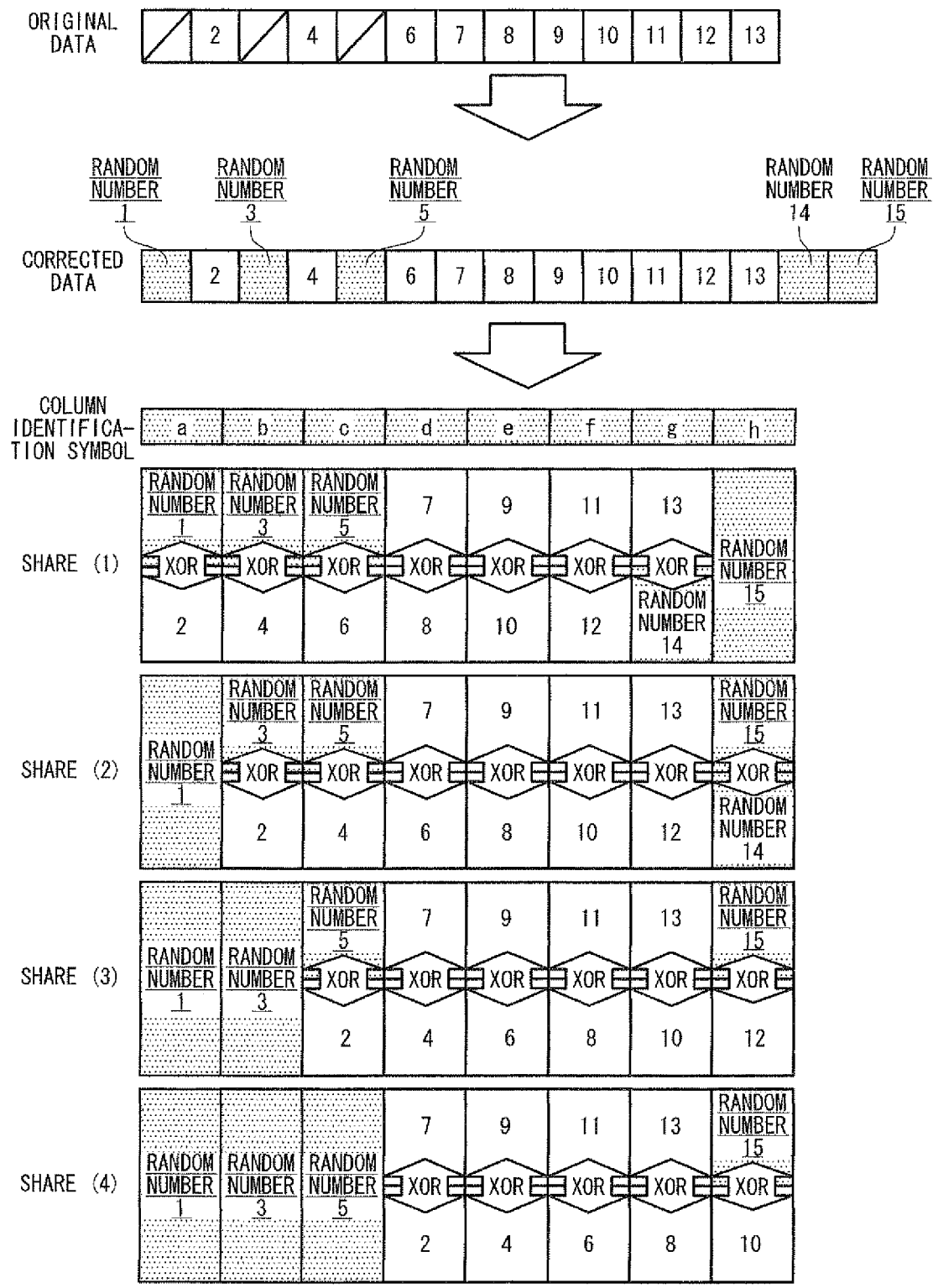
FIG. 28 is a diagram illustrating an example of a generating method of shared data in a threshold value of 2.

FIG. 28 is a diagram illustrating an example of a generating method of shared data according to the present embodiment. In a similar way to FIGS. 24, 26, and 27, the original data does not appear in the shared data in FIG. 28. Thus, deleted blocks are filled with dummy blocks (columns), such as a random number 14.

The dummy blocks (columns) of random numbers are arranged in the lower layer of the shared data in FIG. 27, but in FIG. 28, the same effect is achieved by arranging the dummy blocks (columns) in the upper layer thereof.

Further, in FIG. 28, a dummy block (column) of a random number 15, which is not described hereinbefore, is arranged. In a case where the number of shares is increased by one, the final column in share (1) is prevented from appearing in an exposed manner. This method can be applied to the cases in FIGS. 24, 26 and 27. For example, in FIG. 24, if column 13 is set to a random number, even though the random number 14 is not present, it is possible to prevent the value of the original data from appearing in the shared data, and to maintain the same number of shares.

Figure 29:
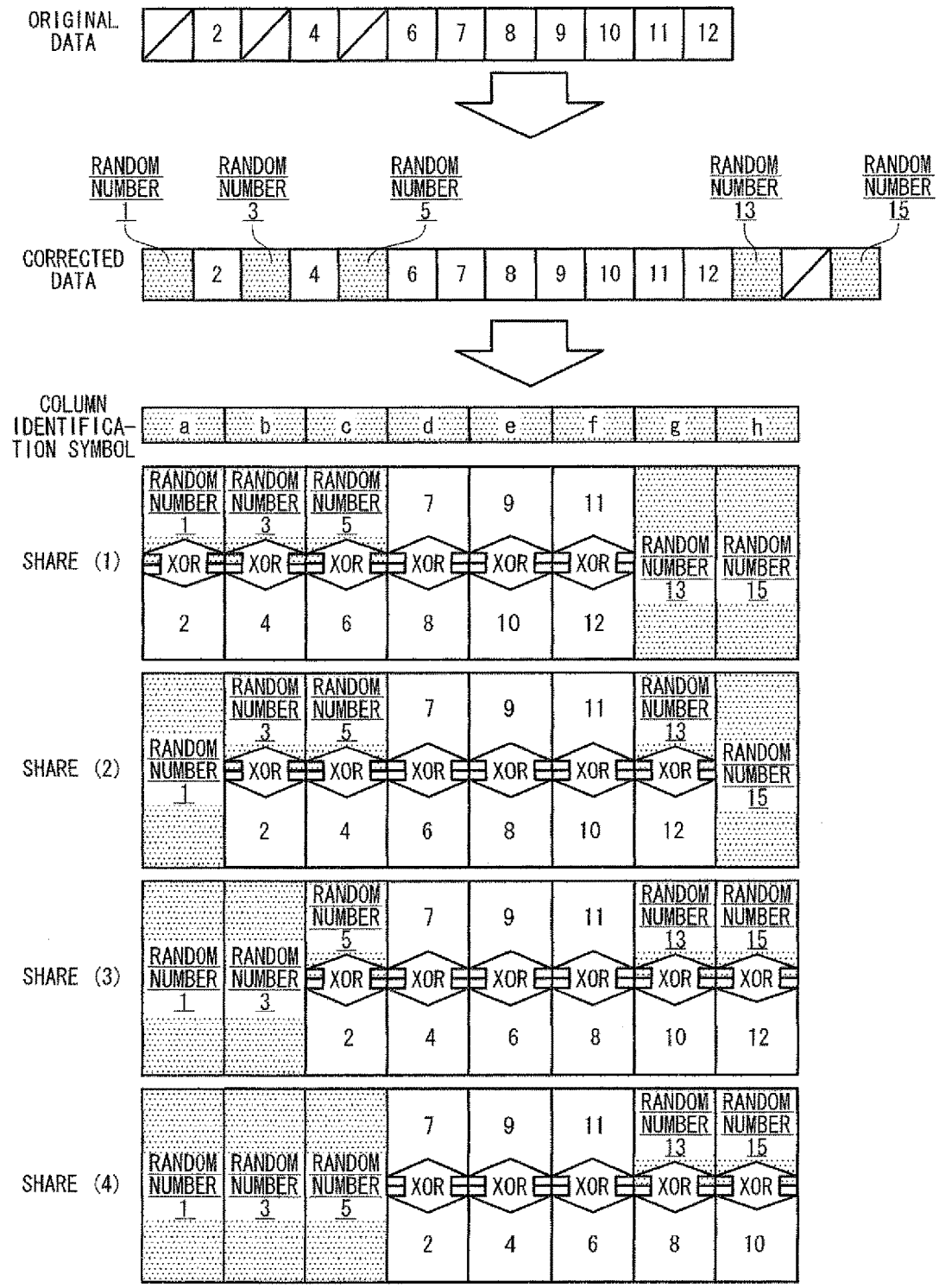
FIG. 29 is a diagram illustrating an example of a generating method of shared data in a threshold value of 2.

FIG. 29 is a diagram illustrating an example of a generating method of shared data according to the present embodiment. In FIG. 29, the random number 14 in FIG. 28 is also deleted. In this way, even though the blocks (here, column 13 and column 15) in share (1) which face the deleted blocks (here, column 14 and column 16) are set to dummy blocks (columns) of random numbers, it is possible to prevent the final column of the shared data from appearing in an exposed manner.

Similarly, column 9, column 11 and column 13 in FIG. 22 may be also set to dummy blocks (columns) of random numbers.

Fifth Embodiment

A fifth embodiment of the invention relates to a case where corrected data obtained by further dividing the original data is used, differently from the first to fourth embodiments.

Figure 30:
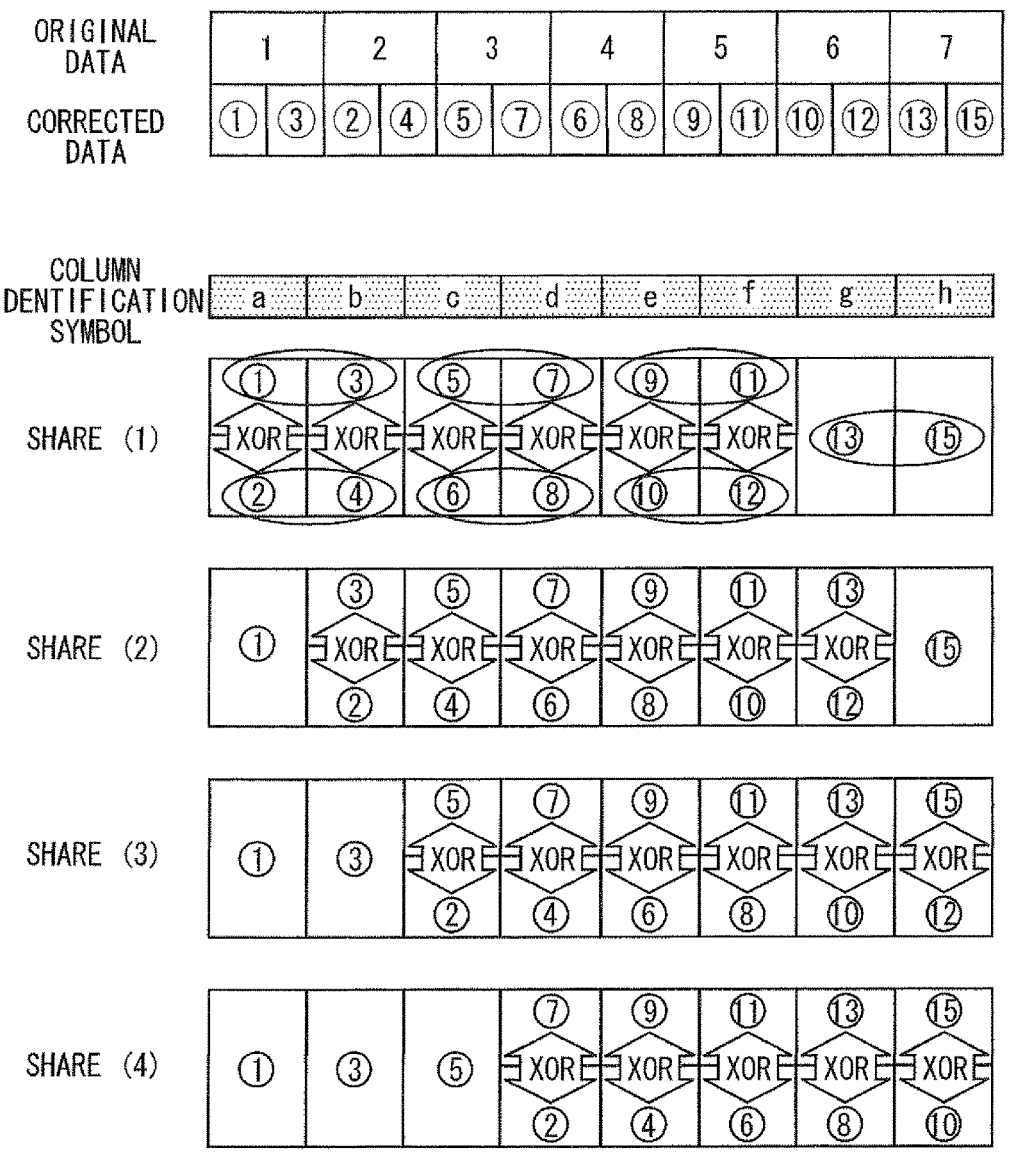
FIG. 30 is a diagram illustrating an example of a generating method of shared data in a threshold value of 2.

FIG. 30 is a diagram illustrating an example of a generating method of shared data according to the present embodiment. As understood from the comparison with FIG. 10, when the shared data is generated, column 1, column 2, column 3 and so on of the original data or the corrected data are arranged as one set of two columns, as shown in the figure.

More specifically, the respective columns (column 1, column 2, column 3, . . . ) of the original data or the corrected data are divided into two blocks, and for example, column 1 is divided into column (1) and column (3) as sub-divided data and column 2 is divided into column (2) and column (4) as sub-divided data. That is, the respective columns become new columns which include a plurality of pieces of sub-divided data of column (1), column (3), column (2), column (4), and so on, to generate the shared data using the method shown in FIG. 10.

This is different from the case in FIG. 10 in that the lower block is shifted by the size of half (½) block (column), not by the size of one block (column) of the original data or the corrected data when each shared data is generated. In this way, it is possible to change the shift size. In this case, the size of one block (column) should be two bits or more.

If such an operation is performed, as understood from the comparison with the case in FIG. 10, it is possible to generate a large amount of shared data even though the dummy block (column) is not inserted. Such an operation can be applied to the cases of the other drawings.

Figure 31:
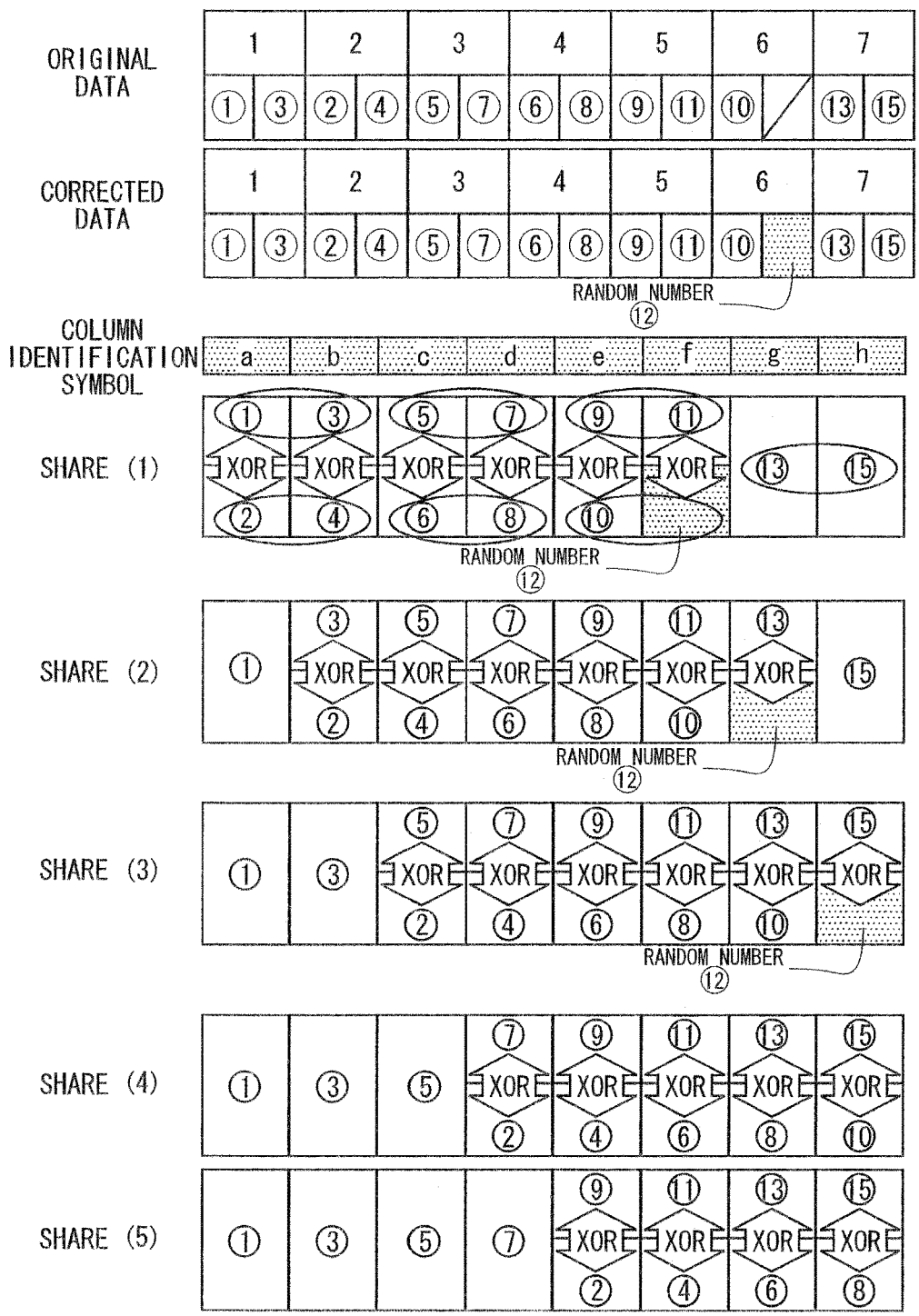
FIG. 31 is a diagram illustrating an example of a generating method of shared data in a threshold value of 2.

FIG. 31 is a diagram illustrating a generating method of shared data according to the present embodiment. This case has the number of shares which is one larger than that of the case in FIG. 30. In this case, one dummy block (column) is inserted, but as understood from this, it is sufficient if a part which should be set to random numbers has the size of half block (column) of the original data or the corrected data.

Figure 32:
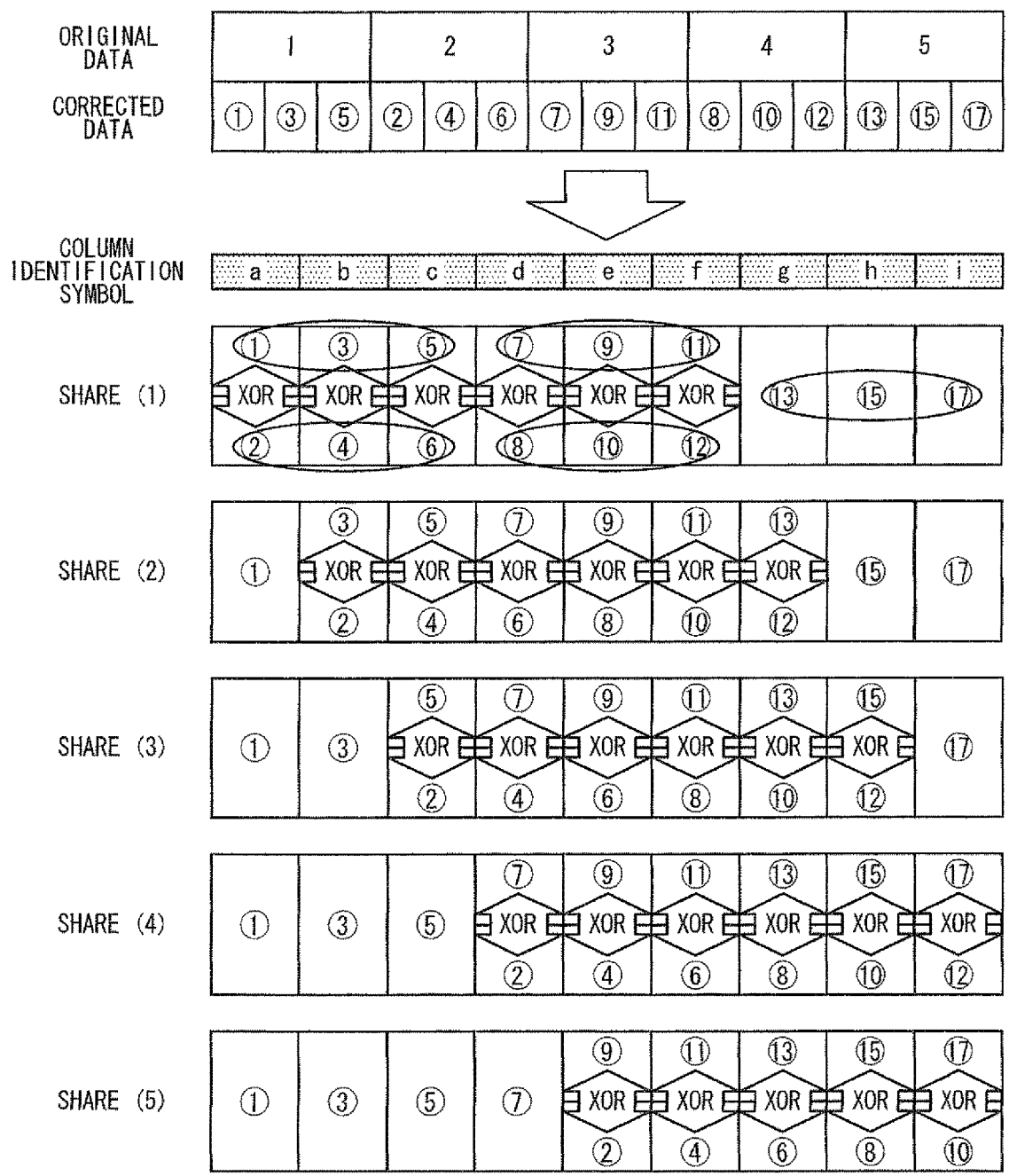
FIG. 32 is a diagram illustrating an example of a generating method of shared data in a threshold value of 2.

FIG. 32 is a diagram illustrating an example of a generating method of shared data according to the present embodiment. As understood from the comparison with FIG. 10, when the shared data is generated, column 1, column 2, column 3 and so on of the original data or the corrected data are arranged as one set of three columns, as shown in the figure.

More specifically, the respective columns (column 1, column 2, column 3, . . . ) of the original data or the corrected data are divided into three blocks, and for example, column 1 is divided into column (1), column (3) and column (5) as sub-divided data and column 2 is divided into column (2), column (4) and column (6) as sub-divided data. That is, the respective columns become new columns which include a plurality of pieces of sub-divided data of column (1), column (3), column (5), column (2), column (4), column (6), and so on, to generate the shared data using the method shown in FIG. 10.

This is different from the case in FIG. 10 in that the lower block is shifted by the size of ⅓ block (column), not by the size of one block (column) of the original data or the corrected data when each shared data is generated. In this way, it is possible to change the shift size to the size of 1/N block (N=2, 3, 4, . . . ). In this case, the size of one block (column) should be N bits or more.

If such an operation is performed, as understood from the comparison with the case in FIG. 10 or FIG. 30, it is possible to generate a large amount of shared data even though the dummy block (column) is not inserted. Such an operation can be applied to the cases of the other drawings.

As described above, in the fifth embodiment, since the original data is finely divided, a large amount of shared data is generated, thereby enhancing security.

Sixth Embodiment

A sixth embodiment of the invention shows another example using random numbers.

Figure 33:
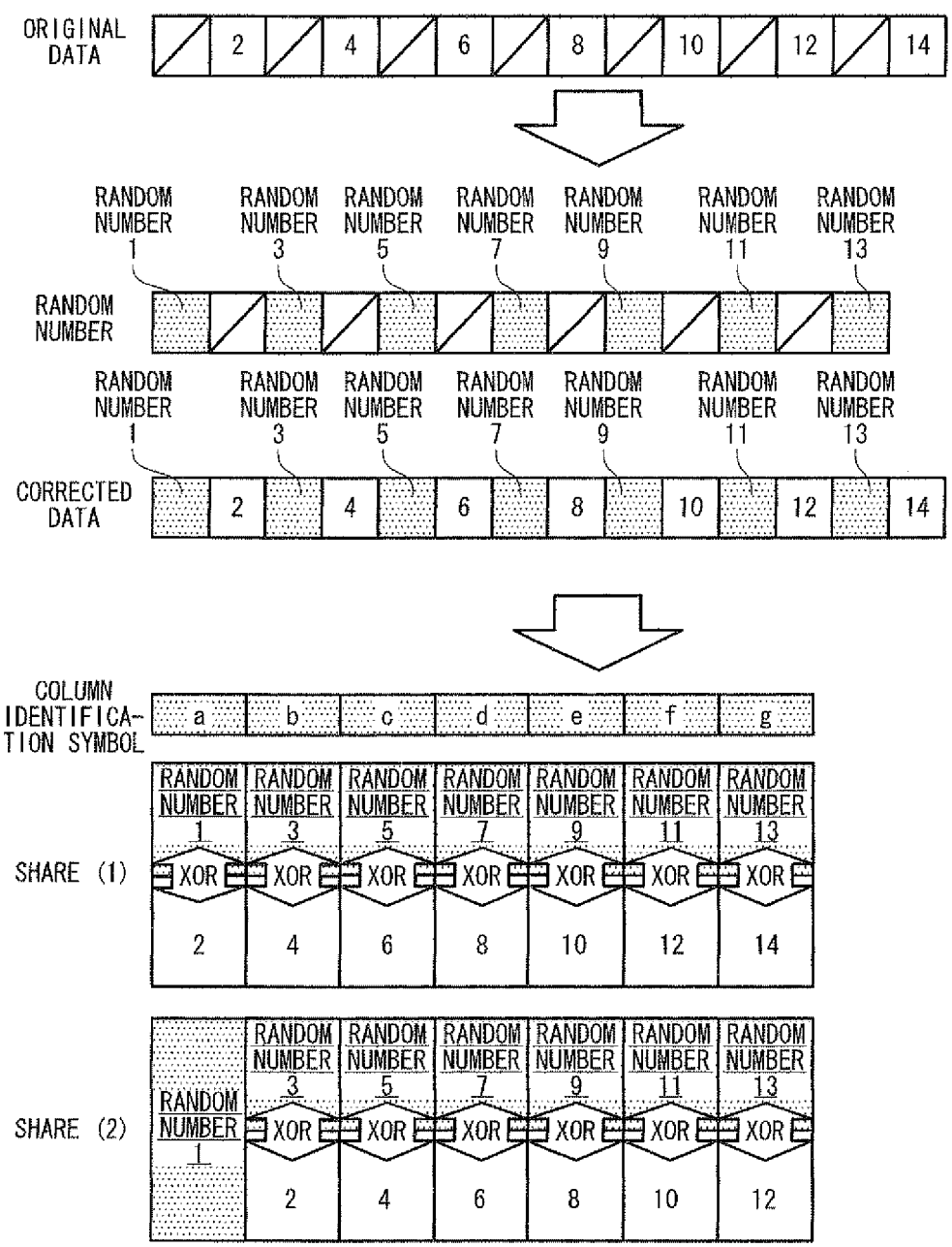
FIG. 33 is a diagram illustrating an example of a generating method of shared data in a threshold value of 2.

FIG. 33 is a diagram illustrating an example of a generating method of shared data according to the present embodiment. This example is a case where the entire upper layer in FIG. 10 is set to random numbers, that is, dummy blocks (columns). In this arrangement, as shown in the figure, the dummy blocks (columns) may be inserted between the respective columns of the original data.

If this operation is performed, while the data amount of each shared data is equivalent to the original data, each shared data is equivalent to data obtained by stream-encrypting the original data, and thus, it is difficult to estimate the original data from the shared data under the threshold value. Further, differently from a normal stream cipher, since a cryptographic device or a seed (initial value) is not necessary in restoration, it is possible to use true random numbers (genuine random numbers, physical random number, or natural random numbers) as random numbers. In a case where the true random numbers are used, this is equivalent to Vernam cipher or Vernam's one-time pad, which becomes very secure shared data. That is, the original data cannot be absolutely restored from the shared data under the threshold value.

Figure 34:
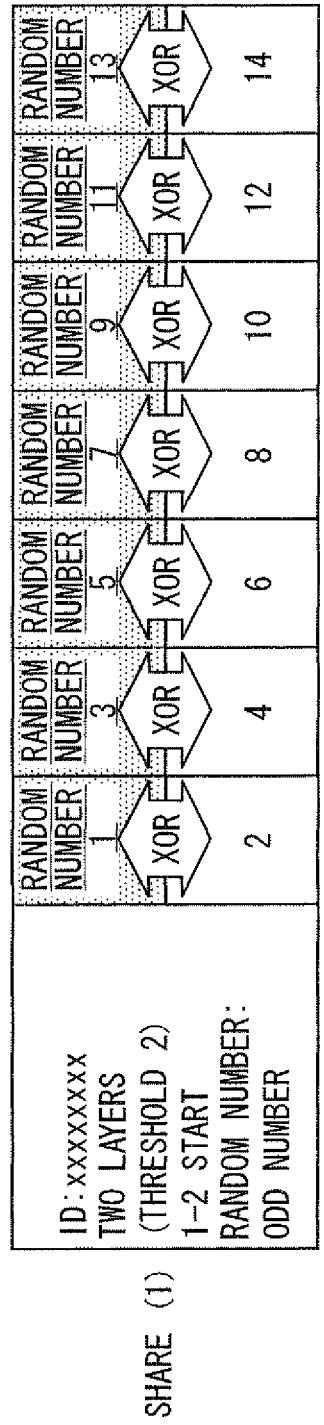
FIG. 34 is a diagram illustrating an example of the format of shared data.

FIG. 34 is a diagram illustrating an example of the format of shared data according to the present embodiment. Here, position information of the random numbers used in FIG. 33 is added to the share information. Thus, in a case where the original data is restored, since it is understood which blocks correspond to the random numbers, that is, the dummy blocks (columns), it is possible to correctly restore the original data. Here, the method of identifying the dummy blocks (columns) is not limited thereto, but for example, the numbers of the dummy blocks (columns) may be described.

Figure 35:
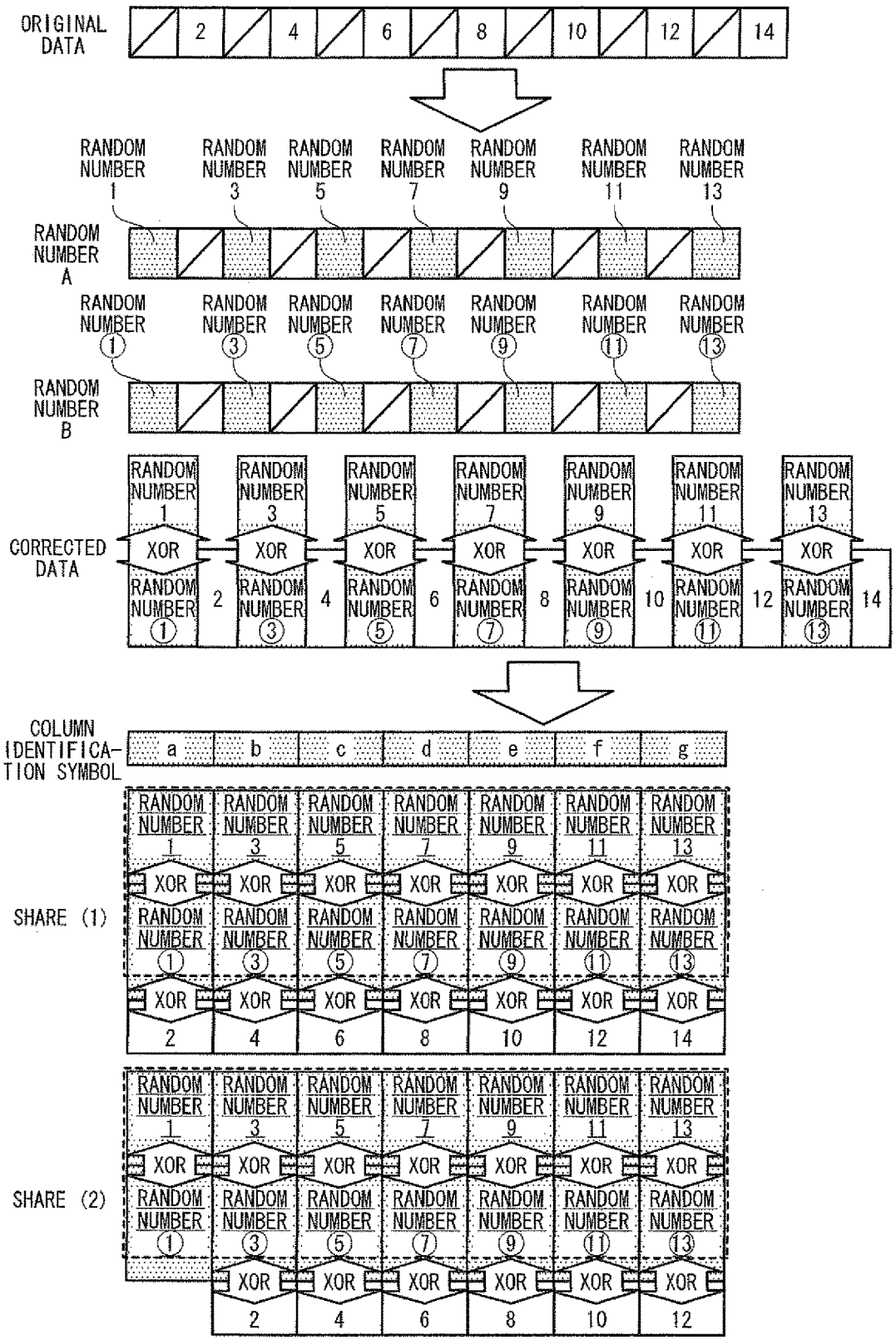
FIG. 35 is a diagram illustrating an example of a generating method of shared data in a threshold value of 2.

FIG. 35 is an example of a generating method of shared data according to the present embodiment. The random number (random number A) in FIG. 33 is XORed by a different random number (random number. B). The random number B may be generated by a random number generator which is the same as a random number generator of the random number A, but if the random number B is generated by a different random number generator, its security level is enhanced, which is preferable.

As described with reference to FIG. 33, while each shared data is equivalent to data obtained by stream-encrypting the original data, since the cryptographic device or the seed (initial value) is not necessary in restoration, it is possible to use very complex random numbers.

Although it is possible to perform encryption with double random numbers even in a normal stream cipher in this way, decoding should be similarly performed with double random numbers, which takes time. In the case of the method according to the present embodiment, even though encryption is performed with double, triple or more random numbers, since the restoration process is completed once, the processing time becomes short.

Figure 36:
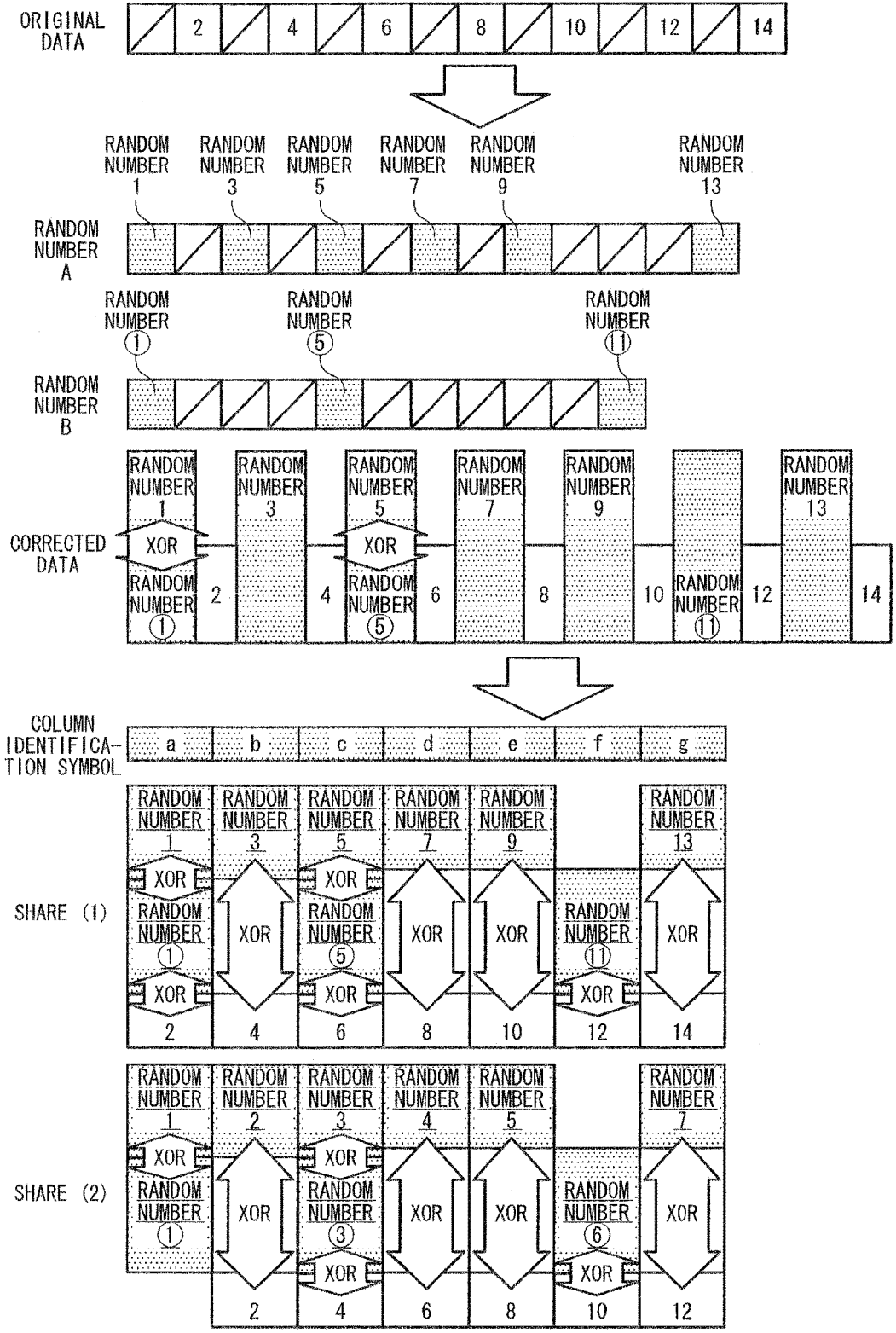
FIG. 36 is a diagram illustrating an example of a generating method of shared data in a threshold value of 2.

FIG. 36 is a diagram illustrating an example of a generating method of shared data according to the present embodiment. In this case, the random number (random number A) in FIG. 33 is XORed by a different random number (random number B). Compared with the case in FIG. 35, it can be understood that the random number B has more scattered values.

As described with reference to FIG. 33, while each shared data is equivalent to data obtained by stream-encrypting the original data, since the cryptographic device or the seed (initial value) is not necessary in restoration, it is possible to use random numbers with no reproducibility such as true random numbers. As described with reference to FIG. 33, all the random numbers may be set to true random numbers, but it is difficult to rapidly generate a large amount of true random numbers by a built-in device. Thus, as shown in FIG. 36, the random number A generated by the random number generator may be XORed by the random number B which has true random numbers which are generated in a scattered manner. If such an operation is performed, the random number sequence is prevented from being deciphered, which becomes secure in a similar way to FIG. 32.

Here, if a process of scattering a part of data generated by the random number generator with values of true random numbers which are obtained is performed such that a part of data in the random number column A is also scattered, the data becomes secure, which is preferable.

Figure 37:
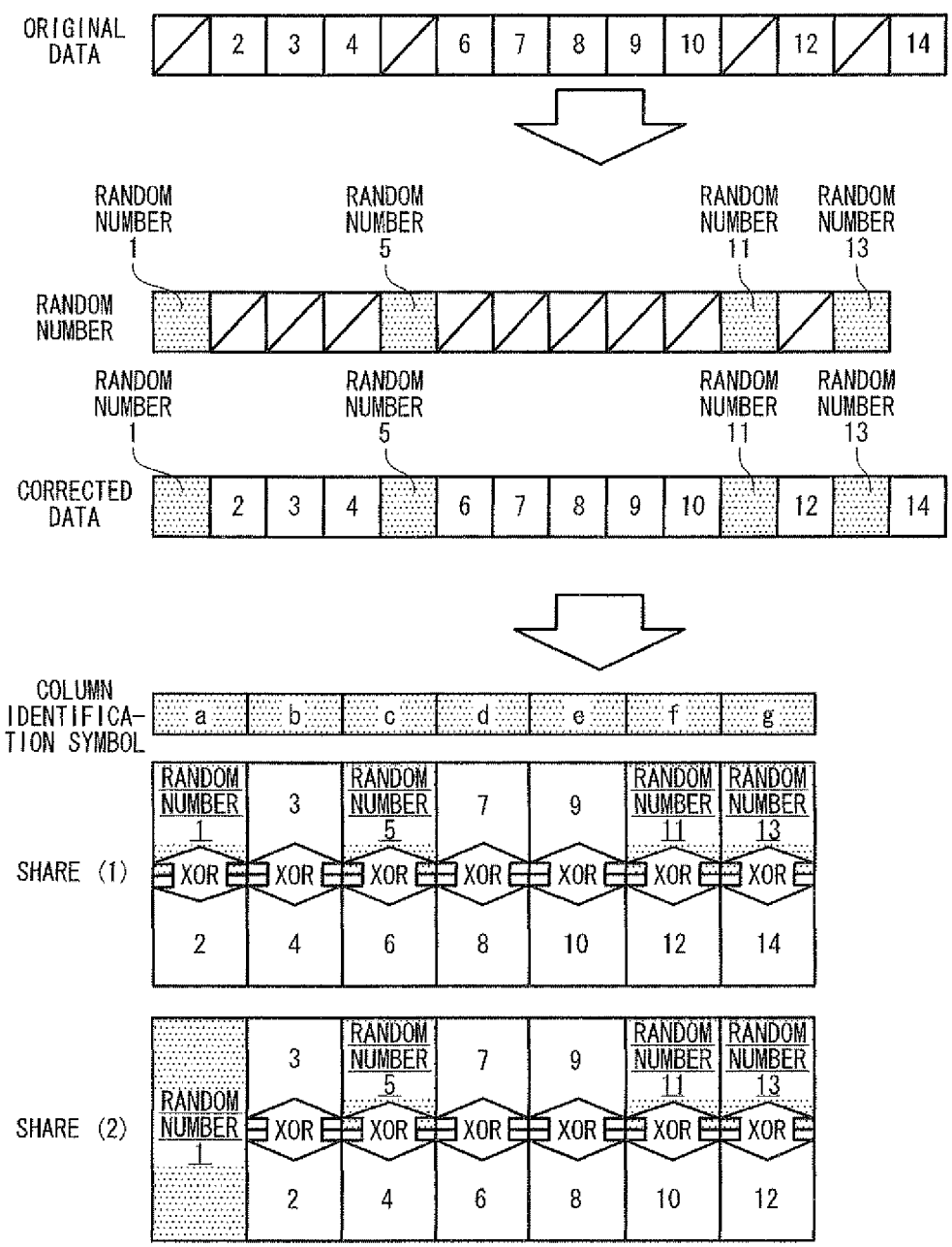
FIG. 37 is a diagram illustrating an example of a generating method of shared data in a threshold value of 2.

FIG. 37 is a diagram illustrating an example of a generating method of shared data according to the present embodiment. In this case, corrected data obtained by appropriately inserting random numbers, that is, dummy blocks (columns) into the original data is generated, and then, shared data is generated from the corrected data. If the positions of the random numbers to be inserted into the original data, that is, the dummy blocks (columns) are determined by the values of the true random numbers which are obtained, the data becomes secure in a similar way to FIG. 32. It is preferable that the inserted random numbers be true random numbers, but the security level is not lowered even if the random numbers are generated by the random number generator. An arrangement method of the random numbers, that is, the dummy blocks (columns) may reduce the data amount of the shared data, which is preferable.

Figure 38:
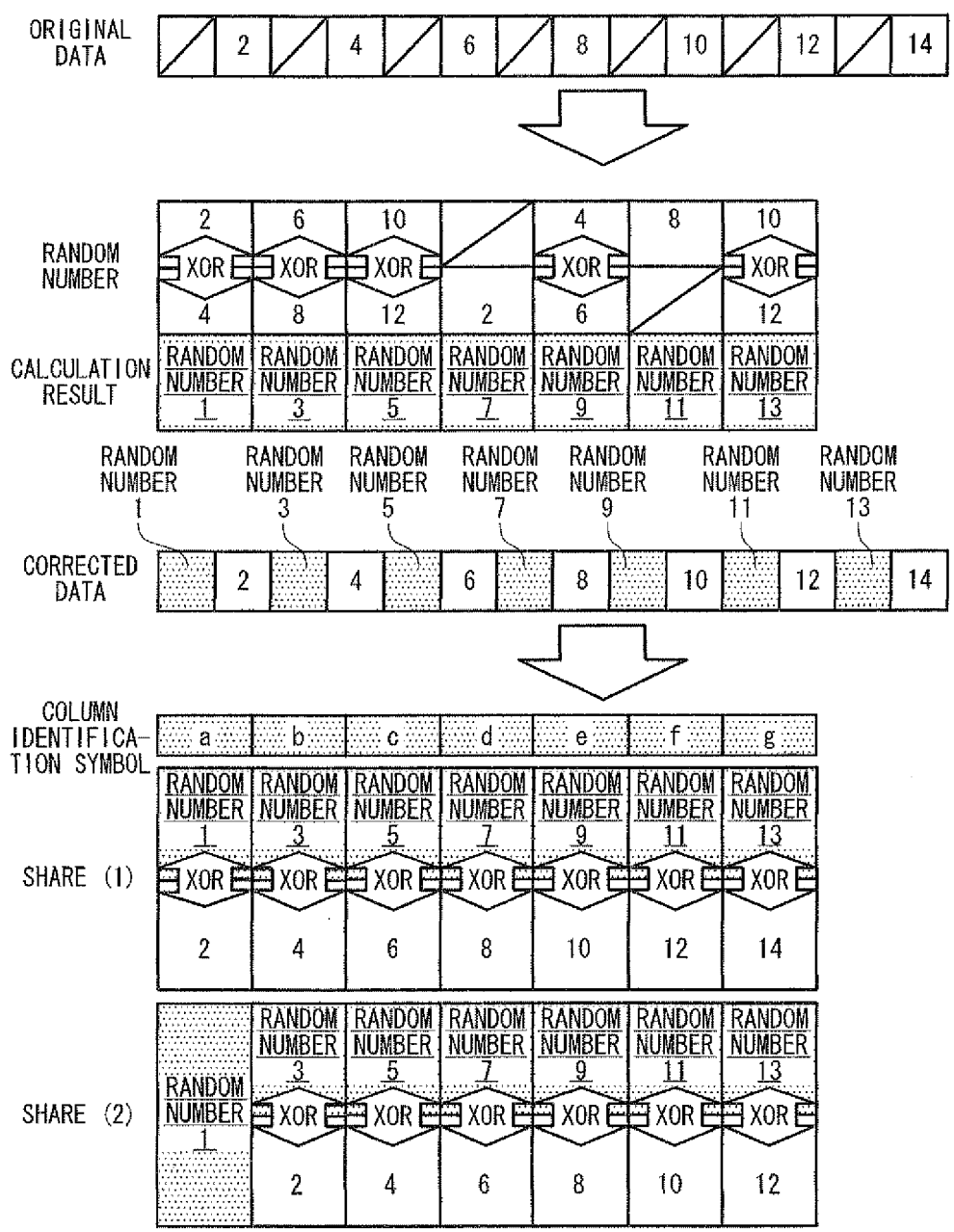
FIG. 38 is a diagram illustrating an example of a generating method of shared data in a threshold value of 2.

FIG. 38 is a diagram illustrating an example of a generating method of shared data according to the present embodiment. In this case, random numbers are generated from the original data. Here, the random numbers are generated, and for example, random number 1 is generated from column 2 and column 4, and random number 3 is generated from column 6 and column 8. However, the random numbers may be generated from arbitrary columns or arbitrary column combinations. This may be regularly performed, but for example, columns or column combinations where random numbers 1, 3, 5, . . . are generated may be determined by random numbers generated by the random number generator or true random numbers.

In this way, if the random number sequence is generated from the original data, it is difficult to decipher the random number sequence, and to estimate the original data from the shared data under the threshold value. Repeatedly speaking, this is achieved because of the characteristic that the cryptographic device or the seed (initial value) is not necessary in restoration. Here, the generated random numbers are used by the same method as in FIG. 33, but may be used by the way shown in FIG. 35, 36 or 37.

Figure 39:
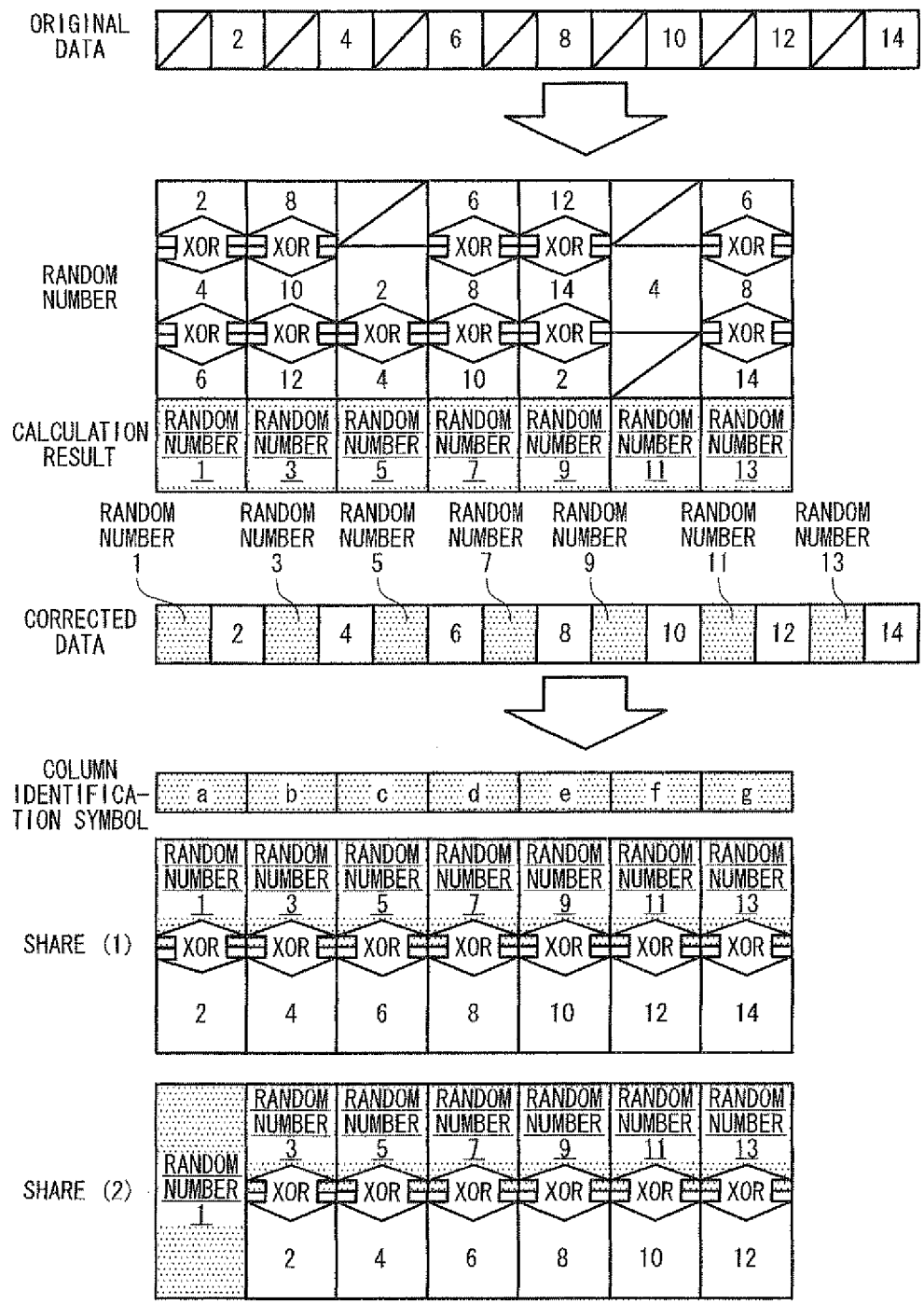
FIG. 39 is a diagram illustrating an example of a generating method of shared data in a threshold value of 2.

FIG. 39 is a diagram illustrating an example of a generating method of shared data according to the present embodiment. In this case, the set of data for generation of the random number is extended to three pieces of the original data, from one piece of the original data or two pieces of the original data in FIG. 38. In this way, the number of the original data for generation of one random number is not limited to any specific number. Although there is a limit, if a large amount of original data is used to generate one random number, it becomes complex, which is more secure. Here, the generated random number is used by the same method as in FIG. 33, but may be used by the way shown in FIG. 35, 36 or 37.

Figure 40:
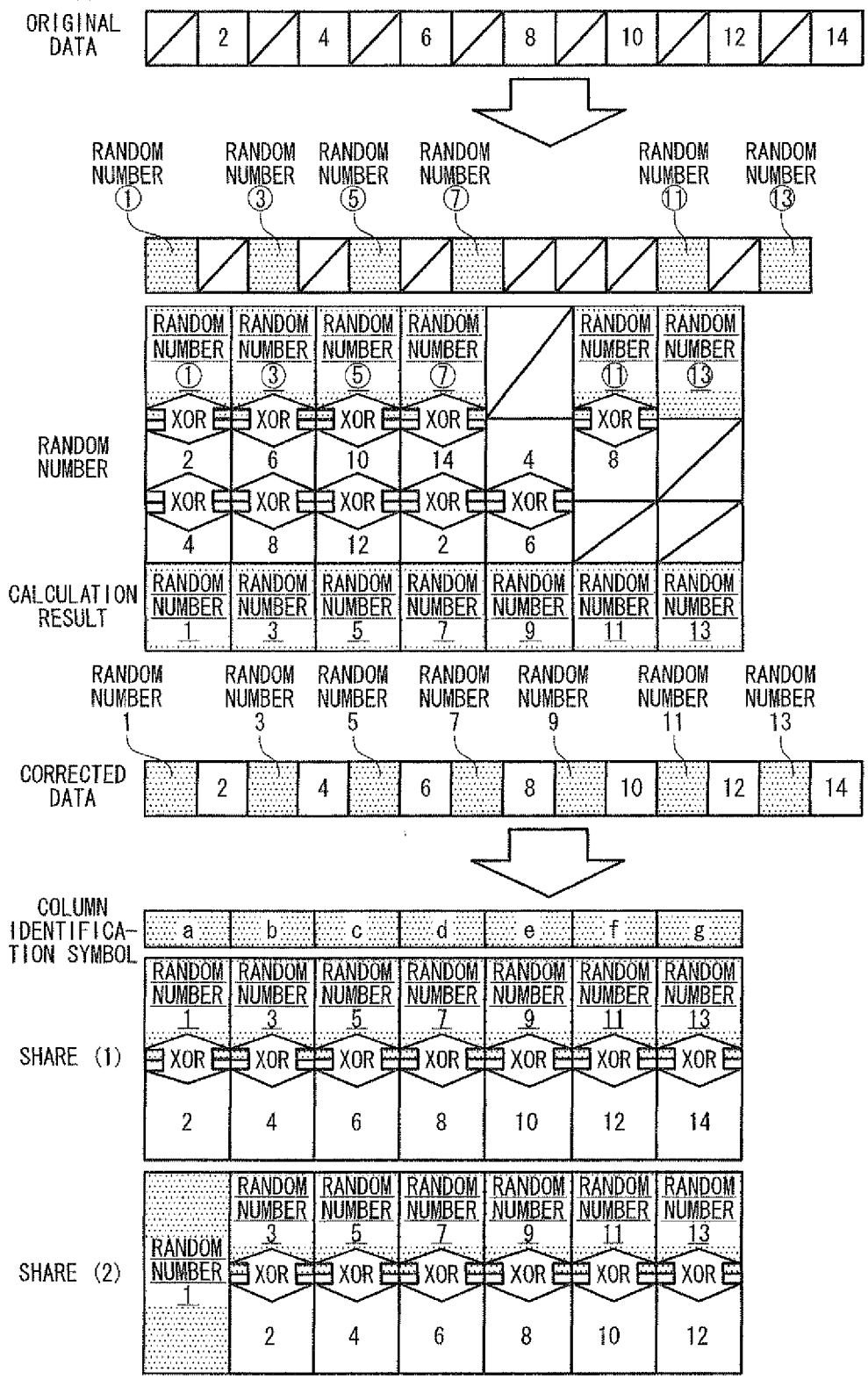
FIG. 40 is a diagram illustrating an example of a generating method of shared data in a threshold value of 2.

FIG. 40 is a diagram illustrating an example of a generating method of shared data according to the present embodiment. This is different from the cases in FIGS. 38 and 39 in that random number A which is generated by the random number generator or true random number A is also used, in addition to the original data, to generate random number B which is used in corrected data.

The position of random number A may be regularly determined in a similar way to the original data. However, for example, if the position is determined by the random number generated by the random number generator or the true random number, it becomes more secure, which is preferable. Further, the random number may also be doubly XORed in a similar way to the original data. Here, the generated random number is used by the same method as in FIG. 33, but may be used by the way shown in FIG. 35, 36 or 37.

Figure 41:
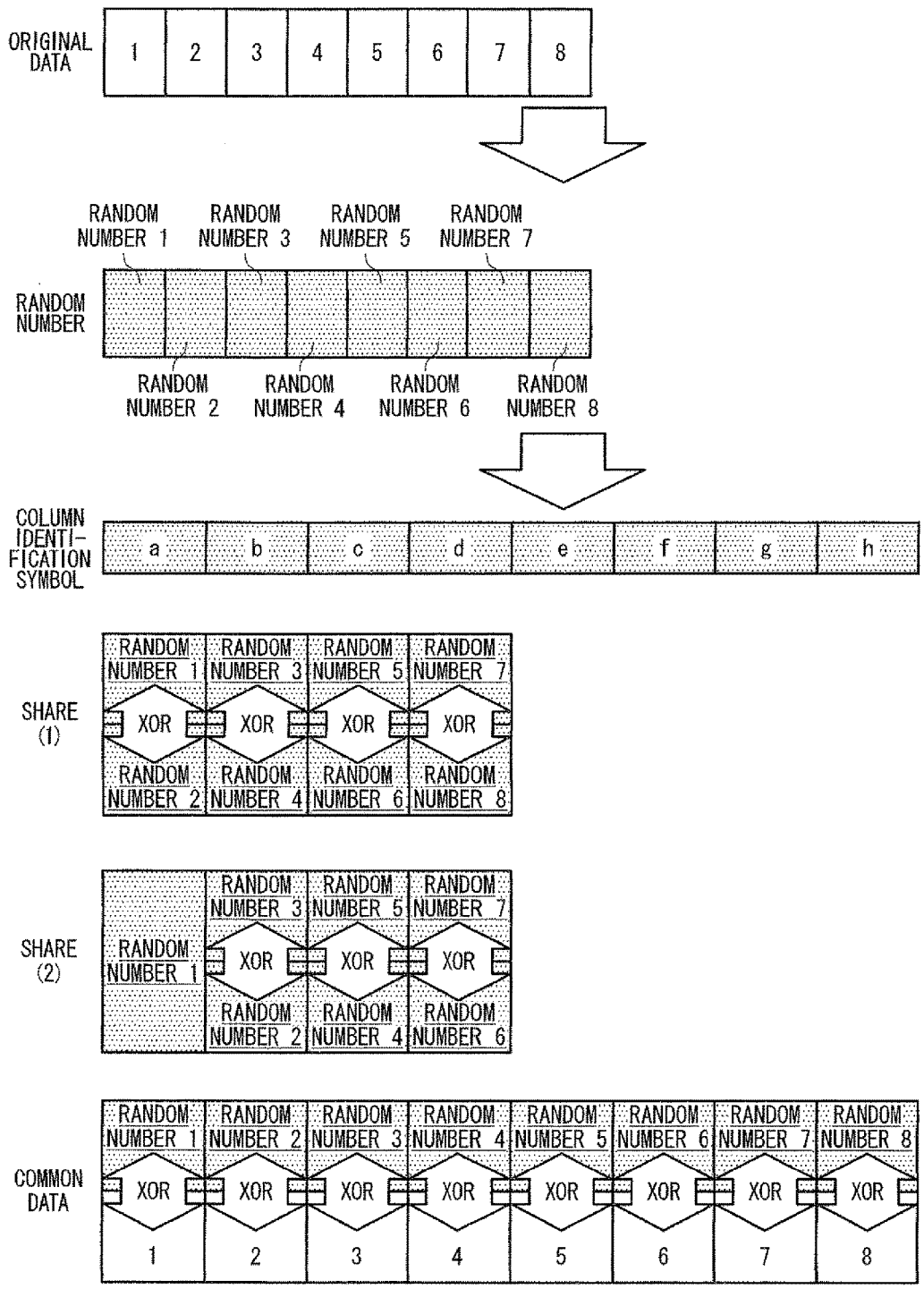
FIG. 41 is a diagram illustrating an example of a generating method of shared data in a threshold value of 2.

FIG. 41 is a diagram illustrating an example of a generating method of shared data according to the present embodiment. In this case, the shared data is generated by a method different from that of the case in FIG. 33. In FIG. 33, the data obtained by combining the random numbers, that is, the dummy blocks (columns) with the original data to be XORed is used as the shared data, but here, only random numbers, that is, dummy blocks (columns) are used as the shared data. Further, the data XORed by the random numbers, that is, the dummy blocks (columns) is used as common data, and is distributed to each holder of the shared data. This shared data is equivalent to share (1) in FIG. 33.

Firstly, the random number sequence (random number 1, 2, 3, . . . ) is calculated in restoration of the original data. If the shared data of a threshold value or more is collected, the random number sequence can be ascertained by the method as described hereinbefore. Next, if the XOR operation is performed by the common data and the random number sequence, it is possible to restore the original data. Further, a generating method of the shared data using the random number sequence may employ the method shown in FIG. 41, or may employ the generating method of the shared data shown in the other drawings.

Figure 42:
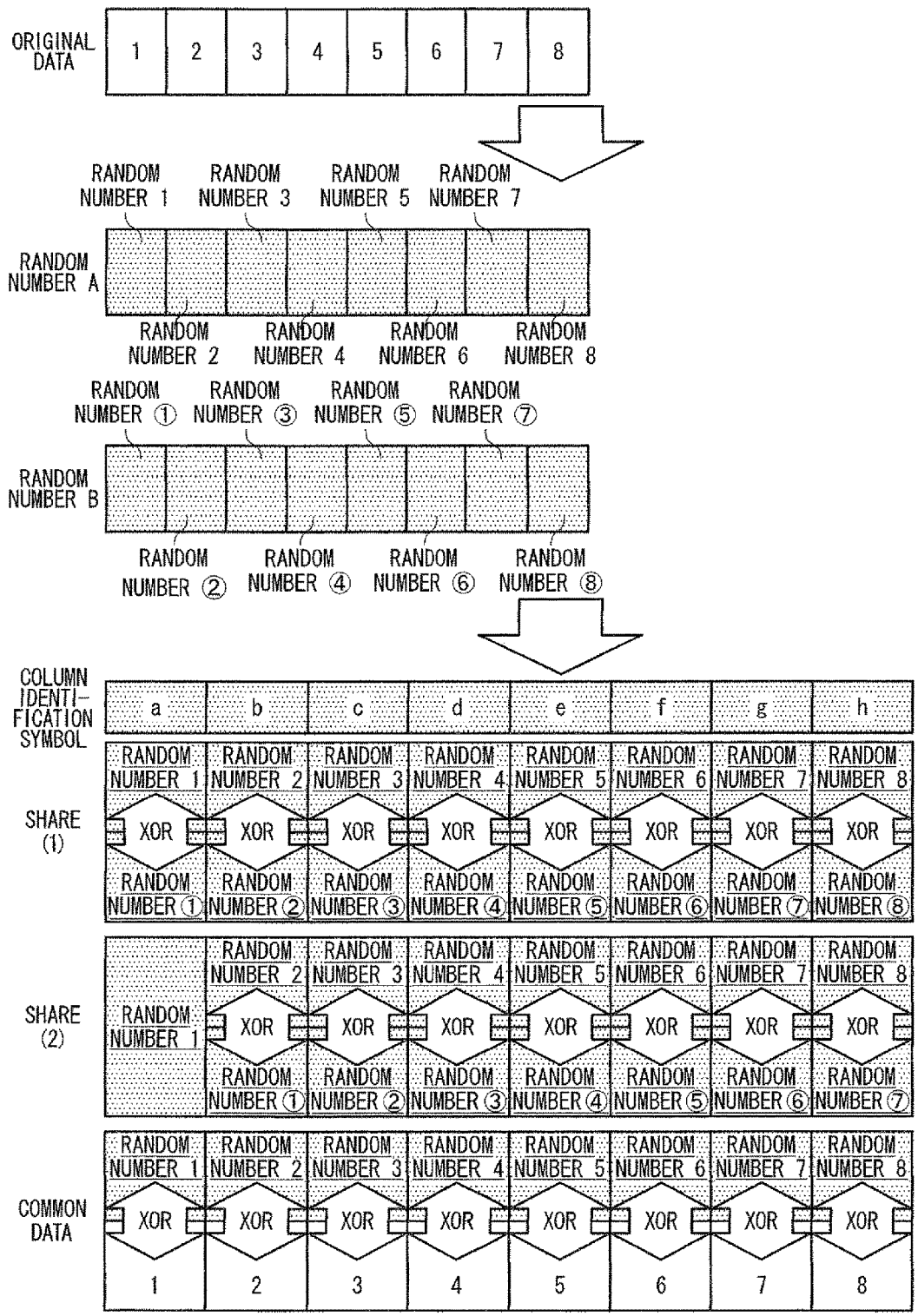
FIG. 42 is a diagram illustrating an example of a generating method of shared data in a threshold value of 2.

FIG. 42 is a diagram illustrating an example of a generating method of shared data according to the present embodiment. Here, differently from the case in FIG. 41, random number A and random number B are used to generate the shared data through the random number sequence. Random number A and random number B may be generated from the same random number generator or different random number generators. Further, one, part or all of them may be the true random number.

Further, it is possible to use the series of methods described with reference to FIG. 33 and thereafter. For example, it is possible to delete some random numbers, or to make some random numbers be set to data obtained by XORing double and triple random numbers. Further, as in FIGS. 38 and 39, if the original data is associated with at least a part of the random numbers, the random numbers are close to the true random numbers, which is preferable in security.

Figure 43:
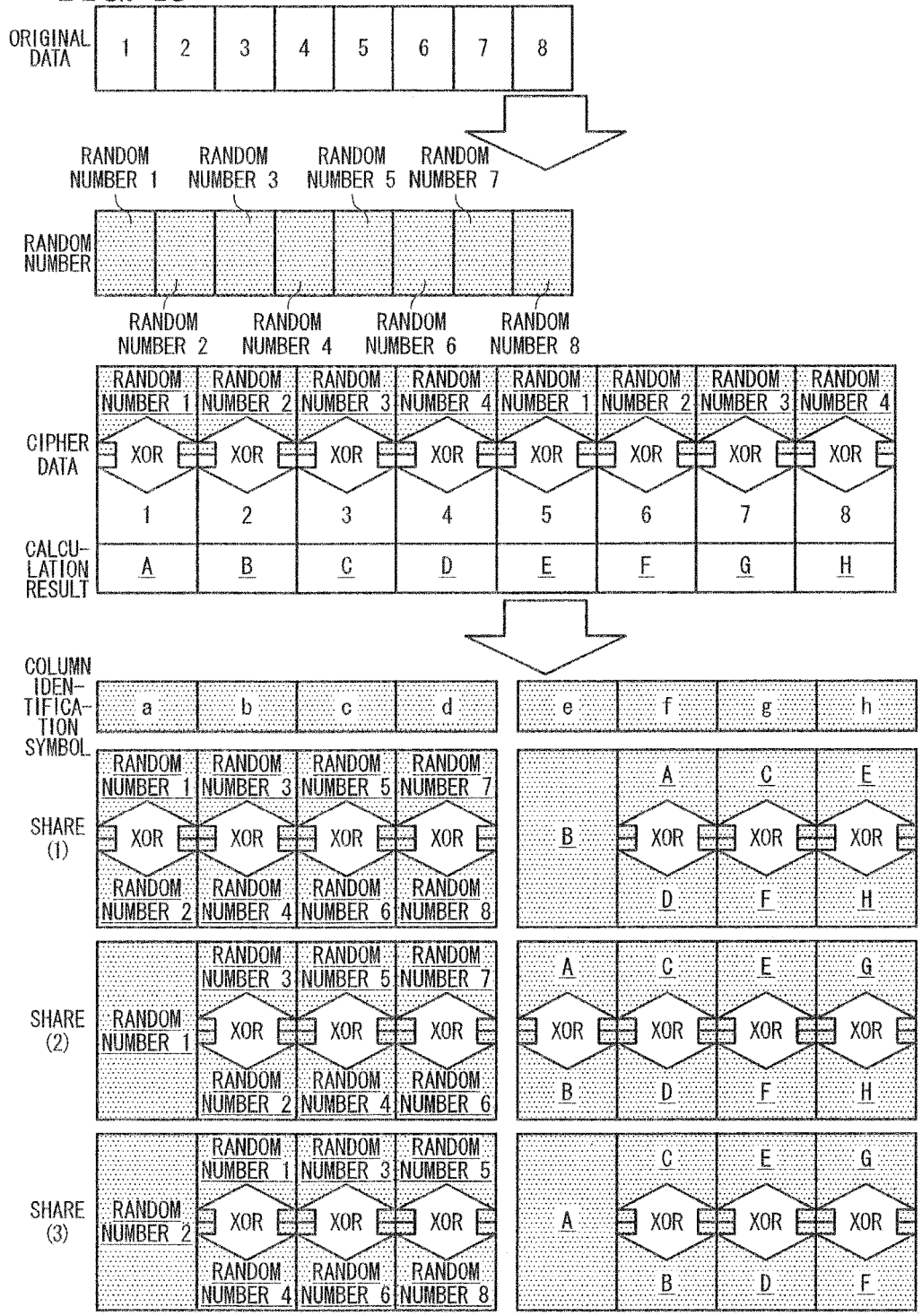
FIG. 43 is a diagram illustrating an example of a generating method of shared data in a threshold value of 2.

FIG. 43 is a diagram illustrating an example of a generating method of shared data according to the present embodiment. Here, differently from the case in FIG. 41, the common data in FIG. 41 is subject to the sharing process, and is distributed to each holder of the shared data. Then, it is more difficult to estimate the original data from the shared data under the threshold value.

In this configuration, attention is necessary in regard to the combination of shared data to be distributed. For example, the shared data should not be distributed in a combination such as [share (2) *a*] and [share (3) *e*], or [share (3) a] and [share (1) e]. If [share (2) a] and [share (3) e] are XORed, column 1 can be restored, and similarly, if [share (3) a] and [share (1) e] are XORed, column 2 can be restored. Further, with respect to the generating method of the random numbers, it is possible to use the series of methods described with reference to FIG. 33.

Figure 44:
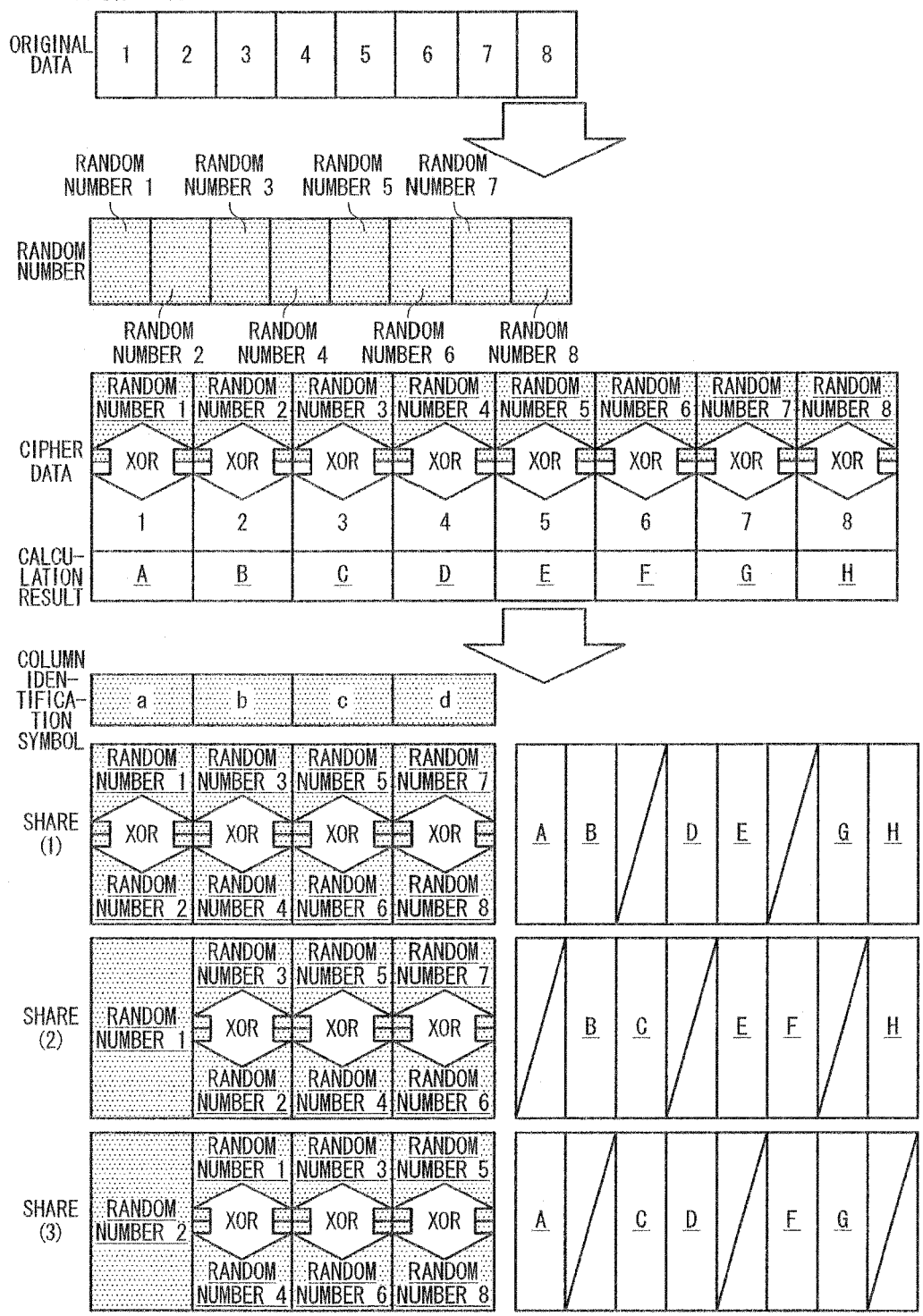
FIG. 44 is a diagram illustrating an example of a generating method of shared data in a threshold value of 2.

FIG. 44 is a diagram illustrating an example of a generating method of shared data according to the present embodiment. Here, differently from the case in FIG. 41, the entire common data in FIG. 41 is not communalized, but is shared and communalized. That is, if the shared data of the threshold value or more is collected, it is possible to generate the common data. For example, if share (1) and share (2) are collected, all of A, B, C, D, E, F, G and H are obtained, the original data can be restored. Then, since all information about the original data is not completely obtained in the shared data under the threshold value, it is difficult to completely estimate the original data from the shared data, under the threshold value.

In this configuration, attention is necessary in regard to the combination of shared data to be distributed. For example, the shared data should not be distributed in a combination such as [share (2) a] and A, or [share (3) a] and B. If [share (2) a] and A are XORed, column 1 can be restored, and similarly, if [share (3) a] and B are XORed, column 2 can be restored.

With respect to the generating method of the random numbers, it is possible to use the series of methods described with reference to FIG. 33. Further, the sharing method of the common data in FIG. 41 is not limited to the method in FIG. 44, and a variety of methods may be employed.

Seventh Embodiment

A seventh embodiment of the invention shows the case of three-layered folding.

Figure 45:
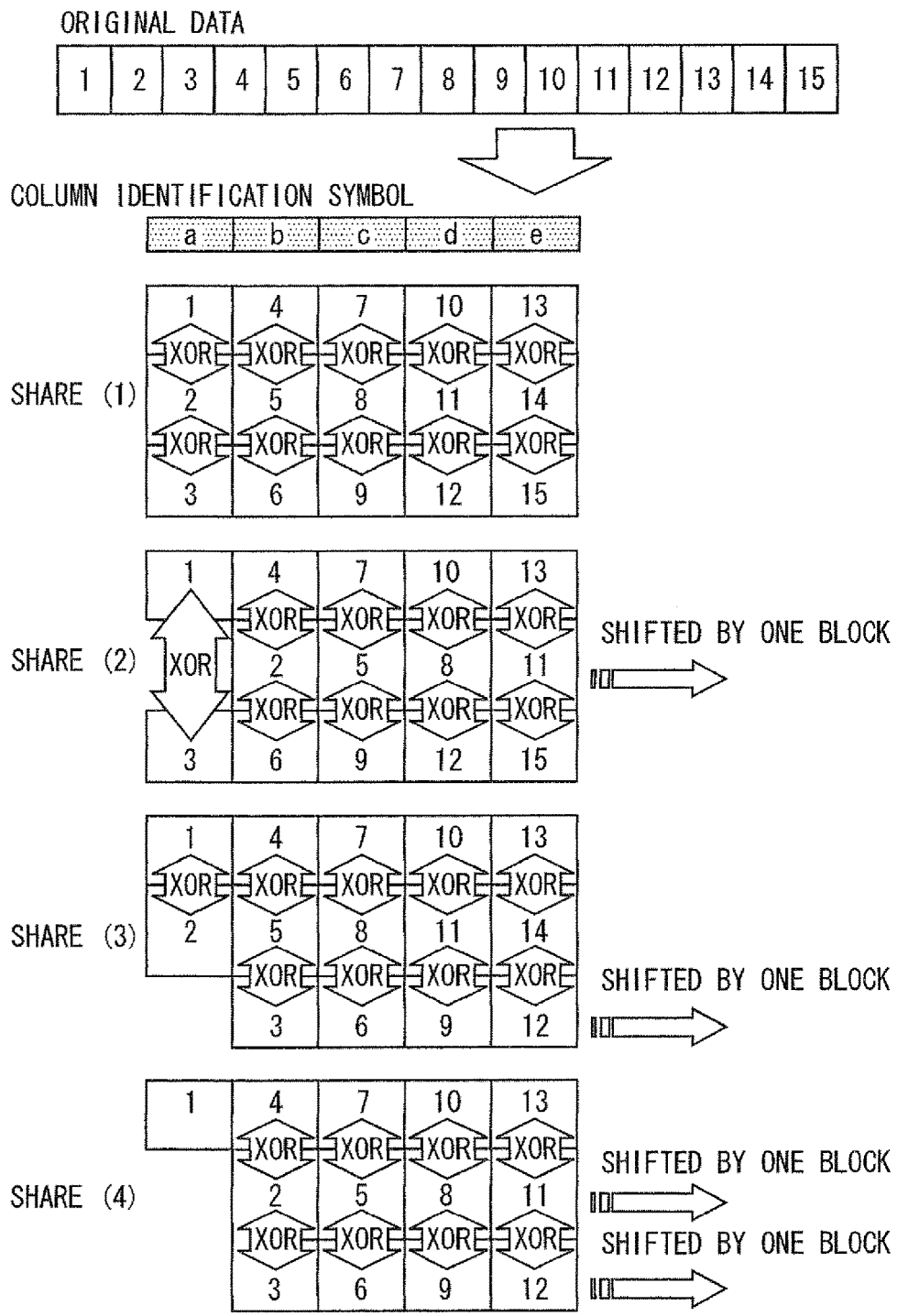
FIG. 45 is a diagram illustrating an example of a generating method of shared data in a threshold value of 3.

FIG. 45 is a diagram illustrating an example of a method of shared data according to the present embodiment. In the above drawings, the operation of folding the original data into two layers (rows) has been performed to generate the shared data, but here, an operation of folding the original data into three layers (rows) is performed.

Firstly, a generating method of share (1) will be described. [Share (1) a] is a value obtained by XORing column 1, column 2 and column 3. Similarly, [share (1) b] is a value obtained by XORing column 4, column 5 and column 6. As shown in the figure, [share (1) c] and so on are calculated by the same process. In this way, share (1) is obtained by folding the original data into three layers (rows). Accordingly, the number of blocks (columns) in share (1) is ⅓ of the number of blocks (columns) in the original data.

Next, a generating method of share (2) will be described. [Share (2) a] all is a value obtained by XORing column 1 and column 3. On the other hand, [share (2) b] is a value obtained by XORing column 4, column 2 and column 6. As shown in the figure, [share (2) c] and so on are calculated by the same process as in [share (2) b]. In this way, share (2) is obtained by folding the original data into three layers (rows). Accordingly, the number of blocks (columns) in share (2) is ⅓ of the number of blocks (columns) in the original data.

Here, as understood from the figure, share (2) is a value obtained by shifting the blocks shown in the mid layer of share (1), that is, columns 2, 5, 8 and so on of the original data to the right by one block and by XORing them. Accordingly, column 14 of the original data is not used for calculation in share (2).

Next, a generating method of share (3) will be described. [Share (3) a] is a value obtained by XORing column 1 and column 2. On the other hand, [share (3) b] is a value obtained by XORing column 4, column 5 and column 3. As shown in the figure, [share (3) c] and so on are calculated by the same process as in [share (3) b]. In this way, share (3) is obtained by folding the original data into three layers (rows). Accordingly, the number of blocks (columns) in share (3) is ⅓ of the number of blocks (columns) in the original data.

Here, as understood from the figure, share (3) is a value obtained by shifting the blocks shown in the lower layer of share (i), that is, columns 3, 6, 9 and so on of the original data to the right by one block and by XORing them. Accordingly, column 15 of the original data is not used for calculation in share (C).

Next, a generating method of share (4) will be described. [Share (4) a] is column 1 itself of the original data. On the other hand, [share (4) b] is a value obtained by XORing column 4, column 2 and column 3. As shown in the figure, [share (4) c] and so on are calculated by the same process as in [share (4) b]. In this way, share (4) is obtained by folding the original data into three layers (rows). Accordingly, the number of blocks (columns) in share (4) is ⅓ of the number of blocks (columns) in the original data.

Here, as understood from the figure, share (4) is a value obtained by shifting the blocks shown in the mid and lower layers of share (1), that is, columns 2, 5, 8 and so on and columns 3, 6, 9 and so on of the original data to the right by one block and by XORing them. Accordingly, column 14 and column 15 of the original data are not used for calculation in share (4).

In this way, if the operation of folding the original data into three layers (rows) is performed, it is possible to delete information in the original data. Thus, it is possible to prevent the original data from being restored from one piece of shared data. That is, it is possible to perform secret sharing.

Further, since the shared data becomes complex in a case where the original data is folded into three layers (rows) compared with a case where the original data is folded into two layers (rows), the security level is enhanced, and the data amount of each shared data becomes ⅓.

Here, the original data is divided into 15 blocks (columns), but actually, if the number is three or more, the number of blocks (columns) is not limitative. Further, the data size of the block (column) may be set to an arbitrary size in the unit of one bit.

When all the columns are set to three-layer (row) folding, it is necessary to set the number of blocks (columns) to multiples of 3, but the original data should not be necessarily divided into multiples of 3. In a similar way to the case of two layers (rows), a position which is not folded into three layers (rows) may be set to an empty block (column) where there is no data or a dummy block (column) of a random number. This is similarly applied to the case of N layers (rows) (N=2, 3, 4, . . . ).

Figure 46:
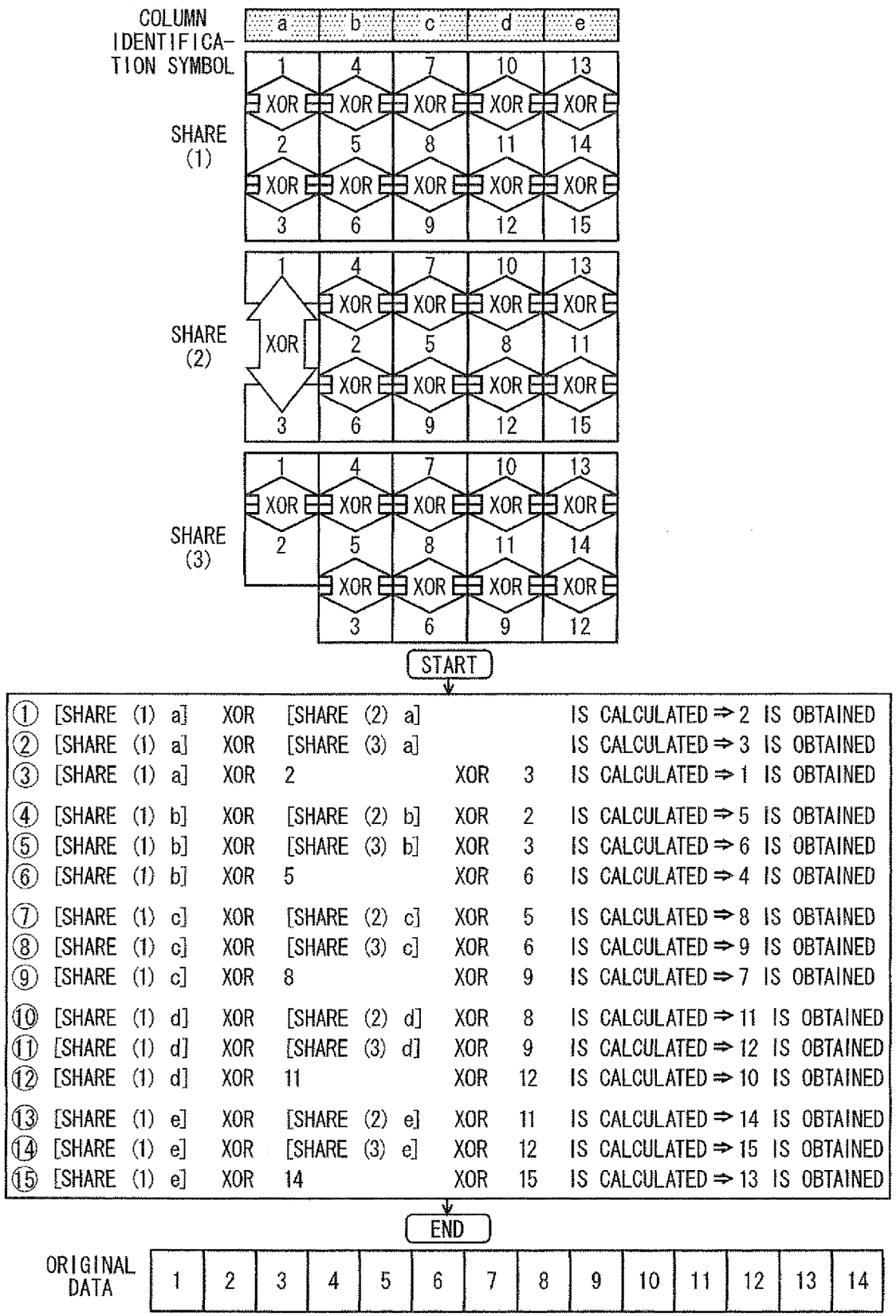
FIG. 46 is a diagram illustrating an example of a restoring method of shared data in a threshold value of 3.

FIG. 46 is a diagram illustrating an example of a restoring method of the original data according to the present embodiment. Here, an example is shown in which restoration is performed using share (1), share (2) and share (3) among four pieces of the shared data in FIG. 45. That is, a method of restoring the original data shown on the upper side in the figure from three pieces of shared data of share (1), share (2) and share (3) shown on the upper side in the figure will be described with reference to a flowchart.

(1) [Share (1) a] XOR [share (2) a] is calculated, and column 2 is obtained from its result. (2) [Share (1) a] XOR

[share (3) *a*] is calculated, and column 3 is obtained from its result. (3) [Share (1) *a*] XOR column 2 XOR column 3 is calculated, and column 1 is obtained from its result. (4) [Share (1) *b*] XOR [share (2) *b*] XOR column 2 is calculated, and column 5 is obtained from its result. (5) [Share (1) *b*] XOR [share (3) *b*] XOR column 3 is calculated, and column 6 is obtained from its result. (6) [Share (1) *b*] XOR column 5 XOR column 6 is calculated, and column 4 is obtained from its result. (7) [Share (1) *c*] XOR [share (2) *c*] XOR column 5 is calculated, and column 8 is obtained from its result. (8) [Share (1) *c*] XOR [share (3) *c*] XOR column 6 is calculated, and column 9 is obtained from its result. (9) [Share (1) *c*] XOR column 8 XOR column 9 is calculated, and column 7 is obtained from its result. (10) [Share (1) *d*] XOR [share (2) *d*] XOR column 8 is calculated, and column 11 is obtained from its result. (11) [Share (1) *d*] XOR [share (3) *d*] XOR column 9 is calculated, and column 12 is obtained from its result. (12) [Share (1) *d*] XOR column 11 XOR column 12 is calculated, and column 10 is obtained from its result. (13) [Share (1) *e*] XOR [share (2) *e*] XOR column 11 is calculated, and column 14 is obtained from its result. (14) [Share (1) *e*] XOR [share (3) *e*] XOR column 12 is calculated, and column 15 is obtained from its result. (15) [Share (1) *e*] XOR column 14 XOR column 15 is calculated, and column 13 is obtained from its result.

Thus, it is possible to restore column 1, column 2, column 3, . . . , column 15 of the original data. As understood from this description, this secret sharing corresponds to a secret sharing of a threshold value of 3. In this way, if the shared data is generated with two layers (rows), the threshold value becomes 2, if the shared data is generated with three layers (rows), the threshold value becomes 3. Further, as shown in FIG. 45, it is possible to set the number of shares to the threshold value or more.

Figure 47:
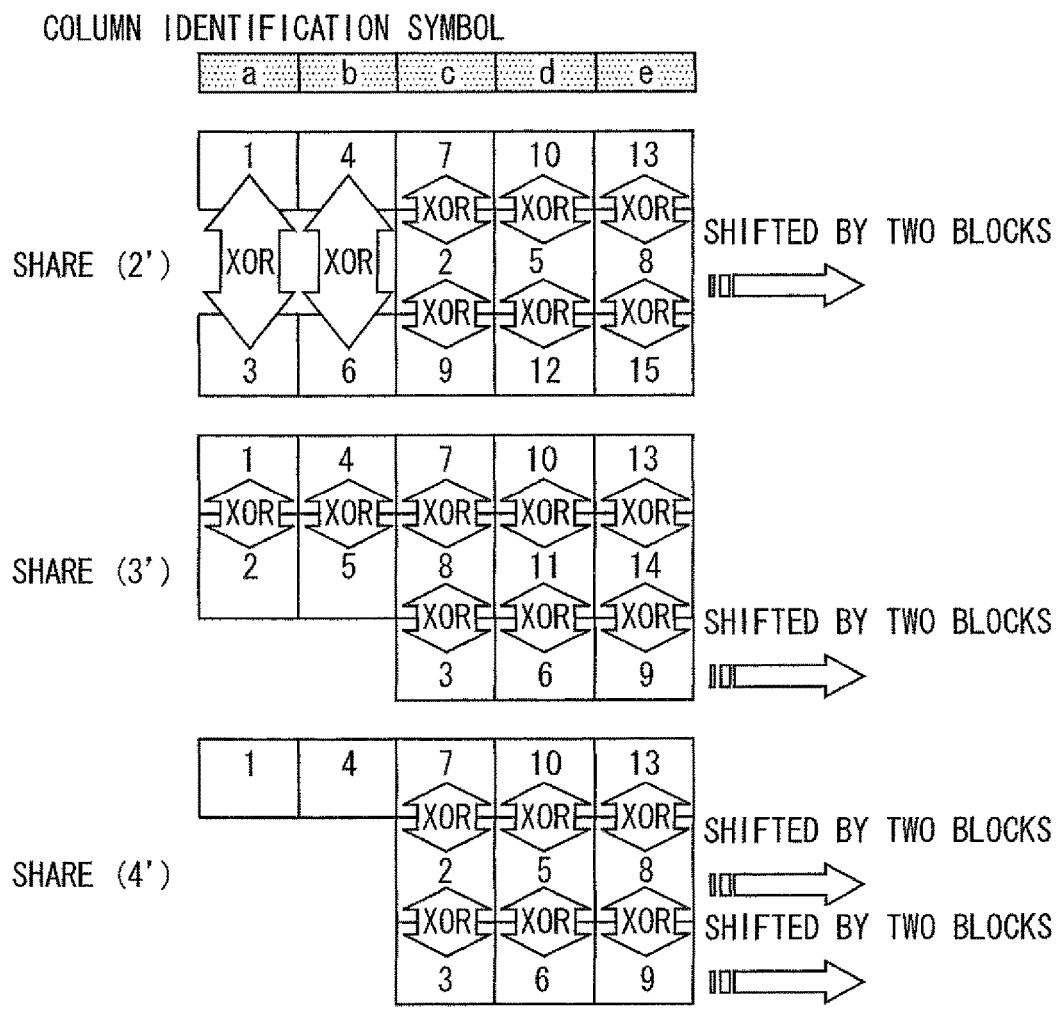
FIG. 47 is a diagram illustrating an example of a generating method of shared data in a threshold value of 3.

FIG. 47 is a diagram illustrating an example of a generating method of shared data according to the present embodiment. Here, the shared data with three layers (rows) is generated by a method different from that of the case in FIG. 45.

Share (2') is obtained by shifting the mid layer of share (2) in FIG. 45 by one block to the right. That is, share (2') is obtained by shifting the mid layer of share (1) in FIG. 45 by two blocks to the right. Similarly, share (3') is obtained by shifting the lower layer of share (3) in FIG. 45 by one block to the right. That is, share (3') is obtained by shifting the lower layer of share (1) in FIG. 45 by two blocks to the right. Similarly, share (4') is obtained by respectively shifting the mid and lower layers of share (4) in FIG. 45 by one block to the right. That is, share (4') is obtained by respectively shifting the mid and lower layers of share (1) in FIG. 45 by two blocks to the right. In this way, in a similar way to the generation of the shared data with two layers (rows), it is possible to use shares obtained by shifting the respective layers by N (N=1, 2, 3, . . . ) blocks as the shared data. The combination of shares obtained by shifting the respective layers by one block or two blocks may be used.

Figure 48:
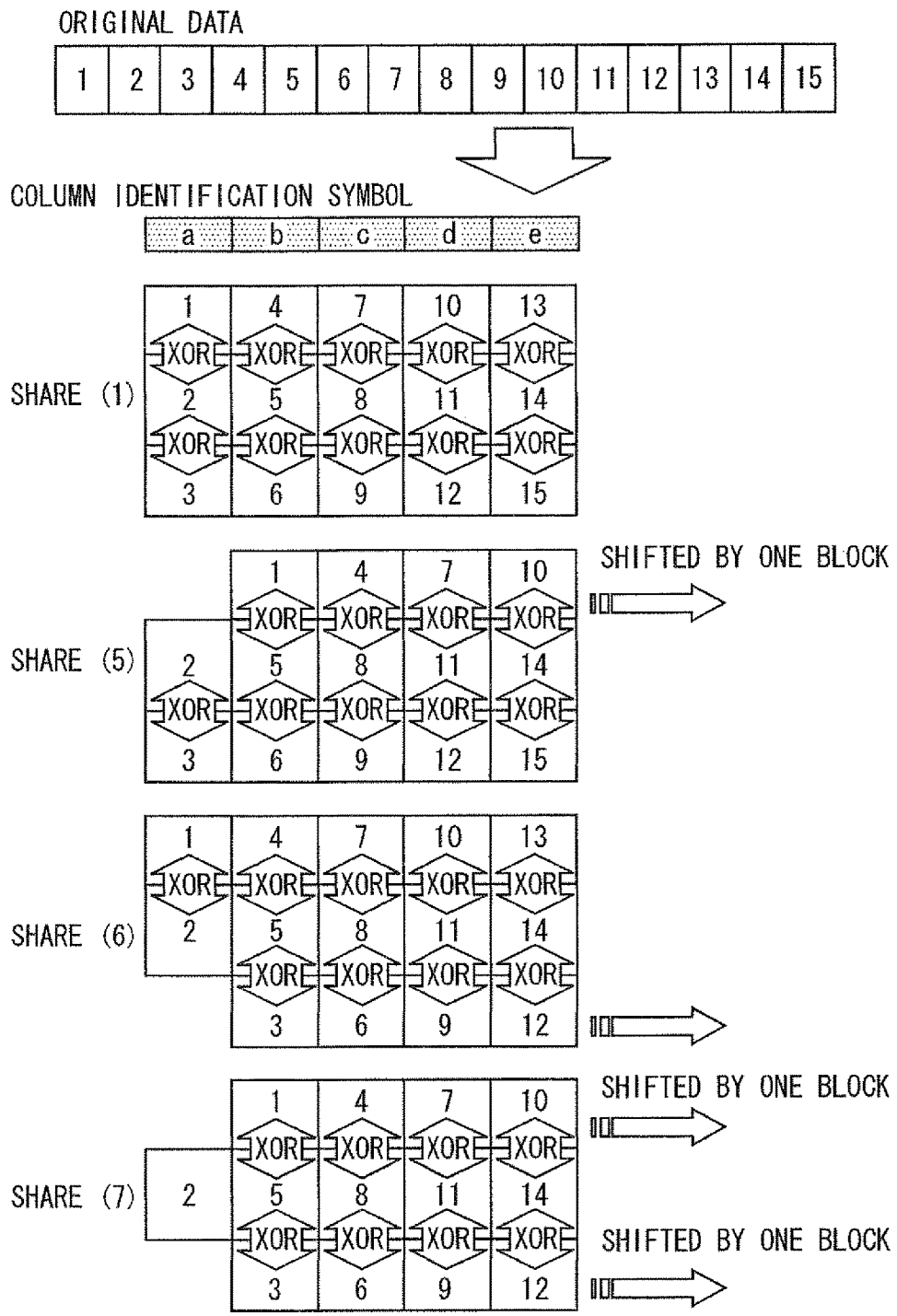
FIG. 48 is a diagram illustrating an example of a generating method of shared data in a threshold value of 3.

FIG. 48 is a diagram illustrating an example of a generating method of shared data according to the present embodiment. Here, the shared data with three layers (rows) is generated by a method different from that of the case in FIG. 45.

Share (5) is obtained by shifting the upper layer of share (1) by one block to the right. Share (6) is obtained by shifting the lower layer of share (1) by one block to the right. Share (7) is obtained by respectively shifting the upper and lower layers of share (1) by one block to the right.

In this way, it is possible to freely set the number of shares. Accordingly, if n is the number of shares and m is a threshold value, the secret sharing scheme according to the present embodiment becomes an (m, n)-threshold secret sharing scheme. The shared data shown in FIGS. 45, 47 and 48 is only part of the shared data of the threshold value of 3. The generating method of the shared data with two layers (rows) may be also applied to the generating method of the shared data with three layers (rows), it is possible to generate a variety of shared data. For example, here, the blocks (columns) are shifted to the right, but as described in the generating method of the shared data with two layers (rows), the blocks may be shifted to the left.

Figure 49:
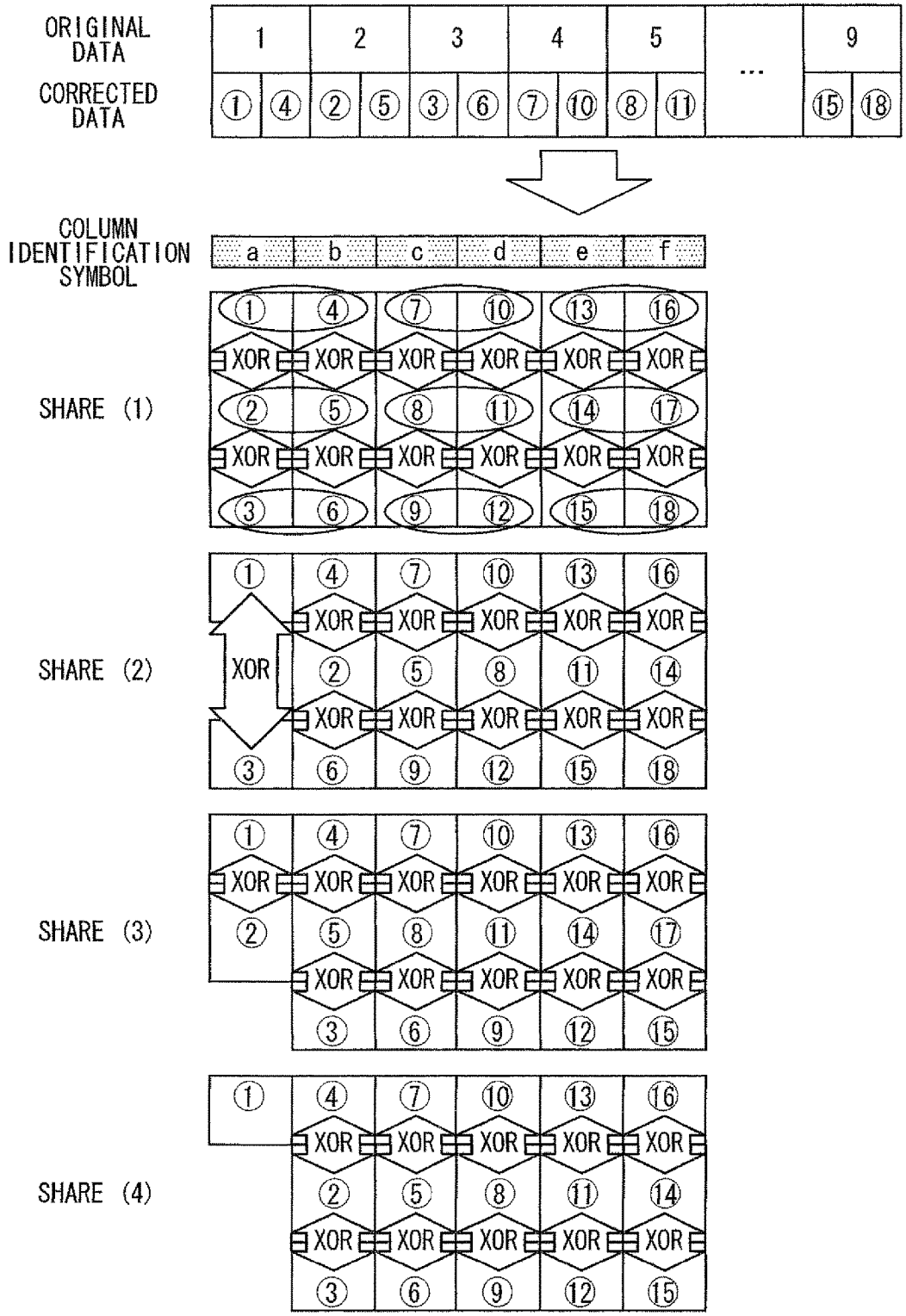
FIG. 49 is a diagram illustrating an example of a generating method of shared data in a threshold value of 3.

FIG. 49 is a diagram illustrating an example of a generating method of shared data according to the present embodiment. As understood from the comparison with the case in FIG. 45, when the shared data is generated, column 1, column 2, column 3 and so on of the original data or the corrected data are arranged as one set of two columns, as shown in the figure. More specifically, the respective columns (column 1, column 2, column 3, . . . ) of the original data or the corrected data are divided into two blocks, and for example, column 1 is divided into column (1) and column (4) and column 2 is divided into column (2) and column (5). That is, column (1), column (4), column (2), column (5), and so on are used as new columns, to generate the shared data using the method shown in FIG. 45.

The case in FIG. 49 is different from the case in FIG. 45 in that when each shared data is generated, the blocks of the mid and lower layers are shifted not by the size of one block (column) of the original data or corrected data but by the size of ½ block (column). In this way, in the shared data with three layers (rows) in addition to the shared data with two layers (rows), it is also possible to change the shift size. In a similar way to the shared data with two layers (rows), in the shared data with three layers (rows), it is also possible to shift the blocks (columns) by 1/N block (N=2, 3, 4, . . . ).

In this way, the variety of methods used as the generating method of the shared data with two layers (rows) may be applied to the generating method of the shared data with three layers (rows).

Figure 50:
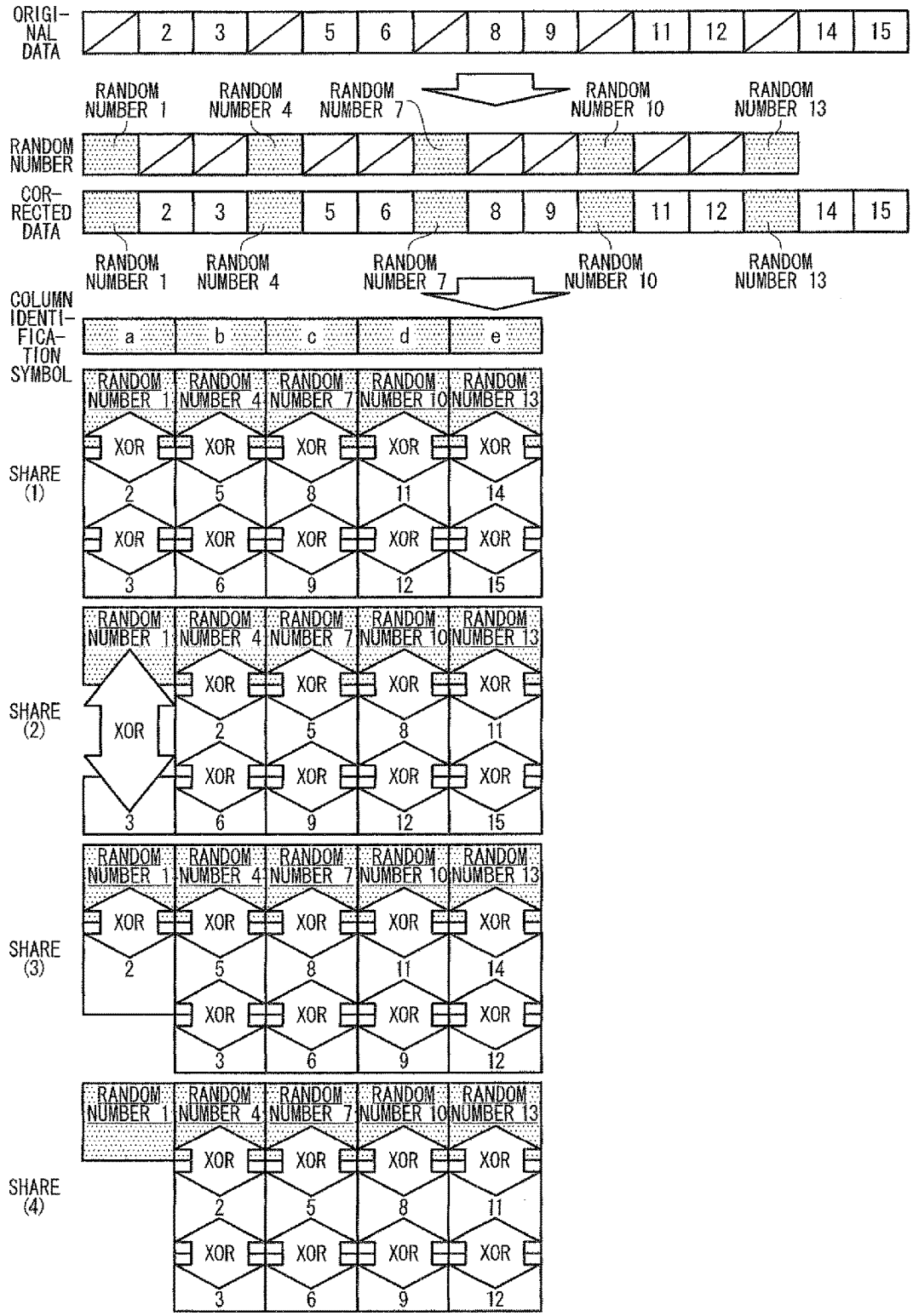
FIG. 50 is a diagram illustrating an example of a generating method of shared data in a threshold value of 3.

FIG. 50 is a diagram illustrating an example of a generating method of shared data according to the present embodiment. In the description of the generating method of shared data with two layers (rows), the method in which it is difficult or impossible to estimate the original data from the shared data under the threshold value using the random numbers, that is, the dummy blocks (columns) is used, but this method may be applied to generate the shared data with three layers (rows). FIG. 50 shows an example thereof. In FIG. 50, the method in FIG. 33 is applied to the shared data with three layers (rows).

As described above, the variety of generating methods of the shared data with two layers (rows) may be also applied to the generating method of the shared data with three layers (rows).

It is possible to obtain one more viewpoint from FIG. 50. As understood from the original data which is arranged in each shared data, the arrangement method of the original data in each shared data corresponds to the generating method of the shared data with two layers (rows). That is, if one layer (row) including a dummy block (column) is added to the shared data of two layers (rows), that is, a threshold value of 2, this means that it is possible to generate the shared data of a threshold value of 3. Similarly, if N layers (rows) (N=1, 2, 3, . . . ) including a dummy block (column) are added to the shared data of two layers (rows), that is, a threshold value of 2, this means that it is possible to generate the shared data of a threshold value of 2+N. Similarly, if N layers (rows) (N=1, 2, 3, . . . ) including a dummy block (column) are added to the shared data of M layers (rows) (M=1, 2, 3, . . . ), that is, a threshold value of M, it is possible to generate the shared data of a threshold value of (M+N).

Figure 51:
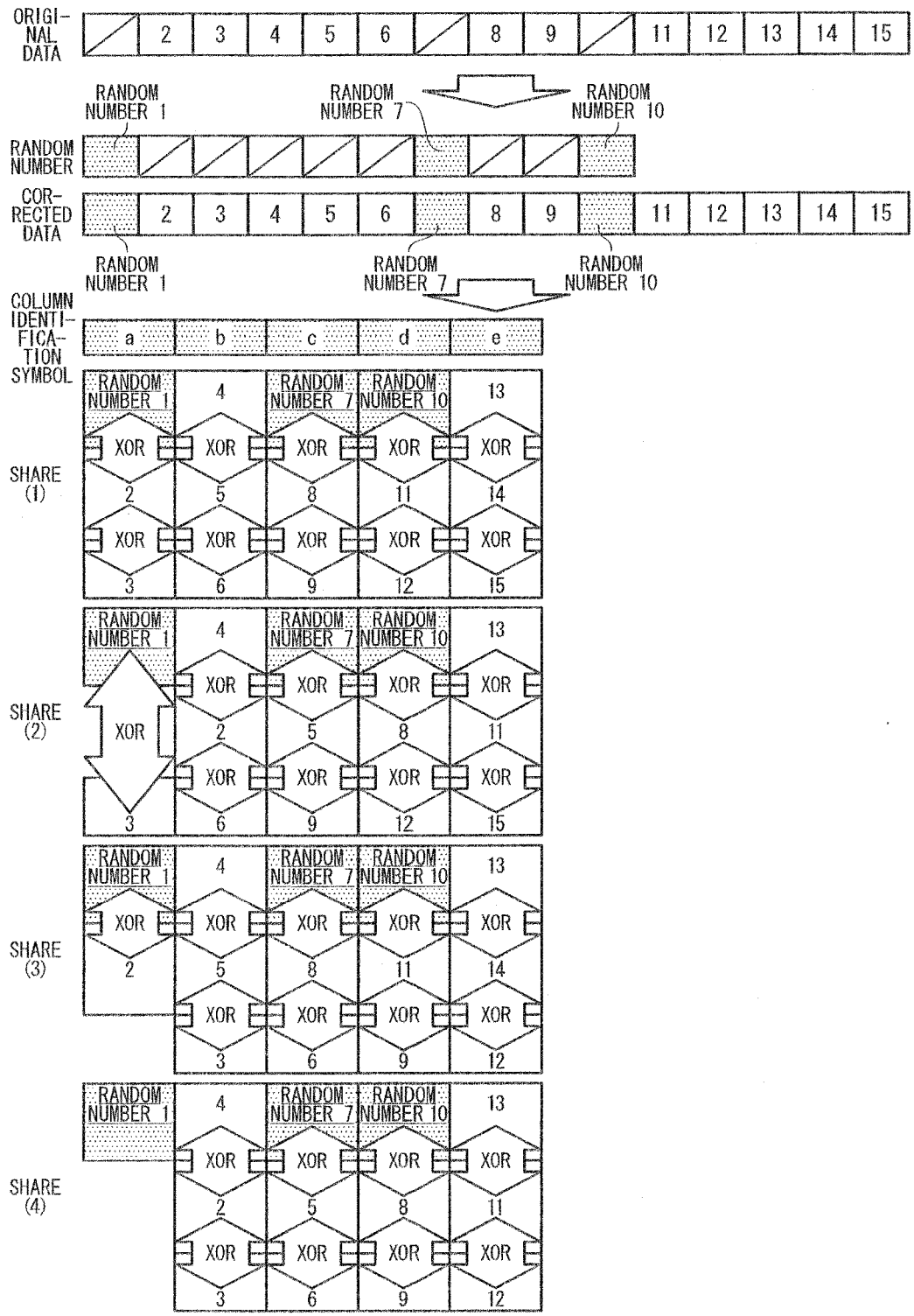
FIG. 51 is a diagram illustrating an example of a generating method of shared data in a threshold value of 3.

FIG. 51 is a diagram illustrating a generating method of shared data according to the present embodiment. In FIG. 51, the method in FIG. 37 is applied to the shared data with three layers (rows). In this way, the variety of generating methods of the shared data with two layers (rows) may be also applied to the generating method of the shared data with three layers (rows).

Figure 52:
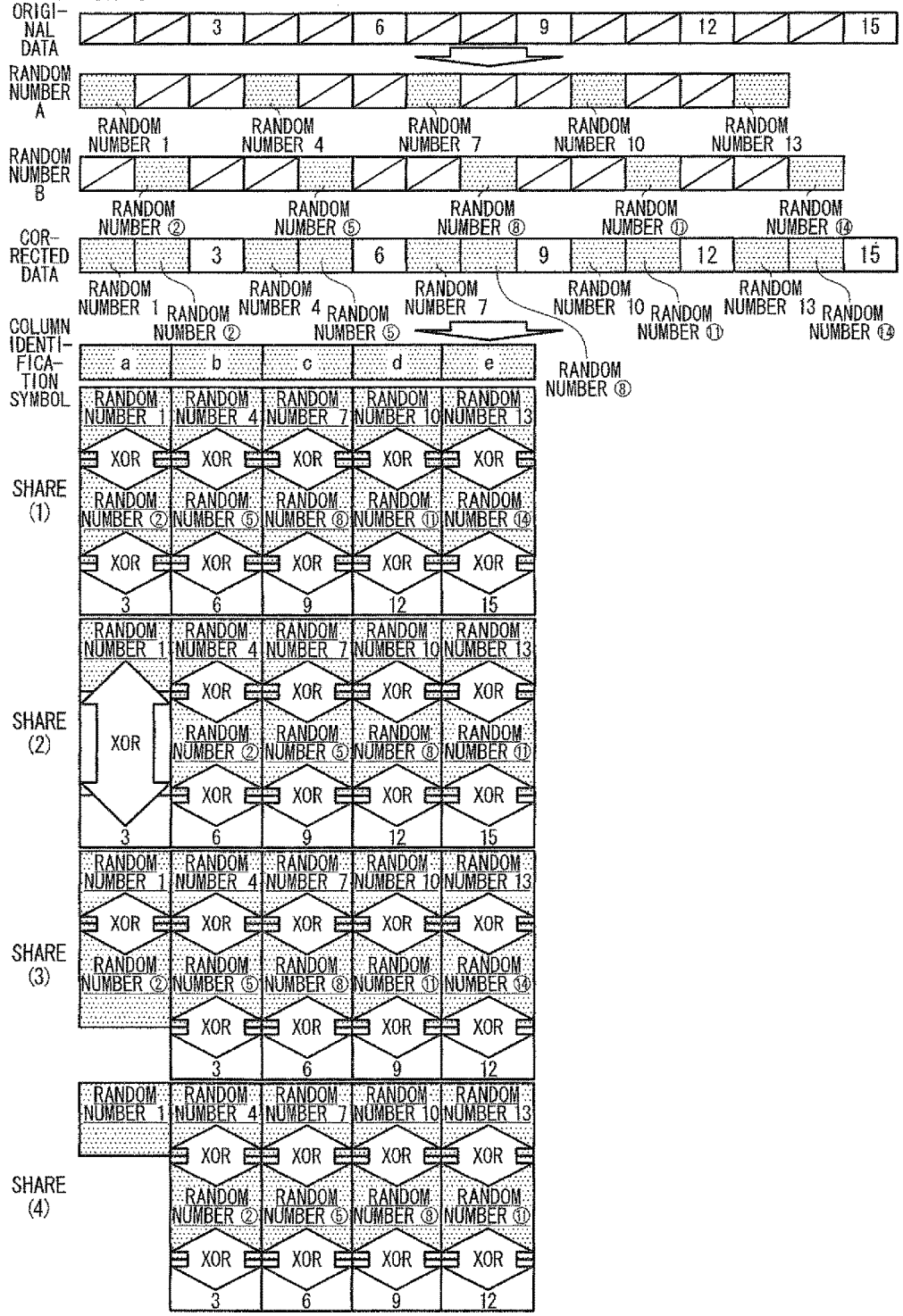
FIG. 52 is a diagram illustrating an example of a generating method of shared data in a threshold value of 3.

FIG. 52 is a diagram illustrating an example of a generating method of shared data according to the present embodiment. In this case, two layers (rows) among three layers (rows) of the shared data are random numbers, that is, dummy blocks (columns). It is possible to generate random number A and random number B by the same random number generator or different random number generators. Further, it is also possible to set a part or all of them to true random numbers. If the number of layers is increased in this way, it is possible to use random numbers, that is, dummy blocks (columns) in a plurality of layers, and to generate complex shared data.

Eighth Embodiment

An eighth embodiment of the invention shows the case of four-layered folding.

Figure 53:
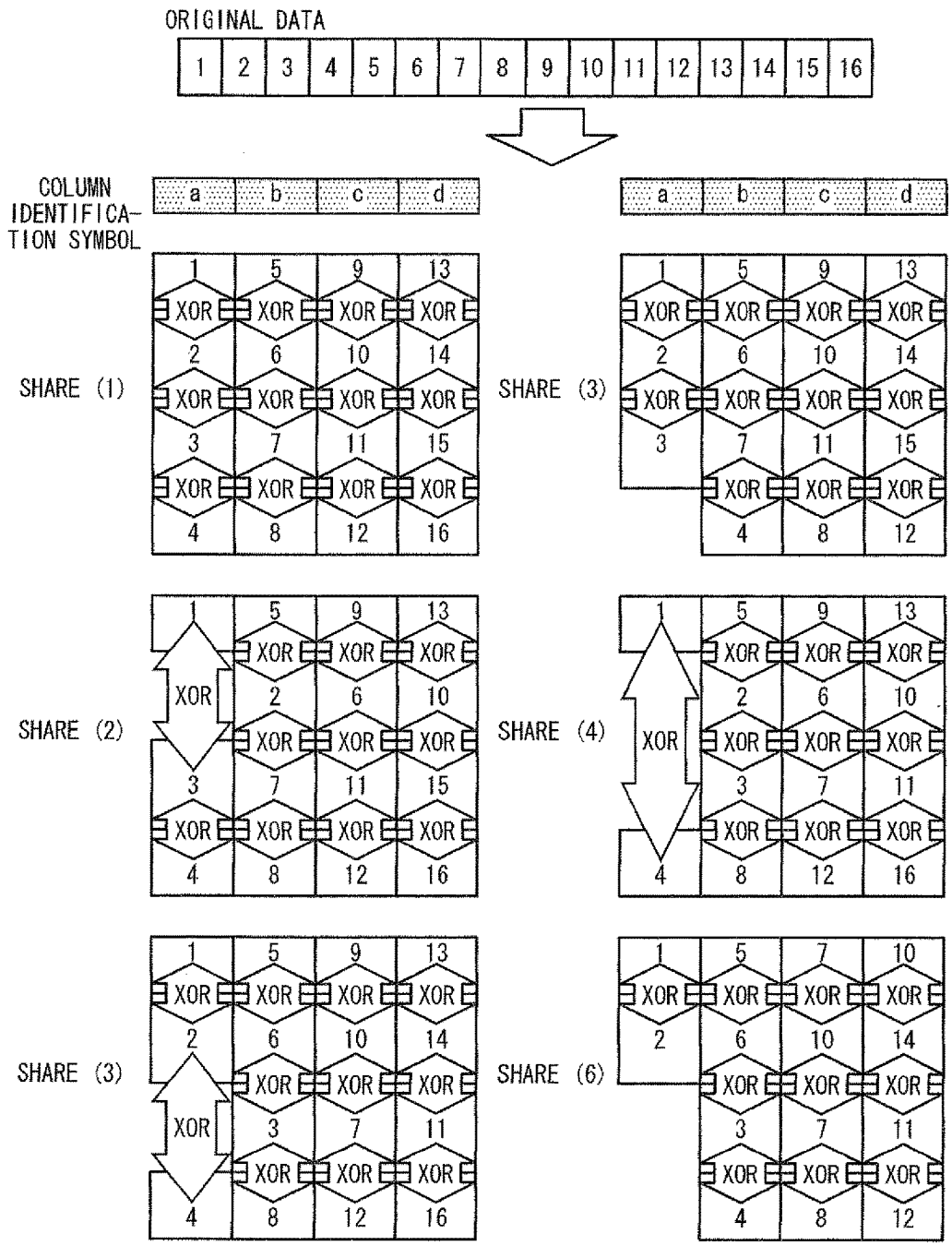
FIG. 53 is a diagram illustrating an example of a generating method of shared data in a threshold value of 4.

FIG. 53 is a diagram illustrating an example of a generating method of shared data according to the present embodiment. In this case, an operation of folding the original data into four layers (rows) is performed.

Firstly, a generating method of share (1) will be described. [Share (1) *a*] is a value obtained by XORing column 1, column 2, column 3 and column 4. Similarly, [share (1) *b*] is a value obtained by XORing column 5, column 6, column 7 and column 8. As shown in the figure, [share (1) *c*] and so on are calculated by the same process. In this way, share (1) is obtained by folding the original data into four layers (rows). Accordingly, the number of blocks (columns) in share (1) is ¼ of the number of blocks (columns) in the original data.

Next, a generating method of share (2) will be described. [Share (2) *a*] is a value obtained by XORing column 1, column 3 and column 4. On the other hand, [share (2) *b*] is a value obtained by XORing column 5, column 2, column 7 and column 8. As shown in the figure, [share (2) *c*] and so on are calculated by the same process as in [share (2) *b*]. In this way, share (2) folds the original data into four layers (rows). Accordingly, the number of blocks (columns) in share (2) is ¼ of the number of blocks (columns) in the original data.

Here, as understood from the figure, share (2) is a value obtained by shifting the blocks shown in the second layer from the top of share (1), that is, columns 2, 6, 10 and so on of the original data to the right by one block and by XORing them. Accordingly, column 14 of the original data is not used for calculation in share (2).

Next, a generating method of share (3) will be described. [Share (3) *a*] is a value obtained by XORing column 1, column 2 and column 4. On the other hand, [share (3) *b*] is a value obtained by XORing column 5, column 6, column 3 and column 8. As shown in the figure, [share (3) *c*] and so on are calculated by the same process as in [share (3) *b*]. In this way, share (3) is obtained by folding the original data into four layers (rows). Accordingly, the number of blocks (columns) in share (3) is ¼ of the number of blocks (columns) in the original data.

Here, as understood from the figure, share (3) is a value obtained by shifting the blocks shown in the third layer from the top of share (1), that is, columns 3, 7, 11 and so on of the original data to the right by one block and by XORing them. Accordingly, column 15 of the original data is not used for calculation in share (C).

Next, a generating method of share (4) will be described. [Share (4) *a*] is a value obtained by XORing column 1, column 2 and column 3. On the other hand, [share (4) *b*] is a value obtained by XORing column 5, column 6, column 7 and column 4. As shown in the figure, [share (4) *c*] and so on are calculated by the same process as in [share (3) *b*]. In this way, share (4) is obtained by folding the original data into four layers (rows). Accordingly, the number of blocks (columns) in share (4) is ¼ of the number of blocks (columns) in the original data.

Here, as understood from the figure, share (4) is a value obtained by shifting the blocks shown in the fourth layer from the top of share (1), that is, columns 3, 7, 11 and so on of the original data to the right by one block and by XORing them. Accordingly, column 16 of the original data is not used for calculation in share (4).

Next, a generating method of share (5) will be described. [Share (5) *a*] is a value obtained by XORing column 1 and column 4. On the other hand, [share (5) *b*] is a value obtained by XORing column 5, column 2, column 3 and column 8. As shown in the figure, [share (5) *c*] and so on are calculated by the same process as in [share (5) *b*]. In this way, share (5) is obtained by folding the original data into four layers (rows). Accordingly, the number of blocks (columns) in share (5) is ¼ of the number of blocks (columns) in the original data.

Here, as understood from the figure, share (5) is a value obtained by shifting the blocks shown in the second and third layers from the top of share (1), that is, columns 2, 6, 10 and so on and columns 3, 7, 11 and so on of the original data to the right by one block and by XORing them. Accordingly, column 14 and column 15 of the original data are not used for calculation in share (5).

Next, a generating method of share (6) will be described. [Share (6) *a*] is a value obtained by XORing column 1 and column 2. On the other hand, [share (6) *b*] is a value obtained by XORing column 5, column 6, column 3 and column 4. As shown in the figure, [share (6) *c*] and so on are calculated by the same process as in [share (6) *b*]. In this way, share (6) is obtained by folding the original data into four layers (rows). Accordingly, the number of blocks (columns) in share (6) is ¼ of the number of blocks (columns) in the original data.

Here, as understood from the figure, share (6) is a value obtained by shifting the blocks shown in the third and fourth layers from the top of share (1), that is, columns 3, 7, 11 and so on and columns 4, 8, 12 and so on of the original data to the right by one block and by XORing them. Accordingly, column 15 and column 16 of the original data are not used for calculation in share (6).

In this way, if the operation of folding the original data into four layers (rows) is performed, it is possible to delete information in the original data. Thus, it is possible to prevent the original data from being restored from one piece of shared data. That is, it is possible to perform secret sharing.

Further, since the shared data becomes complex in a case where the original data is folded into four layers (rows) compared with a case where the original data is folded into two or three layers (rows), the security level is enhanced, and the data amount of each shared data becomes ¼. That is, if the original data is folded into N layers (rows) (N=1, 2, 3, . . . ), the data amount becomes 1/N.

Here, the original data is divided into 16 blocks (columns), but actually, if the number is four or more, the number of blocks (columns) is not limitative. Further, the data size of the block (column) may be set to an arbitrary size in the unit of one bit.

When all the columns are folded into four layers (rows), it is necessary to set the number of blocks (columns) to multiples of 4, but the original data should not be necessarily divided into multiples of 4. In a similar way to the case of two layers (rows) or three layers (rows), a position which is not folded into four layers (rows) may be set to an empty block (column) where there is no data or a dummy block (column) of a random number. This is similarly applied to the case of N layers (rows) (N=2, 3, 4, . . . ).

Figure 54:
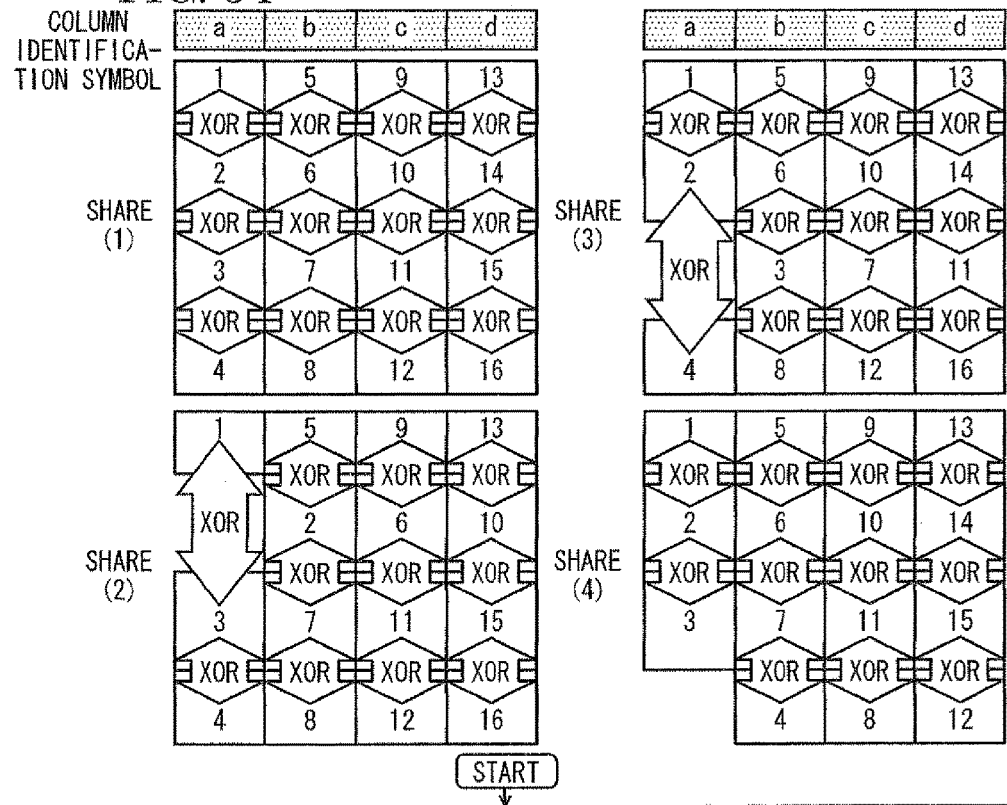
FIG. 54 is a diagram illustrating an example of a restoring method of shared data in a threshold value of 4.

FIG. 54 is a diagram illustrating an example of a restoring method of the original data according to the present embodiment. Here, an example is shown in which restoration is performed using share (1), share (2), share (3) and share (4) among six pieces of the shared data in FIG. 53. That is, a method of restoring the original data shown on the lower side in the figure from four pieces of shared data of share (1), share (2), share (3) and share (4) shown on the upper side in the figure will be described with reference to a flowchart.

(1) [Share (1) $a$] XOR [share (2) $a$] is calculated, and column 2 is obtained from its result. (2) [Share (1) $a$] XOR [share (3) $a$] is calculated, and column 3 is obtained from its result. (3) [Share (1) $a$] XOR [share (4) $a$] is calculated, and column 4 is obtained from its result. (4) [Share (1) $a$] XOR column 2 XOR column 3 XOR column 4 is calculated, and column 1 is obtained from its result. (5) [Share (1) $b$] XOR [share (2) $b$] XOR column 2 is calculated, and column 6 is obtained from its result. (6) [Share (1) $b$] XOR [share (3) $b$] XOR column 3 is calculated, and column 7 is obtained from its result. (7) [Share (1) $b$] XOR [share (4) $b$] XOR column 4 is calculated, and column 8 is obtained from its result. (8) [Share (1) $c$] XOR column 6 XOR column 7 XOR column 8 is calculated, and column 5 is obtained from its result. (9) [Share (1) $c$] XOR [share (2) $c$] XOR column 6 is calculated, and column 10 is obtained from its result. (10) [Share (1) $c$] XOR [share (3) $c$] XOR column 7 is calculated, and column 11 is obtained from its result. (11) [Share (1) $c$] XOR [share (4) $c$] XOR column 8 is calculated, and column 12 is obtained from its result. (12) [Share (1) $c$] XOR column 10 XOR column 11 XOR column 12 is calculated, and column 5 is obtained from its result. (13) [Share (1) $d$] XOR [share (2) $d$] XOR column 10 is calculated, and column 14 is obtained from its result. (14) [Share (1) $d$] XOR [share (3) $d$] XOR column 11 is calculated, and column 15 is obtained from its result. (15) [Share (1) $d$] XOR [column 4 ($d$)] XOR column 12 is calculated, and column 16 is obtained from its result. (16) [Share (1) $d$] XOR column 14 XOR column 15 XOR column 16 is calculated, and column 13 is obtained from its result.

Thus, it is possible to restore column 1, column 2, column 3, . . . , column 16 of the original data. As understood from this description, the secret sharing corresponds to a secret sharing of a threshold value of 4. In this way, if the shared data is generated with two layers (rows), the threshold value becomes 2, if the shared data is generated with three layers (rows), the threshold value becomes 3, and if the shared data is generated with four layers (rows), the threshold value becomes 4. That is, if the shared data is generated with N (N=2, 3, 4, . . . ) layers (rows), the threshold value becomes N. Further, as shown in FIG. 53, it is possible to set the number of shares to the threshold value or more.

Figure 55:
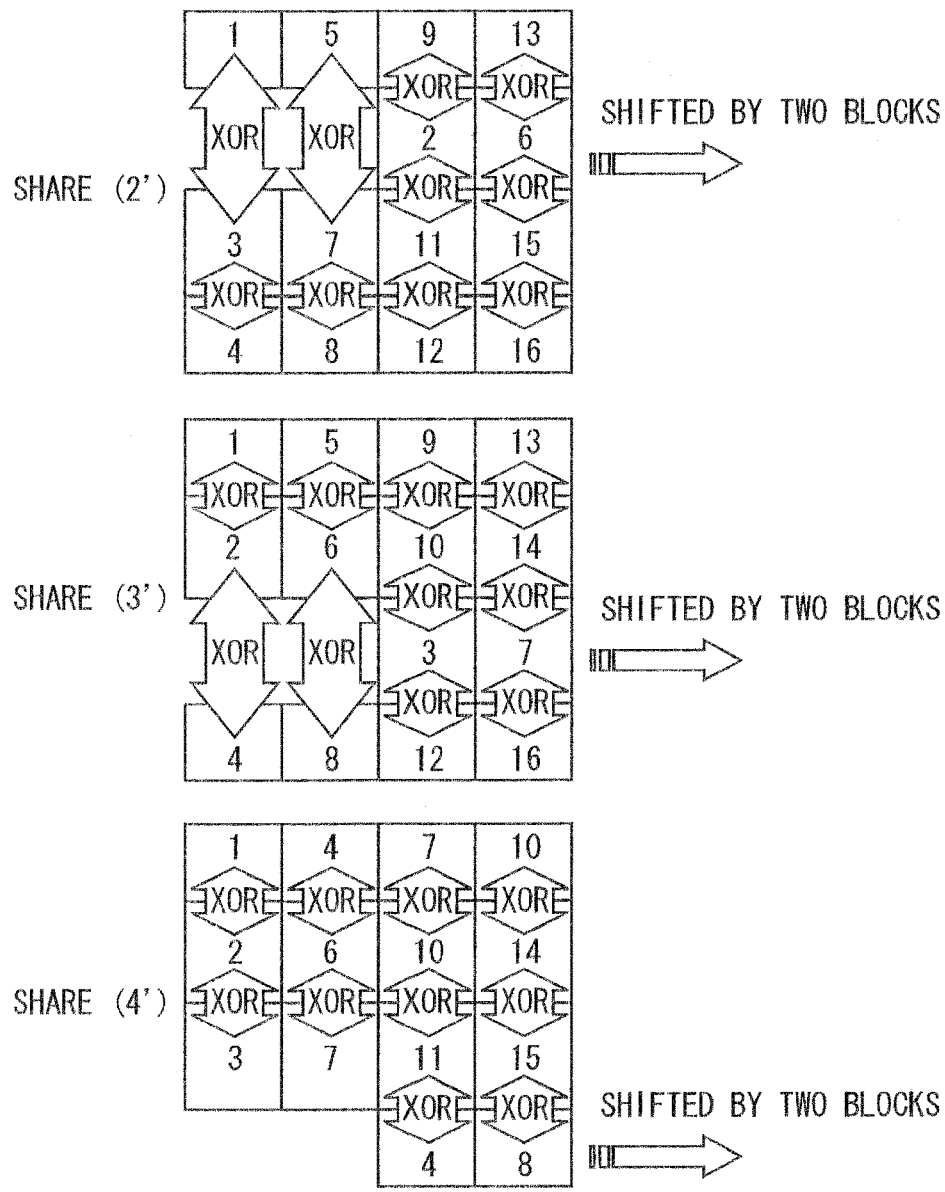
FIG. 55 is a diagram illustrating an example of a generating method of shared data in a threshold value of 4.

FIG. 55 is a diagram illustrating an example of a generating method of shared data according to the present embodiment. Here, the shared data with four layers (rows) is generated by a method which is different from the method in FIG. 53.

Share (2') is obtained by shifting the second layer of share (2) in FIG. 53 by one block to the right. That is, share (2') is obtained by shifting the second layer of share (1) in FIG. 53 by two blocks to the right. Similarly, share (3') is obtained by shifting the third layer of share (3) in FIG. 53 by one block to the right. That is, share (3') is obtained by shifting the third layer of share (1) in FIG. 53 by two blocks to the right. Similarly, share (4') is obtained by shifting the fourth layer of share (4) in FIG. 53 by one block to the right. That is, share (4') is obtained by shifting the fourth layer of share (1) in FIG. 53 by two blocks to the right. In this way, in a similar way to the generation of the shared data with two layers (rows) or three layers (rows), it is possible to use shares obtained by shifting the respective layers by N blocks (N=1, 2, 3, . . . ) as the shared data. The combination of shares obtained by shifting the respective layers by one block, two blocks or three blocks may be used.

Thus, it is possible to freely set the number of shares. Accordingly, if n is the number of shares and m is the threshold value, the secret sharing scheme according to the present embodiment becomes an (m, n)-threshold secret sharing scheme.

The shared data shown in FIGS. 53 and 55 is only part of the shared data of the threshold value of 4. Since the variety of generating methods of the shared data with two layers (rows) or three layers (rows) may be applied to the generating method of the shared data with four layers (rows), it is possible to generate a variety of shared data. For example, here, the blocks (columns) are shifted to the right, but as described in the generating method of the shared data with two layers (rows), the blocks may be shifted to the left.

In this way, the generating method of the shared data with two layers (rows) or three layers (rows) may be also applied to the generating method of the shared data with N layers (rows) (N=2, 3, . . . ). Further, the variety of different methods such as change in the shift size or use of dummy blocks (columns) may be also applied to the generating method of the shared data with N layers (rows) (N=2, 3, . . . ), in a similar way to the generating method of the shared data with two layers (rows) or three layers (rows).

FIG. 56 is a diagram illustrating an example of a generating method of shared data according to the present embodiment. In this case, the case in FIG. 50 is described again. As can be understood from the original data arranged in each shared data, the arrangement method of the original data in each shared data corresponds to the generating method of the shared data with two layers (rows). That is, if two layers (rows) including dummy blocks (columns) are added to the shared data of two layers (rows), that is, a threshold value of 2, this means that it is possible to generate the shared data of a threshold value of 4.

Ninth Embodiment

A ninth embodiment of the invention shows the case of seven pieces or more shared data.

Figure 58:
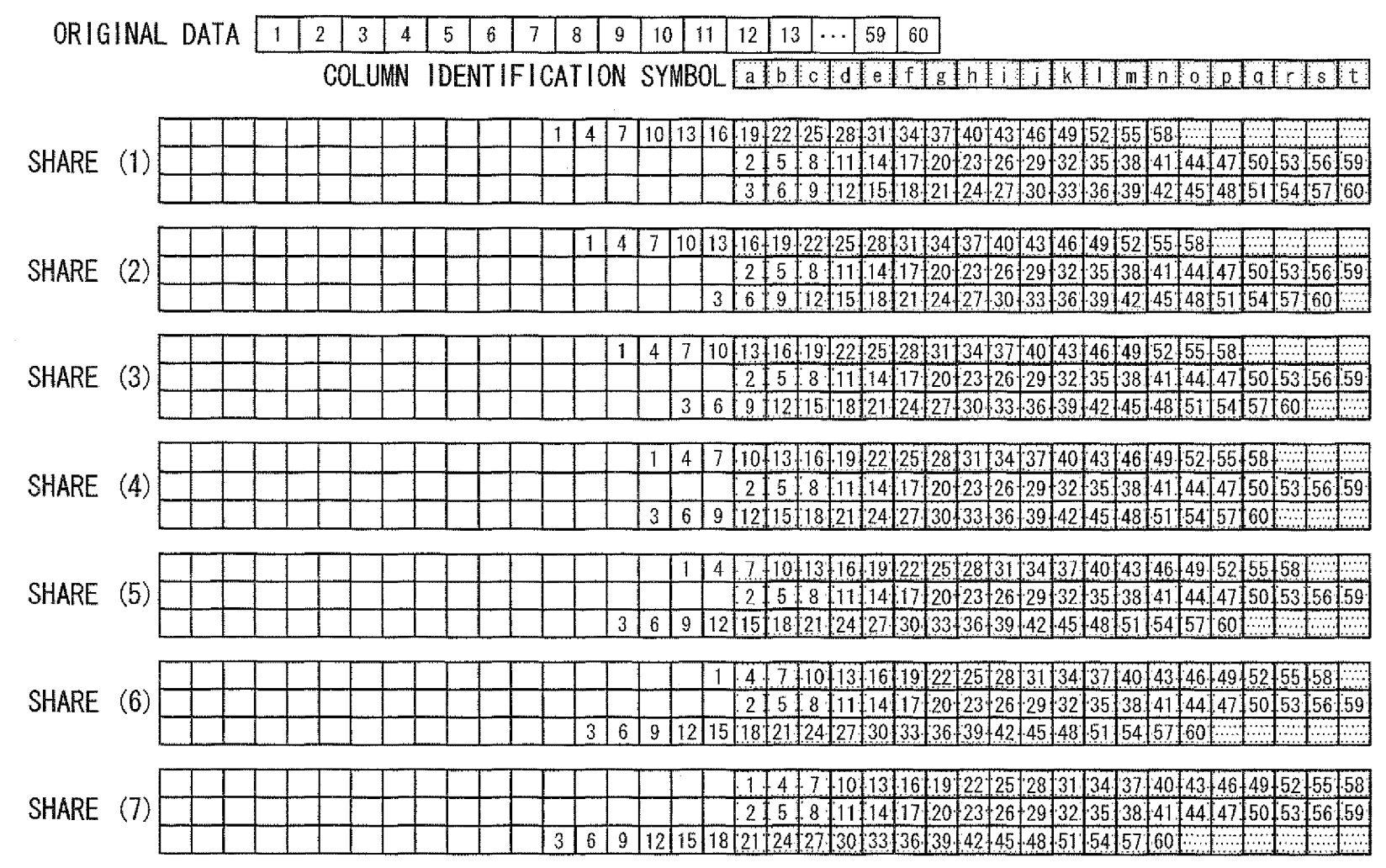
Figure 59:
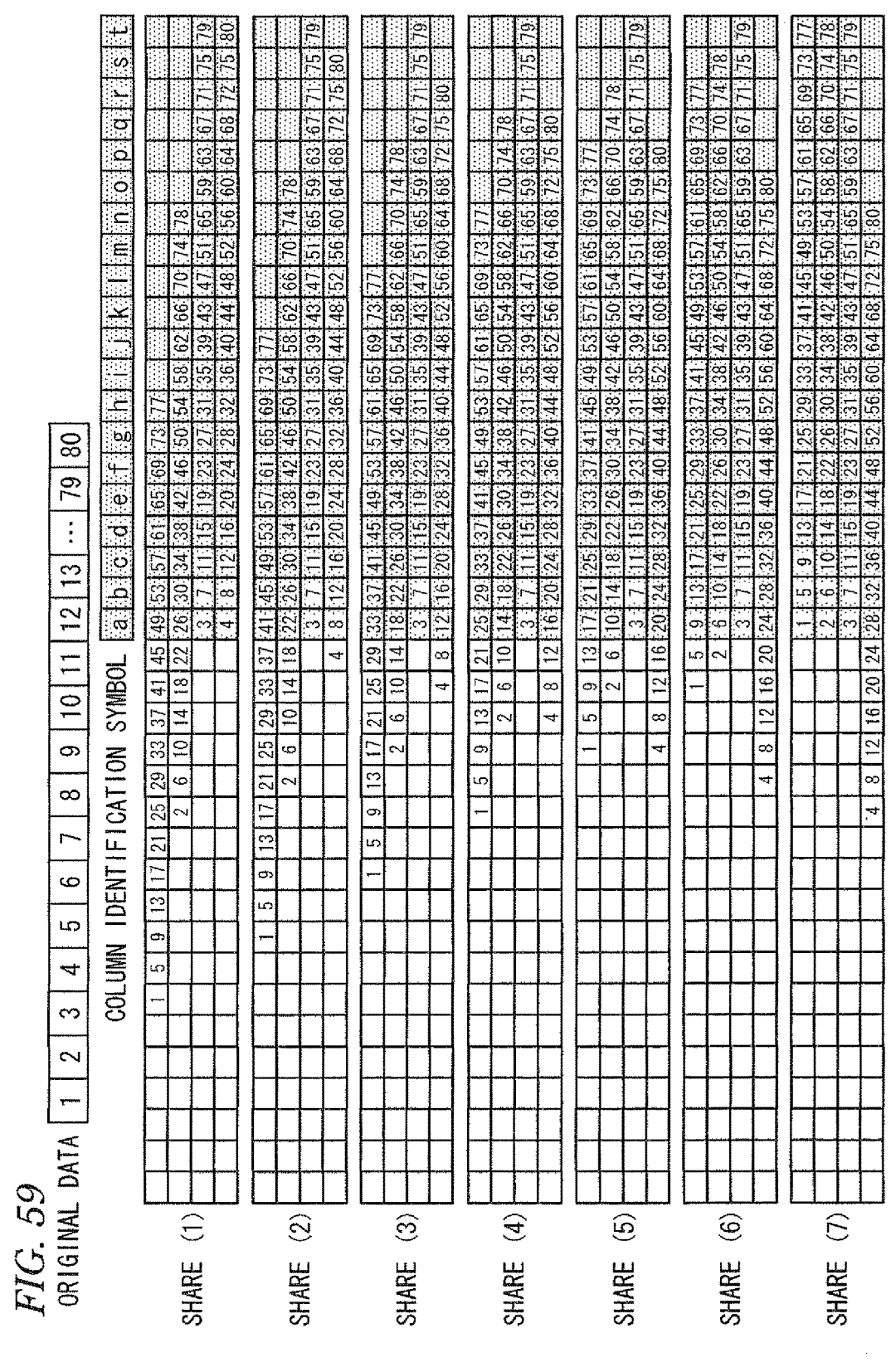
Figure 60:
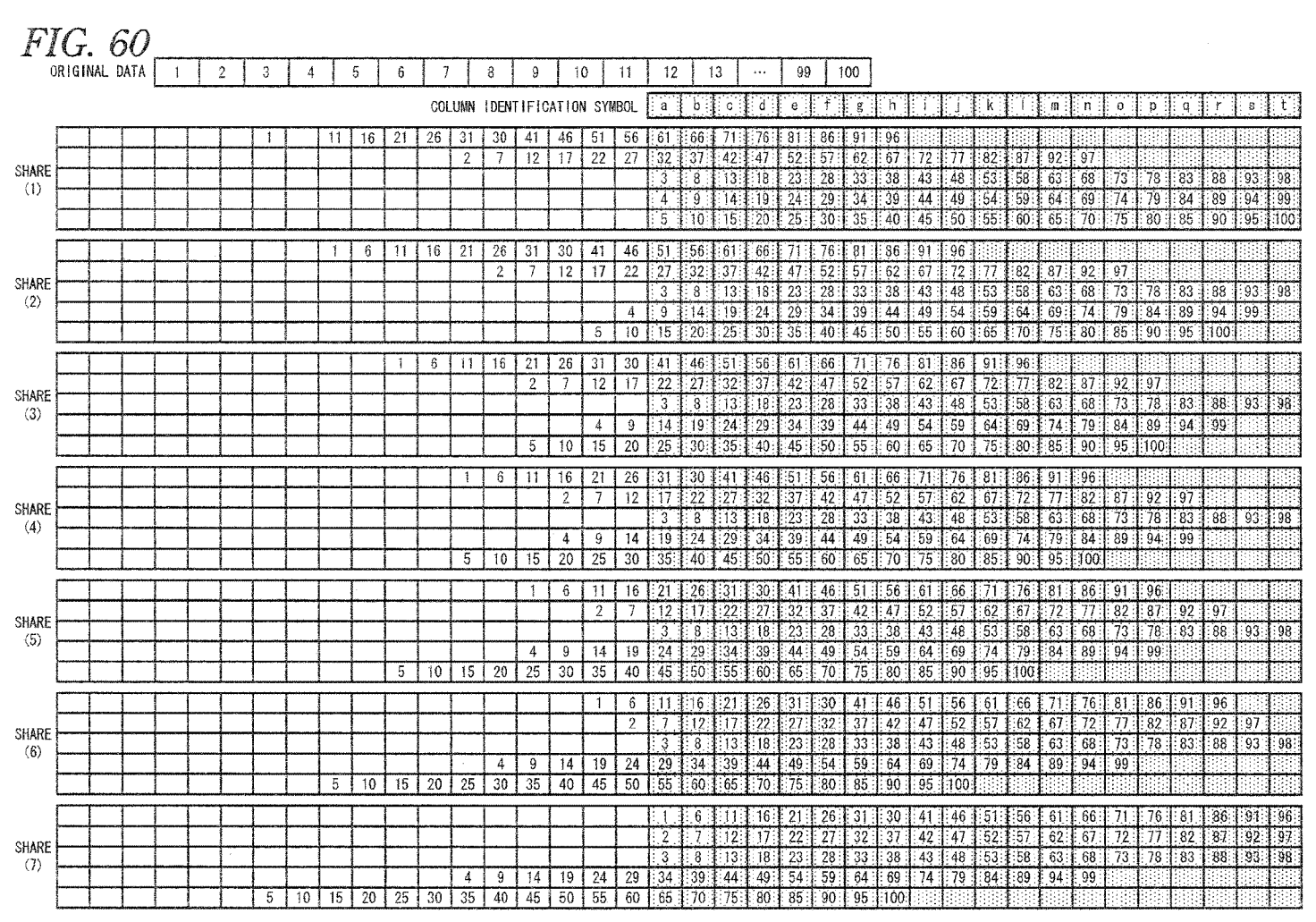
Figure 61:
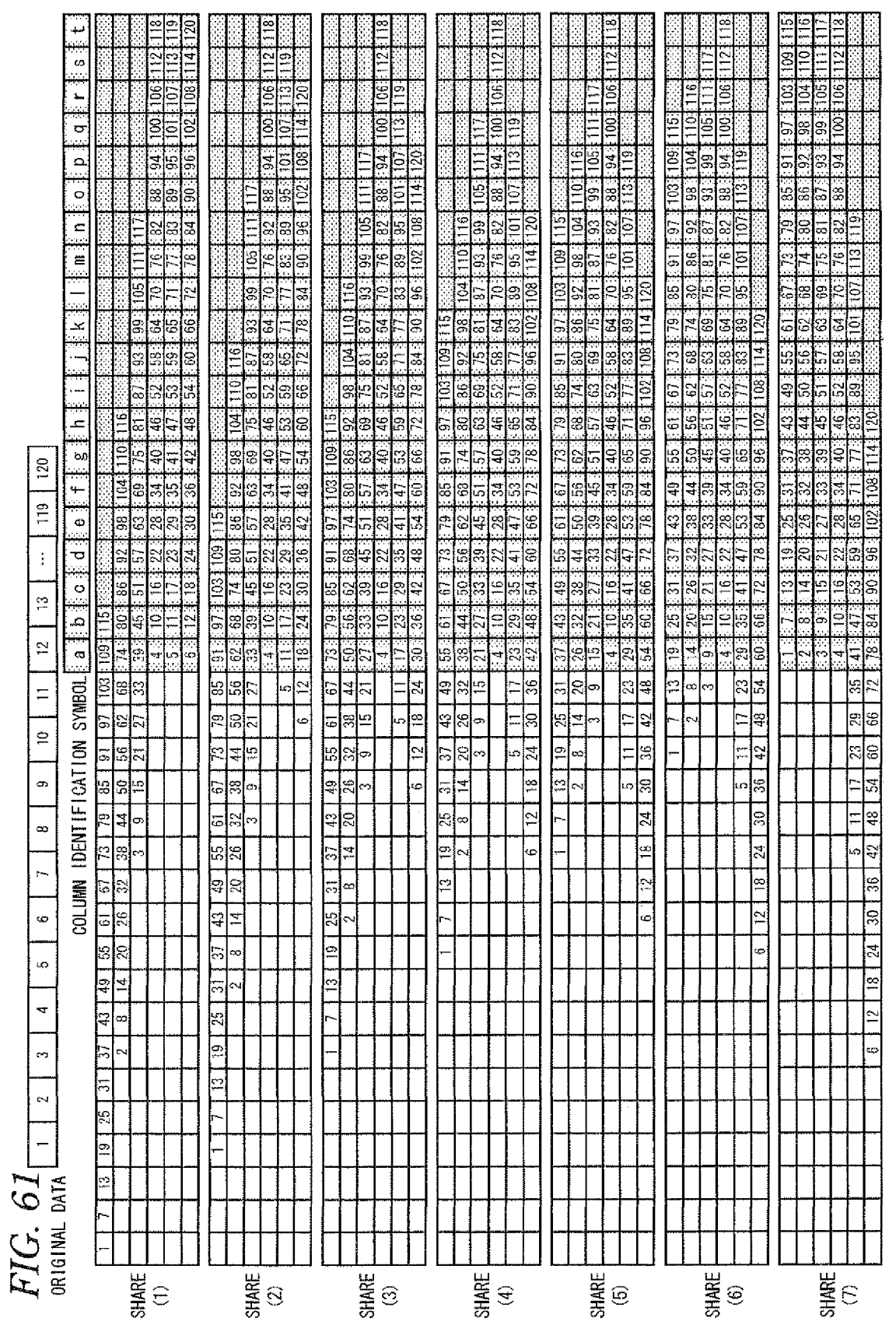

FIGS. 57 to 61 are diagrams illustrating an example of a generating method of shared data according to the present embodiment. FIG. 57 shows an example of a creating method of shared data of a threshold value of 2, FIG. 58 shows an example of a creating method of shared data of a threshold value of 3, FIG. 59 shows an example of a creating method of shared data of a threshold value of 4, FIG. 60 shows an example of a creating method of shared data of a threshold value of 5, and FIG. 61 shows an example of a creating method of shared data of a threshold value of 6.

Here, a gray portion, that is, columns a to t correspond to data obtained by XORing all data which is arranged in the columns. For example, column a of share (1) in FIG. 57 is data obtained by XORing original data 13 and original data 2. Hereinafter, similarly, column b is data obtained by XORing original data 15 and original data 4, and column c is data obtained by XORing original data 17 and original data 6. Similarly, in FIG. 58 and thereafter, for example, column a of share (1) in FIG. 58 is data obtained by XORing original data 19, 2 and 3. Hereinafter, similarly, column b is data obtained by XORing original data 22, 5 and 6, and column c is data obtained by XORing original data 25, 8 and 9.

Further, a non-gray portion, that is, values written before column a correspond to the original data itself which is retained in the shared data, and these values are not XORed. It is preferable that the original data which is not XORed be set to a random number sequence added to the head of the true original data. That is, the random number sequence may be added to the true original data by a necessary amount (by the number of the original data which is exposed for notice). In restoration, the added random number sequence may be deleted after restoration. The degree of the added random number sequence may be understood by being stored in header information of each shared data.

As understood from FIGS. 57 to 61, when the shared data of a threshold value of 2 is generated, the shared data may be divided into two layers (two rows) to be XORed. Similarly, when the shared data of a threshold value of 3, a threshold value of 4, a threshold value of 5 and so on is generated, the shared data may be divided into three layers, four layers, five layers and so on to be XORed.

Here, it is necessary to arrange the combination of numerals in the respective columns of each shared data so that the same combination does not occur. In FIG. 57, this is realized by shifting the first layer (upper layer) to the right by one block. This is only an example, and the first layer (upper layer) may be shifted to the right by two blocks, three blocks or the like, or may be shifted to the left by one block, two blocks, three blocks or the like. Further, contrarily, the second layer (lower layer) may be shifted as in the upper layer, the upper layer may be shifted to the right, or the lower layer may be shifted to the left.

In FIG. 57, a position where the first layer of share (1) is shifted to the left by six blocks, compared with the second layer, is set to a start point, but the start point of the first layer is arbitrary. Further, this is similarly applied to the other drawings. Here, the original data is arranged as 1, 2, 3 and so on, its arrangement is arbitrary.

Figure 62:
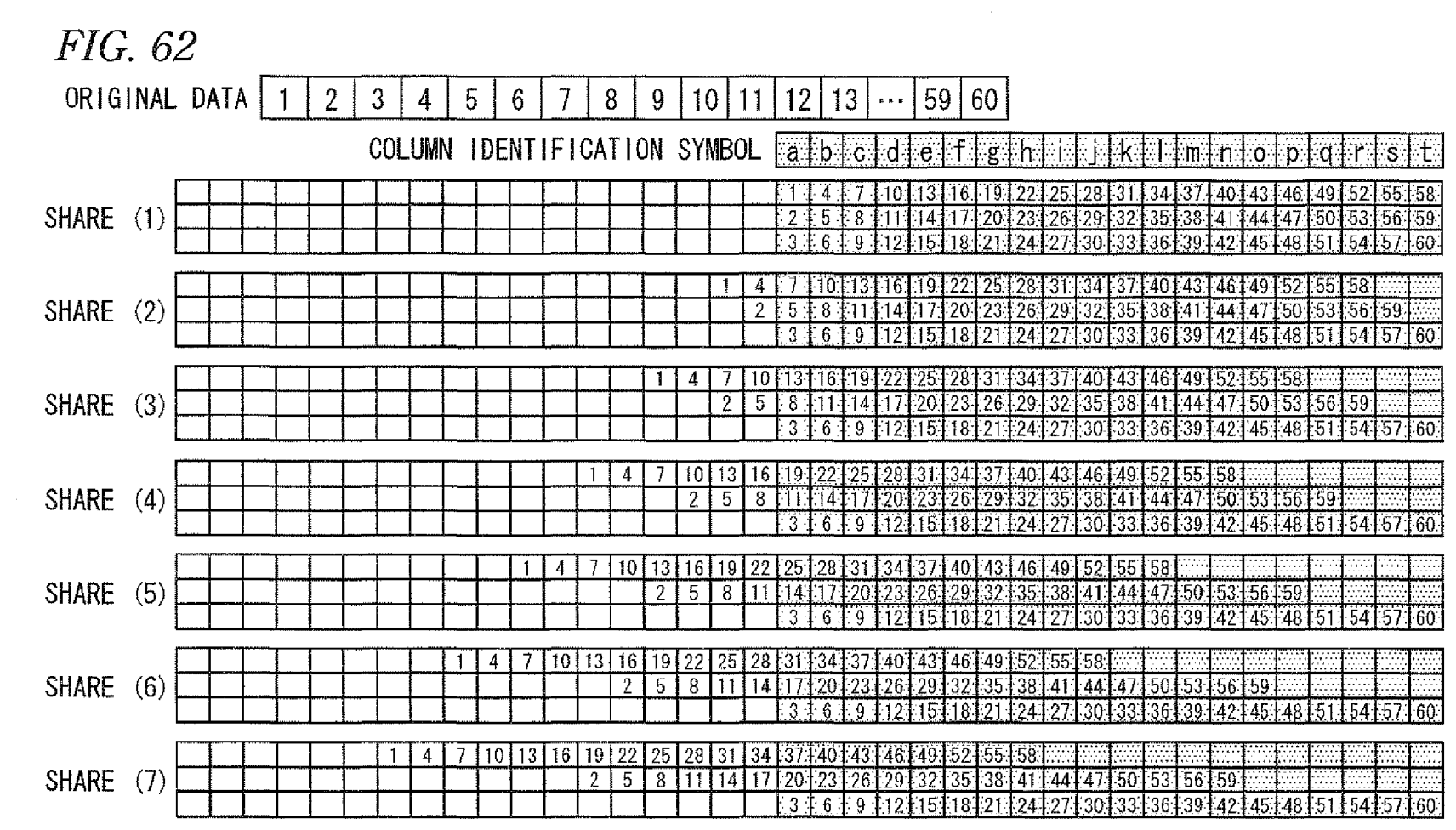

In FIG. 58, by shifting the first layer (upper layer) to the right by one block and by shifting the third layer (lower layer) to the left by one block, the combination of numerals in the respective columns of each shared data is arranged so that the same combination does not occur. In a similar way to the above description, there are a variety of combination methods. For example, as in FIG. 62, the first layer (upper layer) may be shifted to the left by two blocks, and the second layer may be shifted to the left by one block. In a similar way to FIG. 57, a position where the first layer of share (1) is shifted to the left by six blocks, compared with the second and third layers, is set to a start point, but the start point of the first layer is arbitrary.

Figure 63:
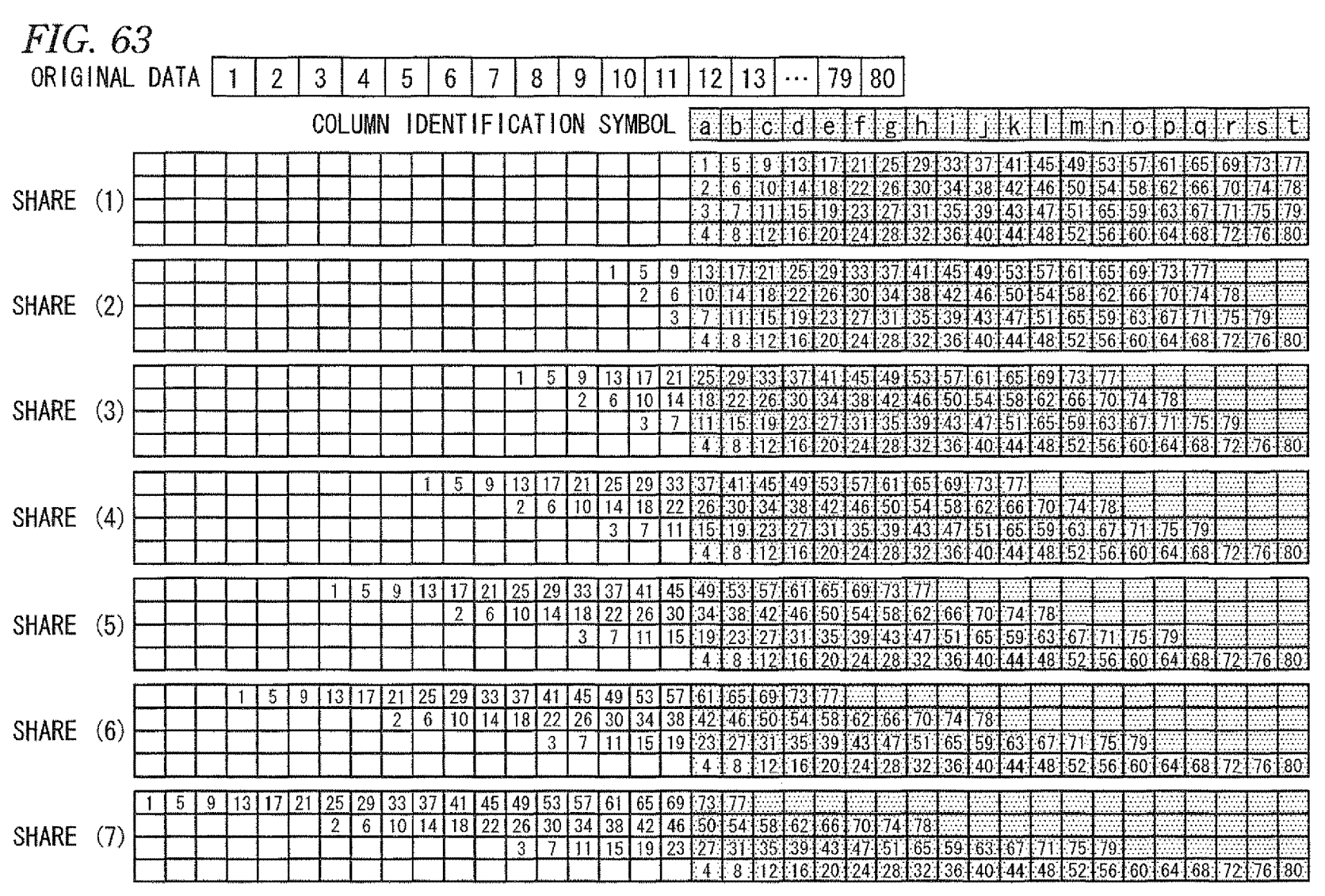

In FIG. 59, by shifting the first layer (upper layer) to the right by two blocks, by shifting the second layer to the left by one block, and by shifting the fourth layer (lower layer) to the left by one block, the combination of numerals in the respective columns of each shared data is arranged so that the same combination does not occur. In a similar way to the above description, there are a variety of combination methods. For example, as in FIG. 63, the first layer (upper layer) may be shifted to the left by three blocks, the second layer may be shifted to the left by two blocks, and the third layer may be shifted to the lift by one block.

In a similar way to FIGS. 57 and 58, a position where the first layer of share (1) is shifted to the left by twelve blocks, compared with the third and fourth layers, is set to a start point, but the start point of the first layer is arbitrary. Similarly, the start points of the second, third and fourth layers are also arbitrary. This is similarly applied to a case where the threshold value is 5 and or less.

In a similar way to FIGS. 57 to 59, in FIGS. 60 and 61, by changing enormous shifting methods, the combination of numerals in the respective columns of each shared data is arranged so that the same combination does not occur. In a similar way to the above description, there are a variety of combination methods.

The important thing is to enormously change the number of shifts. If there is the same shift number, it is not possible to perform restoration. Here, since there are two shift directions of the right and left, layers (rows) which are shifted to the right and the left by the same shift number may exist together. For example, a combination of layers which are shifted to the left by N blocks (N=1, 2, 3, ... ) and layers which are shifted to the right direction by N blocks may exist.

In each shared data, only one layer which is not shifted may be arranged. However, this layer should not be necessarily arranged.

Figure 64:
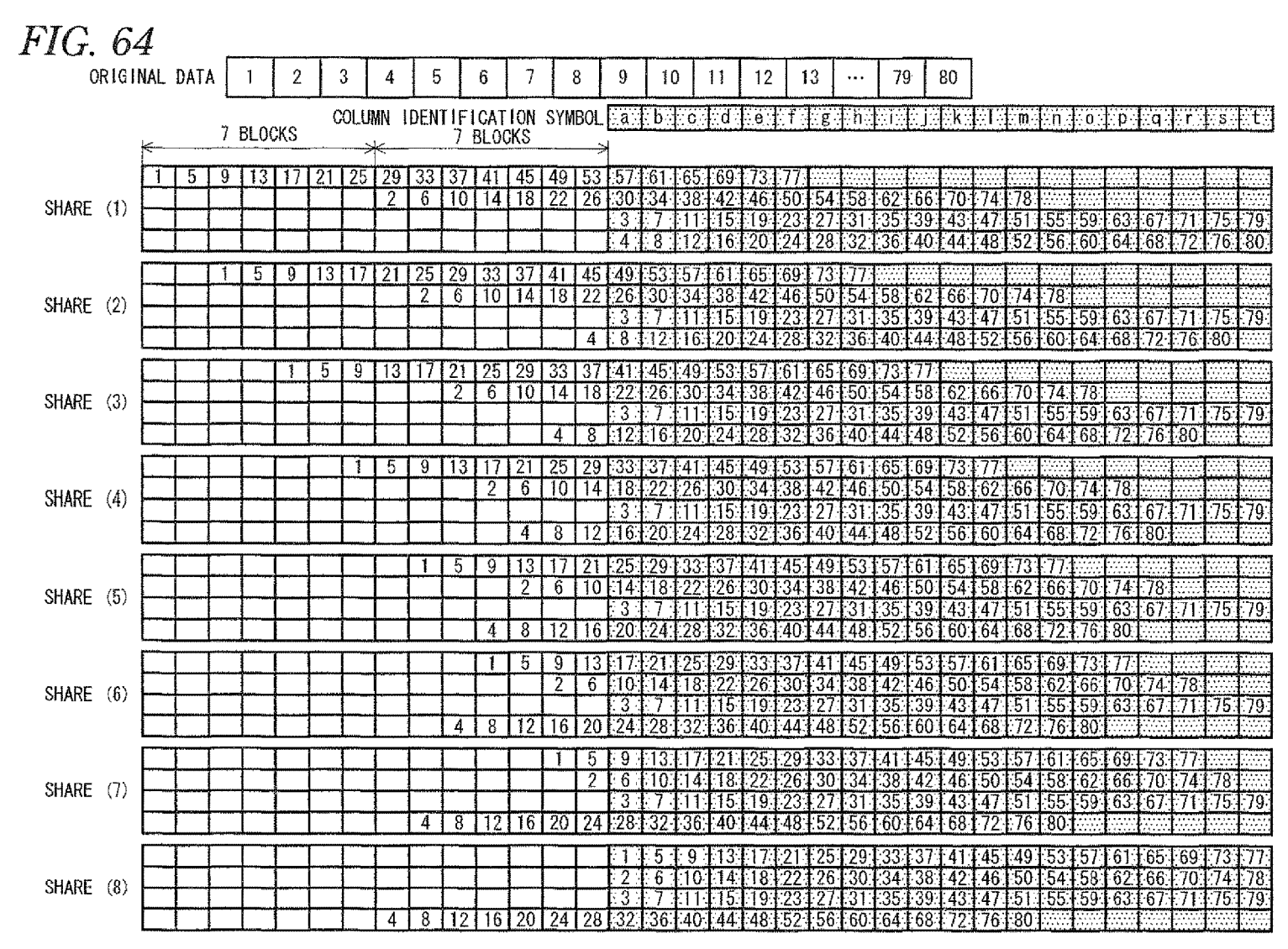

FIG. 64 is a diagram illustrating an example of a generating method of shared data according to the present embodiment. FIGS. 57 to 61 show a creating method of shared data which is effective in a case where the number of shares is 7, but here, a creating method of shared data which is effective in a case where the threshold value is 4 and the number of shares is 8.

As understood from the comparison of the case in FIG. 64 with the case in FIG. 59 of the same threshold value of 4, the number (non-gray portion) of the original data in the first layer (upper layer) becomes multiples of 6 in FIG. 59 where the number of shares is 7, but becomes multiples of 7 in FIG. 64 where the number of shares is 8. In a case where the data arrangement shown in FIGS. 57 to 61 is employed and the number of shares is N (N=1, 2, 3, ... ), it can be understood that the number of the original data in the first layer (upper layer) is set to multiples of N−1 in this way.

Figure 65:
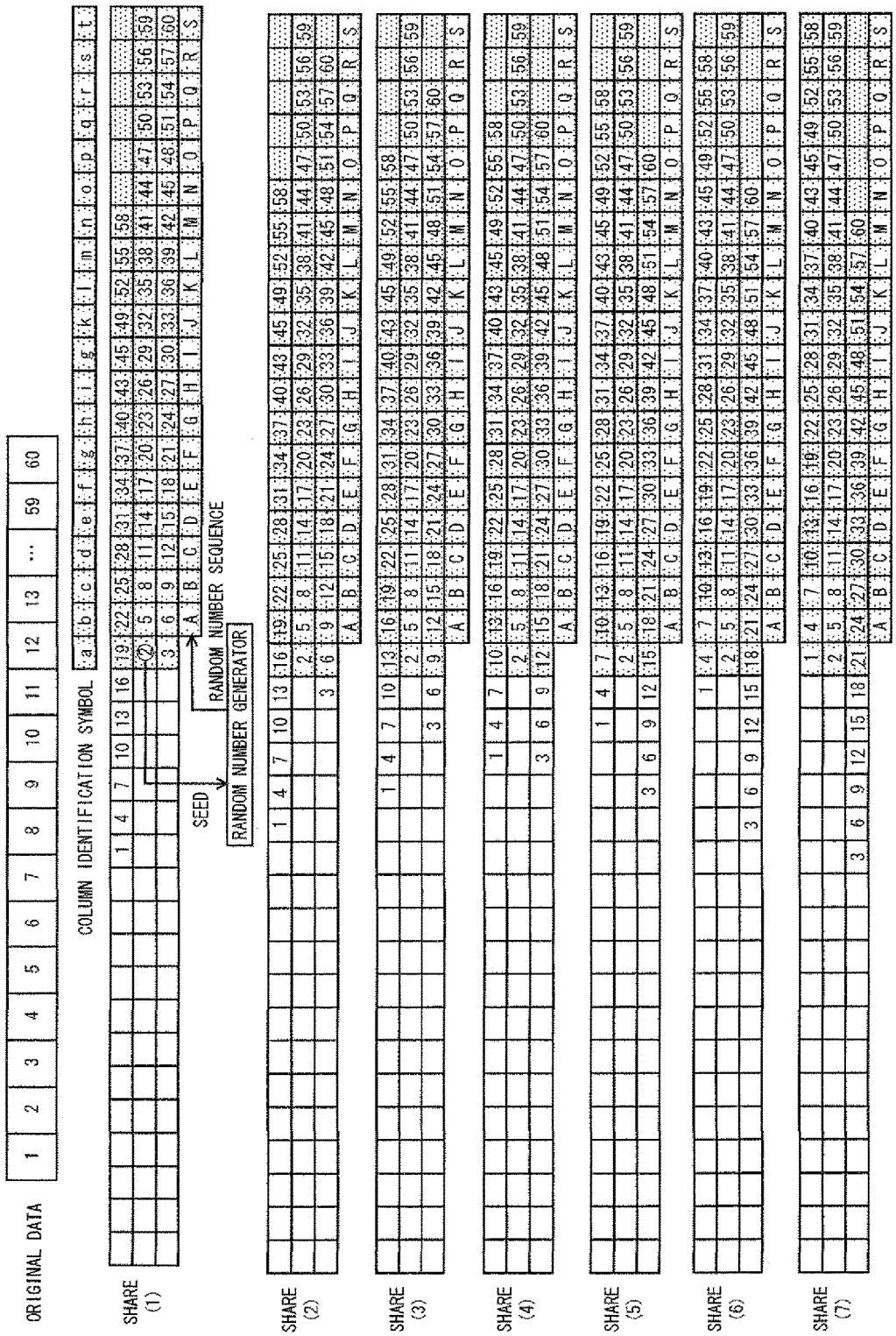
FIG. 65 is a diagram illustrating an example of another generating method of shared data.

FIG. 65 is a diagram illustrating an example of a generating method of shared data according to the present embodiment. In this case, original data 2 is used as a seed value to be inserted to a random number generator, and random number sequences A, BC, . . . generated by the random number generator are respectively XORed with columns a, b, c, . . . . Thus, in a case where characteristic data continuously appears in the original data sequence, it is possible to hide the original data sequence.

Here, at least a part of original data 2 (including a value obtained by performing specific data processing for original data 2) is used as the seed value, but the seed value may be any original data or a plurality of pieces of divided data. Further, the seed value may be generated from a plurality of pieces of the original data. The original data which is used as at least the seed is secured if it is not original data which exists in the non-gray portion of each shared data. Here, since original data 2 is used as the seed, it is possible to perform the XOR operation with random number sequences in the column where original data 2 is present and thereafter (here, column a and thereafter).

In a case where the original data is restored from such shared data, firstly, the original data which is set to the seed value is restored. Further, in a similar way to the sharing process, the original data is set to a seed value to allow the random number generator to generate random number sequences, the random number sequences are XORed with data in the respective columns (columns after the column where the original data which is the seed is present), and then restoration may be performed therefrom.

In this way, since the random number data is calculated using at least one divided data among the plurality of divided data, it is not necessary to prepare the seed of a random number in advance, and thus, it is possible to easily generate a random number.

Figure 66:
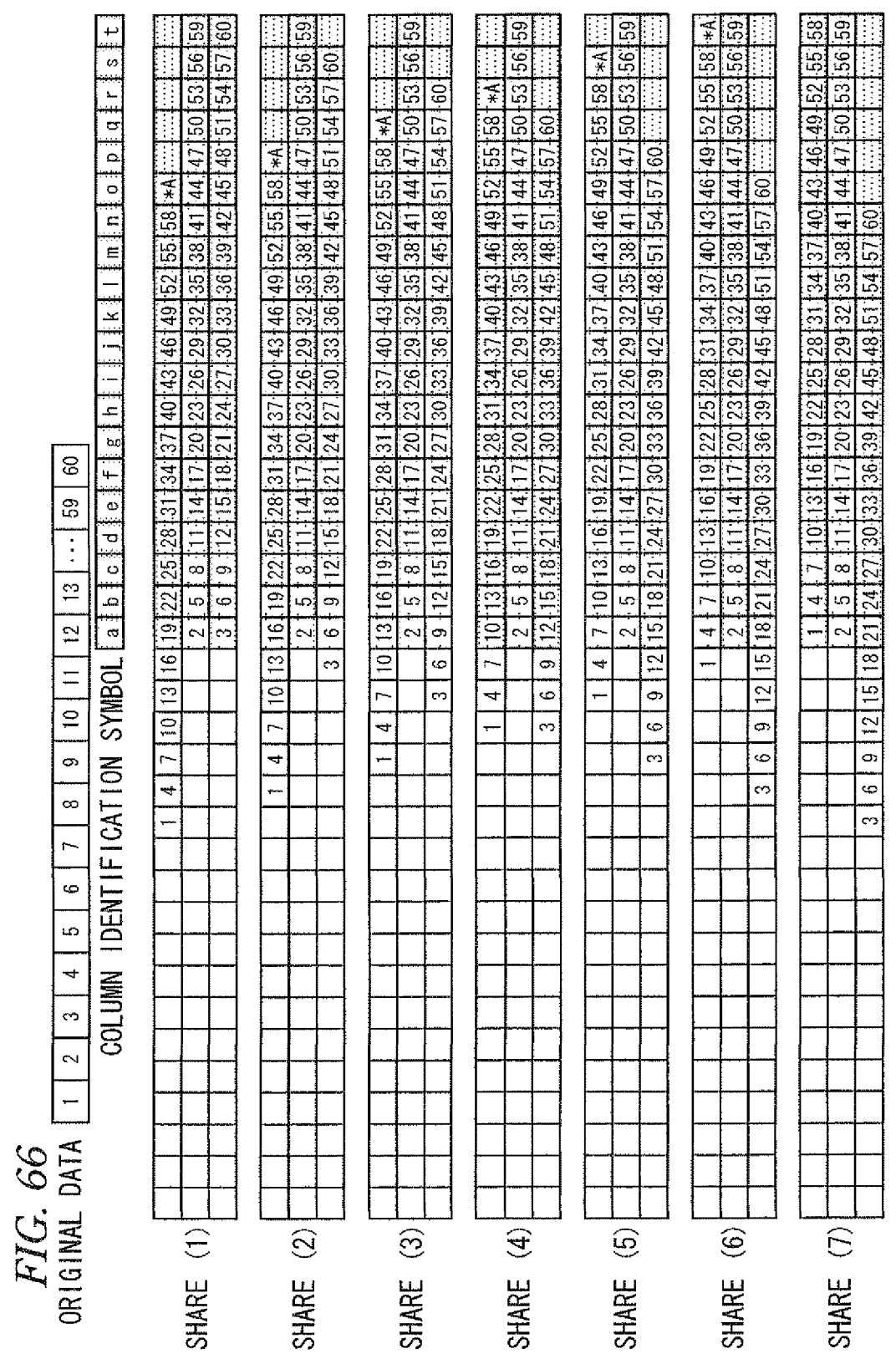

FIG. 66 is a diagram illustrating an example of a generating method of shared data according to the present embodiment. In the above description, description relating to the data number of the original data has not been made. Since the data is arranged in two layers (rows) in the threshold value of 2, and is arranged in three layers (rows) in the threshold value of 3, the data number of the original data should be multiples of the threshold value, such as multiples of 2 or multiples of 3, respectively. However, the data number of the true original data is not limited to multiples of the threshold value as described above.

Thus, in a case where the data number of the original data is not multiples of the threshold value, a process is necessary for adding dummy data at the end of the original data to create the original data, for setting the data number of the original data to multiples of the threshold value. Since the dummy data should be deleted in restoration, the number should be ascertained. It is possible to store this information in header information of each shared data and to read this information in restoration, thereby deleting the dummy data. However, a method of writing the number in a portion where "*A" is written as shown in FIG. 66 and deleting the dummy data in consideration of the data in restoration simplifies a program, which is preferable.

In the above description, the data number information about the dummy data is stored in the portion of "*A", but this information may be inserted in any portion of the original data.

Tenth Embodiment

Figure 67:
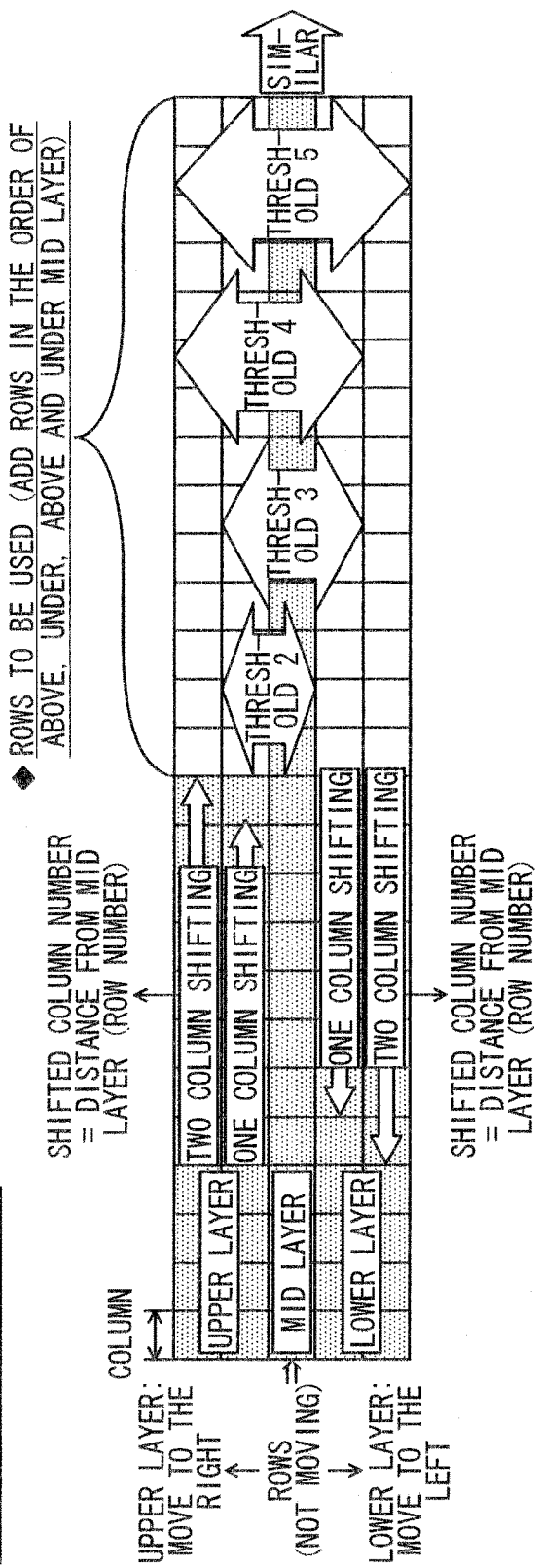
FIG. 67 is a diagram illustrating an example of another generating method of shared data.

FIG. 67 is a schematic diagram illustrating an example of effectively performing a generating method of shared data. A slash portion corresponds to the non-gray portion in FIGS. 57 to 65, which is a portion where the original data which is retained in the shared data is stored. A right part of the slash portion corresponds to the gray portion in FIGS. 57 to 65, which is a portion where a value obtained by XORing each data is stored. The portion which is the gray color represents the mid layer of the row. Here, in the case of even rows, the mid layer is determined by setting one more upper layer compared with the lower layer. Accordingly, in the case of two rows, only the upper and mid layers are present, and the lower layer is not present.

When the shared data is created, rows (layers) of the same number as that of a threshold value are prepared so that two layers correspond to a threshold value of 2 and three layers correspond to a threshold value of 3. The shared data may be used by further stream-encrypting the shared data or by setting a pseudo random number in a row (layer) which exceeds the threshold value. This is not essential for the discussion, and thus is omitted for ease of description.

Firstly, when the shared data is generated, a row (layer) which does not move is determined. Here, the row (layer) which does not move is set to a mid layer indicated by a gray color. In a case where shared data of a threshold value of 2 is generated, one row (layer) is added above the mid layer. Next, in a case where shared data of a threshold value of 3 is generated, one row (layer) is added under the rows (layers) of the threshold value of 2, that is, the upper and mid layers. Similarly, in a case where shared data of a threshold value of 4 is generated, one row (layer) is further added above the uppermost layer of the rows (layers) of the threshold of 3, and in a case where shared data of a threshold value of 5 is generated, one row (layer) is further added under the lowermost layer of the rows (layers) of the threshold value of 4. Thereafter, similarly, if the threshold value is an even number, one row (layer) is further added above the uppermost layer of the rows (layers) of the immediately previous threshold value, and if the threshold value is an odd number, one row (layer) is further added under the lowermost layer of the rows (layers) of the immediately previous threshold value. In this way, rows are sequentially added above, under, above and under the mid layer, to thereby prepare rows to be used.

Further, as described with reference to FIGS. 57 to 65, whenever different shared data is created, columns corresponding to the number of distance (row numbers) from the mid layer are shifted so that data is shifted to the right by one column in the upper layer, data is shifted to the left by one column in the lower layer, data is shifted by one column in the upper and lower layers adjacent to the mid layer, and data is shifted by two columns in the next upper and lower layers adjacent thereto.

Here, the shared data creating method is as described above, but actually, the rows (layers) may be added by a variety of methods as the number of the threshold value is increased, and thus, the shift amount and the shift position of each row (layer) is not limitative. As shown in FIG. 48, the number of rows (layers) which are shifted by the same column number in the same direction may be plural, and the number of rows (layers) which do not move (shift) may be plural, in different shared data. However, as described above, in the creating method of the shared data where the rows (layers) which are shifted by the same column number in the same direction are present, it is difficult to arbitrarily determine the number of shares, and in a case where shared data under the threshold value can be obtained, some rows (layers) are restored, which causes a problem in security. For example, in the case of FIG. 48 where the threshold value is 3, if two pieces of shared data of share (1) and share (2) can be obtained, the pieces of original data 1, 4, 7, . . . , 13 arranged in the upper layer are easily restored.

Accordingly, by shifting columns of different numbers in the respective rows (layers) in a case where the rows (layers) move in the same direction, it is possible to arbitrarily set the number of shares, and to enhance security. Further, like the shared data creating method as described above, if the number of shifted columns is set to be as small as possible, the number of data items in the slash portion is reduced, which is preferable. As described with reference to FIG. 29, a random number is arranged in data which is not XORed, due to security. Thus, by reducing the number of data items in the slash portion as small as possible, it is possible to perform the generation and restoration of shared data at high speed, and to reduce the capacity of storage, which is efficient.

Figure 68:
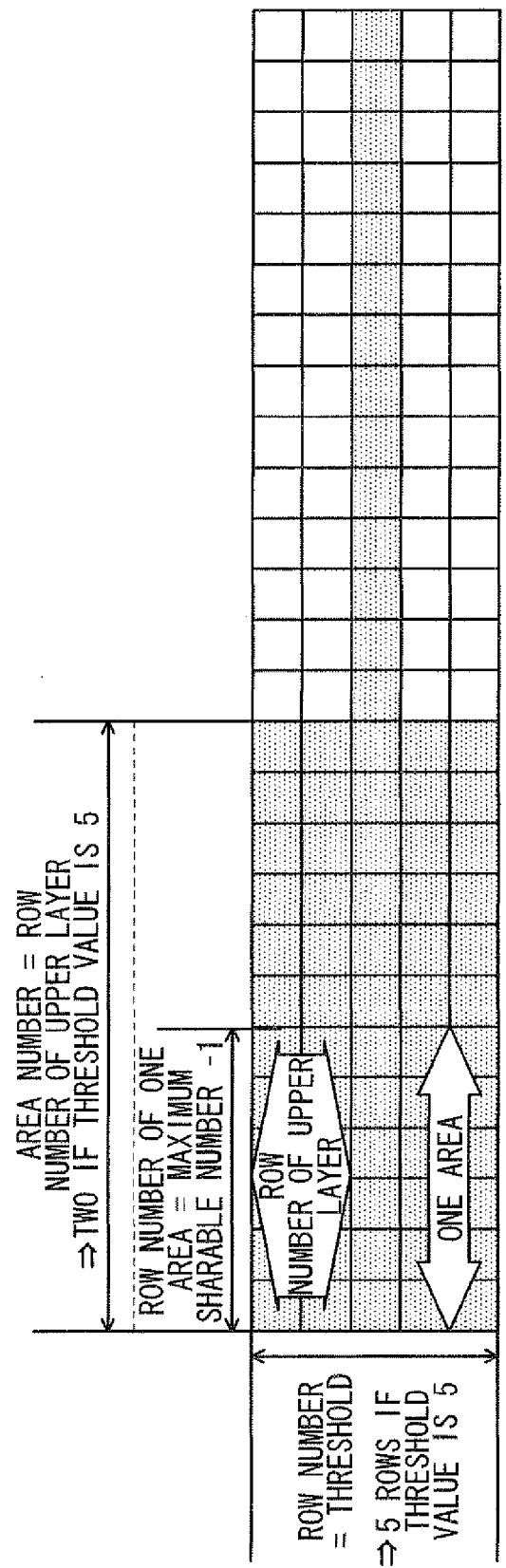
FIG. 68 is a description diagram supplementing FIG. 67.

FIG. 68 is a diagram supplementing FIG. 67. In FIG. 68, in a case where shared data is created by the method described with reference to FIG. 67, the number of columns in the slash portion is shown. Whenever shared data is newly created, since the upper and lower layers adjacent to the mid layer are shifted by one column, with respect to the upper and lower layers adjacent to the mid layer, at least columns of the number corresponding to expression (1) are necessary in the slash portion.

$$\text{Actual number of shares}-1 \quad (1)$$

Figure 69:
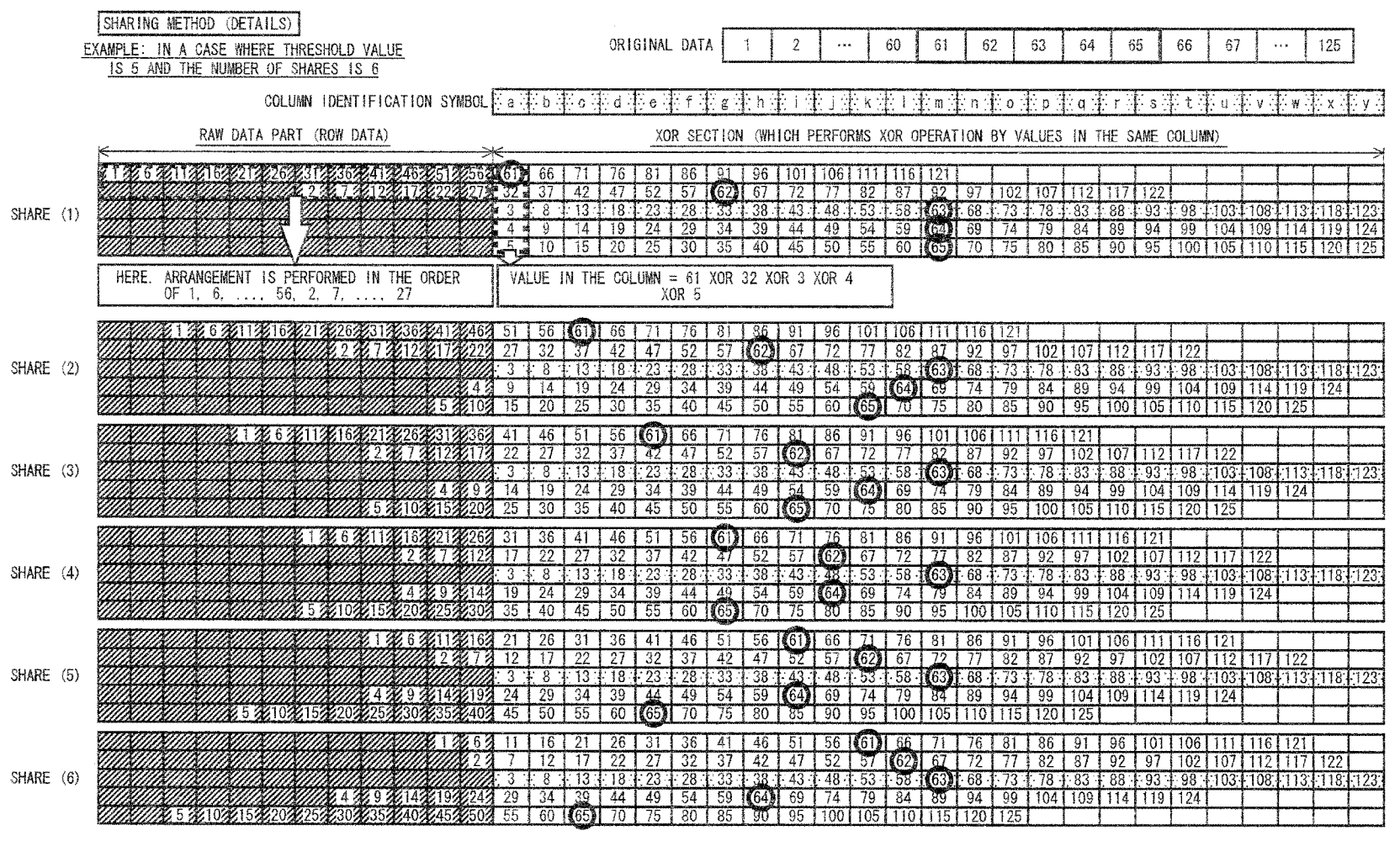

This number of columns is a minimum value, and there is no problem in preparing columns of the number of the minimum value or more. For example, if the number of shares is 6, with respect to the upper and lower layers adjacent to the mid layer, at least five columns are necessary in the slash portion, but it is possible to create the shared data even with six columns or more. Next, FIG. 69 shows such a shared data creating method.

In contrast, the number of columns in the slash portion prepared with respect to the upper and lower layers adjacent to the mid layer corresponds to expression (2), and the actual number of shares may be determined in the range of maximum sharable number.

$$\text{Maximum sharable number(maximum number of shares)}-1 \quad (2)$$

Columns in the slash portion used by the upper and lower layers adjacent to the mid layer are referred to as an "area". That is, the upper and lower layers (cases where the threshold value is 2 and 3) adjacent to the mid layer use columns of the number corresponding to one area (1 is equivalent to the number of rows of the upper layer).

In a case where the threshold value is 4 or more, whenever different shared data is created, rows (layers) which move corresponding to two areas, three areas, . . . appear, but even in this case, in a similar way to cases where the threshold value is 2 and 3, the number of areas equivalent to the number of rows of the upper layer in the slash portion may be prepared. For example, in a case where the threshold value is 4 and 5, two areas may be prepared, and in a case where the threshold value is 6 and 7, three areas may be prepared. Accordingly, the number of columns in the slash portion which is actually necessary corresponds to expression (3).

$$\text{Number of rows in upper layer} \times (\text{maximum sharable number}-1) \quad (3)$$

Since the necessary number of columns in the slash portion also varies by the arrangement method of data, the calculation method of the number of columns as described herein is only an example.

FIG. 69 is a detailed and specific diagram illustrating an example of a shared data creating method in a case where the threshold value is 5 and the number of shares is 6. In a similar way to FIGS. 67 and 68, the slash portion corresponds to the non-gray portion in FIGS. 57 to 65, which is a portion where the original data which is retained in the shared data is stored (raw data part where the value of the original data is viewed as it is). The right side portion with reference to the slash portion corresponds to the gray portion in FIGS. 57 to 65, which is a portion where a value obtained by XORing each data is stored.

Further, for ease of description, it is herein assumed that the original data is divided into 125 blocks (areas). In this way, the actual number of blocks is preferably multiples of the threshold value, but is not necessarily limited thereto. It is possible to set insufficient blocks to empty data or to fill them with dummy data, and the number of blocks divided from the original data is not an essential point.

If the original data is divided into 1, 2, 3, . . . , 125 blocks, the respective blocks are arranged from the uppermost layer to the lowermost layer in the ascending order of block numbers, to generate each shared data. That is, block 1 is arranged in the uppermost layer, block 2 is arranged in the next upper layer, block 3 is arranged in the mid layer, block 4 is arranged in the next lower layer, and then block 5 is arranged in the lowermost layer. After the arrangement is completed in all the rows (layers), similarly, the respective blocks are arranged from the uppermost layer to the lowermost layer in the ascending order of block numbers, in the right adjacent column. That is, block 6 is arranged to in a column which is adjacent to the right by one column in the same row (uppermost layer) as in block 1, block 7 is arranged to in a column which is adjacent to the right by one column in the same row (layer) as in block 2, block 8 is arranged to in a column which is adjacent to the right by one column in the same row (mid layer) as in block 3, block 9 is arranged to in a column which is adjacent to the right by one column in the same row (layer) as in block 4, and block 10 is arranged to in a column which is adjacent to the right by one column in the same row (lowermost layer) as in block 5. Then, the same operation is repeated for arrangements up to block 125.

In each shared data, the positions of columns of the respective rows (layers) where the first block is arranged are different from each other, except for the mid layer. In the uppermost layer of shared data (1) which is the first shared data, the position of the column where the first block is arranged is disposed on the leftmost side of the slash portion, that is, on the left side by two areas from the leftmost column (column a) where the XOR operation is performed. Here, since the maximum number of shares is 7, one area includes six columns. Further, in the next upper layer of shared data (1), the position of the column where the first block is arranged is disposed on the left side by one area from the leftmost column where the XOR operation is performed. Further, in the mid layer to the lowermost layer, the position of the column where the first block is arranged corresponds to the leftmost column where the XOR operation is performed.

Such an arrangement is used to reduce the number of data items which are arranged in the raw data part if possible, and actually, the position of the first column is not limitative.

Next, in the uppermost layer of shared data (2) which is the second shared data, the position of the column where the first block is arranged is laterally disposed on the right side by two columns in the same row (uppermost layer) of shared data (1). Further, in the next upper layer of shared data (2), the position of the column where the first block is arranged is laterally disposed on the right side by one column in the same row of shared data (1). Further, in the subsequent mid layer, the position of the column where the first block is arranged corresponds to the leftmost column where the XOR operation is performed, in a similar way to shared data (1). Further, in the subsequent lower layer, the position of the column where the first block is arranged is reversed in its direction compared with the position thereof in the upper layer. That is, in the lowermost layer of shared data (2), the position of the column where the first block is arranged is laterally disposed on the left side by two columns in the same row (lowermost layer) of shared data (1). Further, in the next lower layer of shared data (2), the position of the column where the first block is arranged is laterally disposed on the left side by one column in the same row of shared data (1).

This operation is similarly performed to generate shared data (3), (4), (5) and (6). Here, as described above, since the maximum number of shares is 7, in shared data (6), the first block in each upper layer is not arranged in the leftmost column where the XOR operation is performed. Further, the first block in the lower layer and the lowermost layer do not reach a location one area and two areas spaced from the leftmost column where the XOR operation is performed. If the maximum number of shares is 6, in shared data (6), the first block in each upper layer is arranged in the leftmost column where the XOR operation is performed. Further, the first block in the lower layer and the lowermost layer reaches a location one area and two areas spaced from the leftmost column where the XOR operation is performed. The arrangement position of the first block in each layer is reversed compared with the arrangement position thereof in shared data (1).

Here, setting the maximum number of shares to 7 for creation of shared data having the number of shares of 6 is for simplification of the XOR operation. As understood from shared data (1) to (6), the number of blocks in each upper layer and each lower layer is necessarily larger than the number of blocks in the mid layer. Accordingly, the method of calculating the number of blocks to be XORed can be communalized in the respective columns, which is simple. On the other hand, if shared data (7) is created, the number of blocks in the uppermost layer and the upper layer in shared data (7) becomes smaller than that in the mid layer. Thus, a different process should be performed as much to calculate the number of blocks to be XORed. Accordingly, it is preferable to set the maximum number of shares to the number obtained by adding 1 to the number of shares actually desired.

Here, the blocks in the respective rows (layers) are sequentially arranged in the order of shared data (1) to (6) by shifting the columns to the right and left using the method in FIG. 67. However, actually, as described with reference to FIG. 67, the shift amount and the shift position of each row (layer) is not limitative. However, as described above, if the arrangement is performed so that block combinations in all columns vary, it is possible to easily increase the number of shares, which is preferable in security. Further, it is possible to reduce the number of data items in the raw data part, which is preferable.

If the arrangement is performed as described above, in shared data (1), blocks 1, 6, 56 and blocks 2, 7, ..., 27 are arranged in a raw data part. Here, the arrangement order of these blocks is not significant.

Further, a calculation result of expression (4) is arranged in column a of an XOR section of shared data (1).

$$\text{"61" XOR "32" XOR "3" XOR "4" XOR "5"} \quad (4)$$

Here, numerals with double-quotations represent block indexes. For example, "61" represents block 61. The same notation is used in the following description. Similarly, in column b, a calculation result of expression (5) is arranged.

$$\text{"66" XOR "37" XOR "8" XOR "9" XOR "10"} \quad (5)$$

Hereinafter, the same XOR operation is performed in column c, column d, ..., column y, and its calculation result is arranged in each column.

That is, shared data (1) includes values of blocks 1, 6, ..., 56 and blocks 2, 7, ..., 27 as they are, and includes values of column a, column b, column y XORed in each column. The arrangement of these values is not significant, but if the respective values are arranged in the order shown in FIG. 69, it is effective in simply performing the restoration process.

As understood from shared data (1), the values of blocks 1, 6, ..., 56 and blocks 2, 7, ..., 27 are seen as they are. Further, since the XOR operation is performed under five blocks in columns n to y, combinations of values to be inferred are reduced compared with the other columns, and thus, the security level is lowered.

Accordingly, it is preferable that blocks 1 to 60 and blocks 66 to 125 of the original data be set to random numbers. To be precise, a block which is secure even if the block is not set to the random number is present among the blocks which are set to the random numbers, like block 3 or block 66, but it is troublesome to calculate the position of the secure block, and thus, the approximate process as described above is simple and preferable.

That is, if the original data is generated by arranging data (original data) to actually be kept secret, corresponding to five blocks, in blocks 61 to 65 and by arranging random numbers in blocks other than blocks 1 to 125, and if the shared data is generated from the original data, the security level is enhanced and the process can be simple, which is preferable. In restoration, the blocks of random numbers may be deleted from the original data, and the data to actually be kept secret corresponding to five blocks may be extracted. Here, the arrangement of the data to actually be kept secret in the blocks should not be necessarily performed in the order of arrangement of the data to actually be kept secret.

In a case where the data to actually be kept secret exceeds five blocks, the blocks of data to actually be kept secret may be added subsequent to blocks 61 to 65, and thus, blocks of random numbers are not necessary any more.

The data size of 1 block may be 1 bit, 1 byte or 4 bytes, and the data size is arbitrary. Here, if the XOR operation is performed in large amounts at one time, since the process speed is enhanced, it is preferable that the maximum data size capable of being XORed be a data size of 1 block, in a CPU to be used.

When the data to actually be kept secret is divided into blocks, in a case where it is less than one block, a dummy data may be added to form one block and may be deleted in restoration. Information about the position, the size or the like of the added dummy data may be written in any block or header information.

Similarly, even in a case where the data to actually be kept secret is under five blocks, dummy data may be added, that is, a dummy block may be added to form five blocks. Similarly, in a case where the data to actually be kept secret is six blocks or more but does not have a pitch of five blocks, the above process is applied. Here, since the threshold value is 5, the pitch of five blocks is used, but if the threshold value is N (N=1, 2, ... ), a pitch of N blocks is used. The data to actually be kept secret in the threshold value of N should not necessarily use the pitch of N blocks as described above, but may use a pitch of one block. For example, among blocks 61 to 65, only one block may correspond to the data to actually be kept secret, and all the remaining data may be dummy data.

FIG. 70 is a schematic diagram illustrating an example of effectively performing a restoring method of shared data. Here, a case where shared data (1) to (5) in FIG. 69 is used will be described as an example. The restoring method is not limitative, but if the method described herein is used, it is possible to easily perform a restoration program process.

Firstly, the shared data used in restoration is rearranged in the ascending order of serial numbers. Here, the serial numbers refer to numbers of (1) to (6) assigned to the shared data in FIG. 69. Here, as the shared data has a small serial number, block 1 is positioned on the left side. Here, for example, since shared data (1) to (5) in FIG. 69 is used, the shared data is arranged from the top in the order of shared data (1) to (5) as it is.

In the restoration process, the first row (uppermost layer) is restored using shared data having the smallest serial number. Further, the next row (layer) is restored using shared data having the next smallest serial number. Similarly, in such a manner that the further next row (layer) is restored using shared data having the further next smallest serial number, rows (layers) to be restored are determined from the top in the order of serial numbers of shared data. Accordingly, here, the restoration is performed in the uppermost layer of shared data (1), in the upper layer in shared data (2), in the mid layer in shared data (3), in the lower layer in shared data (4), and in the lowermost layer in shared data (5).

Figure 71:
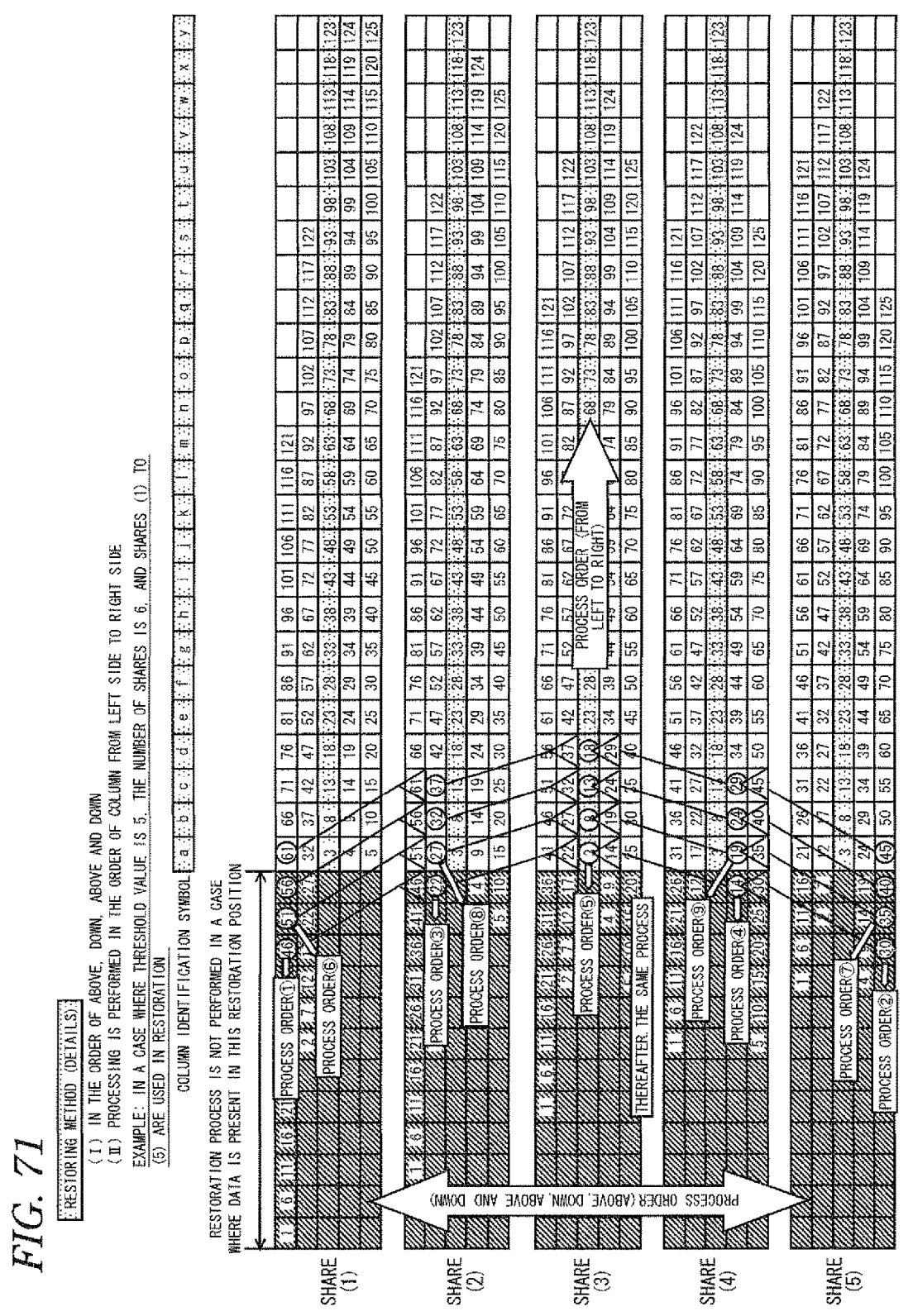

FIG. 71 is a detailed diagram of FIG. 70. Here, the actual order of restoration will be described in detail.

Firstly, shared data (3) in which the mid layer is restored is focused. In shared data (3), block 3 should be firstly restored. Values of blocks 14, 25, 22 and 41 are necessary for restoring block 3. Since these blocks are present in any slash portion of shared data (1) to (5), the values are used as they are. Accordingly, block 3 is obtained by calculating expression (6).

<<shared data (3) column *a*>>XOR "14" XOR "25" XOR "22" XOR "41"  (6)

Here, <<shared data (3) column a>> means a value of column a in shared data (3). In the following description, the same notation will be used.

Similarly, shared data (3) in which the mid layer is restored is focused. In shared data (3), block 8 should be firstly restored. Values of blocks 19, 30, 27 and 46 are necessary for restoring block 8. Since these blocks are present in any slash portion of shared data (1) to (5), the values are used as they are. Accordingly, block 8 is obtained by calculating expression (7).

<<shared data (3) column *b*>>XOR "19" XOR "30" XOR "27" XOR "46"  (7)

Similarly, shared data (3) in which the mid layer is restored is focused. In shared data (3), block 13 should be firstly restored. Values of blocks 24, 35, 32 and 51 are necessary for restoring block 13. Since blocks 35 and 51 are present in any slash portion of shared data (1) to (5), the values are used as they are. On the other hand, since blocks 24 and 32 are not present in any slash portion of shared data (1) to (5), the values should be obtained through restoration.

Firstly, a restoring method of block 32 will be described. As described with reference to FIG. 70, this restoration is performed using shared data (2) in which the upper layer is restored. In shared data (2), values of blocks 8, 14, 20, and 56 are necessary for restoring block 32. Here, block 8 is already restored. Further, since blocks 14, 20 and 56 are present in any slash portion of shared data (1) to (5), the values are used as they are.

Accordingly, block 32 is obtained by calculating expression (8).

<<shared data (2) column *b*>>XOR "8" XOR "14" XOR "20" XOR "56"  (8)

Next, a restoring method of block 24 will be described. As described with reference to FIG. 70, this restoration is performed using shared data (4) in which the lower layer is restored. In shared data (4), values of blocks 8, 40, 22, and 36 are necessary for restoring block 24. Here, block 8 is already restored. Further, since blocks 40, 22 and 36 are present in any slash portion of shared data (1) to (5), the values are used as they are. Accordingly, block 24 is obtained by calculating expression (9).

<<shared data (4) column *b*>>XOR "8" XOR "40" XOR "22" XOR "36"  (9)

Accordingly, since the values of blocks 24, 35, 32 and 51 which are necessary for restoring block 13 in shared data (3) are already known, block 13 is obtained by calculating expression (10).

<<shared data (3) column *c*>>XOR "24" XOR "35" XOR "32" XOR "51"  (10)

Similarly, shared data (3) in which the mid layer is restored is focused. In shared data (3), block 18 should be restored. Values of blocks 29, 40, 37 and 56 are necessary for restoring block 18. Since blocks 40 and 56 are present in any slash portion of shared data (1) to (5), the values are used as they are. On the other hand, since blocks 29 and 37 are not present in any slash portion of shared data (1) to (5), the values should be obtained through restoration.

Firstly, a restoring method of block 37 will be described. As described with reference to FIG. 70, this restoration is performed using shared data (2) in which the upper layer is restored. In shared data (2), values of blocks 13, 19, 25, and 61 are necessary for restoring block 37. Here, block 13 is already restored. Further, since blocks 19 and 25 are present in any slash portion of shared data (1) to (5), the values are used as they are. On the other hand, since block 61 is not present in any slash portion of shared data (1) to (5), the value should be obtained through restoration.

As described with reference to FIG. 70, the restoration of block 61 is performed using shared data (1) in which the uppermost layer is restored. In shared data (1), values of blocks 3, 4, 5 and 32 are necessary for restoring block 61. Since these blocks are already restored or are present in any slash portion of shared data (1) to (5), block 61 is obtained by calculating expression (11).

<<shared data (1) column *a*>>XOR "3" XOR "4" XOR "5" XOR "32"  (11)

Accordingly, block 37 is obtained by calculating expression (12).

<<shared data (2) column *c*>>XOR "13" XOR "19" XOR "25" XOR "61"  (12)

Next, a restoring method of block 29 will be described. As described with reference to FIG. 70, this restoration is performed using shared data (4) in which the lower layer is restored. In shared data (4), values of blocks 13, 45, 27, and 41 are necessary for restoring block 29. Here, block 13 is already restored. Further, since blocks 27 and 41 are present in any slash portion of shared data (1) to (5), the values are used as they are. On the other hand, since block 45 is not present in any slash portion of shared data (1) to (5), the value should be obtained through restoration.

As described with reference to FIG. 70, the restoration of block 45 is performed using shared data (5) in which the lowermost layer is restored. In shared data (5), values of blocks 3, 24, 12 and 21 are necessary for restoring block 45. Since these blocks are already restored or are present in any slash portion of shared data (1) to (5), block 45 is obtained by calculating expression (13).

<<shared data (5) column *a*>>*XOR* "3" *XOR* "24" *XOR* "12" *XOR* "21" (13)

Accordingly, block 29 is obtained by calculating expression (14).

<<shared data (4) column *c*>>*XOR* "13" *XOR* "45" *XOR* "27" *XOR* "41" (14)

Accordingly, block 18 in the mid layer is obtained by calculating expression (15).

<<shared data (3) column *d*>>*XOR* "29" *XOR* "40" *XOR* "37" *XOR* "56" (15)

Similarly, shared data (3) in which the mid layer is restored is focused. In shared data (3), block 23 should be restored. Values of blocks 34, 45, 42 and 61 are necessary for restoring block 23. Blocks 45 and 61 are already restored. On the other hand, since blocks 34 and 42 are not present in any slash portion of shared data (1) to (5), the values should be obtained through restoration.

Firstly, a restoring method of block 42 will be described. As described with reference to FIG. 70, this restoration is performed using shared data (2) in which the upper layer is restored. In shared data (2), values of blocks 18, 24, 30, and 66 are necessary for restoring block 42. Here, blocks 18, 24 and 30 are already restored or are present in any slash portion of shared data (1) to (5). On the other hand, since block 66 is not present in any slash portion of shared data (1) to (5), the value should be obtained through restoration.

As described with reference to FIG. 70, the restoration of block 66 is performed using shared data (1) in which the uppermost layer is restored. In shared data (1), values of blocks 8, 9, 10, and 37 are necessary for restoring block 66. Since these blocks are already restored or are present in any slash portion of shared data (1) to (5), block 66 is obtained by calculating expression (16).

<<shared data (1) column *b*>>*XOR* "8" *XOR* "9" *XOR* "10" *XOR* "37" (16)

Accordingly, block 42 is obtained by calculating expression (17).

<<shared data (2) column *d*>>*XOR* "18" *XOR* "24" *XOR* "30" *XOR* "66" (17)

Next, a restoring method of block 34 will be described. As described with reference to FIG. 70, this restoration is performed using shared data (4) in which the lower layer is restored. In shared data (4), values of blocks 18, 50, 32, and 46 are necessary for restoring block 34. Here, blocks 18, 32 and 46 are already restored or are present in any slash portion of shared data (1) to (5). On the other hand, since block 50 is not present in any slash portion of shared data (1) to (5), the value should be obtained through restoration.

As described with reference to FIG. 70, the restoration of block 50 is performed using shared data (5) in which the lowermost layer is restored. In shared data (5), values of blocks 8, 29, 17, and 26 are necessary for restoring block 50. Since these blocks are already restored or are present in any slash portion of shared data (1) to (5), block 50 is obtained by calculating expression (18).

<<shared data (5) column *b*>>*XOR* "8" *XOR* "29" *XOR* "17" *XOR* "26" (18)

Accordingly, block 34 is obtained by calculating expression (19).

<<shared data (4) column *d*>>*XOR* "18" *XOR* "50" *XOR* "32" *XOR* "46" (19)

Accordingly, block 23 in the mid layer is obtained by calculating expression (20).

<<shared data (3) column *e*>>*XOR* "34" *XOR* "45" *XOR* "42" *XOR* "61" (20)

If the restoration is repeatedly performed in the above-described order, it is possible to completely restore the original data.

This order may be generalized for more efficient restoration as follows. The restoration is performed in the order of above, down, above, down and finally mid, like the uppermost layer, the lowermost layer, the upper layer, the lower layer and the mid layer (in a case where the threshold value is even, the last lower layer is not present. Further, if the threshold value is not 4 or more, the second upper and lower layers are not present). Accordingly, here, the restoration is sequentially performed in the order of shared data (1), (5), (2), (4) and (3). Further, if the series of restoration is completed, the restoration is performed in the next column in the similar procedure.

Here, the positions of columns where the restoration is started in the respective rows (layer) are different from each other. In shared data in which the upper layer adjacent to the mid layer is restored, the restoration is started in a position which is shifted to the left by columns corresponding to expression (21) from shared data where the mid layer is restored.

one column×(serial number of shared data in which mid layer is restored−serial number of shared data in which upper layer is restored) (21)

Further, similarly, in shared data in which the lower layer adjacent to the mid layer is restored, the restoration is started in a position which is shifted to the left by columns corresponding to expression (22) from shared data where the mid layer is restored.

one column×(serial number of shared data in which lower layer is restored−serial number of shared data in which mid layer is restored) (22)

Similarly, in shared data in which the next upper layer adjacent to the previous upper layer is restored, the restoration is started in a position which is shifted to the left by columns corresponding to "two columns×(serial number of shared data in which previous upper layer is restored−serial number of shared data in which next upper layer is restored)" from shared data where the previous upper layer is restored. Further, similarly, in shared data in which the next lower layer adjacent to the previous lower layer is restored, the restoration is started in a position which is shifted to the left by columns corresponding to "two columns×(serial number of shared data in which next lower layer is restored−serial number of shared data in which previous lower layer is restored)" from shared data where the previous upper layer is restored. Hereinafter, the restoration is performed in a similar way.

From the above description, the restoration start position of shared data 2 is shifted to the left by columns of expression (23) from shared data 3.

one column×(3−2)=one column (23)

Similarly, the restoration start position of shared data 4 is shifted to the left by columns of expression (24) from shared data 3.

one column×(4−3)=one column (24)

Further, the restoration start position of shared data 1 is shifted to the left by columns of expression (25) from shared data 2.

two columns×(2−1)=two columns (25)

Accordingly, the restoration start position of shared data 1 is shifted to the left by columns of expression (26) from shared data 3 in which the mid layer is restored.

two columns+one column=three columns (26)

Similarly, the restoration start position of shared data 5 is shifted to the left by columns of expression (27) from shared data 4.

two columns×(5−4)=two columns (27)

Accordingly, the restoration start position of shared data 5 is shifted to the left by columns of expression (28) from shared data 3 in which the mid layer is restored.

two columns+one column=three columns (28)

Since the first restoration start position of the mid layer is set to column a, the restoration start position of shared data (1) having the first process order becomes a position which is shifted to the left by three columns from column a in the uppermost layer. This corresponds to block 46. Since this block is present in the slash portion, it is not necessary to perform any process. Next, the restoration start position of shared data (5) having the second process order becomes a position which is shifted to the left by three columns from column a in the lowermost layer. This corresponds to block 30. Since this block is present in the slash portion, it is not necessary to perform any process.

Next, the restoration start position of shared data (2) having the third process order becomes a position which is shifted to the left by one column from column a in the upper layer. This corresponds to block 22. Since this block is present in the slash portion, it is not necessary to perform any process. Next, the restoration start position of shared data (4) having the fourth process order becomes a position which is shifted to the left by one column from column a in the lower layer. This corresponds to block 14. Since this block is present in the slash portion, it is not necessary to perform any process.

Next, the restoration of shared data (3) having the fifth process order is performed. The restoration position corresponds to block 3. Here, since the values of blocks other than block 3 are already known, by XORing column a and the blocks other than block 3, it is possible to restore block 3.

Next, the restoration of shared data (1) having the sixth process order is performed. The restoration position corresponds to block 51 which is adjacent to block 46 on the right side thereof by one column. Since this block is present in the slash portion, it is not necessary to perform any process. Next, the restoration of shared data (5) having the seventh process order is performed. The restoration position corresponds to block 35 which is adjacent to block 30 on the right side thereof by one column. Since this block is present in the slash portion, it is not necessary to perform any process.

Next, the restoration of shared data (2) having the eighth process order is performed. The restoration position corresponds to block 27 which is adjacent to block 22 on the right side thereof by one column. Here, since the values of blocks other than block 27 are already known, by XORing column a and the blocks other than block 27, it is possible to restore block 27. Next, the restoration of shared data (4) having the ninth process order is performed. The restoration position corresponds to block 19 which is adjacent to block 14 on the right side thereof by one column. Here, since the values of blocks other than block 19 are already known, by XORing column a and the blocks other than block 19, it is possible to restore block 19.

Next, the restoration of shared data (3) having the tenth process order is performed. The restoration position corresponds to block 8. Here, since the values of blocks other than block 8 are already known, by XORing column b and the blocks other than block 8, it is possible to restore block 8.

Next, the restoration of shared data (1) having the eleventh process order is performed. The restoration position corresponds to block 56. Since this block is present in the slash portion, it is not necessary to perform any process. Next, the restoration of shared data (5) having the twelfth process order is performed. The restoration position corresponds to block 40. Since this block is present in the slash portion, it is not necessary to perform any process.

Next, the restoration of shared data (2) having the thirteenth process order is performed. The restoration position corresponds to block 32. Here, since the values of blocks other than block 32 are already known, by XORing column b and the blocks other than block 32, it is possible to restore block 32. Next, the restoration of shared data (4) having the fourteenth process order is performed. The restoration position corresponds to block 24. Here, since the values of blocks other than block 24 are already known, by XORing column b and the blocks other than block 24, it is possible to restore block 24.

Next, the restoration of shared data (3) having the fifteenth process order is performed. The restoration position corresponds to block 13. Here, since the values of blocks other than block 13 are already known, by XORing column c and the blocks other than block 13, it is possible to restore block 13.

Next, the restoration of shared data (1) having the sixteenth process order is performed. The restoration position corresponds to block 61. Here, since the values of blocks other than block 61 are already known, by XORing column a and the blocks other than block 61, it is possible to restore block 61. Next, the restoration of shared data (5) having the seventeenth process order is performed. The restoration position corresponds to block 45. Here, since the values of blocks other than block 45 are already known, by XORing column a and the blocks other than block 45, it is possible to restore block 45. Next, the restoration of shared data (2) having the eighteenth process order is performed. The restoration position corresponds to block 37. Here, since the values of blocks other than block 37 are already known, by XORing column c and the blocks other than block 37, it is possible to restore block 37. Next, the restoration of shared data (4) having the nineteenth process order is performed. The restoration position corresponds to block 29. Here, since the values of blocks other than block 29 are already known, by XORing column c and the blocks other than block 29, it is possible to restore block 29. Next, the restoration of shared data (3) having the twentieth process order is performed. The restoration position corresponds to block 18. Here, since the values of blocks other than block 18 are already known, by XORing column d and the blocks other than block 18, it is possible to restore block 18.

If these sequences are repeated, it is possible to restore all blocks and to obtain the original data. As described above, the restoration is performed in the billiard order. For ease of understanding, in FIG. 71, numerals of blocks are surrounded by circles or triangles, which are connected by side lines. Restored positions are surrounded by circles, and positions where the restored positions are used are surrounded by triangles. For example, it means that block 61 restored in column a of shared data (1) is used in restoration in column c of shared data (2). Here, in a case where the block is present in the slash portion, the restoration process is not performed, and its value is used as it is. If all the relationships between restoration and usage are shown, it becomes complicated, and thus, some of the relationships are not shown.

As described above, the restoring method is not limited thereto, but if this procedure is used, it is possible to simply perform restoration at high speed.

FIGS. 72 to 78 show the level of security retained by the threshold secret sharing method according to the present embodiment. FIG. 72 shows the security level in a case where the threshold value is 2 and true random numbers are sufficiently used.

(1) Data S to actually be kept secret includes blocks 1 to 8.

(2) Next, true random numbers which include blocks (1) to (9) having the same block size as that of the data actually to be kept secret are prepared. Further, between the blocks of the data actually to be kept secret, as shown in the figure, the blocks of true random numbers are inserted to generate the original data.

(3) Two pieces of shared data W1 and W2 are generated from the original data by the method according to the present embodiment, as shown in the figure. The blocks of the same columns as in W1 and W2 are XORed. Here, it can be understood that W1 and W2 include the so-called Vernam cipher. Accordingly, if only one piece of shared data is obtained, it is absolutely impossible to perform restoration.

(4) Entropy is calculated. If entropy of data S to actually be kept secret is expressed as H(S), and entropies in a case where either shared data W1 or W2 becomes clear (known) are expressed as H(S|W1) and H(S|W2), respectively, as shown in FIG. 72, expression (29) is obtained.

$$H(S)=H(S|W1)=H(S|W2) \tag{29}$$

That is, this is a (k, n) complete threshold secret sharing scheme which is infologically secure. Accordingly, in a similar way to (3), it can be understood that if only one piece of shared data is obtained, it is absolutely impossible to perform restoration. Here, k is a threshold value (here, 2), and n is the number of shares.

FIG. 73 is a diagram illustrating the security level in a case where the threshold value is 3 and true random numbers are sufficiently used.

(1) Data S to actually be kept secret includes blocks 1 to 6.

(2) Next, true random numbers which include blocks (1) to (8), (9) to (16) having the same block size as that of the data to actually be kept secret are prepared. Further, between the blocks of the data to actually be kept secret, as shown in the figure, the blocks of true random numbers are inserted to generate the original data.

(3) Three pieces of shared data W1, W2 and W3 are generated from the original data by the method according to the present embodiment, as shown in the figure. The blocks of the same columns as in W1, W2 and W3 are XORed. Here, it can be understood that W1, W2 and W3 include the so-called Vernam cipher. Accordingly, if only one or two pieces of shared data are obtained, it is absolutely impossible to perform restoration.

(4) Entropy is calculated. If entropy of data S to actually be kept secret is expressed as H(S), and entropies in a case where any two of shared data W1, W2 and W3 become clear (known) are expressed as H(S|W1, W2), H(S|W1, W3) and H(S|W2, W3), respectively, as shown in FIG. 73, expression (30) is obtained.

$$H(S) = H(S|W1, W2) \tag{30}$$
$$= H(S|W1, W3)$$
$$= H(S|W2, W3)$$

That is, this is a (k, n) complete threshold secret sharing scheme which is infologically secure. Accordingly, in a similar way to (3), it can be understood that if only one or two pieces of shared data are obtained, it is absolutely impossible to perform restoration. Here, k is a threshold value (here, 3), and n is the number of shares.

FIG. 74 is a diagram illustrating the security level in a case where the threshold value k is an arbitrary value and true random numbers are sufficiently used. If the same calculation as in the case of FIG. 72 or 73 is performed, expression (31) is obtained.

$$H(S)=H(S|(k-1)\text{pieces of shared data}) \tag{31}$$

That is, this is a (k, n) complete threshold secret sharing scheme which is infologically secure.

FIG. 75 is a diagram illustrating the security level in a case where the threshold value is 2 and true random numbers are not used at all.

(1) Data S to be actually be kept secret includes blocks 1 to 8.

(2) Two pieces of shared data W1 and W2 are generated from the original data by the method according to the present embodiment, as shown in the figure. The blocks of the same columns as in W1 and W2 are XORed.

(3) Entropy is calculated. If entropy of data S to actually be kept secret is expressed as H(S), and entropies in a case where either shared data W1 or W2 becomes clear (known) are expressed as H(S|W1) and H(S|W2), respectively, as shown in FIG. 75, expression (32) is obtained.

$$\tfrac{1}{2} \times H(S)=H(S|W1)=H(S|W2) \tag{32}$$

That is, this is an (k, L, n) ramp threshold secret sharing scheme where L=k=2. In a case where the shared data is generated only by the data to actually be kept secret as described above, since there is a possibility that any characteristic used for the data to actually be kept secret, such as a known data format, is inferred to attempt restoration, it is preferable that the shared data be generated while preparing such measures that the data to actually be kept secret is encrypted by pseudo random numbers or the like.

FIG. 76 is a diagram illustrating the security level in a case where the threshold value is 3 and true random numbers are not used at all.

(1) Data S to actually be kept secret includes blocks 1 to 6.

(2) Three pieces of shared data W1, W2 and W3 are generated from the original data by the method according to the present embodiment, as shown in the figure. The blocks of the same columns as in W1, W2 and W3 are XORed.

(3) Entropy is calculated. If entropy of data S to actually be kept secret is expressed as H(S), and entropies in a case where any one of shared data W1, W2 and W3 becomes clear (known) are expressed as H(S|W1), H(S|W2) and H(S|W3), respectively, as shown in FIG. 76, the expression of $\tfrac{2}{3} \times H(S)=H(S|W1)=H(S|W2)=H(S|W3)$ is obtained. Further, if entropies in a case where any two of shared data W1, W2 and W3 are clear (known) are expressed as H(S|W1, W2), H(S|W1, W3) and H(S|W2, W3), respectively, expression (33) is obtained as shown in FIG. 76.

$$\frac{1}{3} \times H(S) = H(S | W1, W2)$$
$$= H(S | W1, W3)$$
$$= H(S | W2, W3)$$
(33)

That is, this is an (k, L, n) ramp threshold secret sharing scheme where L=k=3. In a case where the shared data is generated only by the data to actually be kept secret as described above, since there is a possibility that any characteristic used for the data to actually be kept secret, such as a known data format, is inferred to attempt restoration, it is preferable that the shared data be generated while preparing such measures that the data to actually be kept secret is encrypted by pseudo random numbers or the like.

FIG. 77 is a diagram illustrating the security level in a case where the threshold value k is an arbitrary value and true random numbers are not used at all. It can be understood that if the same calculation as in the case of FIG. 75 or FIG. 76, expression (34) is obtained with respect to an arbitrary k.

$$1/k \times H(S) = H(S|(k-1) \text{pieces of shared data})$$
(34)

That is, this is a (k, L, n) ramp threshold secret sharing scheme where L=k.

Figure 78:
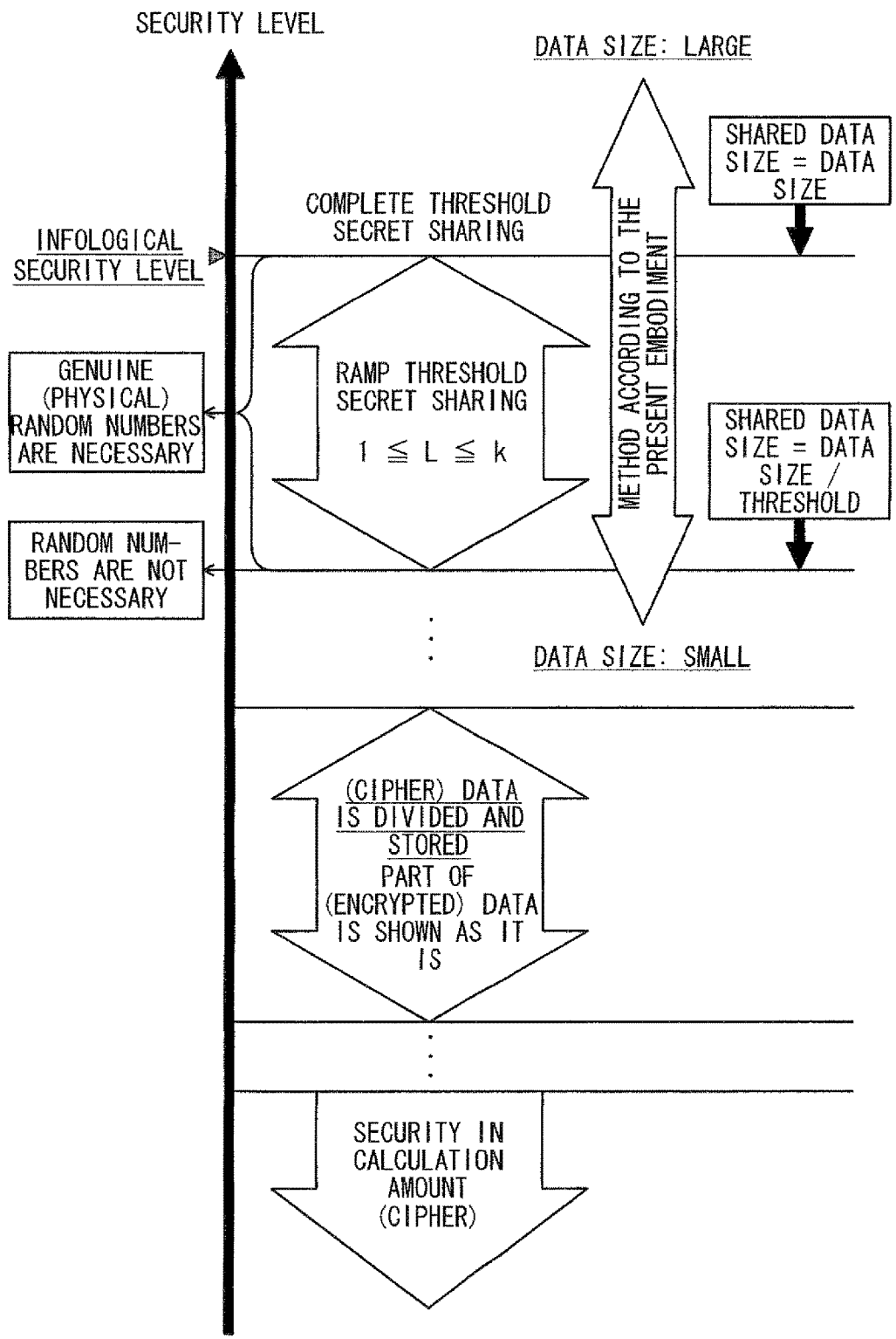
FIG. 78 is a diagram illustrating a security level which is retained by a threshold secret sharing scheme according to an embodiment of the invention.

FIG. 78 is a diagram generally illustrating the security level which is retained by the threshold secret sharing scheme according to the present embodiment. The original data is generated by inserting true random numbers in data to actually be actually be kept secret, to thereby create shared data. In a case where the number of true random numbers is 0, as shown in FIGS. 75 to 77, it becomes a (k, L, n) ramp threshold secret sharing scheme where L=k having the lowermost security level in the ramp threshold secret sharing scheme. If the number of true random numbers is gradually increased, the entropy of the shared data is also increased in proportion thereto. That is, it becomes a (k, L, n) ramp threshold secret sharing scheme where 1<L<k. Further, if the number of true random numbers is the size of the data to actually be kept secret or more, it becomes a (k, L, n) ramp threshold secret sharing scheme where L=1 which is completely infologically secure, that is, a (k, n) complete threshold sharing scheme.

That is, values L of the ramp threshold secret sharing scheme are gradually changed from L=k which is the lowermost security level to L=1 which is the uppermost security level, by the number of true random numbers. In other words, the security level is continuously changed from the (k, L, n) ramp threshold secret sharing scheme of L=k which is the lowermost security level in the threshold secret sharing scheme to the (k, complete threshold sharing scheme which is completely infologically secure. This is a unique characteristic, which is not present in other threshold secret sharing schemes. Thus, a user can easily trade-off an economic benefit through reduction in data size or the like with the security level.

Figure 79:
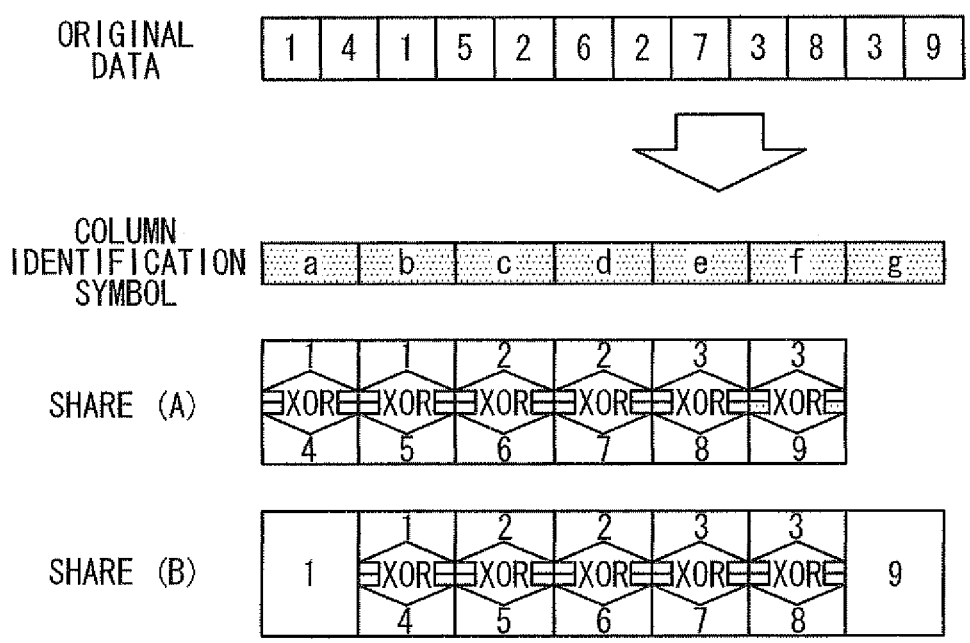
FIG. 79 is a diagram illustrating a method of improving failure resistance.

Then, referring to FIG. 79, a secret sharing scheme of a lower security level, compared with the (k, L, n) ramp threshold secret sharing scheme, may be also realized, according to the present embodiment.

Further, a considerably high cost is necessary for obtaining a large amount of true random numbers. According to the present embodiment, since the (k, L, n) ramp threshold secret sharing scheme where L=k, that is, the threshold secret sharing which does not need true random numbers may be also selected, the cost for obtaining true random numbers is not essential.

As described above, in the case of the (k, L, n) ramp threshold secret sharing scheme where L=k, there is a risk in that any characteristic used for the data to be kept secret, such as a known data format, is inferred to attempt restoration. However, there are many solutions to this problem, and thus, this is not a fatal defect. For example, data obtained by encrypting data to be kept secret with pseudo random numbers may be set to the original data to create shared data, or data obtained by arranging data to actually be kept secret with the pseudo random numbers may be set to the original data to create shared data. Further, data obtained by alternately inserting a plurality of pieces of data to actually be kept secret which is independent may be set to the original data to create shared data.

In a method of encrypting data and dividing and storing the data by a method which is equivalent to a sharing scheme used in RAID (Redundant Arrays of Inexpensive Disks), the entropy of each shared data is considerably low (that is, estimation is easy), and the security level is very low.

FIG. 79 is a diagram illustrating a method of improving failure resistance. As understood from original data, the original data is configured so that values of blocks 1 to 3 are overlapped. If the data is overlapped in this way, the entropy is reduced and the security level is decreased, but even though a part of data is lost, a possibility that the original data can be restored is enhanced. For example, even though data of column c in share (A) is lost, by using column b in share (A), column c and column d in share (B), it is possible to restore the data of column c in share (A). As described above, according to the present embodiment, it is possible to easily realize improvement of failure resistance.

Figure 80:
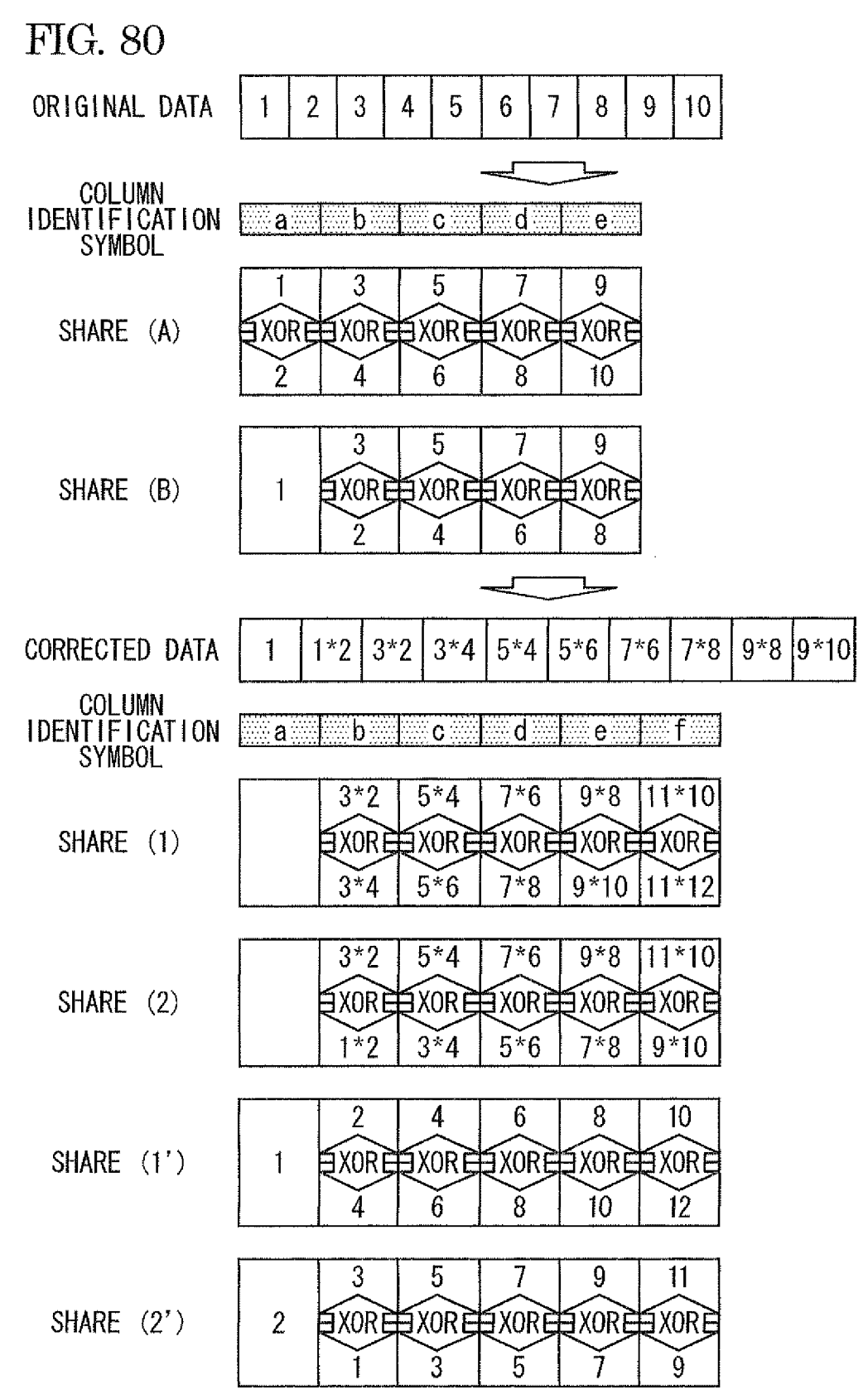

FIG. 80 is a diagram illustrating a method of generating shared data from shared data. Hereinbefore, shared data is generated from divided data. However, as shown herein, it is possible to generate shared data from shared data. Accordingly, it can be understood that divided data means data division in a broad sense, including shared data.

Firstly, shared data (A) and shared data (B) are generated from original data. These are arranged like corrected data shown in the figure. Here, "*" indicates "XOR". Further, the shared data is generated again from the corrected data. This data includes shared data (1) and shared data (2). Since column b in shared data (1) is "3*2 XOR 3*4", this becomes "2 XOR 4". Such a calculation result is expressed as shared data (1') and shared data (2'). It is necessary to trade-off a value of column a. As understood from shared data (1') and shared data (2'), according to the present embodiment, data is divided into even blocks and odd blocks to generate shared data.

The secret sharing apparatus according to the present embodiment is a secret sharing apparatus which generates, from secret data which includes data to be kept secret or data to be kept secret and random numbers, a plurality of pieces of shared data from which the secret data is able to be restored. The secret sharing apparatus includes a shared data generating section which generates the shared data by performing an XOR operation between pieces of divided data of secret data and generates different shared data by performing an XOR operation by changing data combination between the respective pieces of divided data.

According to the present embodiment, since the XOR operation is performed in the pieces of divided data, it is possible to reduce the shared data to data amount smaller than that of the secret data, and to enhance the sharing and restoration processing speed. Further, it is possible to continuously realize sharing which ranges from the ramp threshold sharing scheme to the complete threshold sharing scheme by the amount of true random numbers. Further, it is possible to realize a threshold secret sharing scheme having an arbitrary threshold value and an arbitrary number of shares.

In the embodiments according to the invention, the secret sharing method which handles the secret data has been described, but it is not necessary that the data to be handled should not be necessarily data to be kept secret, but normal data may be handled. As the normal data, communication data such as text data or image data, which is communicated between communication terminals, or control data which includes control information may be used. If the invention is used for communication, it is possible to efficiently compress data to perform communication.

In the above-mentioned embodiments, XOR calculation is described as function of an operation section which operates two pieces of data or more, whereby the operation process is performed in which predetermined data is subject to a plurality of operations with a common (same) number to return to the predetermined data.

The threshold secret sharing scheme according to the invention is a threshold secret sharing scheme using a secure XOR operation between which original data is not inferred from shared data. Further, with this threshold secret sharing scheme, it is possible to decrease the amount of shared data, and to freely set the number of shares and the threshold value.

This application is based upon and claims the benefit of priority of Japanese Patent Application No. 2011-077630 filed on Mar. 31, 2011, the contents of which are incorporated herein by reference in its entirety.

What is claimed is:

1. A secret sharing apparatus which generates a plurality of shared data from secret data, wherein:
the secret data is restored from at least two of the plurality of shared data,
the secret data is divided into a plurality of pieces of divided data and does not include a random number,
the plurality of pieces of divided data are grouped into a plurality of divided groups each of which has a plurality of columns, each including a piece of the divided data,
the secret sharing apparatus comprises:
a shared data generator which performs an XOR operation between pieces of the divided data located in corresponding columns of each divided group and generates the plurality of shared data including a first shared data and a second shared data, a piece of each of the shared data includes a result of the XOR operation, and
a transmitter which transmits at least the first shared data to a first apparatus and the second shared data to a second apparatus,
wherein a first divided group, which is one of at least two divided groups generating the first shared data, is shifted at least one column relative to column positions of the first divided group when used as one of at least two divided groups generating the second shared data.

2. The secret sharing apparatus according to claim 1, wherein the shared data generator performs the XOR operation further between combinations of the divided data and random number data, and generates third shared data which includes results of the XOR operation between the pieces of divided data and the combinations of the divided data and the random number data.

3. The secret sharing apparatus according to claim 2, further comprising a random number generator which generates the random number data using at least one piece of divided data among the plurality of pieces of divided data.

4. The secret sharing apparatus according to claim 1, wherein
the shared data generator performs the XOR operation between the divided groups of which a number is N or more, where N is an integer of 2 or larger, and generates the plurality of pieces of shared data having a threshold value of N.

5. The secret sharing apparatus according to claim 1, wherein
the shared data generator adds attribute information indicating an attribute of the shared data to the shared data.

6. The secret sharing apparatus according to claim 5, wherein
the attribute information indicates a process by which the shared data generator performs the XOR operation between the divided groups.

7. The secret sharing apparatus according to claim 1, wherein
the plurality of divided groups further include a second divided group different from the first divided group,
the shared data generator generates the first shared data including a first result of the XOR operation between a piece of the first divided group and a piece of the second divided group, further generates the second shared data including a second result of the XOR operation between the piece of the first divided group and another piece of the second divided group.

8. A secret sharing method comprising generating a plurality of shared data from secret data, wherein:
the secret data is restored from at least two of the plurality of the shared data,
the secret data is divided into a plurality of pieces of divided data and does not include a random number,
the plurality of pieces of divided data are grouped into a plurality of divided groups each of which has a plurality of columns, each including a piece of the divided data,
the secret sharing method includes performing an XOR operation between pieces of the divided data located in corresponding columns of each divided group, generating the plurality of shared data including a first shared data and a second shared data, a piece of each of the shared data includes a result of the XOR operation, and
transmitting at least the first shared data to a first apparatus and the second shared data to a second apparatus,
wherein a first divided group, being used as one of at least two divided groups generating the first shared data, is shifted at least one column relative to column positions of the first divided group when being used as one of at least two divided groups generating the second shared data.

9. The secret sharing method according to claim 8, wherein
the plurality of divided groups further include a second divided group different from the first divided group,
the first shared data includes a first result of the XOR operation between a piece of the first divided group and a piece of the second divided group, and the second shared data includes a second result of the XOR operation between the piece of the first divided group and another piece of the second divided group.

\* \* \* \* \*